United States Patent [19]

Soderberg et al.

[11] Patent Number: 4,625,282

[45] Date of Patent: Nov. 25, 1986

[54] POSTAGE METER WITH KEYBOARD KEYS FOR CAUSING DISPLAY OF DATA PERTAINING TO METER OPERATION

[75] Inventors: John H. Soderberg, Stratford; Howell A. Jones, Southport; Alton B. Eckert, Norwalk; Edward C. Duwel, Trumbull, all of Conn.

[73] Assignee: Pitney Bowes Inc., Stamford, Conn.

[21] Appl. No.: 447,919

[22] Filed: Dec. 8, 1982

[51] Int. Cl.[4] .......................... G06F 3/02; G06F 15/21

[52] U.S. Cl. .......................................... 364/466

[58] Field of Search ........................ 364/200, 900, 466

[56] References Cited

U.S. PATENT DOCUMENTS

| | | | |
|---|---|---|---|
| 4,280,180 | 7/1981 | Eckert et al. | 364/900 |
| 4,286,325 | 4/1981 | Dlugos | 364/900 |
| 4,325,440 | 4/1982 | Crowley | 177/25 |
| 4,481,587 | 11/1984 | Daniels | 364/466 |
| 4,509,141 | 4/1985 | Soderberg | 364/900 |

*Primary Examiner*—Gareth D. Shaw
*Assistant Examiner*—John G. Mills
*Attorney, Agent, or Firm*—Donald P. Walker; William D. Soltow, Jr.; Albert W. Scribner

[57] ABSTRACT

In a postage meter having structures for entering data, for displaying numerical values and other data, and for printing postage, and having a computer electrically connected to each of the aforesaid structures and programmed for processing data for controlling their operation, wherein the data entering structure includes a keyboard having a plurality of depressable numeric keys, and wherein the computer means includes means for storing data and calculating amounts pertaining to the operation of said postage meter; there is provided apparatus and a method of displaying data pertaining to the operation of the postage meter. The method includes the steps of providing the keyboard with a depressable special purpose key, depressing selected numeric keys for causing the display of a predetermined numerical value, depressing the special purpose key when said numerical value on display, and programming the computer for causing the displaying structure to display data pertaining to the operation of the postage meter in response to the depression of the special purpose key. Preferably, the step of causing the display of a predetermined value includes the step of utilizing a predetermined value which includes at least one numeral and does not include a decimal.

30 Claims, 11 Drawing Figures

POSTAGE METER WITH KEYBOARD KEYS FOR CAUSING DISPLAY OF DATA PERTAINING TO METER OPERATION

BACKGROUND OF INVENTION

This application is related to U.S. Application Ser. No. 447,815, now U.S. Pat. No. 4,579,054 of D. P. Baun et al., for "Stand-Alone Electronic Mailing Machine", and to U.S. Application Ser. No. 447,913 of A. B. Eckert, Jr. et. al., for "Initializing The Print Wheels In An Electronic Postage Meter"; both of which applications were filed concurrently herewith, are assigned to the assignee of the present invention and are hereby specifically incorporated herein by reference. In addition, this application is related to five additional concurrently filed co-pending patent applications, each of which is assigned to the assignee of the present invention, i.e., U.S. patent application Ser. Nos. 447,861, now U.S. Pat. No. 4,577,283, for POSTAGE METER WITH KEYBOARD KEYS FOR CAUSING METER OPERATIONS TO BE PERFORMED; 447,901, for POSTAGE METER WITH KEYBOARD KEYS FOR COMMANDING AND REQUESTING PERFORMANCE OF METER OPERATIONS; 447,905, now U.S. Pat. No. 4,509,141, POSTAGE METER WITH KEYBOARD KEYS USED FOR CHANGING OPERATING CONSTANTS; 447,914, for POSTAGE METER WITH DATE CHECK REMINDER MEANS; and 447,870, now U.S. Pat. No. 4,579,054, for POSTAGE METER WITH KEYBOARD KEYS FOR CHANGING POSTAGE UNUSED AMOUNTS.

Currently available electronic postal meters of, for example, the type disclosed in U.S. Pat. No. 4,301,507 for an Electronic Postage Meter Having Plural Computing Systems, issued Nov. 17, 1981 to J. H. Soderberg et al., and assigned to the assignee of the present invention, are generally provided with a keyboard for entering numerical postal values that are to be printed, a display for visually indicating the entered postage and other values, a printing mechanism and a micro-computer including accounting means and means for controlling the various functions of the postal meter.

In the aforesaid U.S. Pat. No. 4,301,507 the various components of the postal meter are compartmented according to their functions to form three units, referred to as the control, accounting and printing units. Each of the units incorporates a dedicated microprocessor having a separately controlled clock and programs. And, two-way communications are conducted via serial channels between the units, and via serial channels between the postage meter and any external apparatus connected to the meter, in the form of serially transmitted single byte "header" only messages, consisting of ten bits including a start bit followed by an 8 bit byte which is in turn followed by a stop bit, or in the form of a multi-byte message consisting of a header and one or more additional bytes of information. All transmitted messages are followed by a no error pulse if the echoplex message was received error free. In practice, each of the units is capable of processing data independently and asynchronously of the other. Further, to allow for compatibility between the postal meter and any external apparatus, all operational data transmitted to, from and between each of the three units and all stored operator information is accessible via the postal meter interface, as a result of which the external apparatus (if any) may be adapted to have complete control of the postal meter as well as access to all current operational information in the postal meter. In addition, the flow of messages to, from and between the three internal units is in a predetermined, hierarchical direction. For example, any command message from the control unit is communicated to the accounting unit, where it is processed either for local action in the accounting unit and/or for a command message in the printing unit. On the other hand, any message from the printing unit is communicated to the accounting unit, where it is either used for internal information or merged with additional data and communicated to the control unit. And, any message from the accounting unit is initially directed to the printing unit or to the control unit.

Some commercially available postal meters which utilize the aforesaid communication system have been provided with a mechanically operable field service switch which is operable to indicate to the meter that a service mode of operation of the meter is in effect in which various messages are given an alternate interpretation, for example, commanding or requesting the postal meter to display selected values stored in the postal meter. In this connection reference is made to U.S. Pat. No. 4,280,180 for an Electronic Postage Meter Having Field Resettable Control Values, issued to A. B. Eckert et al. and assigned to the assignee of the present invention. In U.S. Pat. No. 4,280,180, a second, key controlled, three-position, mechanical switch, is also provided, to permit an authorized user to initiate a series of routines allowing the user to recharge the postal meter with a predetermined amount of additional postage.

To that end, the positions of the three position switch are identified as the "operate", "enter amount" and "enter combination" positions. By positioning the three-position switch in either the "enter combination" or "enter amount" positions the operator may enter the combination or amount respectively into the meter via the keyboard. In each instance the entry results in providing an indication on the display of the entered amount or combination, as the case may be. Leaving each position generates a message causing the displayed value to be entered into the accounting unit and blanking the display for the next entry. Return of the three-position switch to the operate position in either instance causes the accounting unit to complete the recharging routine and return the meter to normal usage with the amount added to the postage unused register. In practice, the combination for this feature is obtained by calling a Data Center having information relevant to remotely enabling the resetting of the postal meter/mailing machine for which the value is being modified, such as the Data Center of Pitney Bowes Inc. To obtain the combination the operator identifies the meter by serial number, and provides the Data Center with the code which is generated and displayed to the operator upon initially moving the key from the operate position, and also provides the value of the postage which the operator is desirous of adding to the postage unused register. Whereupon the Data Center provides the operator with a unique combination for use with the enter combination key, which combination is a random or pseudorandom number which changes with each resetting of the postage used register for security reasons.

Aside from the aforesaid usage, the three position switch is disclosed in U.S. Pat. No. 4,280,180 as being operable in combination with the service switch for changing certain other values stored in the meter, including a settable limit value, consisting of a predetermined maximum postage value which will not be printed if equaled or exceeded, a low postage warning value, consisting of a predetermined value which causes the postal meter to provide a visual indicator informing the user that the postal meter should be recharged, and a dollar unlock value, consisting of a predetermined postal value which will not be printed at any one time unless something is additionally done by the operator after the select postage key is initially actuated.

An object of the present invention is to provide a simply constructed, non-compartmentalized postal meter/mailing machine which includes a modified version of the aforesaid prior art communication system;

Another object is to provide a simply constructed non-compartmentalized, stand-alone, mailing machine which includes an electronically controlled postal meter incorporating a modified version of the aforesaid prior art communication system, and which includes improved means for servicing the mailing machine;

Another object is to provide an electronically controlled postal meter/mailing machine, having a keyboard, with means for entering and modifying various values in the same, including the serial number of the meter/machine via the keyboard; and A further object is to provide an electronically controlled postal meter/mailing machine including a communication system having a single micro-computer which is programmed so as to retain the hierarchical communication and serial message transmission features of the aforesaid prior art communication system for implementing the control, accounting and printing functions of the postal meter/mailing machine, and which includes improved means for informing the user that the date should be checked, invoking various routines for displaying information stored in the postal meter and changing selected values stored in the postal meter.

SUMMARY OF THE INVENTION

In a postage meter having means for entering data, means for displaying numerical values and other data, means for printing postage, computer means electrically connected to each of the aforesaid means and programmed for processing data for controlling the operation thereof, wherein said data entering means includes a keyboard having a plurality of depressable numeric keys, and wherein said computer means includes means for storing data and calculating amounts pertaining to the operation of said postage meter; there is provided apparatus and a method for displaying data pertaining to the operation of said postage meter. The apparatus comprises the keyboard including a depressable special purpose key, the computer means being programmed for causing said displaying means to display a numerical value in response to the depression of selected numeric keys, the computer means being programmed for automatically processing said numerical value on display in response to the depression of said special purpose key, and the computer means being programmed for automatically causing said displaying means to display data pertaining to the operation of said postage meter in response to the depression of said special purpose key when said displayed numerical value is a predetermined value. Preferably the pedetermined value includes at least one numeral and does not include a decimal.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
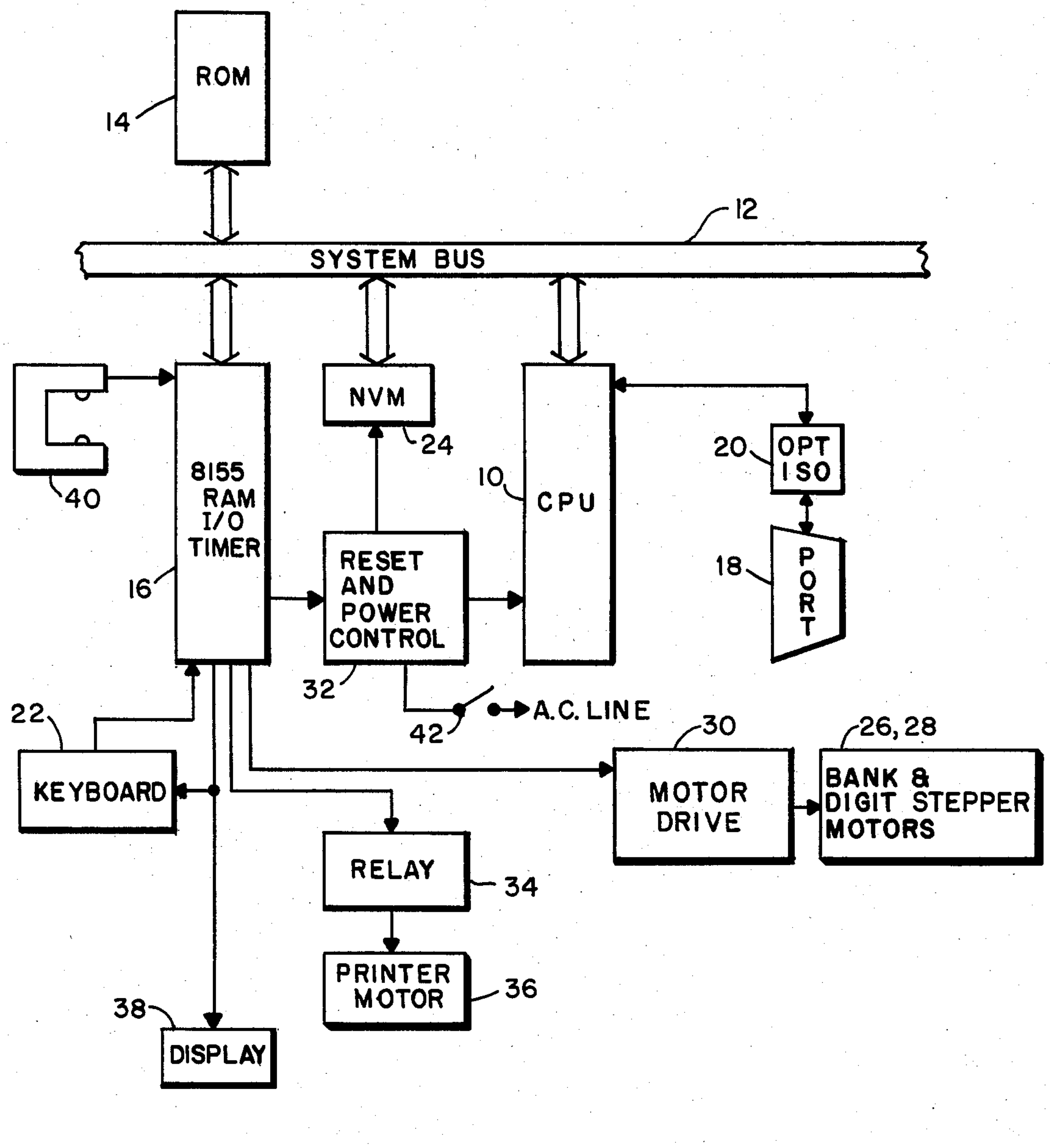
FIG. 1 is a block diagram of the electronic circuits of an electronic postage meter.

The electronic postal meter 130 (FIG. 3) includes an 8-bit microprocessor 10 (FIG. 1) (CPU), such as an Intel Model 8085A microprocessor which is connected to various electronically operable components through a system bus 12, including a ROM 14. The ROM 14, which is provided for storing the programs for controlling the postal meter, includes permanently programmed as well as reprogrammable devices. An integrated circuit 16, such as an Intel Model 8155, is connected to the system bus 12 and includes a RAM, input and output (I/O) lines and a timer. The RAM portion of the integrated circuit 16 has memory allocated for transient storage of the data for the ascending register and descending register. An external data communication port 18 which is connected to the microprocessor 10 through an optical isolator 20, allows for the connection to the postal meter of devices such as an electronic scale, external computer various types of servicing equipment and the like. Also electrically connected to the microprocessor 10 through the system bus 12 is the keyboard 22 of the postal meter and a non-volatile memory (NVM) 24. The bank and digit stepper motors 26, 28 of the postal meter are in electrical connection with the microprocessor 10 via a motor driver 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Preferably the display 38 includes a plurality of, and preferably ten or less, seven segment (with decimal) digit display sections. And, for the purpose of this disclosure each decimal shall be considered to be a segment. And, a trip photosensor 40, which is connected to the microprocessor 10 through the integrated circuit 16, is provided for indicating the presence of an envelope to be imprinted, as described more fully in the aforementioned patent application entitled "Stand-Alone Electronic Mailing Machine".

The electronic postage meter is controlled by the microprocessor 10 operating under control of the program stored in the ROM 14. The microprocessor 10 accepts information entered via the keyboard 22 or via the external communication port 18 from external message generators. Critical accounting data and other important information is stored in the non-volatile memory 24. The non-volatile memory 24, which may be an MNOS semiconductor type memory, a battery augmented CMOS memory, core memory, or other suitable non-volatile memory component, stores critical postal meter data during periods when power is not applied to the postal meter. This data includes, in addition to the serial number of the mailing machine or postal meter, information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the postal meter.

When an on/off switch 42 is turned on (closed) a power supply internal to the mailing machine energizes the microprocessor 10 and the balance of the electronic components. Whereupon information stored in the non-volatile memory 24 is copied into the RAM by the microprocessor 10. Accordingly, after power up the RAM contains an image or copy of the information which was stored only in the non-volatile memory 24 prior to energization. During operation of the postal meter, certain portions of the data in the RAM are ordinarily modified. For example, whenever postage is printed, the value stored in descending register will be reduced by the value of the printed postage, the value in the ascending register will be increased by the value of the printed postage and the value stored in the piece counter register will be incremented. When the power switch 42 is turned off (opened), the updated data reflecting such changed values in the RAM is transferred via the microprocessor 10 back into a suitably prepared area of the non-volatile memory 24. A like transfer of information between the non-volatile memory 24 and the RAM takes place during power failure.

Figure 2A:
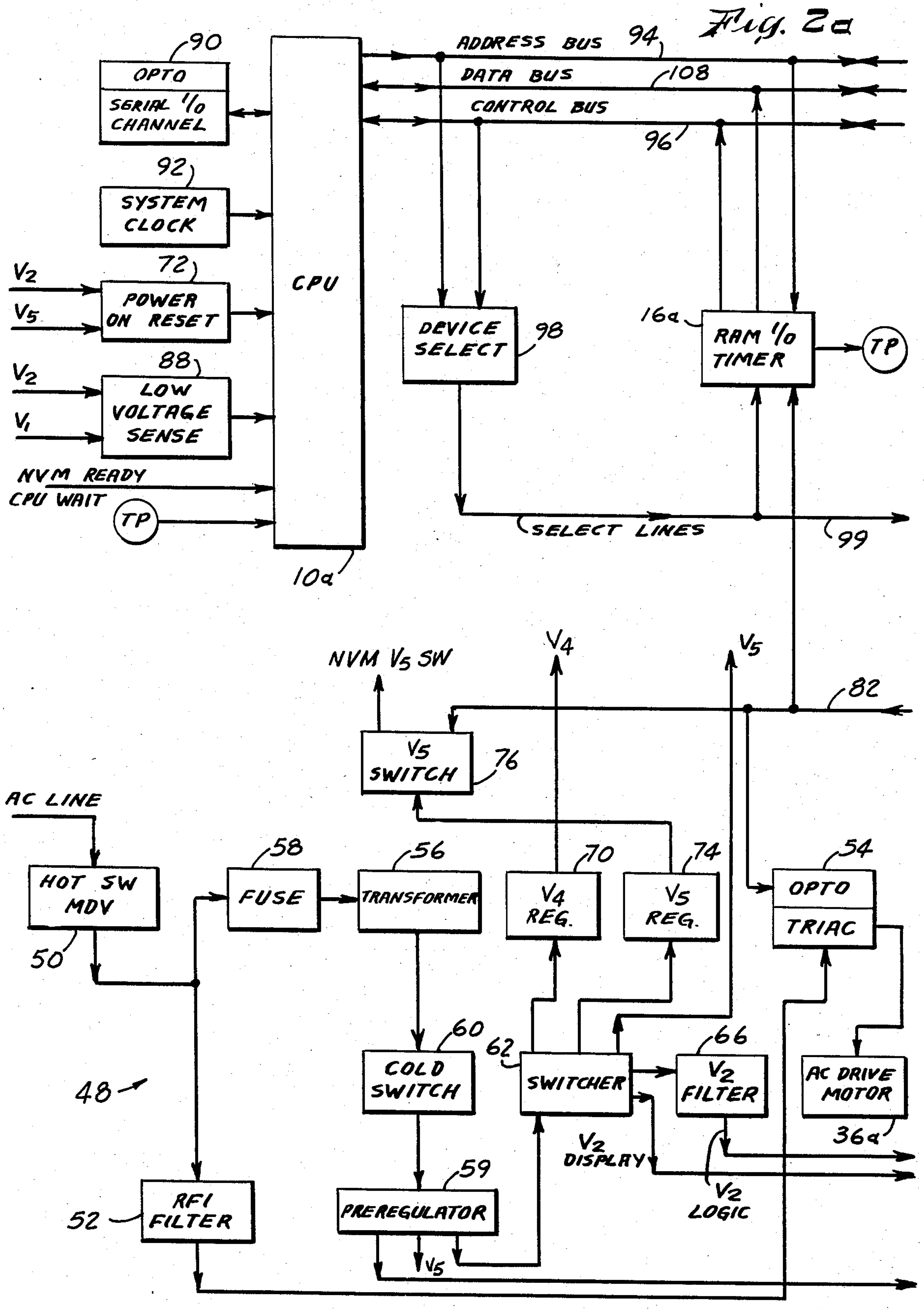
FIG. 2 (including FIGS. 2*a* and 2*b*) is a detailed block diagram of the electronic circuits of the electronic postage meter.
Figure 2B:
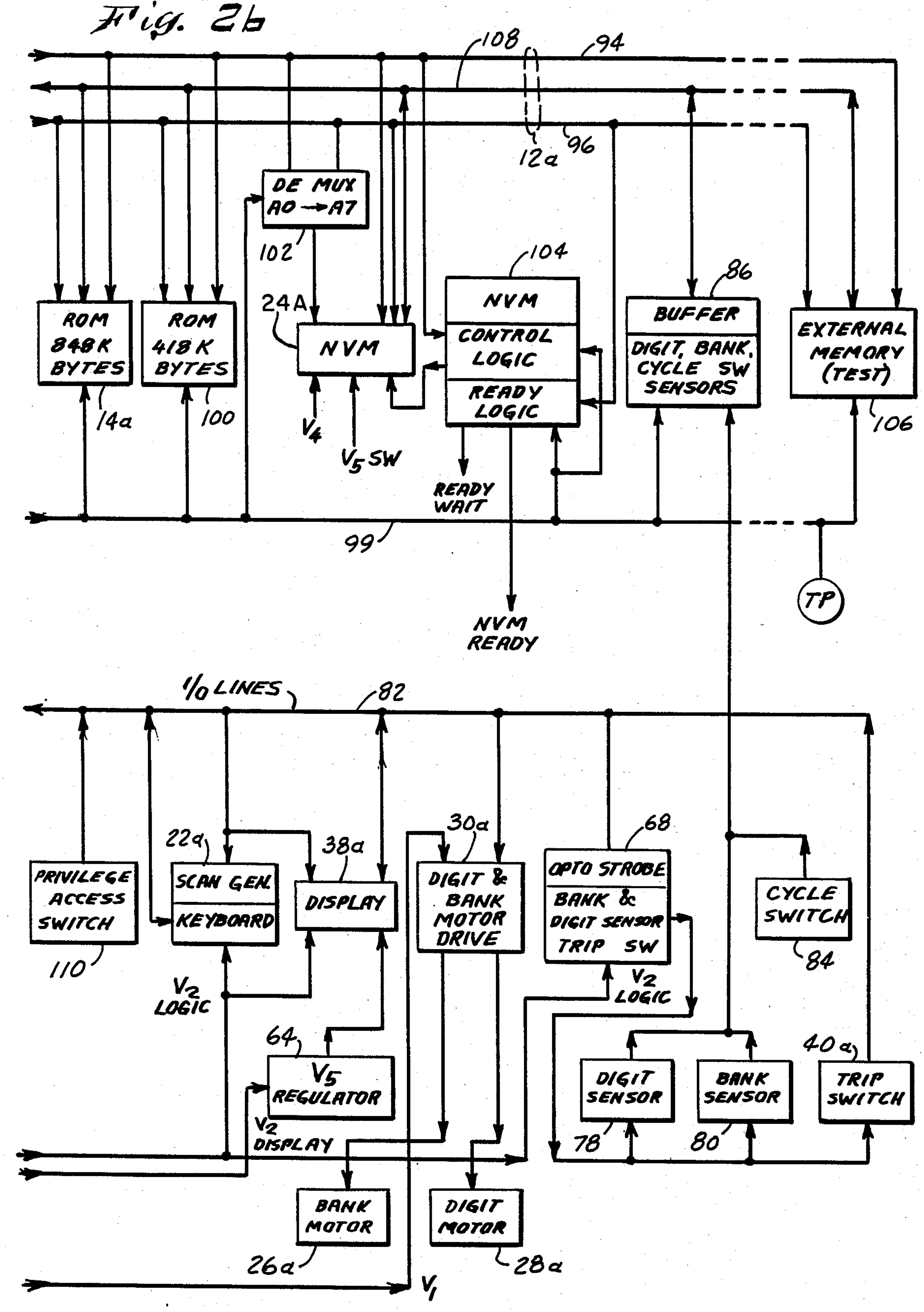

Referring to FIG. 2, a more detailed block diagram of the arrangement of the electrical components of the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also suitably connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display board 38A, and bank, digit and trip sensor logic 68 and to the integrated circuits. The −12 V is applied to a −12 V regulator 70 and then to the non-volatile memory 24A.

The −30 V output from the switcher 62 is also applied to a −30 V regulator 74 and then to a −30 V switch 76 which switches its output voltage on and off in response to the requirements of writing in NVM as dictated by a program. The output of the −30 V switch is applied to the non-volatile memory 24A. The −30 V supply is connected to the power on reset 72 of the microprocessor 10A.

+5 V from the switcher 62 is also applied to one input of the power on reset 72; the other input receives −30 V from the regulator 74 as previously described. A low voltage sensor 88 also receives one input of +5 V from the switcher 62 and its other input from the pre-regulator 59 the output of the voltage sensor 88 is applied to the microprocessor 10A. Upon applying the aforesaid voltages to the microprocessor 10A, the microprocessor system clock 92 is energized. Communications between the microprocessor 10A and the outside world are conducted via the optically isolated serial input and output channels 90. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the form of +24 V is applied to the digit and bank motor drive 30A for the bank motor 26A and digit motor 28A, which respectively select the particular printing wheel (bank) which is to be activated and the particular digit of the selected printing wheel which is to be set.

An output strobe from the integrated circuit 16A is buffered the bank, digit and trip sensor logic 68 and applied to a digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42 (FIG. 1) is closed, and the AC line voltage energizes the electrical components previously described and an Initialization process will occur. Such initialization may include a hard and/or soft initialization process as disclosed in the aforementioned U.S. Pat. No. 4,301,507. Preferably the initialization process for the mechanical components of the meter/machine is as disclosed in the aforementioned patent application entitled "Initializing The Print Wheels In An Electronic Postage Meter".

In operation, the microprocessor 10A under control of the ROM 14A and possibly the auxiliary ROM 100 communicates over the address bus 94 and control bus 96 with the device select 98. The output of the device select 98 communicates with the particular component to be addressed over select lines 99, including the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready, wait and NVM ready signals to the microprocessor 10A to indicate the presence of the slow speed device (NVM) as active on the bus 12A.

As previously mentioned, the digital sensor 78 (optical encoder) and bank sensor 80 (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to the I/O lines to transmit receive data from the trip sensor 40A, the display 38A, keyboard 22A, and, if present, a privileged access switch 110 which is kept under seal. The switch 110 is provided for use in applications which require manual resetting of meter postage by authorized personnel of, for example, the Postal Service.

Figure 3:
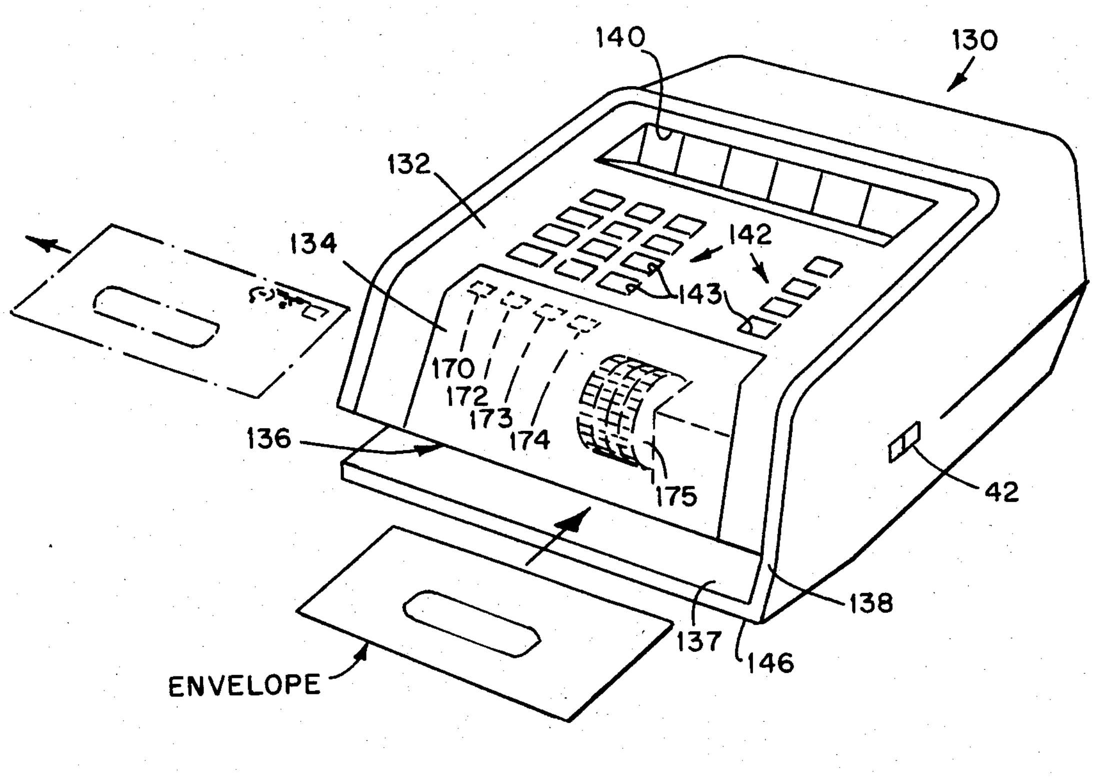
FIG. 3 is a front perspective view of a mailing machine, including a postal meter, which incorporates the features of the present invention.
Figure 4:
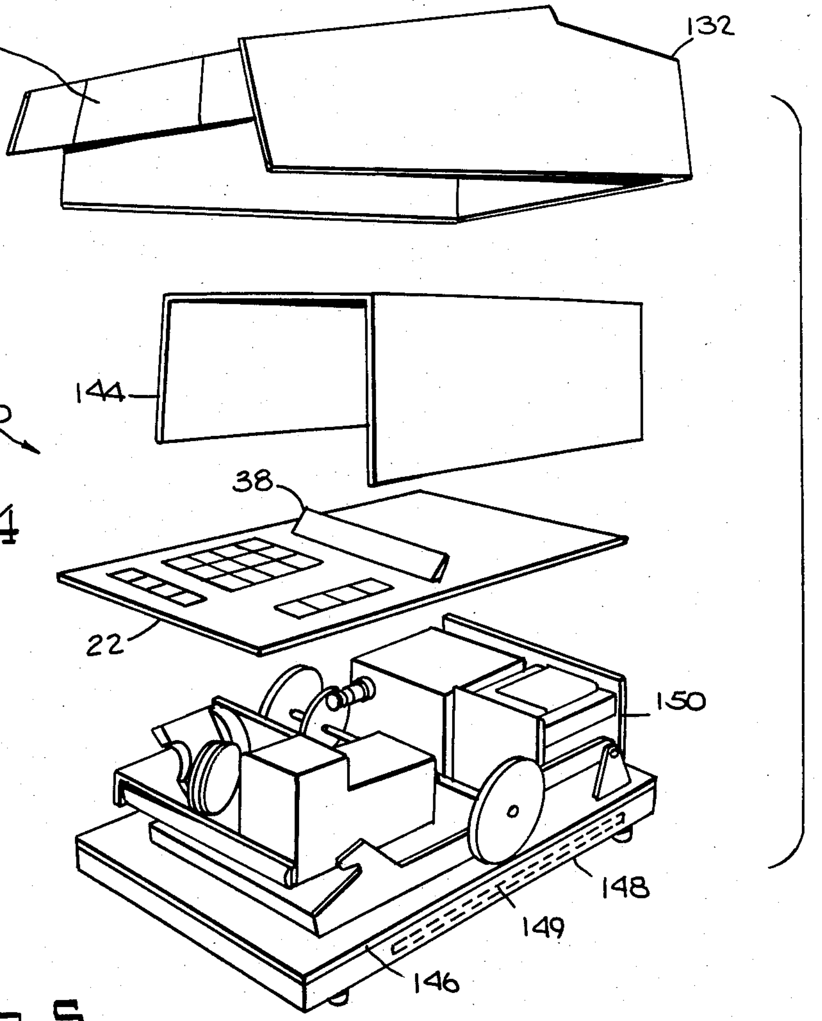
FIG. 4 is an exploded view of the mailing machine of FIG. 3.

As shown in FIG. 3, a mailing machine 130 adapted to house the aforesaid electronic postal meter includes a cover 132 having a hinged lid 134, and a slot 136 therein with a closed end 138 at the right hand side thereof. A portion of the slot 136 forms a deck 137 on which an envelope is placed when inserted into the slot 136 for printing postage thereon. At the top of the cover 132 is an opening 140, and a control panel 142 having a plurality of openings 143 formed therein. The cover 132 (FIG. 4) has nested therein an electromagnetic insulating shield 144. The cover 132 and shield 144 are attached to a base 146; the cover 132 and base 146 together forming a housing. Depending from the base 146 is a pan 148 that contains a logic board 149. A power supply board 150 is mounted on the base 146. The display 38 and the keyboard 22 are conventionally supported within the housing, with the display 38 aligned with the opening 140 in the cover 132. The keyboard 22 (FIG. 5), which serves as an information inputting and information retrieval device, has a plurality of keys which extend through the openings 143 of the control panel 142 for access by the operator. Such keys include the numeric setting keys 156 numbered 0–9, a clear key 158, a decimal point key 160, a postage used key 162, a postage unused key 164, a piece count key 166 and a select postage key 168. In addition, towards the front of the mailing machine 130 (FIG. 3), located under the lid 134, are a plurality of special purpose keys of the keyboard 22. Such keys including an access code key 170, an enter amount key 172, an enter combination key 173 and a date key 174. Also located under the lid 134 are a plurality of thumbwheels 175 which are mechanically connected to the date printing mechanism for adjustment thereof as described more fully in the aforementioned application entitled "Stand-Alone Electronic Mailing Machine". Preferably the keys of the keyboard 22 are membrane switches.

In general, the electronic communication system of the postal meter is in many respects the same as the system disclosed in the aforesaid U.S. Pat. No. 4,301,507. In this connection it is noted that the software architecture of the communication system disclosed in U.S. Pat. No. 4,301,507 services three separately compartmented units of electronic structure, referred to as the control unit, accounting unit and printing unit. Each of such units includes a dedicated central processing unit connected by way of conventional data lines, control lines and address lines to, in the case of the control unit, a multipurpose conventional RAM/ROM/I/O timer circuit incorporating timing control elements and input/output interface hardware, in the case of the accounting unit, a conventional EAROM and a plurality of PROMs incorporating timing control elements and input/output interface hardware, and, in the case of the printing unit, conventional buffers, timing control elements and input/output interface hardware. And, communications between the three units are conducted via serial channels connected between the respective microprocessors of the control, accounting and printing units.

In the postal meter/mailing machine disclosed herein the functionally comparable units of electronic structure, although not compartmented from each other are treated and function as separate and independent structures. And, although a single microprocessor 10 is used, the ROM 14 is organized for storing three substantially independently functioning sets of routines, one for each of the control, accounting and printing functions. Further, although the serial channel communication lines between the compartmented units of the prior art have been eliminated, the RAM of the integrated circuit 16 includes dedicated control, accounting and printing registers for communication between the three functional modules, and includes dedicated buffers for communications with external devices. Accordingly, information is communicated in message form between the three functional modules and between the mailing machine 130 and any external device connected to the external ports 18. Aside from the foregoing, since the three crystal controlled clocks used in the compartmented units of the prior art communication system have been replaced in the present communication system with a single crystal controlled clock, the three functional modules of the present communications system are no longer internally asynchronously operable. Rather the control, accounting and printing routines are independently selected under the control of a single idle loop program stored in the ROM 14. On the other hand, as in the prior art communication system processing precedence is given to messages and requests received from external devices, over those that are internally generated for processing. Thus, as in the prior art, the external device may, as a general rule, take control of the operation of the postal meter/mailing machine. In addition, as a general rule, once the processing of a message has been commenced, such processing will proceed to completion. For example, when printing cycle has been commenced, by tripping the postal meter/mailing machine, nothing is permitted to interrupt the completion of the postage printing cycle and processing the postage value associated therewith under the control of the selected accounting routines.

In addition to the above referred to circuits of the control structure, the control structure includes the circuits of the integrated circuit 16. The control routines utilize two buffers in the RAM, one in which messages corresponding to the digits of the display are built and stored, and the other in which a bit for bit copy or image of displayed digits is stored. As information is entered into the keyboard 22 by depressing one or more keys, a copy of such information in numerical message format is built in the display buffer and transferred in bit format to the image buffer for driving the display. When the postal meter responds to any message from the keyboard 22, the response is communicated to the external device from the transmit buffer. And, with the exception of status responses any message stored in the transmit buffer is copied from the transmit buffer into the display buffer. On the other hand, when the postal meter responds to messages from the external device the responses are only communicated to the external device. Such messages are not displayed, with the exception of postal value messages which are copied into the display buffer as well as being communicated to the external device. Thus the display is mainly used for displaying responses to entries from the keyboard 22. And the keyboard 22 is utilized for inputting information to the microprocessor 10, which interprets each switch closure and in response thereto drives the display 38.

As is hereinafter more fully discussed, for reminding the user to adjust the date by manipulating the thumbwheels 175, the control structure is responsive to the application of power via the power supply board 150 to the mailing machine 130, for selectively energizing the LED display to visually display a predetermined code, which is preferably a single segment in the middle, or minus sign position, in the extreme left digit position of the LED display, and to concurrently intermittently flash the entire display until the lid 134 is opened and the date key 174 depressed.

Further, the control structure is selectively responsive to utilization of the appropriate numerical keys 156 in combination with the access code key 170 for generating command and request messages for which separate keys have not been provided, for example a command to enter or exit the service mode.

In addition, in the service mode of operation the control structure is selectively responsive to utilization of the remote resetting keys, including the enter amount key 172 and enter combination key 173, for generating data entry messages which invoke various accounting routines for modifying values stored in the RAM to conform to customer requests, for example, for modifying the settable limit value, low postage warning value and dollar unlock value. In addition, in the service mode of operation provision is made for modifying the serial number of the postal meter if it is stored in the postal meter in modifiable form.

Further, in the non-service mode of operation the control structure is selectively responsive to utilization of the access code key 170, enter amount key 172 and enter combination key 174 for generating data entry messages which invoke various accounting routines for, in the case of the access code key 170, displaying an access code which is used by the operator for calling into a Data Center to obtain a combination code, and in the case of the enter amount and enter combination keys, 172 and 174, for modifying (normally increasing) the postage unused value stored in the RAM to permit the postal meter to print additional postage.

In addition to the above referred to circuits thereof, the accounting structure includes the non-volatile memory 24 for storing critical data, including the serial number, current values in the ascending and descending and piece count registers. The accounting structures also includes volatile memories, including a plurality of registers in the RAM which function as working ascending, descending and piece count registers for storing total amounts that are appropriately adjusted whenever postage is printed or the remote resetting function keys are utilized. The working volatile memories store such critical operational data for current use and transfer the same to the non-volatile memory 24 at such time as a reduction in power is sensed or the main power switch 42 is moved to its off position.

In addition to the above referred to circuits thereof, the printing structure includes the circuits of the optical sensors, 78 and 80, which are respectively associated with the digit and bank selector stepper motors 28 and 26, respectively, for sensing the relative positioning of the print wheels of the postal meter. And the printing structure also includes the circuits of the photosensor 40 associated with the trip lever for sensing the movement of the lever in response to appropriate insertion of an envelope into the mailing machine slot 136 as discussed more fully in the aforesaid patent application entitled "Stand-Alone Electronic Mailing Machine".

Assuming initialization of the postal meter has been completed for example as disclosed in U.S. Pat. No. 4,301,507 and in U.S. application Ser. No. 447,913 of A. B. Eckert et al., for "Initializing The Print Wheels In An Electronic Postage Meter", the microprocessor 10 executes a scan routine under the control of the idle loop program. The scan routine continuously searches the keyboard 22 for key closures resulting from depression of keys. When each key is depressed, thereby closing the associated switch, the microprocessor 10 executes a control routine which causes a subroutine stored in the control structure to drive the LED display in response to such key depressions. Upon turning the power switch to its "on" position 600 (FIG. 6), the postal meter/mailing machine flags the date key as not checked 602. Thereafter, in the course of initialization process, a zero postal value is displayed and flagged as a postage setting being on display 604. Whereupon, according to the invention, the date check logic routine of FIG. 6 is invoked.

Figure 6A:
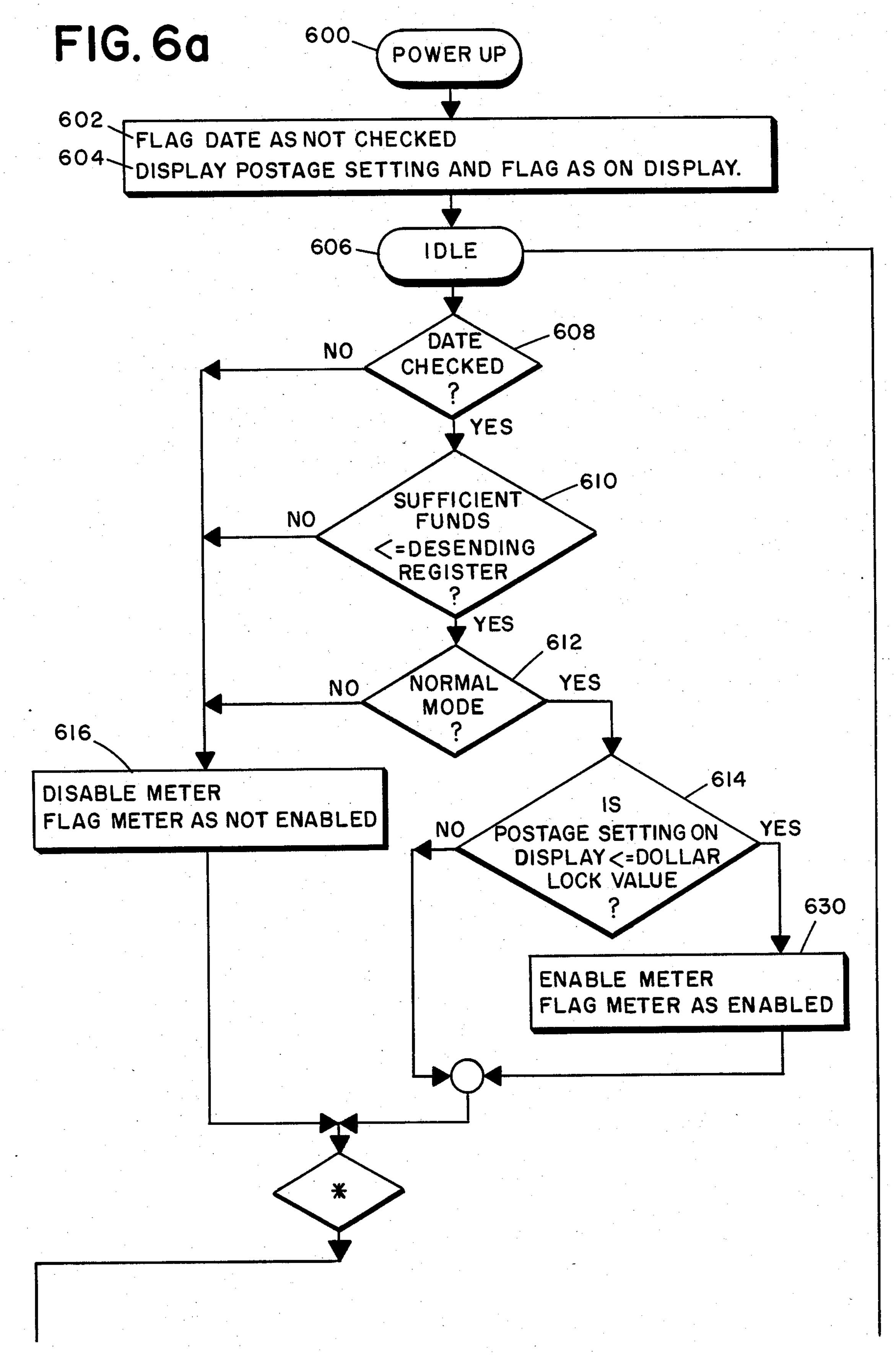
FIG. 6 (including FIGS. 6*a* and 6*b*) is a flow chart of the date check logic routine according to the invention.
Figure 6B:
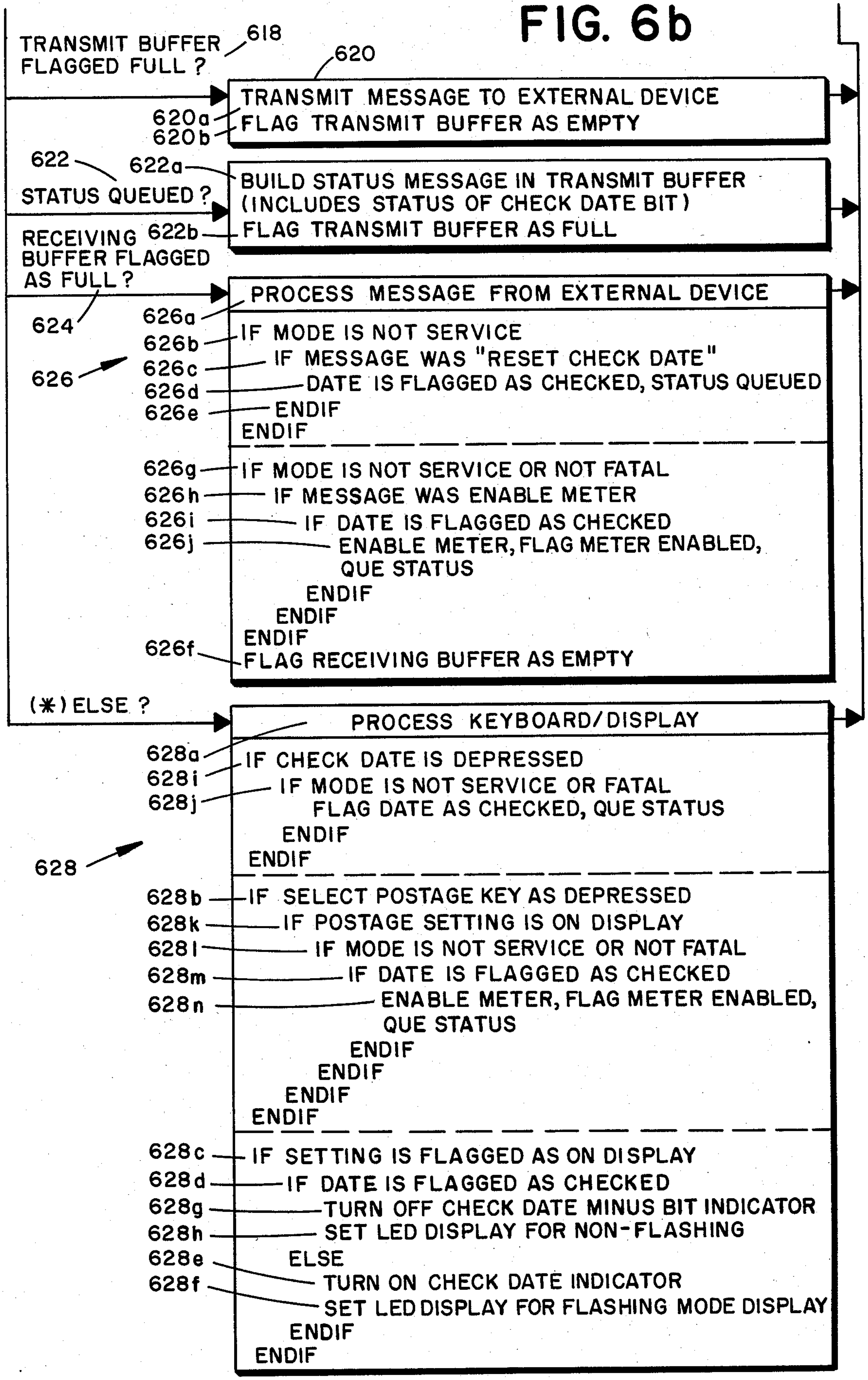

As shown in FIG. 6, wherein the 600 series of numbers is utilized to identify steps of the process shown therein, the microprocessor executes the program starting from idle 606, commencing with a determination as to whether or not the date has been checked 608. If it is not, the postal meter is disabled 616 and flagged as such, as a result of which the postal meter cannot print postage. If it were, determinations would also be made as to whether or not sufficient funds are available in the meter to print the displayed value 610, whether or not the postal meter is in the normal mode of operation 612, and whether or not the dollar unlock value stored in the meter is greater than the postage value which is displayed 614. Thus, if any one of these first three questions, 608, 610, 612, is answered in the negative, the postal meter is disabled 616 and flagged as such. On the other hand, if all of the first three questions, 608, 610 and 612, are answered in the affirmative, a determination is made as to whether or not the dollar unlock value is equalled or exceeded by the postage setting on display 614. If the dollar unlock value has not been equalled or exceeded the postage meter is enabled 630 and flagged as such, otherwise it is not; and, thereafter, in both instances, the transmit buffer 618, receiving buffer 624 and keyboard/display buffer/flags 628 are scanned for processing. For the purpose of this discussion, until otherwise stated, it will be assumed that the postage setting on display remains at the zero value displayed in the course of the initialization process, as a result of which the postage setting is less than the dollar unlock value 614. In addition it will be assumed that there are sufficient funds 610 and that the mode is normal 612.

As shown in FIG. 6, the remainder of the organization of the check date logic routine calls for processing precedence to be given in turn to transmitting messages to the external device which are stored in the transmit buffer 618, then to processing messages generated by the external device and stored in the receiving buffer 624 and then to processing messages generated by the keyboard 628. Before discussing the same in greater detail, there follows a general discussion of such processing steps.

The transmit buffer is initially scanned to determine whether it is full or empty 618. If it is full, then, as shown in the first block 620, the message stored in the transmit buffer is transmitted to the external device 620*a*, the transmit buffer is flagged as empty 620*b* and processing returns to idle 606. Thereafter the microprocessor scans the various flags to determine whether status information has been queued 622, that is, has been flagged to indicate that it is information which is to be transmitted to the external device. If status has been queued, a message corresponding to the status of the postage meter is built in the transmit buffer 622*a*, for example a message including a bit which indicates the status of the date as not being checked, and the transmit buffer is flagged as full 622*b*. Whereupon processing returns to idle 606. On the next scan, since the transmit buffer is now flagged as full 618, the message stored in the transmit buffer is transmitted to the external device 620*a* and the transmit buffer is again flagged as empty 620*b* and processing returns to idle 606. The aforesaid processing continues until all of the queue flags have resulted in a message being transmitted to the external device, one for each such queue flags. At this juncture, the transmit buffer having been flagged as empty, is available for filling with subsequent data to be transmitted, and processing returns to idle 606.

If on the next scan the receiving buffer is flagged as full 624, the check date message stored therein is procesed provided the postal meter is not in the service mode of operation 626*b*, 626*g*. Date check processing does not occur in the service mode because the postal meter is not equipped to process and account for printed postage when it is in the service mode. Also, in the case of a meter enable message being processed 626*h*, processing is ended if the meter is in the fatal mode of operation. This occurs when, for example, the meter has experienced a malfunction requiring the attention of a qualified serviceman. If the receiving buffer is flagged as empty 624, processing occurs in the fourth block 628, wherein keyboard generated messages 628*a*, pertaining to the postage setting being on display 628*c*, are processed.

Referring now to the date check query 608, and assuming that the date is not checked, the meter is disabled 616 and flagged as such. Thereafter assuming the transmit buffer 618 and receive buffer 624 are both flagged as empty, processing occurs in the fourth block 628. If none of the keys 628*a* or 628*b* have been depressed, since the postage setting (zero value) is still flagged as on display 628*c* (from 604) and the date is still flagged as checked 628*d* (from 602), the check date indicator, preferably a minus sign in the extreme left digit position of the LED display, is turned on 628*e* and the entire LED display is set to a flashing mode of operation 628*f*. Thus the keyboard operator is visually reminded to check the setting of the thumbwheels 175 (FIG. 3). In addition, status is queued, 628*f*, 622 (FIG. 6) and processed as hereinbefore discussed in the case of an external device being utilized to operate the postal meter.

Assuming the postal meter is being operated from the keyboard, the operator would at this juncture check the setting of the date and change the same, if necessary, by manipulating the thumbwheels 175 (FIG. 3). Thereafter, the operator would depress the date key 174. Upon doing so, the date will not as yet have been checked 608 (FIG. 6). Accordingly, the meter would remain disabled 616 and flagged as such. On the other hand, since the transmit buffer is flagged as empty 618, the receiving buffer flagged as empty 624 and the check date key has been depressed 628*a*, the date is then flagged as checked 628*i*. In addition, since the postage setting is still on display 628*c* and the date flagged as checked 628*d*, the minus bit indicator is turned off 628*g*, the LED display set to its non-flashing mode 628*h*, and processing returned to idle 606. At this juncture since the date has now been flagged as checked 608 (from 628*j*), and the answer to the questions 610, 612 and 614 are all yes, the meter is enabled and flagged as such.

Assuming the postal meter is being operated from an external device, the external device would normally be operated to generate and transmit to the postal meter a "reset clock date" message, i.e., a header only message which simulates the depression of the date key of the postal meter. Assuming this has occurred, the transmit buffer is flagged as fully 624, and the message from the external device is processed 626*a*. Since the postal meter is not in the service mode 626*b*, if the message was not "reset check date" processing would be ended 628*e*, but since the message was "reset check date" 626*c*, the date is flagged as checked 626*d*, the receiving buffer is flagged as empty 626*f* and processing returned to idle 606. Since the date has now been flagged as checked 608 (from 626*d*), and the questions 610, 612 and 614 are all answered affirmatively, the meter is enabled and flagged as such. Thereafter, all queued status is processed as hereinbefore discussed and transmitted to the external device. Then, since the date is flagged as checked (from 626*d*) and the setting is still flagged as on display 628*c*, the check date minus bit indicator is turned off 628*g*, the LED display set for the non-flashing mode 628*h*, and processing returned to idle 606.

As shown in FIG. 6, the external device can enable the meter 626*j* by transmitting an enable meter message to the postal meter. Assuming this occurs and the postage setting on display 614 is greater than the dollar unlock value, the receiving buffer will be flagged as full 624 and the message therein processed in block 626. Whereupon if the mode is not service or not fatal 626*g* and the date is flagged and checked 626*i*, the enabled meter message will be processed, preferably, on an unconditional basis. However it is within the scope of the invention to conditionally enable the meter 626*j*. This may be deemed to be a desirable occurrence due to it being generally impermissable to unconditionally enable the meter 626*j* when the postage value on display exceeds the dollar unlock value 614. For example, it may be desirable that the processing step 626*j* include a conventional subroutine to permit enablement of the postal meter by the external device when the enable meter message 626*h* simulates more than one discrete depression of the select postage key.

Similarly, the postal meter may be enabled from the keyboard by depressing the select postage key 628*b*. Again, assuming the postage is on display 628*k*, the mode not service or not fatal 628*l* and the date flagged as checked 628*m*, the meter will be, preferably, unconditionally enabled. However, as hereinbefore discussed it may be desirable to conditionally enable the postage meter, for example if the postage setting on display exceeds the dollar lock value. Thus the remarks hereinbefore made with regard to processing at step 626*j* apply with equal force to the processing at step 628*n*, except that meter enablement would occur, for example, when the select postage key 628*b* is actually depressed a second time.

Aside from the foregoing, if the date has been checked 608 but there are insufficient funds in the postal meter to print the displayed postage 610, the meter will be disabled 616 and flagged as such. Reading down the flow chart (FIG. 6) it will be noted that nothing in chart can cure this problem, as a result of which processing is ended and returns to idle 606. Ordinarily the operator would at this juncture recharge the meter.

If the date has been checked 608 and there are sufficient funds 610 but the meter is not in the normal mode 612, then, the meter will be disabled and flagged as such, processing ended and returned to idle 606 since there is nothing in the flow chart (FIG. 6) for curing this problem. Ordinarily, if the meter is in the service mode, the operator would have to take it out of the service mode before proceeding with check date processing. On the other hand, if the meter were not in the service mode but was in the fatal mode, the user would ordinarily call a serviceman to cure the problem.

Assuming that the problems which could occur with respect to insufficient funds 610 or not being in the normal mode 612, are cured, it will then be assumed that the date is checked 608, but the setting on display is less than the dollar lock value 614, as a result of which nothing is done. However, this state of affairs can be dealt with as hereinbefore discussed by the check data logic routine. Since the date was checked 608 at the outset, the operator can operate the select postage key 628*b* to depress the same a second time for overriding the dollar unlock feature of the postal meter. And, upon doing so, since the setting is on display 628*k*, the mode of operation is normal 628, and the date was flagged as checked 628*m*, the meter is enabled 628*n* to print postage. After which, processing is ended and returns to idle 606.

Accordingly, when the postal meter/machine is powered-up, the data is flagged as not checked, as a result of which the check date program is invoked and executed by the microprocessor to determine whether or not a postage setting is on display and, if it is and the date is not checked, the microprocessor disables the meter to prevent postage from being printed. In addition, the display is then driven to display at least one segment in a predetermined digit position of the display. In the preferred embodiment, a minus sign is displayed in the extreme left digit position. In addition, the entire LED display commences flashing, intermittently, to inform the user that the date has not been checked. Further, the postal meter/machine is programmed to respond to depression of the date key to turn off the minus sign bit in the extreme left hand digit position of the LED display and set the LED display to a non-flashing mode. In addition, the postal meter/machine is programmed to respond to messages from an external device for simulating depression of the date key and for enabling the meter/machine without operator intervention. Further, the postal meter is programmed to permit utilization of the select postage key for generating an enable meter message after the date has been checked although the postage setting on display exceeds the dollar unlock value; and provision is made to permit an external device to simulate such operation of the postage meter.

Figure 5:
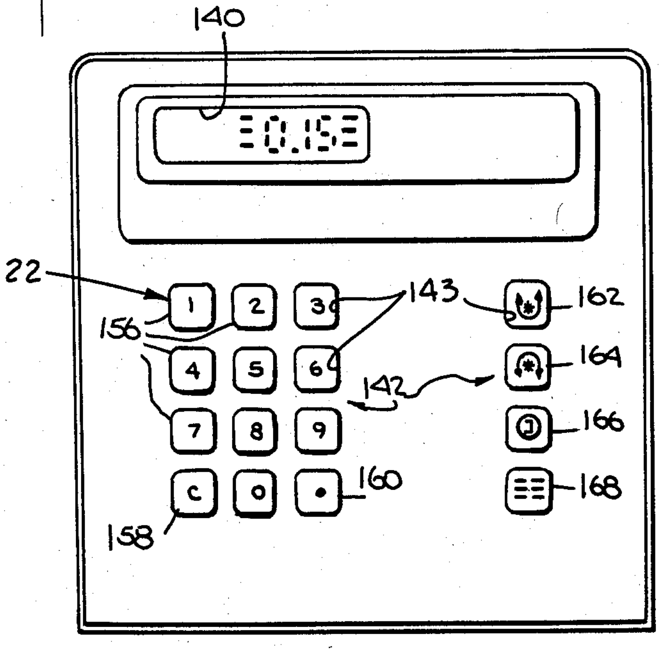
FIG. 5 is a plan view of the keyboard and display of the postal meter/mailing machine of FIG. 3.

Referring now to FIG. 5, in any mode of meter operation other than the service mode, depression of the postage used key 162 effects the display at the display panel 140 of the total value in the ascending register of all postage that has been printed, depression of the postage unused key 164 effects the display of the total value in the descending register of the postage than available for printing, and depression of the piece count key 166 effects the display of the total count of all printing operations of the mailing machine 130. In each instance the depression of the selected key results in the current value associated with the key being displayed for a predetermined time interval after the key is released, for example several seconds, after which time interval the display will return to the then current postage setting.

According to the invention, the numerical keys 156 (FIG. 5) in combination with the access code key 170 (FIG. 3) may be used for displaying the aforesaid information and other information which is not ordinarily the kind of information that a customer needs or is able to interpret. And, when the meter is in the service mode of operation, the postage used, postage unused and piece count keys, 162, 164 and 166 (FIG. 5) may each be used to effectuate the display of some of such other information. The latter case is hereinafter initially discussed since it exemplifies both usages of the keyboard.

In order to effectuate utilization of the keyboard 22 (FIG. 4) to initiate command or request functions for which separate keys have not been provided, a predetermined numerical code, having at least one and preferably four characters without a decimal point, is entered in the keyboard 22 by depressing the appropriate numerical keys 156 (FIG. 5), followed by depression of the access code key 170 (FIG. 3). Upon depression of the access code key 70 a control routine is invoked which causes the generation of a request or command header corresponding to the two low order digits in the display. For example, although a service mode key has not been provided, entering the numerals 6946 in the keyboard followed by depression of the access code key 170 will cause the generation of a "46" command header. Whereupon the microprocessor will invoke a conventional subroutine causing the meter to enter the service mode of operation. When this occurs, a predetermined code, preferably consisting of a segment inserted in the low segment position of each blank digit position will be displayed to inform the user that the postal meter and thus the machine is in the service mode of operation. Thereafter, depression of the postage used key 162 will result in the display of the "dollar unlock" value, consisting of a predetermined value which if equaled or exceeded, in the course of use of the postal meter, will not be printed unless the operator depresses the select postage key a second time after the value is originally displayed. On the other hand, in the service mode of operation, the depression of the postage unused key 164 will result in the display of the "low postage warning" value, consisting of a predetermined postage value which results in the display of a warning signal informing the operator that the postal meter/mailing machine should be recharged. And, depression of the piece count key 166 will result in a diagnostic status display identifying the last fatal condition that occurred, even though that condition was subsequently cleared.

Figure 7:
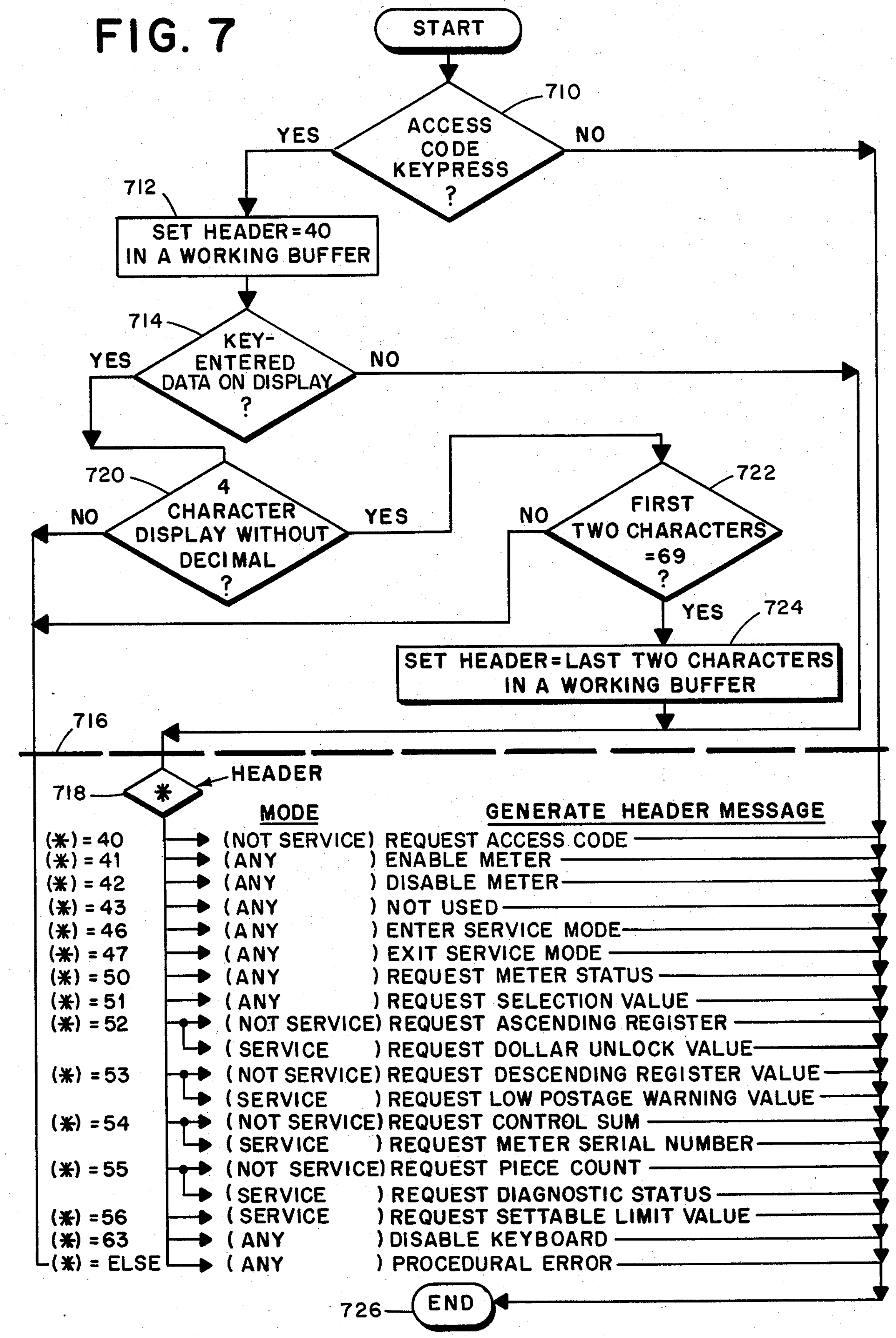
FIG. 7 is a flow chart of the header message logic routine according to the invention.

For the general case of usage of the numerical keys in combination with the access key 170 (FIG. 3) for displaying all of the above referred to information and still further information, reference is made to FIG. 7, wherein the 700 series of numbers are utilized to identify the steps of processing. As shown in FIG. 7, until the access code key is depressed 710, the microprocessor under the direction of the idle loop program continues its idle routine. When the access key is depressed 710, a single byte header message corresponding to the numerical value of "40" is built and stored in an available working buffer 712. If there is no key entered data in the display 714 at this juncture, the microprocessor invokes the header message execution routine 716 shown below the dashed line in FIG. 7 to execute the header message 718. Since the header message corresponds to the numeral 40, a "request access code" message is generated, which message results in the microprocessor invoking a conventional subroutine for building an access code in the display buffer. And, as hereinbefore discussed, the display buffer is copied into the image buffer in bit format for driving the LED display, as a result of which the access code is displayed to the operator, i.e., the code ordinarily used by the operator, for example for calling into Pitney Bowes Data Center, when charging the postal meter with additional postage. On the other hand, after the aforesaid numeral 40 header is generated 712 and set in the available buffer, if there is key entered data is in the display 714 the header will not be executed. Rather, the display buffer will be scanned, and, if the data in the display buffer is not a four character display without a decimal 720, then the microprocessor invokes a conventional sub-routine which generates a "procedure error" message, i.e., a meter status message having a procedural error bit, which message is transferred to the display image buffer to drive the LED display to display the notation "ERR". Similarly, if the display is a four character display without a decimal, but the first two characters 722 are not the numerals "69", the microprocessor invokes the aforesaid sub-routine to generate the procedural error message and display the same error notation. On the other hand, if the first two characters 722, of the four character display without a decimal, are the numerals "69", then, a single byte header message 724 utilizing the last two characters is generated and stored in an available working buffer, whereupon the microprocessor invokes the header message execution routine 716 below the dashed line in FIG. 37 and execute the same to generate a message corresponding to the last two digits.

Upon execution of the header message routine 716 (FIG. 7), if the aforesaid last two digit header message is "40", a "request access code" message is generated, resulting in the display hereinbefore discussed. If the two digit header message is "41" an "enable meter" message is generated, if it is "42" a "meter disable" message is generated, if it is "46" an "enter service mode" message is generated, if it is "47" an "exit service mode" message is generated, if it is "50" a "request status" message is generated, and if it is "51" a "request selection value" message is generated. If it is "52" and the meter is not in the service of operation a "request ascending register" message is generated. On the other hand, if it is "52" and the meter is in the service mode of operation the request ascending register message is interpreted as a "request dollar lock value" message. If the two digit code is "53", "54" or "55" and the meter is not in the service mode of operation, then the "request descending register", "request control sum" or "request piece count" messages will be respectively generated; whereas if it is "53", "54" or "55" and the meter is in the service mode of operation then these same messages will be respectively interpreted as the "request low postage warning value", "request meter serial number" or "request diagnostic status" messages. Further, if it is "56" and the meter is in the service mode of operation the "request settable limit value" message will be generated, if it is "63" the "disable keyboard" message will be generated, and, if the last two digits are any two digits other than one of the foregoing last two digits, then the "procedural error" message will be generated. In each instance, upon generating or otherwise providing the particular message, processing is ended 726, and thereafter the microprocessor invokes a conventional sub-routine which is executed by the microprocessor to cause the performance of the particular operation of the meter which corresponds to the message and to provide a display corresponding to the message. For example, when the message "request access code" and "procedural error" were respectively generated as hereinbefore discussed, an access code and the notation "ERR" were respectively displayed.

To effectuate utilization of the keyboard 22 to initiate data entry functions for which separate keys have not been provided, and to obviate the necessity of entering and end of entry command from the keyboard without providing a separate key therefor, the postal meter/-mailing machine is also programmed to permit an operator, usually a factory trained serviceman, to modify or initially store various predetermined values in the mailing machine which effect its operational characteristics. These values include the settable limit value, low postage warning value and dollar unlock value, which are usually modified to comply with customer needs or preferences. According to the invention, for modifying such values the machine is initially put into the service mode of operation as hereinbefore discussed. Having done so it should be noted that since the access code key is not involved with modifying values stored in the meter, the flow chart of FIG. 7 is not hereinafter referred to in the following discussion.

Before modifying the aforesaid values, after putting the postal meter in the service mode of operation, the operator may optionally check the values that are to be modified, by depressing the appropriate key 162, 164 or 166 (FIG. 5) to determine whether or not modification is necessary. Thereafter the operator ordinarily enters the new value to be stored into the keyboard 22, by depressing the appropriate numerical keys 156, which results in the display of the corresponding value, and then depressing the enter amount key 172 (FIG. 3), which results in the storage of the displayed amount and blanking the display. Either before or after entry of the new value, the operator may enter a predetermined combination, having at least one digit, into the keyboard by utilizing the numerical keys 156 (FIG. 5), which results in the display of the corresponding value, and then depressing the enter combination key 173 (FIG. 3), which results in the storage of the combination corresponding to the keyboard entry and blanking of the display. As a result of having entered both the amount and combination, the microprocessor automatically invokes the end of entry program shown in FIG. 8 for processing the entered amount and combination, as if an end of entry command had been received, thereby causing the value stored in the register identified by the combination to be changed to the new value.

Figure 8A:
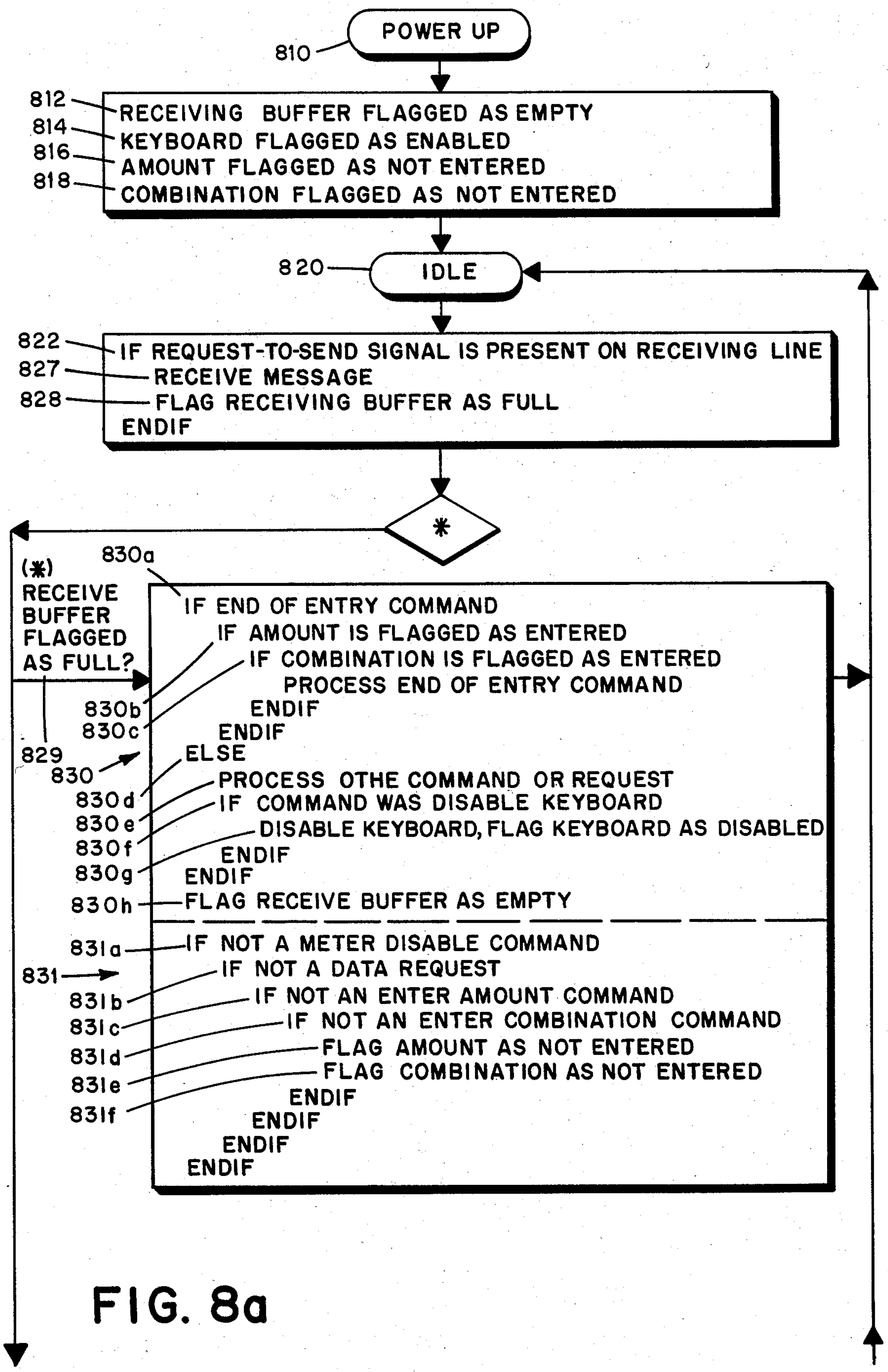
FIG. 8 (including FIGS. 8*a* and 8*b*) is a flow chart of the amount and combination, end of entry, logic routine according to the invention.
Figure 8B:
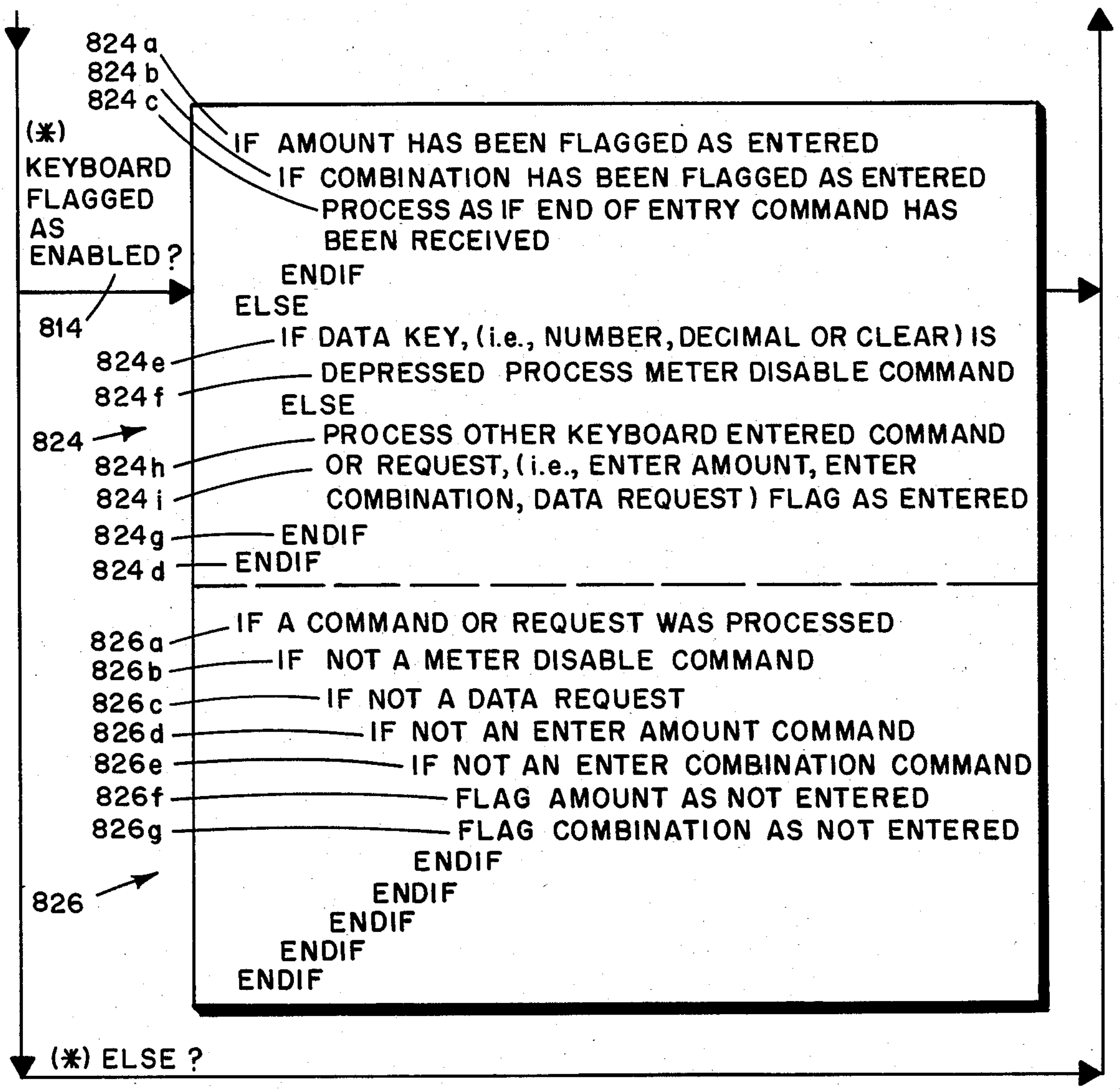

The end of entry program (FIG. 8) is executed by the microprocessor under the control of the appropriate accounting routine. As shown in FIG. 8, after power 810 is applied to the postal meter the receiving buffer is flagged as empty 812, the keyboard is flagged as enabled 814. In addition, the amount and combination working registers of the RAM are flagged as not entered, 816 and 818, in the course of initialization of the postal meter/machine. Under the control of the idle loop program, the microprocessor then searches for executable instruction in the various working buffers of the RAM.

As shown in FIG. 8, wherein the 800 series of numbers are used for identifying the processing steps, processing precedence from idle 820 is given to messages received from external devices, over those that are internally generated. For the purpose of this discussion, it will be assumed until otherwise stated that a request-to-send signal 822 has not been received from any external device since the initialization process was completed, and that the receiving buffer remains flagged as empty 812, the keyboard remains flagged as enabled 814, the amount remains flagged as not entered 816 and the combination remains flagged as not entered 818. Accordingly, messages are processed in accordance with the steps of the process set forth in the lower block 824 (FIG. 8). If the amount has been flagged as entered 824*a*, due to a new value having been entered in the keyboard and the enter amount key having been depressed, and if the combination code has also been flagged as entered 824*b*, due to the appropriate code having been entered in the keyboard and the enter combination key having been depressed, then, the amount and combination code are processed 824*c* as if an end of entry command has been received. On the other hand, if the amount has been flagged as entered 824*a* but the combination has not been so flagged, then, processing is ended 824*d*. If however the amount has not been flagged as entered 824*a* and if a numerical data key is depressed 824*e*, then, the keyed data 824*f* generates a meter disable command. In this connection it should be noted that disabling the meter prevents the same from printing postage, and that the keyboard remains enabled. Referring again to FIG. 8, if the amount has not been flagged as entered 824*a* and a numerical data key is not depressed 824*e*, processing is ended 824*g* unless some other key is depressed 824*h*, and in which event the other command or request is processed 824*i*.

After the aforesaid processing is completed, all such processing is additionally subjected to the abort analysis subroutine 826 shown below the dashed line in the lower block 826. As shown in this subroutine 826, if a command or request has been processed above the dashed line 826*a*, and if it was not a meter disable command 826*b*, and it was not a keyboard entered data request 826*c* i.e., a message generated as a result of depression of any one of the postage used, postage unused or piece count keys, and it was not an enter amount command 826*d*, and it was not an enter combination command 826*e*, then, the amount 826*f* and combination 826*g* are both flagged as not entered. If however the command or request was processed above the dashed line 826*a* and it was a meter disable command 826*b* processing is ended; or, if it was not a meter disable 826*b* but was a keyed data request 826, then processing is ended; or, if it was neither a meter disable command 826*b* nor a numerically keyed data request 826*c*, but was an enter amount command 826*d*, then, processing is ended; or if it was not a meter disable command 826*b* nor data request 826*c* nor enter amount command 826*d*, but was an enter combination command 826*d*, then, processing is ended. And, in each instance in which processing is ended, the amount and combination, 826*b*, 826*g* are not flagged as not entered, or, otherwise stated, if one or the other of the amount or combination had been flagged as entered due to prior processing above the dashed line it will remain flagged as entered.

The aforesaid abort analysis subroutine 826 (FIG. 8) is provided to be sure that once the operator commences the process of modifying one of the values stored in the postal meter, and certain other information other than the appropriate information for completing the value modification process is entered into the keyboard before completing the value modification process, then the operator is forced to recommence the value modification process. For example, if after the operator enters an amount, the operator then enters a postage value via the keyboard 824*e*, the meter will be disabled due to a meter disable command being generated and processed 824*f* each time a key is depressed. Such entries will not clear the amount and combination entry flags since a meter disable command was processed 826*b*. However, when the operator depresses the select postage key, the message generated is a meter disable command 826*b* not a data request 826*c*, not an enter amount command 826*d* and not an enter combination command 826*e*; as a result of which the amount and combination code will both be flagged as not entered. Thus the previously entered amount will have to be reentered by the operator. On the other hand, it is permissable to interrupt processing the new value/combination code entry sequence for the purpose of displaying values by depressing data request keys. Thus the postage used key may be depressed by displaying the "dollar unlock" value, the postage unused key may be depressed for displaying the "low postage warning" value, and the piece count key may be depressed for displaying the "settable value"; these values, rather than those associated with the name of the key, being displayed since the new value/combination code is entered when the postal meter is in the service mode of operation. Under these circumstances, the amount and combination will not be flagged as not entered, since the depression of such keys results in generating a data request message and processing a data request message 826*a* results in ending the abort analysis subroutine. Accordingly, a previously entered amount or combination will not be flagged as not entered. Thus, although the postal meter is programmed for forcing the operator to complete the value modification process after having commenced the same, or, otherwise stated, is programmed for preventing the value modification process form being aborted after its commencement, information which is relevant to value modification processing may be displayed after the process has been commenced with respect to any of the values that are ordinarily modified.

At any time in the course of the foregoing procedures the operator of an external device may take control of the meter to transmit a command or message by sending a request-to-send signal. However, the message associated with the signal will not be processed until internal processing then in process is completed.

As shown in FIG. 8, after idle 810, if there is not a request to send signal 822 on the receiving line nothing is done. If however a request to send signal 822 is on the receiving line, then the message is received 826 and the receive buffer is flagged as full 828. Having flagged the receive buffer as full 828, 829 the message will be processed in the upper block 830 whether or not the keyboard is enabled, due to processing receiving buffer messages taking precedence over processing keyboard entered messages.

As shown in the upper block 830, if the message following the request to send signal is an end of entry command 830*a* and the amount and combination are both flagged as entered 830*b* and 830*c*, then, the amount and combination are processed. However, it should be noted that if the keyboard entry routine hereinbefore discussed was interrupted by a request-to-send signal 822 after entry of the amount and combination via the keyboard, the amount and combination would not be effected, since processing would have already automatically occurred as if an end of entry command had been received, inasmuch as the end of entry message associated with the request-to-send signal 822 will not be processed until the processing then in progress is completed. Accordingly, the incoming end of entry command 830*a* would find both the amount and combination flagged as not entered 830*b* and 830*c*, as a result of which processing of the end of entry command in the upper block diagram would be ended. This would also occur if the external device operator were to consecutively enter the amount and then enter the combination, in any order, unless the operator of the external device initially disables the keyboard. Assuming the external device is equipped to disable the keyboard, the operator of the external device has the option of allowing automatic processing, as previously discussed, as if an end of entry command had been sent, or, preventing such processing until an end of entry command is transmitted.

Referring back to the upper block 830 (FIG. 8) assuming the message following the request-to-send signal 822 is not an end of entry command, but is something else 830*d*, that request or command is processed 830*e*. And if the message is a disable keyboard command 830*f*, the keyboard is flagged as not enabled 830*g*. In any event, after processing the request or command received from the external device, processing is ended and the receiving buffer is flagged as empty 830*h*.

As discussed in connection with processing the keyboard entries, commands and messages from the external device are also subjected to an abort analysis subroutine 831, in this instance as shown in the upper block 830. As shown below the dashed line 831, if a command or request was not a meter disable command 830*a*, not a numerical data request 830*b*, not an enter amount command 830*c* and not an enter combination command 830*d*, then, both the amount 830*a* and combination 830*f* are flagged as not entered. On the other hand, if the request or command was a meter disable command 830*a*, or, if it was not, but was a data request 830*b*; or, if it was neither a meter disable command 830*c* nor a data request 830*d* but was an enter amount command 830*e*; or if it was not a meter disable command 830*a* nor data request 830*b* nor enter amount command 830*c*, but was an enter combination command 830*d*; then, in each instance, processing below the dashed line is ended and returns to idle 820.

The main difference between the processing steps involved in modifying the values in the registers via the external device rather than via keyboard entries, is that an end of entry command 830*a* must be sent from the external device to commence processing the amount and combination code if the operator of the external device initially transmitted a disable keyboard command; whereas, as shown in the lower block 824, an end of entry command need not be initiated by the operator to commence processing the amount and combination code data, rather it is automatically processed when the last of the two (amount or combination) are entered. Thus the external operator has a choice of methodology which is unavailable to the keyboard operator.

Assuming the operator of the external device sends a disable keyboard command, it must be sent prior to entering either the amount or combination. For example, assuming the amount has been entered 830*b* but the combination has not been entered 830*c* and a disable keyboard command 831*a* has not as yet been sent by the operator of the external device, if at this time a request to send signal 822 is sent, followed by a disable keyboard command 826, since this is not an end of entry command 830 it would be processed by the upper block 830 as any other command or request 830*d* and, in addition, the keyboard would be flagged as not enabled 830*g*. However, since all processing above the dashed line of the upper block 830 is analyzed below the dashed line, and since the keyboard disable command is not a meter disable command 831*a*, and not a data request 830*b*, and not an enter amount command 830*c* and not an enter combination command 830*d*; the amount 830*e* and combination 830*e* will both be flagged as not entered. As a result, the previously entered amount would be cleared.

Assuming the external device operator chooses to disable the keyboard before entering the amount and combination, since he wants to avoid automatic processing, then, after such processing, unless the external operator transmits an enable keyboard command, the keyboard will remain disabled. If this state of affairs is not intended, the keyboard operator can cure the problem by turning the power switch "off" and then "on" again, as a result of which the keyboard will be flagged as enabled 814 in the course of the initialization process.

The aforesaid discussion concerning the end of entry processing is based on the assumption that the postal meter is in the service mode of operation. When the postal meter is in the non-service mode of operation, the amount and combination keys 172 and 714 are utilized in the same fashion to effectuate modifying the amount stored in the postage unused register of the RAM. And, processing any message generated by depression of the amount and combination keys 172 and 174 is in all respects the same as is hereinbefore discussed. In addition, the same may be said for processing messages generated by the external device. And all other remarks hereinbefore made with regard to utilization of other keys of the keyboard, and processing messages from the external device other than those pertaining to entry of the amount and combination, apply with equal force to utilization of the meter in the non-service mode. However, it is critical to the security of the postal meter that the combination code used for modifying the value stored in the postage unused register not be made available to anyone other than authorized users of the postal meter. Therefore the code is obtained from the Data Center by following the steps of depressing the access code key 170, which results in the display of a code other than the combination code, and then calling this code into the appropriate Data Center, as hereinbefore discussed, along with the serial number of the postal meter/machine and the amount which is to be added to the postage unused register, to obtain from the Data Center the then current combination code which must be used for entry in order to effectuate modification of the value stored in the postage unused register.

Since it is critical to the security of the postal meter to be sure that the serial number cannot be modified except by authorized personnel, any modification of the serial number is ordinarily undertaken in the course manufacture of the machine and, in any event, before the machine is placed in service. For preventing the serial number from being modified by unauthorized personnel, the above discussed modification procedure can only be used for modifying the serial number if it is stored in modifiable form. For example, assuming the postal meter/mailing machine does not have a serial number or has a serial number which is to be modified; the foregoing procedure may be followed, utilizing as the new value, a serial number having at least one digit prefixed by a "zero" digit, for either initial entry or any modification of an unlocked serial number. However, at such time as it is desirable to fix the serial number of the postal meter/mailing machine, the operator repeats the aforesaid modification procedure another time, utilizing the next previously entered serial number prefixed by a "one" digit rather than a "zero" digit, whereupon the microcprocessor invokes a conventional subroutine which locks the next previously entered combination in place in the serial number register.

It is known and understood that the terms postage meter and postal meter, as used herein, refer to the general definition of a device for the imprinting of a defined unit value for governmental or private carrier parcel, evelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including acounting and printing functions.

A more detailed description of the programs hereinbefore discussed is disclosed in the appended program listing describing in detail all of the various routines incorporated in, and used in the operation of, the postal meter/mailing machine.

While the inventions disclosed herein have been described with reference to a simple embodiment thereof, it will be apparent to those skilled in the art that variations and modifications may be made therein without departing from the spirit and scope of the same. Accordingly, it is intended in the following claims to cover each such variation and modification as falls within the true spirit and scope of the claimed inventions.

PROGRAM APPENDIX

PATENT APPLICATION

OF: John H. Soderberg, Howell A. Jones, Alton B. Eckert and Edward C. Duwel

FOR: POSTAGE METER WITH KEYBOARD KEYS FOR CAUSING DISPLAY OF DATA PERTAINING TO METER OPERATION

```
<<< ASSEMBLY COMMAND STRING >>>


/LIST=_DRA1:[OPT1.DEBUG]PATENT.LIS
/OBJECT=_DRA1:[OPT1.DEBUG]PATENT.OBJ
+       LINES 60
+       LIST    A,E,G,O,S,X
+       NLIST   M
_DRA1:[OPT1.DEBUG]SYMBOL.SRC
;       I N T E R R U P T   V E C T O R   T A B L E
_DRA1:[OPT1.DEBUG]VECTBL.SRC
;       I N T E R R U P T   P R O C E S S I N G
+       ORG     40H
_DRA1:[OPT1.NEWINT]CLKDEC
_DRA1:[OPT1.NEWINT]DBOUNC
_DRA1:[OPT1.NEWINT]DISPLY
_DRA1:[OPT1.NEWINT]INT75
_DRA1:[OPT1.NEWINT]KDIO
_DRA1:[OPT1.NEWINT]MVDDAT
_DRA1:[OPT1.NEWINT]RDROW
_DRA1:[OPT1.NEWINT]STPTMR
_DRA1:[OPT1.NEWINT]STRTMR
_DRA1:[OPT1.NEWINT]TIMINT
;       P O W E R   U P   &   D O W N
;_DRA1:[OPT1.DEBUG]PWRUP
```

```
_DRA1:[OPT1.NEWCTL]PWRABN
_DRA1:[OPT1.NEWCTL]PWRDN
_DRA1:[OPT1.NEWCTL]PWRNOR
_DRA1:[OPT1.NEWCTL]PWRUNG
_DRA1:[OPT1.NEWCTL]PWRUOK
;       K E Y B O A R D   &   D I S P L A Y
_DRA1:[OPT1.NEWKEY]CDBUF
_DRA1:[OPT1.NEWKEY]FILDIM
_DRA1:[OPT1.NEWKEY]KEYBRD
_DRA1:[OPT1.NEWKEY]MODDSP
_DRA1:[OPT1.NEWKEY]PAUTHK
_DRA1:[OPT1.NEWKEY]PCLRK
_DRA1:[OPT1.NEWKEY]PDCMK
_DRA1:[OPT1.NEWKEY]PERDSP
_DRA1:[OPT1.NEWKEY]PNUMK
_DRA1:[OPT1.NEWKEY]PROKEY
_DRA1:[OPT1.NEWKEY]PSETK
_DRA1:[OPT1.NEWKEY]SEGCOD
_DRA1:[OPT1.NEWKEY]VALDSP
;       C O N T R O L   &   P R O C E S S I N G
;+      ORG     400H
_DRA1:[OPT1.NEWCTL]CMDDSB
_DRA1:[OPT1.NEWCTL]CMDENB
_DRA1:[OPT1.NEWCTL]CONFIG
_DRA1:[OPT1.NEWCTL]CONSUM
_DRA1:[OPT1.NEWCTL]CTLSUM
_DRA1:[OPT1.NEWCTL]DBLHDR
_DRA1:[OPT1.NEWCTL]DECADD
_DRA1:[OPT1.NEWCTL]DECCOM
_DRA1:[OPT1.NEWCTL]DECERR
_DRA1:[OPT1.NEWCTL]DECSUB
_DRA1:[OPT1.NEWCTL]DOACCT
_DRA1:[OPT1.NEWCTL]DOSTAT
_DRA1:[OPT1.NEWCTL]DOTRIP
_DRA1:[OPT1.NEWCTL]ENDENT
_DRA1:[OPT1.NEWCTL]ENTAMT
_DRA1:[OPT1.NEWCTL]ENTSER
_DRA1:[OPT1.NEWCTL]EXTSER
_DRA1:[OPT1.NEWCTL]EXTTRP
_DRA1:[OPT1.NEWCTL]FATERR
_DRA1:[OPT1.NEWCTL]FINTRP
_DRA1:[OPT1.NEWCTL]HDRONY
_DRA1:[OPT1.NEWCTL]HDRPLS
_DRA1:[OPT1.NEWCTL]IDLE
_DRA1:[OPT1.NEWCTL]MANRST
_DRA1:[OPT1.NEWCTL]MESAGE
_DRA1:[OPT1.NEWCTL]MSERNO
_DRA1:[OPT1.NEWCTL]MSG2MU
_DRA1:[OPT1.NEWCTL]MTRSTS
_DRA1:[OPT1.NEWCTL]NPAUSE
_DRA1:[OPT1.NEWCTL]POSUPD
_DRA1:[OPT1.NEWCTL]PROERR
_DRA1:[OPT1.NEWCTL]RDCYC
_DRA1:[OPT1.NEWIO]RECEVE
_DRA1:[OPT1.NEWCTL]REDSTS
_DRA1:[OPT1.NEWCTL]SELVAL
_DRA1:[OPT1.NEWCTL]SEREOE
_DRA1:[OPT1.NEWCTL]SETPOS
_DRA1:[OPT1.NEWCTL]SRVCNV
_DRA1:[OPT1.NEWCTL]SRVREQ
_DRA1:[OPT1.NEWCTL]VALREQ
_DRA1:[OPT1.NEWCTL]XEQHDR
_DRA1:[OPT1.NEWIO]XMIT
;       U T I L I T I E S
_DRA1:[OPT1.NEWUTL]CLRBLK
_DRA1:[OPT1.NEWUTL]CMPARE
_DRA1:[OPT1.NEWUTL]CRC
_DRA1:[OPT1.NEWUTL]CRCNIB
_DRA1:[OPT1.NEWUTL]DBLANK
_DRA1:[OPT1.NEWUTL]DFLUSH
_DRA1:[OPT1.NEWUTL]DSBKBD
_DRA1:[OPT1.NEWUTL]ENAKBD
_DRA1:[OPT1.NEWUTL]FILNIB
_DRA1:[OPT1.NEWUTL]GETNIB
_DRA1:[OPT1.NEWUTL]LSTATE
_DRA1:[OPT1.NEWUTL]MOVBIT
_DRA1:[OPT1.NEWUTL]MVLNIB
_DRA1:[OPT1.NEWUTL]MVRNIB
_DRA1:[OPT1.NEWUTL]PUTNIB
_DRA1:[OPT1.NEWUTL]RSCAN
_DRA1:[OPT1.NEWUTL]TDBITM
_DRA1:[OPT1.NEWUTL]VCALL
_DRA1:[OPT1.NEWUTL]VCALLS
;       N O N   V O L A T I L E   M E M O R Y
_DRA1:[OPT1.NEWNVM]NVM30F
_DRA1:[OPT1.NEWNVM]NVM30T
_DRA1:[OPT1.NEWNVM]NVMBYT
_DRA1:[OPT1.NEWNVM]NVMCHG
_DRA1:[OPT1.NEWNVM]NVMDED
_DRA1:[OPT1.NEWNVM]NVMDXB
_DRA1:[OPT1.NEWNVM]NVMER
_DRA1:[OPT1.NEWNVM]NVMFND
_DRA1:[OPT1.NEWNVM]NVMLOD
_DRA1:[OPT1.NEWNVM]NVMMAP
_DRA1:[OPT1.NEWNVM]NVMNBK
_DRA1:[OPT1.NEWNVM]NVMNXT
_DRA1:[OPT1.NEWNVM]NVMOPN
_DRA1:[OPT1.NEWNVM]NVMPRP
_DRA1:[OPT1.NEWNVM]NVMRD
_DRA1:[OPT1.NEWNVM]NVMSTO
_DRA1:[OPT1.NEWNVM]NVMWN
_DRA1:[OPT1.NEWNVM]NVMWR
;       V R M R S
_DRA1:[OPT1.VRMRS]ACCODE
_DRA1:[OPT1.VRMRS]BINOCT
_DRA1:[OPT1.VRMRS]VRCDR
_DRA1:[OPT1.VRMRS]VRCLR
_DRA1:[OPT1.VRMRS]VRCREC
_DRA1:[OPT1.VRMRS]VRMRS
_DRA1:[OPT1.VRMRS]VRSET
_DRA1:[OPT1.DEBUG]PATENT
;       M O T O R   S U B S Y S T E M
;_DRA1:[OPT1.DEBUG]STUB
_DRA1:[EASWARAN.CONTROL]DMOVE
_DRA1:[EASWARAN.CONTROL]ENCMOV
_DRA1:[EASWARAN.CONTROL]ENDMOV
_DRA1:[EASWARAN.CONTROL]MDSEEK
_DRA1:[EASWARAN.CONTROL]MOPEN
_DRA1:[EASWARAN.CONTROL]MOTMOV
_DRA1:[EASWARAN.CONTROL]POHOME
_DRA1:[EASWARAN.CONTROL]RENC
_DRA1:[EASWARAN.CONTROL]SETCLS

        <<< end of assembly command string >>>
```

```
1                  LINES 60
3                  NLIST   M
5               ;  *********************************
6               ;  ***   RAM LABEL DEFINATIONS   ***
7               ;  *********************************
 21  0000                 +FIXSED  EQU   PTR
 26  0008                 +VARSED  EQU   PTR
 31  0010                 +CTLCRC  EQU   PTR
 36  0012                 +RSTCNT  EQU   PTR
 41  0013                 +ERRST  EQU   PTR
 46  0014                 +ERRCOD  EQU   PTR
 51  0016                 +ERRCNT  EQU   PTR
 56  0018                 +UNLOCK  EQU   PTR
 61  001C                 +LOWWRN  EQU   PTR
 66  001E                 +SETLIM  EQU   PTR
 71  0020                 +SERFLG  EQU   PTR
 76  0021                 +SERNUM  EQU   PTR
 81  0028                 +PCEREG  EQU   PTR
 86  002F                 +DSCREG  EQU   PTR
 91  0036                 +DSCCRC  EQU   PTR
 96  0038                 +ASCREG  EQU   PTR
101  0040                 +ASCCRC  EQU   PTR
106  0042                 +POSREG  EQU   PTR
111  0046                 +MTRCHR  EQU   PTR
116  0048                 +MRSTS1  EQU   PTR
121  004A                 +MRSTS2  EQU   PTR
126  004C                 +NORFLG  EQU   PTR
131  004E                 +KDCTRL  EQU   PTR
136  0050                 +BLKTMR  EQU   PTR
141  0052                 +DSPTMR  EQU   PTR
146  0054                 +KEYBKT  EQU   PTR
151  0056                 +CTLBKT  EQU   PTR
156  0058                 +CHRBKT  EQU   PTR
161  005A                 +CURBKT  EQU   PTR
166  005C                 +DBCTR  EQU   PTR
171  005E                 +SKPVAL  EQU   PTR
176  0060                 +SKPCNT  EQU   PTR
181  0062                 +TIMVEC  EQU   PTR
186  0066                 +NVMCTL  EQU   PTR
191  0068                 +OLDSWT  EQU   PTR
196  006A                 +DIEDCM  EQU   PTR
201  006C                 +DEFDCM  EQU   PTR
206  006E                 +PORTBI  EQU   PTR
214  0070                 +SPARE  EQU   PTR
219  0080                 +DBUF  EQU   PTR
224  008C                 +SPARE1  EQU   PTR
239  0090                 +RECBUF  EQU   PTR
234  00A0                 +XMTBUF  EQU   PTR
239  00B0                 +SPARE2  EQU   PTR
244  00C0                 +WORK1  EQU   PTR
249  00D0                 +WORK2  EQU   PTR
254  00E0                 +AMTBUF  EQU   PTR
259  00F0                 +CMBBUF  EQU   PTR
265  0000                 +DIMAGE  EQU   PTR
269                NLIST M

272             ;                     FLAG ASSIGNMENTS

274             ; RAM                BIT
275             ; LABEL     BIT      LABEL     DESCRIPTION

277             ; Serflg    0        Dead      Unrecoverable Fatal Error
278             ;            1
279             ;             2      Weknvm    Retention qualities of NVM poor
280             ;              3     Snolck    Sernum can no longer be changed
281             ;
```

```
         ; Mrsts1   0         Unksel    Unknown selection value
         ;          1        Datdor    Check date warning
         ;           2       Insfnd    Insufficient funds
         ;            3      Lowpos    Low postage warning
         ;             4     Sermod    In service mode
         ;              5    Enabld    Meter enabled
         ;               6   Incyc     Trip mechanism in cycle
         ;                7  Quereq    Trip request being processed
         ;
         ; Mrsts2   0        Fatmod    Detected fatal error condition
         ;          1
         ;           2
         ;            3
         ;             4     Trpsw     Trip switch status
         ;              5
         ;               6
         ;                7  Prvmod    Privileged mode set
         ;
         ; Norflg   0        Quests    Status is to be transmitted
         ;          1        Quepos    Current selection is to be transmitted
         ;           2       Cmbin     Combination entered
         ;            3      Amtin     Amount entered
         ;             4     Trpreq    Trip waiting to be processed
         ;              5    Comdsb    External communications disabled
         ;               6   Unvsel    Selected postage not verified
         ;                7  Latdsb    Commanded disable (latched)
         ;
         ; Kdctrl   0        Stgdsp    Setting is on display
         ;          1        Flsdsp    Flashing display
         ;           2       Timed     Display is timed
         ;            3
         ;             4
         ;              5    Flsdcm    Flashing decimal
         ;               6
         ;                7  Kbddsb    Keyboard disabled

         ; **************************************
         ; ***   HARDWARE ADDRESS POINTERS   ***
         ; **************************************

7400     X        EQU   7400H  BASE ADDRESS OF RAM
7480     Y   EQU    7480H  BASE ADDRESS OF RAM UPPER HALF
7000     CTLREG   EQU   7000H  8155 CONTROL REGISTER
6800     DATA1    EQU   6800H  SWITCH DATA ADDRESS
02BE     KILCOD   EQU    2BEH  ADDRESS OF KILCODES IN NVM
4800     NVMWRT   EQU   4800H  WRITE ADDRESS FOR NON VOLATILE MEMORY
4400     NVMRED   EQU   4400H  READ ADDRESS FOR NON VOLATILE MEMORY
4000     NVMERS   EQU   4000H  ERASE ADDRESS FOR NON VOLATILE MEMORY
6800     PORT2A   EQU   DATA1
7001     PORTA    EQU   7001H  8155 PORT A ADDRESS
7002     PORTB    EQU   7002H  8155 PORT B ADDRESS
7003     PORTC    EQU   7003H  8155 PORT C ADDRESS
00FE     RETAIN   EQU    0FEH  ADDRESS OF NVM RETENTION LOCATION
8000     TEST     EQU   8000H  ADDRESS OF EXTERNAL TEST SOFTWARE
7004     TIMER    EQU   7004H  8155 TIMER DATA ADDRESS

         ; ******************************
         ; ***  P A R A M E T E R S  ***
         ; ******************************

0002     DBVAL    EQU   2      DEBOUNCE COUNT
0007     DSPVAL   EQU   7.     COUNT FOR 5.5 SEC TIMED DISPLAY
0002     KDSKIP   EQU   2      TIMER INT SKIP COUNT
4C96     KEYINT   EQU   (18.*179.).OR.4000H   VALUE FOR 1.8 MILLI SEC INT RATE
7FA1     MAXINT   EQU   (91.*179.).OR.4000H  MAX TIMER INTERVAL , 9.1 MILLI SEC
```

```
0080          MULKEY  EQU   80H     VALUE ASSIGNED TO MULTI KEY DEPRESSION
0002          NDISP   EQU   2       NO. OF DISPLAY PACKS
0008          DSPCHR  EQU   (NDISP*4) MAX NO. OF CHAR DISPLAYABLE
              ;  NON-VOLATILE MEMORY PARAMETERS
0000          SRVSTR   EQU   FIXSED  NIBB OFFSET FOR START OF SERVICE BLOCK IN RAM
0028          NORSTR   EQU   PCEREG  NIBB OFFSET FOR START OF NORMAL BLOCK IN RAM
0028          SRVSIZ   EQU   NORSTR-SRVSTR
0022          NORSIZ   EQU   MRSTS2-NORSTR


              ;  ********************************************
              ; ***   VALUE SIZE IN NIBBLES ( DIGITS )    ***
              ;  ********************************************

0008          ASCSIZ   EQU   8     ASCENDING REGISTER
0007          DSCSIZ   EQU   7     DESCENDING REGISTER
0004          NBANKS   EQU   4     BANKS FOR POSTAGE PRINTING
0007          PCESIZ   EQU   7     PIECE REGISTER


              ;  *************************************
              ;  ***   V A L U E   F O R M A T S   ***
              ;  *************************************

              ;  FORMAT OF DATA  2 DIGITS
              ;     LEFT DIGIT = NO. OF DIGITS
              ;     RIGHT DIGIT = NO. OF DECIMAL PLACES EXCEPT
              ;                   = F HEX  NOT DECIMAL NO ( COUNT )
              ;                   = 0 USE NO. OF DECIMALS INDICATED BY DIEDCM

008F          ACCFMT  EQU   8FH    ACCESS CODE
0080          ASCFMT  EQU   80H    ASCENDING REG
0080          CSMFMT  EQU   80H    CONTROL SUM
005F          DIAFMT  EQU   5FH    DIAGNOSTIC STATUS
0070          DSCFMT  EQU   70H    DESCENDING REG
0040          LOKFMT  EQU   40H    UNLOCK
007F          MSNFMT  EQU   7FH    METER SERIAL NO
007F          PCEFMT  EQU   7FH    PEICE COUNT
0040          POSFMT  EQU  NBANKS*10H SELECTION


              ;  *************************************
              ;  ***   MISSING ENTRY POINT TRAPS   ***
              ;  *************************************


              ;  ****************************
              ;  ***   FATAL ERROR CODES   ***
              ;  ****************************

0002          SFTWRE   EQU   02H   DETECTED INCONSISTANT SET OF ARGUMENTS ON CALL
0008          TRPTIM   EQU   08H   TRIP FAILED TO COMPLETE WITHIN ALLOWED TIME
0009          RSTTRY   EQU   09H   EXCEEDED ALLOWED NO OF UNSUCESSFUL RESET ATTEMPTS
0011          BADSW    EQU   11H   DETECTED ILLOGICAL SWITCH CONDITION
0012          BUFOVR   EQU   12H   INFORMATION WAS OVER WRITTEN IN TRANSMIT BUF
0017          BARF     EQU   17H   UNEXPECTED INTERRUPT
0018          NINCYC   EQU   18H   CYCLE SWITCH FAILED TO INDICATE NOT HOME
```

```
                ; *********************
                ; ***   KILL CODES   ***
                ; *********************

                ; CODES 0 - 9 WILL RESULT IN THE METER BEING
                ;               PERMINITELY INOPERATIVE
                ; CODES A - E WILL RESULT IN CPU BEING HALTED
                ; CODE F  IS NORMAL OPERATION
0000            BADCRC   EQU    0H   DETECTED BAD CRC
0001            NVMBAD   EQU    1H   ERRASE OR WRITE TO NVM UNSUCESSFUL
0002            NVMRET   EQU    2H   READ BEFORE ERASE FAILED,  IE UNACCEPTABLE RETENTIO
0003            FATRST   EQU    3H   DESCENDING REG CLEARED WHILE FATAL MODE
0004            BADCYC   EQU    4H   UNACCEPTABLE RESPONSE FROM CYCLE SWITCH
                ;        EQU    5H   SPARE
                ;        EQU    6H   SPARE
                ;        EQU    7H   SPARE
                ;        EQU    8H   SPARE
                ;        EQU    9H   SPARE
                ;  WILL RESULT IN CPU HALTING ON POWER UP
000A            BADRAM   EQU    0AH  DETECTED BAD RAM ON POWERUP
                ;        EQU    0BH  SPARE
                ;        EQU    0CH  SPARE
                ;        EQU    0DH  SPARE
                ;        EQU    0EH  SPARE

                ; **************************
                ; ***   MESSAGE HEADERS   ***
                ; **************************

                ; COMMANDS
0041            HENABL  EQU   41H   ENABLE METER
0042            HDISAB  EQU   42H   DISABLE METER
0043            HENDEN  EQU   43H   END OF ENTRY
0046            HSETSV  EQU   46H   SET SERVICE MODE
0047            HCLRSV  EQU   47H   CLEAR SERVICE MODE
004E            HEXTRP  EQU   4EH   EXTERNAL TRIP
0062            HENAKB  EQU   62H   ENABLE KEYBOARD
0063            HDISKB  EQU   63H   DISABLE KEYBOARD

00C0            HSETMN  EQU   0C0H  ENTER METER SERIAL NUMBER
00C1            HSETPO  EQU   0C1H  SET POSTAGE
00C4            HSETDA  EQU   0C4H  CLEAR CHECK DATE
00C5            HENTAM  EQU   0C5H  ENTER AMOUNT
00C6            HENTCO  EQU   0C6H  ENTER COMBINATION
                ; SERVICE
                ; NAME              COMBO    AMT FMT MAX
                ; UNLOCK VALUE        0          42
                ; LOW POSTAGE WARN    1          2F
                ; SETTABLE LIMIT      2          2F

                ;REQUESTS - NORMAL MODE
0040            HREQAC  EQU   40H   ACCESSCODE REQUEST
0050            HREQST  EQU   50H   STATUS REQUEST
0051            HREQPO  EQU   51H   CURRENT SELECTION VALUE
0052            HREQAR  EQU   52H   ASCENDING REGISTER VALUE
0053            HREQDR  EQU   53H   DESCENDING REGISTER VALUE
0054            HREQCS  EQU   54H   CONTROL SUM VALUE
0055            HREQPC  EQU   55H   PEICE COUNT VALUE
005B            HREQCF  EQU   5BH   CONFIGURATION REQUEST
005C            HREQSN  EQU   5CH   SERIAL NUMBER VALUE

                ;REQUESTS - SERVICE MODE

                ;             50H   STATUS REQUEST
                ;             51H   CURRENT SELECTION VALUE
0052            HREQDL  EQU   52H   LOCK VALUE
0053            HREQLP  EQU   53H   LOW POSTAGE WARNING
0054            HREQMN  EQU   54H   METER SERIAL NO.
```

```
0055          HREQDS  EQU   55H    DIAGNOSTIC STATUS
0056          HREQSL  EQU   56H    SETTABLE LIMIT
              ;             5CH    SERIAL NUMBER VALUE
0000          EJEC
              ;VALUE HEADERS
0080          HSTAT   EQU   80H    METER STATUS
0081          HPSET   EQU   81H    POSTAGE VALUE
0082          HAREG   EQU   82H    ASCENDING REGISTER
0083          HDREG   EQU   83H    DESCENDING REGISTER
0084          HCSUM   EQU   84H    CONTROL SUM
0085          HPCNT   EQU   85H    PIECE COUNT
008A          HDLOCK  EQU   8AH    UNLOCK VALUE
008B          HLOPOS  EQU   8BH    LOW POSTAGE WARNING
008C          HMTRNO  EQU   8CH    METER SERIAL NUMBER
008D          HDIAGS  EQU   8DH    DIAGNOSTIC STATUS
008E          HHSLIM  EQU   8EH    SETTABLE LIMIT
0090          HACODE  EQU   90H    ACCESS CODE
00AB          HCONFG  EQU   0ABH   METER CONFIGURATION
              ;   INTERRUPT JUMP TABLE TO VECTOR INTERRUPTS TO CORRECT ENTRY POINT
               ORG   0
0000 C3 C5 01 JMP   PWRUP      RST 0  POWER ON RESET
               ORG   8H        RST1
0008 C3 A1 0B JMP   PROERR
               ORG   10H       RST2
0010 C3 A1 0B JMP   PROERR
               ORG   18H       RST3
0018 C3 A1 0B JMP   PROERR
               ORG   20H       RST4
0020 C3 A1 0B JMP   PROERR
               ORG   24H       TRAP  ( WATCH DOG TIMER )
0024 C3 7E 08 JMP   FATINT
               ORG   28H       RST5
0028 C3 A1 0B JMP   PROERR
               ORG   2CH       5.5  ( POWER FAIL )
002C C3 7E 08 JMP   FATINT
               ORG   30H       RST6
0030 C3 A1 0B JMP   PROERR
               ORG   34H       6.5
0034 C3 B6 01 JMP   PWRDN
               ORG   38H       RST7
0038 C3 A1 0B JMP   PROERR
               ORG   3CH       7.5  ( TIMER )
003C C3 9D 00 JMP   INT75
                  ORG     40H
               ;CLKDEC/CLKDGT(KDCTRL,BLKMSK,PORTA )
               ;             (BITSTR,BYTE  ,BITSTR)
               ;             ( I    , I    , I/O  )
               ;             ( PSW  , B    , @HL  )
               ;             ( C    , NC   , C    )
               ;
               ;REGISTER A DESTROYED
               ;PSW DESTROYED
               ;
               ;CLOCK DECIMAL/DIGIT BITS FROM PORTA INTO DISPLAYS.
               ;MODIFIES BITS TO CAUSE BLINKING.
               ;
               CLKDEC;                ****ENTRY FROM DSPLY ONLY
0040 EA 46 00    JPE  CLKD01          IF(KDCTRL.FLSDCM .OR. KDCTRL.FLSDSP)
               ;                        .EQ. TRUE
               ;                        MODIFY BITS WITH BLINK CONTROL MASK
               ;                      ENDIF
               ;                      PULSE CLOCK BITS
               ;                      RETURN
               CLKDGT;                ****ENTRY FROM DSPLY ONLY
0043 C2 49 00    JNZ  CLKD02          IF KDCTRL.FLSDSP .EQ. TRUE
               CLKD01;                  MODIFY BITS WITH BLINK CONTROL MASK
0046 7E          MOV  A,M               PORTA = PORTA .OR. BLKMSK
0047 B0          ORA  B
```

```
0048 77          MOV  M,A
               CLKD02;                 ENDIF
0049 35          DCR  M                PULSE CLOCK BIT
004A 34          INR  M
004B C9          RET                   RETURN
               ;DBOUNC()(KEYBKT,CTLBKT,CHRBKT)(DBCTR)
               ;        (BYTE  ,BYTE  ,BYTE  )(UBYTE)
               ;        ( I    , O    , O    )( I/O )
               ;        ( RAM  , RAM  , RAM  )( RAM )
               ;        ( NC   , C    , C    )( C   )
               ;
               ;REGISTERS DESTROYED
               ;PSW DESTROYED
               ;
               ;DEFINES DEBOUNCED KEYCODES CTLBKT AND CHRBKT FOR USE OF
               ;MAINLINE KEYBOARD ROUTINE.  CHRBKT DIFFERS FROM CTLBKT
               ;IN THAT THE MAINLINE ROUTINE MAY SET CHRBKT = 0.
               ;
               DBOUNC;                 ****ENTRY FROM KDIO ONLY
004C 3A 2A 74    LDA  KEYBKT/2+X       A = KEYBKT
               ;                       DECREMENT DBOUNCE COUNTER
004F 21 2E 74    LXI  H,DBCTR/2+X      HL = ADDRESS, DBCTR
0052 35          DCR  M                DBCTR = DBCTR - 1
               ;                       CHECK WHETHER COUNTER WAS STOPPED AT 1
0053 C2 5D 00    JNZ  DBOUN1           IF DBCTR .EQ. 0
               ;                         KEEP COUNTER AT 1
0056 34          INR  M                  DBCTR = 1
               ;                         KEYBOARD IS DEBOUNCED
               ;                         DEFINE NEW KEYCODE OUTPUT BUCKETS
0057 32 2C 74    STA  CHRBKT/2+X         CHRBKT = KEYBKT
005A 32 2B 74    STA  CTLBKT/2+X         CTLBKT = KEYBKT
               DBOUN1;                 ENDIF
               ;                       CHECK WHETHER KEY IS  PRESSED
005D B7          ORA  A                IF KEYBKT .NE. HEX00
005E C8          RZ
               ;                         SET DEBOUNCE PERIOD
005F 36 02       MVI  M,DBVAL            DBCTR = DBVAL
               ;                       ENDIF
0061 C9          RET                   RETURN
               ;DISPLY()(KDCTRL,BLKTMR,PORTA )
               ;        (BITSTR,BYTE  ,BITSTR)
               ;        ( I    , I    , I/O  )
               ;        ( RAM  , RAM  , 7001 )
               ;        ( NC   , NC   , C    )
               ;
               ;REGISTERS DESTROYED
               ;PSW DESTROYED
               ;
               ;DISPLAY ROUTINE
               ;
               DISPLY;                 ****ENTRY FROM KDIO ONLY
               ;                       FETCH DISPLAY CONTROL BYTE
0062 2A 27 74    LHLD KDCTRL/2+X
               ;                       L = KDCTRL
               ;                       H = BLKTMR
0065 5D          MOV  E,L              E = KDCTRL
               ;                       DEFINE DISPLAY BLINK CONTROL MASK
0066 06 01       MVI  B,01H            B = BLKMSK = HEX01, FOR DISPLAY ON
0068 24          INR  H                IF (BLKTMR+1) .GE. 0
0069 FA 72 00    JM   DISP02
006C 2C          INR  L                  IF KDCTRL.STGDSP .EQ. TRUE
006D F2 72 00    JP   DISP01
0070 06 0F       MVI  B,0FH                B = BLKMSK = HEX0F, FOR DISPLAY OFF
               DISP01;                   ENDIF
               DISP02;                 ENDIF
               ;                       OUTPUT START BITS FOR DISPLAY LOAD
0072 21 01 70    LXI  H,PORTA          HL = ADDRESS, PORTA
```

```
0075 7E        MOV  A,M        PORTA = PORTA.AND.HEXF1, 3 START BITS
0076 E6 F1     ANI  0F1H
0078 77        MOV  M,A
0079 35        DCR  M          PULSE CLOCK BIT
007A 34        INR  M
              ;                SET TO LOAD 4 DIGITS INTO EACH DISPLAY
007B 0E 04     MVI  C,4        C = CHRCNT = 4
              DISP03;          DO UNTIL CHRCNT .EQ. 0
              ;                  DEFINE BIT SELECTION MASK
007D 16 80     MVI  D,80H        D = BITMSK = HEX80
              DISP04;            DO UNTIL BITMSK .EQ. HEX01
              ;                    MOVE DIGIT BITS FROM DIMAGE TO
              ;                    PORTA
007F CD DE 00  CALL MVDDAT         MVDDAT(CHRCNT,BITMSK,KDCTRL,PORTA,
              ;                           ( C    , D    , E    , @HL ,
              ;                           ( I    , I    , I    , I/O ,
              ;
              ;                           KDCTRL)
              ;                            PSW  )
              ;                            O    )
              ;                    CLOCK OUT DIGIT BITS
0082 CD 43 00  CALL CLKDGT         CLKDGT(KDCTRL,BLKMSK,PORTA )
              ;                           ( PSW  , B    , @HL  )
              ;                           ( I    , I    , I/O  )
              ;                    SHIFT BIT SELECTION MASK TO RIGHT
0085 7A        MOV  A,D            D = BITMSK = BITMSK/2
0086 0F        RRC
0087 57        MOV  D,A
0088 1F        RAR                 TEST BITMSK
0089 D2 7F 00  JNC  DISP04
              ;                  ENDDO
              ;                  MOVE DECIMAL BITS FROM DIMAGE TO
              ;                  PORTA
008C CD DE 00  CALL MVDDAT       MVDDAT(CHRCNT,BITMSK,KDCTRL,PORTA,
              ;                         ( C    , D    , E    , @HL ,
              ;                         ( I    , I    , I    , I/O ,
              ;
              ;                         KDCTRL)
              ;                          PSW  )
              ;                          O    )
              ;                  CLOCK OUT DECIMAL BITS
008F CD 40 00  CALL CLKDEC       CLKDEC(KDCTRL,BLKMSK,PORTA)
              ;                         ( PSW  , B    , @HL )
              ;                         ( I    , I    , I/O )
0092 0D        DCR  C            C = CHRCNT = CHRCNT-1
0093 C2 7D 00  JNZ DISP03
              ;                ENDDO
0096 35        DCR  M          3 CLOCK CYCLES TO FINISH LOAD
0097 34        INR  M
0098 35        DCR  M
0099 34        INR  M
009A 35        DCR  M
009B 34        INR  M
009C C9        RET             RETURN

              ;INT75
              ;
              ;SERVICE INTERRUPT 7.5
              ;
              INT75;           ****INTERRUPT ENTRY 7.5
009D E5        PUSH H          SAVE HL
009E 21 7C 01  LXI  H,TIMINT   HL = ADRESS = ADDRESS, TIMINT
00A1 CD 25 10  CALL VCALLS     VCALLS(ADRESS)
              ;                       ( HL   )
              ;                       ( I    )
00A4 E1        POP  H          RESTORE HL
00A5 FB        EI              ENABLE INTERRUPTS
00A6 C9        RET             RETURN
```

```
                ;KDIO()(KDCTRL,PORTBI,PORTB ,BLKTMR,DSPTMR,KEYBKT)
                ;      (BITSTR,BITSTR,BITSTR,BYTE  ,UBYTE ,BITSTR)
                ;      ( I    , I    , I/O  , I/O  , I/O  , O     )
                ;      ( RAM  , RAM  , 7002 , RAM  , RAM  , RAM   )
                ;      ( NC   , NC   , C    , C    , C    , C     )
                ;
                ;REGISTERS DESTROYED
                ;PSW DESTROYED
                ;
                ;KEYBOARD/DISPLAY I/O ROUTINE MAKES REAL TIME ASPECTS OF
                ;KEYBOARD/DISPLAY PROCESSING INVISIBLE TO APPLICATION
                ;LEVEL ROUTINES.
                ;
                KDIO;                   ****ENTRY FROM TIMINT ONLY
                ;                       INCREMENT CONTINUOUS RUN BLINK TIMER
 00A7 21 28 74   LXI  H,BLKTMR/2+X      HL = ADDRESS, BLKTMR
 00AA 34         INR  M                 BLKTMR = BLKTMR+1
 00AB 5E         MOV  E,M               E = BLKTMR
 00AC C2 B7 00   JNZ  KDIO02            IF BLKTMR .EQ. 0
                ;                         DECREMENT TIMED DISPLAY TIMER. 1=STOP
 00AF 21 29 74   LXI  H,DSPTMR/2+X        HL = ADDRESS, DSPTMR
 00B2 35         DCR  M                   DSPTMR = DSPTMR-1
 00B3 C2 B7 00   JNZ  KDIO01              IF DSPTMR .EQ. 0
 00B6 34         INR  M                     DSPTMR = 1
                KDIO01;                   ENDIF
                KDIO02;                 ENDIF
                ;                       TOGGLE MOTOR FOR HALF POWER HOLD
 00B7 3A 37 74   LDA  PORTBI/2+X        A = PORTBI
 00BA 21 02 70   LXI  H,PORTB           HL = ADDRESS, PORTB
 00BD AE         XRA  M                 PORTB = PORTB .XOR. PORTBI
 00BE 77         MOV  M,A
                ;                       DEFINE PROGRAM CONTROL COUNTER
 00BF 7B         MOV  A,E               E = IOCTR = BLKTMR .AND. HEX07
 00C0 E6 07      ANI  07H
 00C2 5F         MOV  E,A
                ;                       CASE (IOCTR)
 00C3 FE 05      CPI  5
 00C5 D2 D0 00   JNC  KDIO03
                ;                         **0,1,2,3,4: READ KEYROWS
 00C8 3A 27 74   LDA  KDCTRL/2+X            IF KDCTRL.KBDDSB .EQ. FALSE
 00CB 1F         RAR
                ;                             KEYBOARD IS NOT DISABLED
 00CC D2 0A 01   JNC  RDROW                   RDROW(IOCTR)
                ;                                  ( E    )
                ;                                  ( I    )
                ;                           ENDIF
 00CF C9         RET
                KDIO03;
 00D0 C0         RNZ                      **5: START KEYBOARD/DISPLAY OUTPUT
 00D1 CD 4C 00   CALL DBOUNC                DEBOUNCE KEYBOARD
                ;                           INITIALIZE FOR NEXT KEYBOARD SCAN
 00D4 AF         XRA  A                     KEYBKT = 0
 00D5 32 2A 74   STA  KEYBKT/2+X
 00D8 CD F6 0E   CALL DFLUSH                FLUSH NOISE FROM DISPLAY SHIFT REG
 00DB C3 62 00   JMP  DISPLY                OUTPUT TO DISPLAY
                ;                         **ELSE:
                ;                           COMPLETE PROCESSING INITIATED
                ;                           IN CASE **5:. THIS INTERRUPT LEVEL
                ;                           ROUTINE IS ITSELF INTERRUPTED.
                ;                       ENDCASE
                ;                       RETURN

                ;MVDDAT(CHRCNT,BITMSK,KDCTRL,PORTA ,KDCTRL)(DIMAGE)
                ;      (BYTE  ,BYTE  ,BITSTR,BITSTR,BITSTR)(BYTSTR)
                ;      ( I    , I    , I    , I/O  , O    )( I    )
                ;      ( C    , D    , E    , @HL  , PSW  )( RAM  )
                ;      ( NC   , NC   , NC   , C    , C    )( NC   )
                ;
                ;REGISTER A DESTROYED
```

```
                    ;PSW DESTROYED
                    ;
                    ;FETCH SELECTED BITS FROM DIMAGE, INVERT THEM,
                    ;AND MOVE THEM TO PORTA.
                    ;COPY KDCTRL INTO PSW FOR LATER USE
                    ;
                    MVDDAT;                 ****ENTRY FROM DSPLY ONLY
 00DE C5              PUSH B                SAVE REGISTERS
 00DF E5              PUSH H
                    ;                       SET DATA AND CLOCK BITS
 00E0 7E              MOV  A,M              PORTA = PORTA .OR. HEXOF
 00E1 F6 OF           ORI  OFH
 00E3 77              MOV  M,A
                    ;                       DEFINE INVERTED OUTPUT BIT FOR PORTA
 00E4 06 FD           MVI  B,OFDH           B = OUTBIT = HEXFD
                    ;                       CALCULATE INDEX
 00E6 3E 04           MVI  A,4              A = INDEX = 4-CHRCNT
 00E8 91              SUB  C
                    ;                       SET TO MOVE 1 BIT INTO EACH DISPLAY
 00E9 0E 02           MVI  C,NDISP          C = BITCTR = NDISP
                    ;                       HL = ADDRESS,
                    ;                       DIMAGE[INDEX+(NDISP-BITCTR)*4]
 00EB 21 80 74        LXI  H,DIMAGE/2+Y
 00EE 85              ADD  L
 00EF 6F              MOV  L,A
                    MVDD01;                 DO UNTIL BITCTR .EQ. 0
 00F0 7E              MOV  A,M                IF(DIMAGE[INDEX+(NDISP-BITCTR)*4]
                    ;                           .AND. BITMSK) .NE. 0
 00F1 A2              ANA  D
 00F2 CA FA 00        JZ   MVDD02
                    ;                           PUT OUTBIT INTO PORTA
 00F5 E3              XTHL                      HL = ADDRESS, PORTA
 00F6 7E              MOV  A,M                  PORTA = PORTA .AND. OUTBIT
 00F7 A0              ANA  B
 00F8 77              MOV  M,A
 00F9 E3              XTHL                      HL = ADDRESS,
                    ;                           DIMAGE[INDEX+(NDISP-BITCTR)*4]
                    MVDD02;                   ENDIF
                    ;                         SHIFT OUTBIT TO LEFT
 00FA 78              MOV  A,B                B = OUTBIT = OUTBIT*2+1
 00FB 07              RLC
 00FC 47              MOV  B,A
 00FD 0D              DCR  C                  C = BITCTR = BITCTR-1
                    ;                         HL = ADDRESS,
                    ;                         DIMAGE[INDEX+(NDISP-BITCTR)*4]
 00FE 23              INX  H
 00FF 23              INX  H
 0100 23              INX  H
 0101 23              INX  H
 0102 C2 F0 00        JNZ  MVDD01               TEST BITCTR
                    ;                       ENDDO
 0105 E1              POP  H                RESTORE REGISTERS
 0106 C1              POP  B
                    ;                       SET PSW FOR CALL TO CLKDEC/CLKDAT
 0107 D5              PUSH D                PSW = KDCTRL
 0108 F1              POP  PSW
 0109 C9              RET                   RETURN

                    ;RDROW(IOCTR )(PORTA ,PORTC ,KEYBKT)
                    ;      ( MOD8 )(BITSTR,BITSTR,NIBSTR)
                    ;      ( I    )( I/O  , I    , I/O   )
                    ;      ( E    )( 7001 , 7002 , RAM   )
                    ;      ( C    )( C    , NC   , C     )
                    ;
                    ;REGISTERS DESTROYED
                    ;STATUS DESTROYED
                    ;
                    ;READS THE KEYROWS DESIGNATED BY IOCTR.  CONSOLIDATES
```

```
                ;DATA AS THE SCAN OF 5 KEYROWS PROGRESSES.  OUTPUTS
                ;CODES TO KEYBKT INDICATING WHICH KEY, OR WHETHER NO
                ;SINGLE KEY IS DOWN.
                ;
                RDROW;                  ****ENTRY FROM KDIO ONLY
                ;                       FORM STROBE MASK
010A 7B          MOV  A,E               B = STRMSK = (2*IOCTR) .XOR. HEXFF
010B 07          RLC
010C 2F          CMA
010D 47          MOV  B,A
                ;                       FORM ROW CODE
010E 2F          CMA                    C = ROWCOD = IOCTR*HEX10
010F 07          RLC
0110 07          RLC
0111 07          RLC
0112 4F          MOV  C,A
                ;                       STROBE KEYROW
0113 21 01 70    LXI  H,PORTA           HL = ADDRESS, PORTA
0116 7E          MOV  A,M               PORTA =
                ;                       PORTA .OR. HEXOF .AND. STRMSK
0117 F6 0F       ORI  OFH
0119 A0          ANA  B
011A 77          MOV  M,A
                ;                       READ POSITIVE LOGIC IMAGE OF KEYROW
011B 3A 03 70    LDA  PORTC             A = COLCOD = PORTC .AND. HEXOF
011E E6 0F       ANI  OFH
0120 C8          RZ                     IF COLCOD .NE. 0
                ;                         A KEY IN CURRENT ROW IS DOWN
0121 21 2A 74    LXI  H,KEYBKT/2+X        HL = ADDRESS, KEYBKT
0124 34          INR  M                   PSW:Z = NOPREV = KEYBKT .EQ. 0
0125 35          DCR  M
                ;                         ASSUME MULTIPLE KEYS DOWN
0126 36 80       MVI  M,MULKEY            KEYBKT = MULKEY
0128 C0          RNZ                      IF NOPREV .EQ. TRUE
                ;                           NO KEY SEEN IN PREVIOUS ROW
0129 FE 09       CPI  9                     IF COLCOD .LT. 9
012B D0          RNC
                ;                             COL CODE VALUES 1 THRU 8 REMAIN
012C B7          ORA  A                       PSW:P = PARITY, COLCOD
012D E8          RPE                          IF PARITY .EQ. ODD
                ;                               COL CODES 1,2,4,7,8 REMAIN
012E FE 07       CPI  7                         IF COLCOD .NE. 7
0130 C8          RZ
                ;                                 A SINGLE KEY IN ROW IS DOWN
0131 B1          ORA  C                           KEYBKT = ROWCOD .OR. COLCOD
0132 77          MOV  M,A
                ;                               ENDIF
                ;                             ENDIF
                ;                           ENDIF
                ;                         ENDIF
                ;                       ENDIF
0133 C9          RET                    RETURN

                ;STPTMR(WASOFF)(PORTBI,PORTB ,SKPCNT,CTLREG)
                ;      (BIT   )(BITSTR,BITSTR,UBYTE ,TIMCTL)
                ;      ( 0    )( I    , 0    , 0    , 0     )
                ;      (PSW:Z )(RAM   ,7002  ,RAM   ,7000   )
                ;      ( C    )( NC   , C    , C    , C     )
                ;
                ;PSW:CY = NO CHANGE
                ;PSW:S, Z, P CHANGED; CORRESPOND TO SKPCNT AT ENTRY
                ;
                ;STOP INTERRUPT TIMER
                ;
                STPTMR;                 ****ENTRY POINT
0134 E5          PUSH H                 SAVE HL
                ;                       INDICATE TIMER STATUS AT ENTRY
0135 2A 30 74    LHLD SKPCNT/2+X        L = SKPCNT
```

```
0138 2C          INR  L             PSW:Z = WASOFF = SKPCNT .EQ. 0
0139 2D          DCR  L
013A E1          POP  H             RESTORE HL
013B F5          PUSH PSW           SAVE A, PSW:CY, WASOFF
                ;                   CHECK FOR RUNNING TIMER
013C CA 51 01    JZ   STPTM1        IF WASOFF .EQ. FALSE
013F 3E 43       MVI  A,43H           STOP TIMER
0141 32 00 70    STA  CTLREG
                ;                     DISABLE TIMER INTERRUPT
0144 3E 0D       MVI  A,0DH           A = HEX0D
0146 30          SIM
                ;                     INDICATE THAT TIMER IS STOPPED
0147 AF          XRA  A               SKPCNT = 0
0148 32 30 74    STA  SKPCNT/2+X
                ;                     HOLD DIGIT MOTOR IN POSITION
014B 3A 37 74    LDA  PORTBI/2+X      PORTB = PORTBI
014E 32 02 70    STA  PORTB
                STPTM1;             ENDIF
0151 F1          POP  PSW           RESTORE A, PSW:CY
                ;                   PSW:Z = WASOFF
0152 C9          RET                RETURN

                ;STRTMR(ISADR,SKIPCT,PERIOD,WASOFF)(TIMER ,SKPCNT,SKPVAL,
                ;      (ADDR ,UBYTE ,TMODCT,BIT   )(TMODCT,UBYTE ,UBYTE ,
                ;      ( I   , I    , I    , 0    )( 0    , 0    , 0    ,
                ;      ( HL  , A    , DE   , PSW:Z)(7004  , RAM  , RAM  ,
                ;      ( NC  , NC   , NC   , C    )( C    , C    , C    ,
                ;
                ;      TIMVEC,CTLREG,PORTB ,PORTBI)
                ;      ADDR  ,TIMCTL,BYTE  ,BYTE  )
                ;       0    , 0    , I    , 0    )
                ;      RAM   ,7000  ,7002  , RAM  )
                ;       C    , C    , NC   , C    )
                ;
                ;PSW:CY = NO CHANGE
                ;PSW:S, Z, P CHANGED; CORRESPOND TO SKPCNT AT ENTRY
                ;
                ;STARTS TIMER INTERRUPTS AFTER DEFINING INFORMATION NEEDED
                ;BY TIMINT.  ISADR IS ADDRESS OF INTERRUPT SERVICE RTN
                ;WHICH WILL BE ENTERED EVERY SKIPCT(TH) OCCURRENCE OF
                ;INTERRUPT.
                ;PERIOD WILL CONTAIN THE PARAMETER VALUE KEYINT.
                ;
                STRTMR;             ****ENTRY POINT
0153 E5          PUSH H             SAVE HL
                ;                   INDICATE TIMER STATUS AT ENTRY
0154 2A 30 74    LHLD SKPCNT/2+X    L = SKPCNT
0157 2C          INR  L             PSW:Z = WASOFF = SKPCNT .EQ. 0
0158 2D          DCR  L
0159 E1          POP  H             RESTORE HL
015A F5          PUSH PSW           SAVE A, PSW:CY, WASOFF
                ;                   CHECK FOR STOPPED TIMER
015B C2 7A 01    JNZ  STRTM1        IF WASOFF .EQ. TRUE
                ;                     SET TIMER MODE AND COUNT
015E EB          XCHG                 HL = PERIOD
                ;                     DE = ISADR
015F 22 04 70    SHLD TIMER           TIMER = PERIOD
0162 EB          XCHG                 HL = ISADR
                ;                     DE = PERIOD
                ;                     INITIALIZE SKIP COUNTER
0163 32 30 74    STA  SKPCNT/2+X      SKPCNT = SKIPCT
                ;                     SET REINITIALIZATION VALUE
0166 32 2F 74    STA  SKPVAL/2+X      SKPVAL = SKIPCT
                ;                     SET INTERRUPT SERVICE ROUTINE ADDR
0169 22 31 74    SHLD TIMVEC/2+X      TIMVEC = ISADR
016C 3E 19       MVI  A,19H           RESET AND ENABLE TIMER INTERRUPT
016E 30          SIM
016F 3E C3       MVI  A,0C3H          START TIMER
```

```
0171 32 00 70   STA  CTLREG
                ;                    UPDATE IMAGE OF PORTB
0174 3A 02 70   LDA  PORTB           PORTBI = PORTB
0177 32 37 74   STA  PORTBI/2+X
               STRTM1;            ENDIF
017A F1         POP  PSW          RESTORE A, PSW:CY
                ;                 PSW:Z = WASOFF
017B C9         RET               RETURN

               ;TIMINT()(SKPCNT,SKPVAL,TIMVEC)
               ;         (UBYTE ,UBYTE ,ADDR  )
               ;         ( I/O  , I    , I    )
               ;         ( RAM  , RAM  , RAM  )
               ;         ( C    , NC   , NC   )
               ;
               ;PSW:S, Z, P, CY CHANGED
               ;
               ;DETERMINE WHETHER IT IS TIME TO TRANSFER CONTROL
               ;TO CURRENTLY ACTIVE INTERRUPT SERVICE ROUTINE.
               ;
               TIMINT;            ****ENTRY FROM INT75 ONLY
017C CD C7 0B   CALL RECEVE       TRY TO RECEIVE MESSAGE
                ;                 DECREMENT SKIP COUNTER
017F 21 30 74   LXI  H,SKPCNT/2+X HL = ADDRESS, SKPCNT
0182 35         DCR  M            SKPCNT = SKPCNT-1
                ;                 CHECK FOR COMPLETED COUNTDOWN
0183 C0         RNZ               IF SKPCNT .EQ. 0
                ;                   REINITIALIZE SKIP COUNTER
0184 3A 2F 74   LDA  SKPVAL/2+X     A = SKPVAL
0187 77         MOV  M,A            SKPCNT = SKPVAL
0188 FB         EI                  ENABLE INTERRUPT
                ;                   PERFORM CURRENT INTRPT SERVICE RTN
0189 2A 31 74   LHLD TIMVEC/2+X     HL = ADRESS = TIMVEC
018C E9         PCHL
                ;                 ENDIF
                ;                 RETURN

               ;PWRABN
               ;
               ;A,PSW DESTROYED
               ;REGISTERS DESTROYED
               ;
               ;ABNORMAL POWER-UP OF METER WHICH POWERED DOWN DURING
               ;SETTING OR TRIP CYCLE
               ;
               PWRABN;             ****ENTRY POINT
018D 3A 24 74   LDA  MRSTS1/2+X    IF MRSTS1.QUEREG .EQ. TRUE
0190 1F         RAR
0191 D2 AA 01   JNC  PWRAB2
                ;                    POWERED DOWN DURING TRIP
0194 1F         RAR                  IF MRSTS1.INCYC .EQ. FALSE
0195 DA A7 01   JC   PWRAB1
                ;                      ACCOUNTING NOT COMPLETED
0198 CD 71 18   CALL SEKTRP            PREPARE TO TRIP
019B F3         DI                     DISABLE INTERRUPTS
019C CD 44 07   CALL DOACCT            DO ACCOUNTING
                ;                      INDICATE ACCOUNTING COMPLETE
019F 21 24 74   LXI  H,MRSTS1/2+X      HL = ADDRESS, MRSTS1
01A2 7E         MOV  A,M               MRSTS1.INCYC = TRUE
01A3 F6 02      ORI  2
01A5 77         MOV  M,A
01A6 FB         EI                     ENABLE INTERRUPTS
               PWRAB1;               ENDIF
01A7 C3 A0 08   JMP  FINTRP          COMPLETE TRIP CYCLE
               PWRAB2;             ENDIF
                ;                  TRIP CYCLE COMPLETE
                ;                  PREPARE TO ZERO SET METER
01AA CD 4E 0F   CALL LSTATE        LSTATE(FATMOD,NORMOD,SERMOD,PRVMOD)
                ;                        (PSW:S ,PSW:Z ,PSW:P ,PSW:CY)
                ;                        ( 0    , 0    , 0    , 0    )
```

```
01AD F8          RM                  IF FATMOD .NE. TRUE
                ;                      METER IS HOME AND NOT DEAD
                ;                      DRIVE METER TO ZERO SETTING
01AE CD 25 16    CALL SEKPOS           SEKPOS(ERROR)
                ;                             ( A    )
                ;                             ( 0    )
01B1 B7          ORA  A                IF ERROR .NE. 0
                ;                        DECLARE FATAL ERROR
01B2 C2 80 08    JNZ  FATERR             FATERR(ERROR,ERRFLG)
                ;                               ( A   ,PSW:Z )
                ;                               ( I   , 0    )
                ;                      ENDIF
                ;                    ENDIF
01B5 C9          RET                 RETURN
                ;PWRDN/PWRUP
                ;
                ;A,PSW DESTROYED
                ;REGISTERS DESTROYED
                ;
                ;ENFORCE ORDERLY POWER-UP AND POWER-DOWN
                ;
                PWRDN;               ****ENTRY POINT
01B6 F3          DI                  DISABLE INTERRUPTS
                ;                    TURN OFF DEVICES ON PORTA AND PORTB
01B7 AF          XRA  A              PORTB = HEX00
01B8 32 02 70    STA  PORTB
01BB 3D          DCR  A              PORTA = HEXFF
01BC 32 01 70    STA  PORTA
01BF CD DE 0E    CALL DBLANK         CLEAR DISPLAY
                ;                    WRITE AND CLOSE ANY OPEN BLOCK
01C2 CD 9E 12    CALL NVMWR          NVMWR(ERRFLG)
                ;                         (PSW:Z )
                ;                         ( 0    )
                PWRUP;               ****ENTRY POINT
                PWRU01;              DO UNTIL INT6.5 .EQ. 0
01C5 20          RIM
01C6 07          RLC
01C7 07          RLC
01C8 07          RLC                   PSW:CY = INT6.5
                ;                      A.0  = INT5.5
01C9 DA C5 01    JC   PWRU01
                ;                    ENDDO
                ;                    POWER IS NOW FULLY ON
01CC B7          ORA  A              PSW:S = INT5.5
                ;                    IF INT5.5 .EQ. TRUE
01CD FA 00 80    JM   TEST             GO TO SPECIAL SERVICE ROUTINE
                ;                    ENDIF
                ; >>OMITTED<<        PULSE DEAD STICK TIMER
                ;                    INITIALIZE STACK POINTER
01D0 31 00 75    LXI  SP,7500H       SP = HEX7500
                ;                    INITIALIZE 8155 TIMER AND PORTS
01D3 3E 43       MVI  A,043H         CTLREG = HEX43
01D5 32 00 70    STA  CTLREG
                                     TIMER SET FOR REPETITIVE SQUARE WAVE
                ;                    PORTA = PORTB = 0; OUTPUT MODE SET
                ;                    PORTC; INPUT MODE SET
                ;                    PORTA = HEXFF
01D8 3E FF       MVI  A,0FFH
01DA 32 01 70    STA  PORTA
                                     TEST AND CLEAR ALL OF RAM
                ;                    FILL 256 BYTES OF RAM WITH HEXAA
                ;                    B = HEXAA
01DD 06 AA       MVI  B,0AAH
01DF 21 00 74    LXI  H,X            HL = ADDRESS, X(I=0)
                PWRU02;              DO UNTIL (ADDR,X(I)) .EQ. (ADDR,X(0))
01E2 70          MOV  M,B              X(I) = HEXAA
01E3 2C          INR  L                HL = ADDRESS, X(I=I+1)
01E4 C2 E2 01    JNZ  PWRU02
                ;                    ENDDO
                ;                    XOR 256 BYTES OF RAM WITH HEX55
```

```
01E7 06 55      MVI  B,55H          B = HEX55
               PWRU03;              DO UNTIL (ADDR,X(I)) .EQ. (ADDR,X(0))
01E9 7E         MOV  A.M              X(I) = X(I) .XOR. HEX55
01EA A8         XRA  B
01EB 77         MOV  M,A
01EC 2C         INR  L                HL = ADDRESS, X(I=I+1)
01ED C2 E9 01   JNZ  PWRU03
               ;                    ENDDO
01F0 3E 0A      MVI  A,BADRAM       A = BADRAM
               ;                    INCREMENT AND TEST 256 BYTES OF RAM
               PWRU04;              DO UNTIL (ADDR,X(I)) .EQ. (ADDR,X(0))
01F2 34         INR  M                X(I) = X(I)+1
01F3 CA FC 01   JZ   PWRU05           IF X(I) .NE. 0
               ;                        DECLARE DEAD METER. BAD RAM
01F6 CD 85 10   CALL NVMDED             NVMDED(BADRAM,ERRFLG)
               ;                               ( A    ,PSW:Z )
               ;                               ( I    , O    )
01F9 C3 00 02   JMP  PWRU06             BREAK
               PWRU05;                ENDIF
01FC 2C         INR  L                HL = ADDRESS, X(I=I+1)
01FD C2 F2 01   JNZ  PWRU04
               PWRU06;              ENDDO
               ;                    READ SPECIAL NVM LOCATION
0200 3A BE 46   LDA  NVMRED+KILCOD  A = NVMRED[KILCOD]
0203 3C         INR  A              IF (A .GE. 10).AND.(A .LT. 15) = TRUE
0204 E6 0F      ANI  0FH
0206 FE 0B      CPI  11
0208 DA 0C 02   JC   PWRU07
               ;                      METER IS OUT OF SERVICE
020B 76         HLT                   HALT
               PWRU07;              ENDIF
020C CD 6D 15   CALL INITSM         INITIALIZE STEPPER MOTORS
               ;                    FILL NVM DATA AREA WITH HEXFF
020F 01 00 48   LXI  B,((MTRCHR+1)-(FIXSED+0)+1)*100H+(FIXSED+0)
               ;                    B = NIBCNT; NVM DATA AREA
               ;                    C = OFFSET, FIXSED[0]
0212 3E FF      MVI  A,0FFH         A = HEXFF
0214 CD 24 0F   CALL FILNIB         FILNIB(FIXSED[0],HEXFF,NIBCNT)
               ;                          ( @C       , A    , B    )
               ;                          ( O        , I    , I    )
               ;                    CLEAR DISPLAY IMAGE
0217 AF         XRA  A              A = HEX00
0218 CD 22 03   CALL FILDIM         FILDIM(HEX00)
               ;                          ( A    )
               ;                          ( I    )
               ;                    ENABLE INTERRUPT 6.5
021B 3E 0D      MVI  A,0DH          INTMSK = HEX0D
021D 30         SIM
021E CD 6B 11   CALL NVMLOD         LOAD AND CHECK NON VOLATILE MEMORY
               ;                    CHECK METER STATUS
0221 CD 4E 0F   CALL LSTATE         LSTATE(FATMOD,NORMOD,SERMOD,PRVMOD)
               ;                          (PSW:S ,PSW:Z ,PSW:P ,PSW:CY)
               ;                          ( O    , O    , O    , O    )
0224 FA 45 02   JM   PWRU09         IF FATMOD .EQ. FALSE
               ;                      NVM LOADED OK
               ;                      DEFINE DECIMAL POSITIONS ON DIE
0227 3A 23 74   LDA  MTRCHR/2+X       A = MTRCHR
022A E6 03      ANI  3                DIEDCM = MTRCHR .AND. HEXC3
022C 32 35 74   STA  DIEDCM/2+X
               ;                      DEFINE DEFAULT DECIMAL POSITION
022F E6 02      ANI  2                DEFDCM = DIEDCM .AND. HEX02
0231 32 36 74   STA  DEFDCM/2+X
               ;                      CHECK NVM STATUS
0234 21 45 02   LXI  H,PWRU08         SET TO RETURN TO ENDIF
0237 E5         PUSH H
0238 3A BE 46   LDA  NVMRED+KILCOD    A = CODE = NVMRED[KILCOD]
023B E6 0F      ANI  0FH
023D FE 0F      CPI  0FH              IF NVMRED[KILCOD] .EQ. HEX0F
```

```
0238F CA 9B 02   JZ   PWRUOK            CONTINUE NORMAL INITIALIZATION
                 ;                    ELSE
                 ;                      CONTINUE FATAL INITIALIZATION
0242 C2 83 02    JNZ  PWRUNG            PWRUNG(CODE)
                 ;                             ( A  )
                 ;                             ( I  )
                 PWRU08;              ENDIF
                 PWRU09;            ENDIF
                 ;                  RECHECK METER STATUS
0245 CD 4E 0F    CALL LSTATE        LSTATE(FATMOD,NORMOD,SERMOD,PRVMOD)
                 ;                         (PSW:S ,PSW:Z ,PSW:P ,PSW:CY)
                 ;                         ( 0    , 0    , 0    , 0     )
0248 F2 50 02    JP   PWRU10        IF FATMOD .EQ. TRUE
                 ;                    TURN ON SENSOR LEDS FOR SERVICE CHECK
024B 3E DF       MVI  A,0DFH          PORTA = HEXDF
024D 32 01 70    STA  PORTA
                 PWRU10;            ENDIF
                 ;                  INITIALIZE DEBOUNCE COUNTER
0250 3E 01       MVI  A,1           DBCTR = 1
0252 32 2E 74    STA DBCTR/2+X
0255 C3 7E 09    JMP  IDLE          ENTER IDLE STATE

                 ;PWRNOR
                 ;
                 ;A,PSW DESTROYED
                 ;REGISTERS DESTROYED
                 ;
                 ;CONTINUE POWER-UP FOR NORMAL SITUATION THAT POWER-DOWN
                 ;OCCURRED WHEN METER WAS HOME
                 ;
                 PWRNOR;            ****ENTRY POINT
                 ;                  SET METER TO ALL NINES
0258 21 24 74    LXI  H,MRSTS1/2+X  HL = ADDRESS, MRSTS1
025B 7E          MOV  A,M           MRSTS1.UNKSEL = TRUE
025C F6 80       ORI  80H
025E 77          MOV  M,A
025F 01 CC 04    LXI  B,NBANKS*100H+(WORK1+16-NBANKS)
                 ;                  B = NIBCNT = NBANKS
                 ;                  C = OFFSET, WORK1[I=16-NBANKS]
0262 3E 09       MVI  A,9           A = HEX09
0264 CD 24 0F    CALL FILNIB        FILNIB(WORK1[I],HEX09,NIBCNT)
                 ;                         ( @C      , A   , B    )
                 ;                         ( 0       , I   , I    )
0267 CD 25 1A    CALL MVPOST        MVPOST(ERROR)
                 ;                         ( A   )
                 ;                         ( 0   )
026A B7          ORA  A             IF ERROR .NE. 0
                 ;                    SETTING ERROR IS FATAL
026B C2 80 08    JNZ  FATERR          FATERR(ERROR,ERRFLG)
                 ;                           ( A   ,PSW:Z )
                 ;                           ( I   , 0    )
                 ;                  ELSE
                 ;                    UPDATE BUFFER TO AGREE WITH SETTING
026E 01 42 04    LXI  B,NBANKS*100H+POSREG
                 ;                    B = NIBCNT = NBANKS
                 ;                    C = OFFSET, POSREG
0271 3E 09       MVI  A,9             A = HEX09
0273 CD 24 0F    CALL FILNIB          FILNIB(POSREG,HEX09,NIBCNT)
                 ;                           ( @C    , A    , B    )
                 ;                           ( 0     , I    , I    )
                 ;                    SET METER TO ALL ZEROES
0276 3E C0       MVI  A,WORK1         A = OFFSET, WORK1
0278 CD 85 0E    CALL CLRBLK          CLRBLK(WORK1)
                 ;                           ( @A  )
                 ;                           ( 0   )
027B CD 25 1A    CALL MVPOST          MVPOST(ERROR)
                 ;                           ( A   )
                 ;                           ( 0   )
```

```
027E B7          ORA  A              IF ERROR .NE. 0
                ;                      SETTING ERROR IS FATAL
027F C2 80 08    JNZ  FATERR           FATERR(ERROR,ERRFLG)
                ;                             ( A   ,PSW:Z )
                ;                             ( I   , 0    )
                ;                    ENDIF
                ;                  ENDIF
0282 C9          RET               RETURN

                ;PWRUNG(CODE  )
                ;      (NIBBLE)
                ;      ( I    )
                ;      ( A    )
                ;      ( C    )
                ;
                ;A,PSW DESTROYED
                ;REGISTERS CHANGED
                ;
                ;HANDLE POWER-UP OF METER PREVIOUSLY DECLARED DEAD
                ;
                PWRUNG;            ****ENTRY POINT
0283 F5          PUSH PSW          SAVE A,PSW
                ;                  DECLARE FATAL ERROR
                ;                  FLAG METER DEAD
0284 47          MOV  B,A          B = CODE
0285 CD 99 10    CALL NVMDE1       NVMDE1(CODE,ERRFLG)
                ;                        ( B  ,PSW:Z )
                ;                        ( I  , 0    )
0288 F1          POP  PSW          RESTORE A,PSW
0289 FE 03       CPI  FATRST       IF CODE .EQ. FATRST
028B C0          RNZ
                ;                    FAILED WHILE CLEARING DESC REGISTER
                ;                    CLEAR DESCENDING REGISTER
028C 01 2F 07    LXI  B,DSCSIZ*100H+DSCREG
                ;                    B = NIBCNT = DSCSIZ
                ;                    C = OFFSET, DSCREG
028F AF          XRA  A              A = HEX00
0290 CD 24 0F    CALL FILNIB         FILNIB(DSCREG,HEX00,NIBCNT)
                ;                          ( @C   , A   , B    )
                ;                          ( 0    , I   , I    )
                ;                    UPDATE CRC
0293 CD B1 0E    CALL CRC            CRC(DSCREG,NIBCNT,CRCVAL)
                ;                       ( @C   , B    , D    )
                ;                       ( I    , I    , 0    )
0296 7A          MOV  A,D            DSCCRC = CRCVAL
0297 32 1B 74    STA  DSCCRC/2+X
                ;                  ENDIF
029A C9          RET               RETURN

                ;PWRUOK
                ;
                ;A,PSW DESTROYED
                ;REGISTERS DESTROYED
                ;
                ;CONTINUATION OF SUCCESSFUL POWER-UP SEQUENCE
                ;
                PWRUOK;            ****ENTRY POINT
                ;                  OPEN NORMAL NVM BLOCK
029B CD C4 11    CALL NVMOPN       NVMOPN(ERRFLG)
                ;                        (PSW:Z )
                ;                        ( 0    )
029E C8          RZ                IF ERRFLG .EQ. FALSE
                ;                    NVM BLOCK IS NOW OPEN
029F 21 AD 02    LXI  H,PWRU01       SET TO RETURN TO ENDIF
02A2 E5          PUSH H
02A3 3A 24 74    LDA  MRSTS1/2+X     IF MRSTS1.UNKSEL .EQ. TRUE
02A6 B7          ORA  A
                ;                      POWERED DOWN DURING SETTING OR TRIP
```

```
02A7 FA 8D 01   JM   PWRABN           PERFORM ABNORMAL POWER-UP
               ;                    ELSE
02AA F2 58 02   JP   PWRNOR           PERFORM NORMAL POWER-UP
               PWRU01;              ENDIF
               ;                    CHECK METER STATUS
02AD CD 4E 0F   CALL LSTATE         LSTATE(FATMOD,NORMOD,SERMOD,PRVMOD)
               ;                          (PSW:S ,PSW:Z ,PSW:P ,PSW:CY)
               ;                          ( 0    , 0    , 0    , 0     )
02B0 FA C1 02   JM   PWRU02         IF FATMOD .EQ. FALSE
               ;                      POWER-UP COMPLETED
               ;                      CONTINUE WITH INITIALIZATION
               ;                      CLEAR POSTAGE REGISTER
02B3 01 42 04   LXI  B,NBANKS*100H+POSREG
               ;                      B = NIBCNT = NBANKS
               ;                      C = OFFSET, POSREG
02B6 AF         XRA  A                A = HEX00
02B7 CD 24 0F   CALL FILNIB           FILNIB(POSREG,HEX00,NIBCNT)
               ;                            ( @C    , A   , B     )
               ;                            ( 0     , I   , I     )
               ;                      REGISTER NOW MATCHES SETTING
02BA 21 24 74   LXI  H,MRSTS1/2+X     HL = ADDRESS, MRSTS1
02BD 7E         MOV  A,M              MRSTS1.UNKSEL = FALSE
02BE E6 7F      ANI  7FH
02C0 77         MOV  M,A
               PWRU02;              ENDIF
               ;                    CHECK MEMORY RETENTION OF NVM
02C1 3A FE 44   LDA  NVMRED+RETAIN  A = NVMRED[RETAIN]
02C4 E6 0F      ANI  0FH
02C6 FE 0A      CPI  0AH            IF NVMRED[RETAIN] .NE. HEX0A
02C8 CA DE 02   JZ   PWRU04
               ;                      MEMORY IS FAILING
02CB 21 10 74   LXI  H,SERFLG/2+X     HL = ADDRESS, SERFLG
02CE 7E         MOV  A,M              IF SERFLG.WEKNVM .EQ. FALSE
02CF E6 20      ANI  20H
02D1 C2 DE 02   JNZ  PWRU03
               ;                        SERFLG.WEKNVM NOT SET IN NVM
02D4 7E         MOV  A,M                SERFLG.WEKNVM = TRUE
02D5 F6 20      ORI  20H
02D7 77         MOV  M,A
               ;                        WRITE NORMAL BLOCK
               ;                        LEAVE NO BLOCKS OPEN
02D8 CD 9E 12   CALL NVMWR              NVMWR(ERRFLG)
               ;                              (PSW:Z )
               ;                              ( 0    )
               ;                        WRITE NEW SERVICE BLOCK
               ;                        OPEN ERASED NORMAL BLOCK
02DB CD 19 12   CALL NVMSTO             NVMSTO(ERRFLG)
               ;                              (PSW:Z )
               ;                              ( 0    )
               PWRU03;                ENDIF
               PWRU04;              ENDIF
02DE CD 47 10   CALL NVM30T         TURN ON -30V FOR NVM
               ;                    START ERASING RETENTION LOCATION
02E1 32 FE 40   STA  NVMERS+RETAIN  NVMERS[RETAIN] = A
               ;                    PAUSE FOR 10 MSEC
02E4 01 64 00   LXI  B,100          BC = LOOPCT = 100
               PWRU05;              DO UNTIL LOOPCT .EQ. 0
02E7 CD 19 0B   CALL NPAUSE           NPAUSE(LOOPCT,ZROFLG)
               ;                             ( BC    ,PSW:Z )
               ;                             ( I/O   , 0    )
02EA C2 E7 02   JNZ  PWRU05
               ;                    ENDDO
               ;                    TERMINATE ERASURE
02ED 3A FE 44   LDA  NVMRED+RETAIN  A[1] = NVMRED[RETAIN] = GARBAGE
               ;                    CHECK ERASURE
02F0 3A FE 44   LDA  NVMRED+RETAIN  A[1] = NVMRED[RETAIN]
02F3 F6 F0      ORI  0F0H           A[0] = HEXF
02F5 3C         INR  A              PSW:Z=ERASED=NVMRED[RETAIN].EQ.HEXF
```

```
02F6 3E 01      MVI  A,NVMBAD       A = NVMBAD
               ;                    IF ERASED .EQ. FALSE
               ;                      DECLARE DEAD METER. BAD NVM.
02F8 C2 85 10   JNZ  NVMDED           NVMDED(NVMBAD,ERRFLG)
               ;                             ( A    ,PSW:Z )
               ;                             ( I    , 0    )
               ;                    ENDIF
               ;                    WRITE HEXOA INTO RETENTION LOCATION
02FB 21 FE 00   LXI  H,RETAIN       HL = BASE = ADDRESS, RETAIN
02FE 3E 0A      MVI  A,0AH          A = HEXOA
0300 CD 61 12   CALL NVMWN          NVMWN(HEXOA,BASE,ERRFLG)
               ;                         ( A[1], HL ,PSW:Z )
               ;                         ( I   , I  , 0    )
0303 C3 31 10   JMP  NVM30F         TURN OFF -30 V TO NVM
               ;                  ENDIF
               ;                  RETURN
               ;CDBUF/CDBUFC/CDBUFD()(DBUF  )
               ;                   (NIBSTR)
               ;                   ( I/O  )
               ;                   ( RAM  )
               ;                   ( C    )
               ;
               ;PSW:S, Z, P, CY = NO CHANGE
               ;
               ;---------------------------------------------------------
               ;                  DISABLE METER AND CLEAR DBUF ONLY ON
               ;                  CONDITION THAT DISPLAYED VALUE WAS
               ;                  NOT ENTERED FROM KEYBOARD
               ;
               CDBUFC;            ****ENTRY POINT
0306 F5         PUSH PSW          SAVE A, PSW
               ;                  CHECK FOR KEY ENTERED DISPLAY
0307 3A 40 74   LDA  DBUF/2+X     A = DBUF[0..1]
030A B7         ORA  A            IF DBUF[0..1] .EQ. HEX00
030B CA 20 03   JZ   CDBUF1
               ; >>JUMP AHEAD<<
               ;                    DISPLAY WAS KEY ENTERED
               ;                    RESTORE A, PSW
               ;                    RETURN
               ;                  ENDIF
030E F1         POP  PSW          RESTORE A, PSW
               ;---------------------------------------------------------
               ;                  DISABLE METER AND CLEAR DISPLAY BUFFER
               ;
               CDBUFD;            ****ENTRY POINT
030F F5         PUSH PSW          SAVE A, PSW
               ;                  DISABLE METER
0310 3E 42      MVI  A,HDISAB     A = HDISAB
0312 CD C7 0D   CALL XEQHDR       XEQHDR(HDISAB,ERROR)
               ;                        ( A    ,PSW:Z)
               ;                        ( I    , 0   )
0315 F1         POP  PSW          RESTORE A, PSW
               ;---------------------------------------------------------
               ;                  CLEAR DISPLAY BUFFER
               ;
               CDBUF;             ****ENTRY POINT
0316 F5         PUSH PSW          SAVE A, PSW
               ;                  SET DBUF HEADER TO KEY ENTRY
0317 AF         XRA  A            A = HEX00
0318 32 40 74   STA  DBUF/2+X     OUTPUT DBUF[0..1] = HEX00
               ;                  SET DBUF FORMAT FOR NUL MESSAGE
031B 3E 0F      MVI  A,0FH        DBUF[2..3] = HEX0F
031D 32 41 74   STA  DBUF/2+X+1
               CDBUF1;            >>TARGET OF JUMP AHEAD<<
0320 F1         POP  PSW          RESTORE A, PSW
0321 C9         RET               RETURN

               ;FILDIM(VALUE )(DIMAGE)
               ;      (UBYTE )(BITSTR)
```

```
                  ;       ( I     )( O     )
                  ;       ( A     )( RAM   )
                  ;       ( NC    )( C     )
                  ;
                  ;PSW DESTROYED
                  ;REGISTERS DESTROYED
                  ;
                  ;FILL DISPLAY IMAGE BUFFER WITH VALUE
                  ;
                  FILDIM;                 ****ENTRY POINT
                  ;                       SET TO FILL (NDISP*4) BYTES
0322 06 07          MVI  B,NDISP*4-1      B = BYTNO = NDISP*4-1
0324 21 87 74       LXI  H,DIMAGE/2+Y+NDISP*4-1
                  ;                       HL = ADDRESS, DIMAGE[BYTNO]
                  FILDI1;                 DO UNTIL BYTNO .LT. 0
0327 77             MOV  M,A                DIMAGE[BYTNO] = VALUE
0328 05             DCR  B                  BYTNO = BYTNO-1
0329 2B             DCX  H                  HL = ADDRESS, DIMAGE[BYTNO]
032A F2 27 03       JP   FILDI1             TEST BYTNO
                  ;                       ENDDO
032D C9             RET                   RETURN
                  ;KEYBRD()(NORFLG,CTLBKT,CHRBKT,KDCTRL,DSPTMR,CURBKT)
                  ;         (BITSTR,BYTE  ,BYTE  ,BITSTR,UBYTE ,BYTE  )
                  ;         ( I    , I    , I/O  , I    , I    , O     )
                  ;         ( RAM  , RAM  , RAM  , RAM  , RAM  , RAM   )
                  ;         ( NC   , NC   , C    , NC   , NC   , C     )
                  ;
                  ;PSW AND REGISTERS DESTROYED
                  ;
                  ;SAMPLES INTERRUPT LEVEL KEYCODE BUCKETS.  DEFINES A
                  ;STABLE KEYCODE BUCKET FOR APPLICATION USE.  INITIATES
                  ;PROCESSING OF KEYPRESS.  UPDATES DISPLAY TO CONFORM TO
                  ;METER STATUS.  INITIATES END OF ENTRY PROCESSING.
                  ;
                  KEYBRD;                 ****ENTRY POINT
032E 3A 27 74       LDA  KDCTRL/2+X       IF (KDCTRL.KBDDSB .EQ. FALSE) .AND.
0331 1F             RAR                     ((NORFLG.CMBIN .AND. NORFLG.AMTIN).EQ.
0332 DA 4A 03       JC   KEYB01             TRUE)
0335 3A 26 74       LDA  NORFLG/2+X
0338 E6 30          ANI  30H
033A FE 30          CPI  30H
033C C2 4A 03       JNZ  KEYB01
033F CD DE 0E       CALL DBLANK             BLANK DISPLAY
                  ;                         EXECUTE END OF ENTRY
0342 3E 43          MVI  A,HENDEN           A = HENDEN
0344 CD C7 0D       CALL XEQHDR             XEQHDR(HENDEN,ERROR)
                  ;                                ( A     ,PSW:Z)
                  ;                                ( I     , O    )
0347 C3 8C 03       JMP  KEYB09
                  KEYB01;                 ELSE
                  ;                         READ INTERRUPT BUCKETS TOGETHER
034A 2A 2B 74       LHLD CTLBKT/2+X
034D EB             XCHG                    E = CTLBKT
                  ;                         D = CHRBKT
034E 1C             INR  E                  IF CTLBKT .EQ. HEX00
034F 1D             DCR  E
0350 C2 78 03       JNZ  KEYB06
                  ;                           NO KEY IS DOWN
0353 21 27 74       LXI  H,KDCTRL/2+X         HL = ADDRESS, KDCTRL
0356 7E             MOV  A,M                  A = KDCTRL
0357 E6 20          ANI  20H                  IF KDCTRL.TIMED .EQ. TRUE
0359 CA 75 03       JZ   KEYB05
                  ;                             CURRENT DISPLAY IS TIMED
035C 3A 29 74       LDA  DSPTMR/2+X             A = DSPTMR
035F 3D             DCR  A                      IF DSPTMR .EQ. 1
0360 C2 75 03       JNZ  KEYB04
                  ;                               DISPLAY TIME IS UP
                  ;                               REVERT TO POSTAGE DISPLAY
                  ;                               CHECK FOR FATAL ERROR
```

```
0363 CD 4E 0F   CALL LSTATE            LSTATE(FATAL,NORM,SERV,PRIV)
               ;                             (PSW:S, :Z , :P , :C )
               ;                             ( 0   , 0 , 0  , 0  )
0366 F2 70 03   JP   KEYB02            IF FATAL .EQ. TRUE
               ;                          SET FOR FATAL SETTING DISPLY
0369 7E         MOV  A,M                  KDCTRL.STGDSP = TRUE
036A F6 80      ORI  80H
036C 77         MOV  M,A
036D C3 75 03   JMP  KEYB03
               KEYB02;                 ELSE
               ;                          MAKE NORMAL SETTING DISPLAY
0370 3E 51      MVI  A,HREQPO             A = HREQPO
0372 CD C7 0D   CALL XEQHDR               XEQHDR(HREQPO,ERROR)
               ;                                 ( A    ,PSW:Z)
               ;                                 ( I    , 0   )
               KEYB03;                 ENDIF
               KEYB04;               ENDIF
               KEYB05;             ENDIF
0375 C3 8C 03   JMP  KEYB08
               KEYB06;           ELSE
               ;                   KEYS ARE DOWN
               ;                   RESTART DISPLAY TIMER
0378 3E 07      MVI  A,DSPVAL        DSPTMR = DSPVAL
037A 32 29 74   STA  DSPTMR/2+X
037D 7A         MOV  A,D           A = CHRBKT
037E B7         ORA  A             IF CHRBKT .NE. HEX00
037F CA 8C 03   JZ   KEYB07
               ;                     A SINGLE UNPROCESSED KEY IS DOWN
               ;                     DEFINE A STABLE KEYBUCKET
0382 32 2D 74   STA  CURBKT/2+X      CURBKT = CHRBKT
               ;                     PREVENT REPROCESSING KEYPRESS
0385 AF         XRA  A               CHRBKT = NOKEY
0386 32 2C 74   STA  CHRBKT/2+X
0389 CD CE 04   CALL PROKEY          PROCESS KEYPRESS
               KEYB07;             ENDIF
               KEYB08;           ENDIF
               KEYB09;         ENDIF
038C 3A 26 74   LDA  NORFLG/2+X  IF NORFLG.QUEPOS .EQ. TRUE
038F E6 40      ANI  40H
0391 C0         RNZ                RETURN
               ;                 ELSE
0392 CD A0 03   CALL MODDSP        MODIFY DISPLAY TO MATCH METER STATUS
               ;                   START KEYBOARD/DISPLAY INTERRUPTS
0395 21 A7 00   LXI  H,KDIO        HL = ADRESS = ADDRESS, KDIO
0398 3E 02      MVI  A,KDSKIP      A = KDSKIP
039A 11 96 4C   LXI  D,KEYINT      DE = KEYINT
039D C3 53 01   JMP  STRTMR        STRTMR(ADRESS,KDSKIP,KEYINT,WASOFF)
               ;                          ( HL   , A    , DE   ,PSW:Z )
               ;                          ( I    , I    , I    , 0    )
               ;                   RETURN
               ;                 ENDIF
               ;MODDSP()(DIMAGE, MRSTS1, KDCTRL)
               ;        (BYTSTR, BITSTR, BITSTR)
               ;        (  0   ,   I   ,   0   )
               ;        ( RAM  ,  RAM  ,  RAM  )
               ;        (  C   ,  NC   ,   C   )
               ;
               ;ALL REGISTERS CHANGED
               ;PSW: S, Z, P, CY CHANGED
               ;
               ;UPDATE DISPLAY CONTROL FLAGS AND DISPLAY IMAGE
               ;TO REFLECT CURRENT METER STATUS
               ;
               MODDSP;              ****ENTRY POINT
               ;                     CHECK DISPLAY TYPE
03A0 21 27 74   LXI  H,KDCTRL/2+X   HL = ADDRESS, KDCTRL
03A3 7E         MOV  A,M            A = KDCTRL
03A4 E6 BB      ANI  0BBH           A.FLSDSP = FALSE
               ;                    A.FLSDCM = FALSE
```

```
                     ;                         PSW:S = KDCTRL.STGDSP
03A6 FA AD 03     JM    MODD01           IF KDCTRL.STGDSP .EQ. FALSE
                     ;                           SETTING NOT ON DISPLAY
                     ;                           PREVENT FLASHING DISPLAY
03A9 77           MOV   M,A                KDCTRL.FLSDSP = FALSE
                     ;                           KDCTRL.FLSDCM = FALSE
03AA C3 FF 03     JMP   MODD07
                  MODD01;                  ELSE
                     ;                           SETTING IS ON DISPLAY
                     ;                           DECIDE WHETHER TO FLASH DISPLAY
03AD 3A 24 74     LDA   MRSTS1/2+X         B = MRSTS1
03B0 47           MOV   B,A
                                             D.DATDOR = D.0 = MRSTS1.DATDOR
                     ;                           E.FLSDSP = E.1 = MRSTS1.DATDOR .OR.
                     ;                                           MRSTS1.INSFND
                     ;                           E.FLSDCM = E.5 = MRSTS1.LOWPOS
                     ;
03B1 E6 70        ANI   70H
03B3 57           MOV   D,A
03B4 0F           RRC
03B5 0F           RRC
03B6 B2           ORA   D
03B7 57           MOV   D,A
03B8 07           RLC
03B9 B2           ORA   D
03BA 57           MOV   D,A
03BB E6 44        ANI   44H
03BD 5F           MOV   E,A
                     ;                           KDCTRL.FLSDSP = E.FLSDSP
                     ;                           KDCTRL.FLSDCM = E.FLSDCM
03BE 21 27 74     LXI   H,KDCTRL/2+X
03C1 7E           MOV   A,M
03C2 E6 BB        ANI   0BBH
03C4 B3           ORA   E
03C5 77           MOV   M,A
                     ;                           DETERMINE METER STATUS
03C6 CD 4E 0F     CALL LSTATE                LSTATE(FATMOD,NORMOD,SERMOD,PRVMOD)
                     ;                                 (PSW:S ,PSW:Z ,PSW:P ,PSW:CY)
                     ;                                 ( 0    , 0     , 0     , 0     )
03C9 FA F5 03     JM    MODD04               IF FATMOD .EQ. FALSE
                     ;                             METER NOT FATAL
                     ;                             TURN DATER DOOR LAMP ON OR OFF
03CC 21 80 74     LXI   H,DIMAGE/2+Y           HL = ADDRESS, DIMAGE
03CF 7E           MOV   A,M                    A = DIMAGE
03D0 E6 FD        ANI   0FDH                   A.DATLMP = FALSE
03D2 14           INR   D                      PSW:S = D.DATDOR
03D3 F2 D8 03     JP    MODD02                 IF D.DATDOR .EQ. TRUE
03D6 F6 02        ORI   2                        A.DATLMP = TRUE
                  MODD02;                      ENDIF
03D8 77           MOV   M,A                    DIMAGE = A
                     ;                             SELECT WING TYPE
03D9 16 02        MVI   D,02H                  D = WING, DISABLED
03DB 3E 04        MVI   A,04H                  A = MRSTS1.ENABLD
03DD A0           ANA   B
03DE CA E3 03     JZ    MODD03                 IF MRSTS1.ENABLD .EQ. TRUE
03E1 16 92        MVI   D,92H                    D = WING, ENABLED
                  MODD03;                      ENDIF
                     ;                             INSERT RIGHT HAND WING
03E3 21 87 74     LXI   H,DIMAGE/2+Y+(NDISP*4-1)
                     ;                             HL = ADDRESS, DIMAGE[(NDISP*4-1)]
03E6 72           MOV   M,D                    DIMAGE[(NDISP*4-1)] = WING
                     ;                             INSERT LEFT HAND WING
03E7 06 82        MVI   B,DBUF+2               B = OFFSET, DBUF[2]
03E9 CD 35 0F     CALL GETNIB                  GETNIB(NCHAR,ZERO ,DBUF[2])
                     ;                                   ( A    ,PSW:Z, @B    )
                     ;                                   ( 0    , 0    , I     )
03EC 2F           CMA                          BC = -NCHAR-1
03ED 4F           MOV   C,A
03EE 06 FF        MVI   B,0FFH
03F0 09           DAD   B                      HL = ADDRESS,
```

```
                       ;                             DIMAGE[(NDISP*4-2)-NCHAR]
 03F1 72               MOV  M,D                      DIMAGE[(NDISP*4-2)-NCHAR] = WING
 03F2 C3 FF 03         JMP  MODD06
                       MODD04;                     ELSE
                       ;                             METER IS FATAL
                       ;                             SET TO DISPLAY ALL DECIMALS
 03F5 3E 01            MVI  A,01H                    A = DECBIT = HEX01
 03F7 E2 FC 03         JPO  MODD05                   IF SERMOD .EQ. TRUE
                       ;                               SET TO DISPLAY DECIMALS+DASHES
 03FA 3E 11            MVI  A,11H                      A = DECBIT = HEX11
                       MODD05;                       ENDIF
 03FC CD 22 03         CALL FILDIM                   FILDIM(DECBIT)
                       ;                                    ( A     )
                       ;                                    ( I     )
                       MODD06;                     ENDIF
                       MODD07;                   ENDIF
                       ;                         BUILD SERVICE/NORMAL MODE EDIT MASK
 03FF AF               XRA  A                    A = MASK, BLANK
 0400 CD 4E 0F         CALL LSTATE               LSTATE(FATMOD,NORMOD,SERMOD,PRVMOD)
                       ;                               (PSW:S ,PSW:Z ,PSW:P ,PSW:CY)
                       ;                               ( 0    , 0    , 0    , 0    )
 0403 E2 08 04         JPO  MODD08               IF SERMOD .EQ. TRUE
 0406 3E 10            MVI  A,10H                  A = MASK, UNDERSCORE
                       MODD08;                   ENDIF
 0408 4F               MOV  C,A                  C = MASK
                       ;                         EDIT MASK INTO DISPLAY
 0409 06 07            MVI  B,(NDISP*4-1) B = DISPNO = (NDISP*4-1)
 040B 21 87 74         LXI  H,DIMAGE/2+Y+(NDISP*4-1)
                       ;                         HL = ADDRESS, DIMAGE[DISPNO]
                       MODD09;                   FOR DISPNO = (NDISP*4-1) DOWNTO 0
 040E 7E               MOV  A,M                    IF(DIMAGE[DISPNO] .AND. HEXEE).EQ.0
 040F E6 EE            ANI  0EEH
 0411 C2 19 04         JNZ  MODD10
                       ;                             COPY MASK INTO DISPLAY
 0414 7E               MOV  A,M                      A = IMAGE = DIMAGE[DISPNO]
 0415 E6 EF            ANI  0EFH                     IMAGE = IMAGE, WITHOUT UNDERSCORE
 0417 B1               ORA  C                        IMAGE = IMAGE, WITH EDIT MASK
 0418 77               MOV  M,A                      DIMAGE[DISPNO] = IMAGE
                       MODD10;                     ENDIF
 0419 05               DCR  B                      B = DISPNO = DISPNO-1
 041A 2B               DCX  H                      HL = ADDRESS, DIMAGE[DISPNO]
 041B F2 0E 04         JP   MODD09                 TEST DISPNO
                       ;                         ENDFOR
 041E C9               RET                       RETURN
                       ;PAUTHK()(DBUF  ,NORFLG)
                       ;         (NIBSTR,BITSTR)
                       ;         ( I    , I    )
                       ;         ( RAM  , RAM  )
                       ;
                       ;PSW DESTROYED
                       ;REGISTERS DESTROYED
                       ;
                       ;PROCESS AUTHORIZATION KEY
                       ;
                       PAUTHK;                   ****ENTRY POINT
                       ;                         TEST DISPLAY HEADER
 041F 21 40 74         LXI  H,DBUF/2+X           HL = ADDRESS, DBUF[0..1]
 0422 7E               MOV  A,M                  A = DHEAD = DBUF[0..1]
 0423 B7               ORA  A                    PSW:Z = KEYDAT = DHEAD .EQ. 0
                       ;                         DEFINE REQUEST HEADER
 0424 3E 40            MVI  A,HREQAC             A = RHEAD = HREQAC
                       ;                         IF KEYDAT .EQ. FALSE
                       ;                           NO KEYENTERED DATA IN DISPLAY
                       ;                           REQUEST AUTHORIZATION CODE
 0426 C2 C7 0D         JNZ  XEQHDR                 XEQHDR(RHEAD,ERRFLG)
                       ;                                 ( A    ,PSW:Z )
                       ;                                 ( I    , 0    )
                       ;                         ELSE
 0429 23               INX  H                    HL = ADDRESS, DBUF[2..3]
```

```
042A 7E        MOV  A,M          A = FORMAT = DBUF[2..3]
042B FE 4F     CPI  4FH          IF FORMAT .NE. HEX4F
              ;                    DISPLAY NOT 4 CHAR WITHOUT DECIMAL
              ;                    DECLARE PROCEDURAL ERROR
042D C2 A1 0B  JNZ  PROERR         PROERR(ERRFLG)
              ;                          (PSW:Z )
              ;                          ( 0    )
              ;                  ELSE
0430 23        INX  H            HL = ADDRESS, DBUF[4..5]
0431 7E        MOV  A,M          A = CODE = DBUF[4..5]
0432 FE 69     CPI  69H          IF CODE .NE. HEX69
              ;                    FIRST 2 CHARACTERS IN DISPLAY NOT 69
              ;                    DECLARE PROCEDURAL ERROR
0434 C2 A1 0B  JNZ  PROERR         PROERR(ERRFLG)
              ;                          (PSW:Z )
              ;                          ( 0    )
              ;                  ELSE
              ;                    ISSUE LAST 2 CHARACTERS OF DISPLAY
              ;                    AS REQUEST HEADER
0437 23        INX  H              HL = ADDRESS, DBUF[6..7]
0438 7E        MOV  A,M            A = RHEAD = DBUF[6..7]
0439 CD C7 0D  CALL XEQHDR         XEQHDR(RHEAD,ERRFLG)
              ;                           ( A    ,PSW:Z )
              ;                           ( I    , 0    )
              ;                    TEST THE REQUEST HEADER
043C FE 46     CPI  HSETSV         IF RHEAD .EQ. HSETSV
043E C0        RNZ
              ;                      SERVICE MODE ENTERED VIA KEYBOARD
              ;                      DISABLE COMMUNICATIONS
043F 21 26 74  LXI  H,NORFLG/2+X     HL = ADDRESS, NORFLG
0442 7E        MOV  A,M              NORFLG.COMDSB = TRUE
0443 F6 04     ORI  04H
0445 77        MOV  M,A
              ;                    ENDIF
              ;                  ENDIF
0446 C9        RET               RETURN
              ;PCLRK
              ;
              ;PSW:S, Z, P, CY = NO CHANGE
              ;
              ;PROCESS CLEAR KEY
              ;
              PCLRK;             ****ENTRY POINT
0447 CD 06 03  CALL CDBUFC       IF DISPLAY WAS NOT KEY ENTERED
              ;                    DISABLE METER
              ;                    CLEAR DISPLAY BUFFER
              ;                  ENDIF
044A CD 16 03  CALL CDBUF        CLEAR DISPLAY BUFFER
044D C3 5A 05  JMP  VALDSP       DISPLAY VALUE IN DBUF
              ;                  RETURN
              ;PDCMK()(DBUF   )
              ;       (NIBSTR)
              ;       ( I/O  )
              ;       ( RAM  )
              ;       ( C    )
              ;
              ;PSW AND REGISTERS DESTROYED
              ;
              ;PROCESS DECIMAL KEY
              ;
              PDCMK;             ****ENTRY POINT
              ;                  CHECK FOR NON KEYENTRY DISPLAY
              ;                  IF DBUF[0..1] .NE. HEX00
0450 CD 06 03  CALL CDBUFC         PUT NUL MESSAGE IN DBUF
              ;                    DISABLE METER
              ;                  ENDIF
              ;                  CHECK THAT DECIMAL NOT ALREADY ENTERED
0453 01 83 83  LXI B,(DBUF+3)*100H+DBUF+3
```

```
                 ;                    B = OFFSET, DBUF[3]
                 ;                    C = OFFSET, DBUF[3]
0456 CD 35 0F     CALL GETNIB         GETNIB(DECPOS,ZERO ,DBUF[3])
                 ;                          ( A    ,PSW:Z, @B    )
                 ;                          ( O    , O   , I     )
0459 D6 0F        SUI  0FH            IF DECPOS .EQ. HEX0F
045B C2 61 04     JNZ  PDCMK1
                 ;                      A = DECPOS = 0, RIGHTMOST POSITION
                 ;                      OUTPUT DECPOS
045E CD EE 0F     CALL PUTNIB           PUTNIB(DBUF[3],DECPOS)
                 ;                            ( @C     , A    )
                 ;                            ( O      , I    )
                 PDCMK1;              ENDIF
0461 C3 5A 05     JMP  VALDSP         MAKE NEW DISPLAY
                 ;                    RETURN
                 ;PERDSP()(KDCTRL,DIMAGE,DSPTMR)
                 ;        (BITSTR,BYTSTR,UBYTE )
                 ;        ( O    , O    , O    )
                 ;        ( RAM  , RAM  , RAM  )
                 ;        ( C    , C    , C    )
                 ;
                 ;PSW:S, Z, P, CY = NO CHANGE
                 ;
                 ;MAKE PROCEDURAL ERROR DISPLAY
                 ;
                 PERDSP;              ****ENTRY POINT
0464 F5           PUSH PSW            SAVE A, PSW
                 ;                    CLEAR SETTING-ON-DISPLAY FLAG
0465 3A 27 74     LDA  KDCTRL/2+X     A = KDCTRL
0468 E6 7F        ANI  7FH            KDCTRL.STGDSP = FALSE
                 ;                    SET DISPLAY-IS-TIMED FLAG
046A F6 20        ORI  20H            KDCTRL.TIMED = TRUE
046C 32 27 74     STA  KDCTRL/2+X
046F CD 16 03     CALL CDBUF          CLEAR DISPLAY BUFFER
                 ;                    CLEAR DISPLAY IMAGE BUFFER
0472 AF           XRA  A              A = BLANK
0473 CD 22 03     CALL FILDIM         FILDIM(BLANK)
                 ;                          ( A    )
                 ;                          ( I    )
                 ;                    INSERT 'ERR' IN DISPLAY IMAGE
0476 3E 9E        MVI  A,9EH          DIMAGE[0] = 'E'
0478 32 80 74     STA  DIMAGE/2+Y
047B 3E 0A        MVI  A,0AH          DIMAGE[1] = 'r'
047D 32 81 74     STA  DIMAGE/2+Y+1
0480 32 82 74     STA  DIMAGE/2+Y+2   DIMAGE[2] = 'r'
                 ;                    START DISPLAY TIMER
0483 3E 07        MVI  A,DSPVAL       DSPTMR = DSPVAL
0485 32 29 74     STA  DSPTMR/2+X
0488 F1           POP  PSW            RESTORE A, PSW
0489 C9           RET                 RETURN
                 ;PNUMK(CURKEY)(DBUF  ,WORK1 )
                 ;     (BYTE  )(NIBSTR,NIBSTR)
                 ;     ( I    )( I/O  , O    )
                 ;     ( A    )( RAM  , RAM  )
                 ;     ( C    )( C    , C    )
                 ;
                 ;PSW AND REGISTERS DESTROYED
                 ;
                 ;PROCESS NUMERIC KEY
                 ;
                 PNUMK;               ****ENTRY POINT
048A 57           MOV  D,A            D = CURKEY
048B CD 06 03     CALL CDBUFC         IF DBUF[0..1] .NE. HEX00
                 ;                      NOT IN KEYENTRY MODE
                 ;                      DISABLE METER
                 ;                      ENTER KEYENTRY MODE
                 ;                      DBUF[0..1] = HEADER = HEX00
                 ;                      DECLARE DBUF CLEAR
                 ;                      DBUF[2..3] = FORMAT = HEX0F
```

```
                 ;                  ENDIF
                 ;                  CHECK DATA LENGTH IN DISPLAY
048E 21 41 74     LXI  H,(DBUF+2)/2+X
                 ;                  HL = ADDRESS, DBUF[2..3]
0491 7E           MOV  A,M          E = NCHAR*16 = DBUF[2]*16
0492 E6 F0        ANI  0F0H
0494 5F           MOV  E,A
0495 FE 80        CPI  DSPCHR*16     IF NCHAR .LT. DSPCHR
0497 D0           RNC
                 ;                    THERE IS ROOM IN DISPLAY FOR CHAR
                 ;                    CALCULATE NEXT DECIMAL POSITION
0498 7E           MOV  A,M            A = DECPOS = (DBUF[3]+1) .AND. HEX0F
0499 3C           INR  A
049A E6 0F        ANI  0FH
049C FE 08        CPI  DSPCHR         IF DECPOS .LT. DSPCHR
049E D0           RNC
                 ;                      THERE IS ROOM TO SHIFT DECIMAL
049F B7           ORA  A                IF DECPOS .EQ. 0
04A0 C2 A5 04     JNZ  PNUMK1
                 ;                        DECIMAL HASN'T BEEN ENTERED
                 ;                        INDICATE NO DECIMAL
04A3 3E 0F        MVI  A,0FH              A = DECPOS = HEX0F
                 PNUMK1;                ENDIF
                 ;                      UPDATE FORMAT BYTE
04A5 B3           ORA  E                DBUF[2..3] = (NCHAR+1)*16+DECPOS
04A6 C6 10        ADI  10H
04A8 77           MOV  M,A
04A9 06 82        MVI  B,DBUF+2         B = OFFSET, DBUF[2]
04AB CD 35 0F     CALL GETNIB           GETNIB(NCHAR,ZROFLG,DBUF[2])
                 ;                            ( A   ,PSW:Z , @B     )
                 ;                            ( 0   , 0    , I      )
04AE 5F           MOV  E,A              E = NCHAR
                 ;                      COPY DBUF INTO WORK AREA
04AF 01 C0 84     LXI  B,(DBUF+4)*100H+(WORK1+0)
                 ;                      B = OFFSET, DBUF[I=4]
                 ;                      C = OFFSET, WORK1[J=0]
04B2 CD B3 0F     CALL MVLNIB           MVLNIB(WORK1[J],DBUF[I],NCHAR,
                 ;                            ( @C      , @B     , A   ,
                 ;                            ( 0       , I      , I   ,
                 ;
                 ;                            NONBCD,ZROFLG)
                 ;                            PSW:S_,PSW:Z )
                 ;                             0     , 0    )
                 ;                      ZERO PAD DISPLAY BUFFER
04B5 23           INX  H                HL = ADDRESS, DBUF[4..5]
04B6 36 00        MVI  M,0              DBUF[4..5] = 0
                 ;                      INSERT NEW CHAR IN WORK AREA
04B8 81           ADD  C                C=OFFSET, WORK1[J=NCHAR.AND.HEXFE]
04B9 E6 FE        ANI  0FEH
04BB 4F           MOV  C,A
04BC 7A           MOV  A,D              A = CURKEY
04BD CD EE 0F     CALL PUTNIB           PUTNIB(WORK1[J],CURKEY)
                 ;                            ( @C      , A     )
                 ;                            ( 0       , I     )
                 ;                      MOVE WORK AREA TO DISPLAY BUFFER
04C0 41           MOV  B,C              B = OFFSET, WORK1[I=J]
04C1 3E 83        MVI  A,DBUF+3         C=OFFSET,DBUF[J=(3+NCHAR).OR.HEX01]
04C3 83           ADD  E
04C4 F6 01        ORI  1
04C6 4F           MOV  C,A
04C7 7B           MOV  A,E              A = NCHAR
04C8 CD C2 0F     CALL MVRNIB           MVRNIB(DBUF[J],WORK1[I],NCHAR,
                 ;                            ( @C     , @B      , A   ,
                 ;                            ( 0      , I       , I   ,
                 ;
                 ;                            NONBCD,ZROFLG)
                 ;                            PSW:S ,PSW:Z )
                 ;                             0     , 0    )
04CB C3 5A 05     JMP  VALDSP           UPDATE DISPLAY IMAGE
```

```
                   ;                        ENDIF
                   ;                      ENDIF
                   ;                      RETURN
                   ;PROKEY()(CURBKT)
                   ;         ( BYTE )
                   ;         ( I    )
                   ;         ( RAM  )
                   ;         ( NC   )
                   ;
                   ;PSW AND REGISTERS DESTROYED
                   ;
                   ;INITIATE PROCESSING OF A KEYPRESS
                   ;
                   PROKEY;               ****ENTRY POINT
04CE CD DE 0E        CALL DBLANK         STOP TIMER, BLANK DISPLAY
                   ;                     BUILD INDEX FOR TABLE LOOKUP
                   ;                     CURBKT = ORRR CCCC WHERE:
                   ;                     RRR = 0, 1, 2, 3, OR 4 = ROW CODE
                   ;                     CCCC= 1, 2, 4, OR 8 = COLUMN CODE
04D1 3A 2D 74        LDA CURBKT/2+X      A = CURBKT
04D4 57              MOV  D,A            D = CURBKT
04D5 E6 70           ANI  70H            E = INDEX = (CURBKT .AND. HEX70)/4
04D7 0F              RRC
04D8 0F              RRC
04D9 5F              MOV  E,A
04DA 7A              MOV  A,D            A = CURBKT
                   PROKE1;               DO WHILE COLUMN CODE BIT NOT IN CARRY
04DB 1F              RAR
04DC DA E3 04        JC   PROKE2
04DF 1C              INR  E                E = INDEX = INDEX + 1
04E0 C3 DB 04        JMP  PROKE1
                   PROKE2;               ENDDO
                   ;                     DEFINE CURRENT KEYCODE OR HEADER
04E3 16 00           MVI  D,0            DE = INDEX
04E5 21 02 05        LXI  H,PROKE3       HL = ADDRESS, PROKE3
04E8 19              DAD  D              HL = ADDRESS, PROKE3[INDEX]
04E9 7E              MOV  A,M            A = CURKEY = PROKE3[INDEX]
                   ;                     PROCESS CURRENT KEYCODE
04EA FE 0A           CPI  10             IF CURKEY .LT. 10
                   ;                       PROCESS NUMERIC KEY
04EC DA 8A 04        JC   PNUMK            PNUMK(CURKEY)
                   ;                            ( A     )
                   ;                            ( I     )
                   ;                       RETURN
                   ;                     ELSE IF CURKEY .EQ. 10
04EF CA 47 04        JZ   PCLRK            PROCESS CLEAR KEY
                   ;                       RETURN
04F2 FE 0C           CPI  12             ELSE IF CURKEY .EQ. 11
04F4 DA 50 04        JC   PDCMK            PROCESS DECIMAL KEY
                   ;                       RETURN
                   ;                     ELSE IF CURKEY .EQ. 12
04F7 CA 16 05        JZ   PSETK            PROCESS SET KEY
                   ;                       RETURN
04FA FE 0D           CPI  13             ELSE IF CURKEY .EQ. 13
04FC CA 1F 04        JZ   PAUTHK           PROCESS AUTHORIZATION KEY
                   ;                       RETURN
                   ;                     ELSE
                   ;                       A = HEADER = PROKE3[INDEX]
                   ;                       EXECUTE HEADER
04FF C3 C7 0D        JMP  XEQHDR           XEQHDR(HEADER,ERROR)
                   ;                             ( A     ,PSW:Z)
                   ;                             ( I     , O   )
                   ;                       RETURN
                   ;                     ENDIF
                   PROKE3;   CURKEY      INDEX   DESCRIPTION
                   ;           OR
                   ;         HEADER
                   ;
0502 C4              DB      HSETDA        0     SET DATE
```

```
0503 C6         DB      HENTCO      1     ENTER COMBINATION
0504 C5         DB      HENTAM      2     ENTER AMOUNT
0505 0D         DB      13          3     AUTHORIZATION KEY
0506 0C         DB      12          4     SET KEY
0507 0B         DB      11          5     DECIMAL KEY
0508 00         DB       0          6     0 KEY
0509 0A         DB      10          7     CLEAR KEY
050A 55         DB      HREQPC      8     REQUEST PIECE COUNT
050B 09         DB       9          9     9 KEY
050C 08         DB       8         10     8 KEY
050D 07         DB       7         11     7 KEY
050E 53         DB      HREQDR     12     REQUEST DESCENDING REGISTER
050F 06         DB       6         13     6 KEY
0510 05         DB       5         14     5 KEY
0511 04         DB       4         15     4 KEY
0512 52         DB      HREQAR     16     REQUEST ASCENDING REGISTER
0513 03         DB       3         17     3 KEY
0514 02         DB       2         18     2 KEY
0515 01         DB       1         19     1 KEY
               ;PSETK()(DBUF  ,NORFLG)
               ;       (NIBSTR,BITSTR)
               ;       ( I    , O    )
               ;       ( RAM  , RAM  )
               ;       ( C    , C    )
               ;
               ;PSW AND REGISTERS DESTROYED
               ;
               ;PROCESS SET KEY
               ;
               PSETK;                   ****ENTRY POINT
               ;                        PROCESS SET KEY ACCORDING TO DISPLAY
0516 3A 40 74    LDA  DBUF/2+X          A = DBUF[0..1]
0519 B7          ORA  A                 IF DBUF[0..1] .EQ. HEX00
051A C2 2F 05    JNZ  PSETK1
               ;                          DISPLAY IS IN KEYENTRY MODE
051D 21 36 05    LXI  H,PSETK2            SET TO QUE POSTAGE VIA RETURN
0520 E5          PUSH H
0521 3A 41 74    LDA  (DBUF+2)/2+X        A = DBUF[2..3]
0524 FE 0F       CPI  0FH                 IF DBUF[2..3] .EQ. HEX0F
0526 C8          RZ                         DISPLAY IS CLEAR
               ; >>RETURN AHEAD<<           QUE POSTAGE REQUEST
               ;                            NORFLG.QUEPOS = TRUE
               ;                          ELSE
               ;                            DISPLAY CONTAINS KEYENTERED VALUE
               ;                            SET POSTAGE
0527 3E C1       MVI  A,HSETPO              A = HSETPO
0529 CD C7 0D    CALL XEQHDR                XEQHDR(HSETPO,ERRFLG)
               ;                                  ( A     ,PSW:Z )
               ;                                  ( I     , O    )
052C C0          RNZ                        IF ERRFLG .EQ. FALSE
               ; >>RETURN AHEAD<<             QUE POSTAGE REQUEST
               ;                              NORFLG.QUEPOS = TRUE
               ;                            ENDIF
               ;                          ENDIF
052D E1          POP  H                   CLEAN UP STACK
052E C9          RET
               PSETK1;                  ELSE
               ;                          DISPLAY NOT IN KEYENTRY MODE
052F FE 81       CPI  HPSET               PSW:Z = SETTING=DBUF[0..1].EQ.HPSET
0531 3E 41       MVI  A,HENABL            A = HENABL
               ;                          IF SETTING .EQ. TRUE
               ;                            SETTING IS ON DISPLAY
               ;                            ENABLE METER
0533 CA C7 0D    JZ   XEQHDR                XEQHDR(HENABL,ERRFLG)
               ;                                  ( A     ,PSW:Z )
               ;                                  ( I     , O    )
               ;                          ELSE
               ;                            SETTING IS NOT ON DISPLAY
               PSETK2;                      >>TARGET OF RETURN AHEAD<<
```

```
                 ;                          QUE POSTAGE REQUEST
0536 21 26 74      LXI  H,NORFLG/2+X        HL = ADDRESS, NORFLG
0539 7E            MOV  A,M                 A = NORFLG
053A F6 40         ORI  40H                 NORFLG.QUEPOS = TRUE
053C 77            MOV  M,A
                 ;                        ENDIF
                 ;                      ENDIF
053D C9            RET                  RETURN
                 ;SEGCOD(CODE)
                 ;      (BYTE)
                 ;      (I/O )
                 ;      ( A  )
                 ;      ( C  )
                 ;
                 ;PSW:S, Z, P, CY DESTROYED
                 ;
                 ;CONVERT 4 BIT HEX VALUE INTO 7 SEGMENT DISPLAY CODE
                 ;
                 SEGCOD;                 ****ENTRY POINT
053E E5            PUSH H                SAVE HL
                 ;                       FETCH 7 SEGMENT DISPLAY CODE
053F C6 4A         ADI  >SEGC01          HL = ADDRESS, SEGC01[CODE]
0541 6F            MOV  L,A
0542 3E 00         MVI  A,0
0544 CE 05         ACI  <SEGC01
0546 67            MOV  H,A
0547 7E            MOV  A,M              A = CODE = SEGC01[CODE]
0548 E1            POP  H                RESTORE HL
0549 C9            RET                   RETURN
                 ;
                 SEGC01; 7 SEG CODE;  HEX VALUE;  GRAPHIC
                 ;
054A FC            DB       0FCH          0         0
054B 60            DB       060H          1         1
054C DA            DB       0DAH          2         2
054D F2            DB       0F2H          3         3
054E 66            DB       066H          4         4
054F B6            DB       0B6H          5         5
0550 BE            DB       0BEH          6         6
0551 E0            DB       0E0H          7         7
0552 FE            DB       0FEH          8         8
0553 F6            DB       0F6H          9         9
0554 9E            DB       09EH          A         E
0555 0A            DB       00AH          B         r
0556 3A            DB       03AH          C         o
0557 92            DB       092H          D         WING, ENABLED
0558 02            DB       002H          E         WING, DISABLED
0559 00            DB       000H          F         BLANK
                 ;VALDSP()(DIMAGE,KDCTRL,DBUF   ,DSPTMR)
                 ;        (BYTSTR,BITSTR,NIBSTR,UBYTE )
                 ;        ( O    , O    , I    , O     )
                 ;        ( RAM  , RAM  , RAM  , RAM   )
                 ;        ( C    , C    , NC   , C    -)
                 ;
                 ;PSW:S, Z, P, CY = NO CHANGE
                 ;
                 ;TRANSLATE CONTENTS OF DISPLAY BUFFER INTO 7 SEGMENT
                 ;CHARACTER CODES WHICH ARE PLACED IN THE DISPLAY IMAGE
                 ;BUFFER
                 ;
                 VALDSP;                 ****ENTRY POINT
055A E5            PUSH H                SAVE HL
055B D5            PUSH D                SAVE DE
055C C5            PUSH B                SAVE BC
055D F5            PUSH PSW              SAVE A, PSW
                 ;                       CLEAR DISPLAY IMAGE BUFFER
055E AF            XRA  A                A = BLANK
055F CD 22 03      CALL FILDIM           FILDIM(BLANK)
                 ;                             ( A   )
```

```
                   ;                          ( I   )
                   ;                    DEFINE DEFAULT DISPLAY MODE
0562 3A 27 74   LDA  KDCTRL/2+X         A = KDCTRL
0565 E6 7F      ANI  7FH                KDCTRL.STGDSP = FALSE
0567 F6 20      ORI  20H                KDCTRL.TIMED = TRUE
0569 57         MOV  D,A                D = KDCTRL
                   ;                    FETCH VALUES FROM DBUF'S FORMAT BYTE
056A 06 82      MVI  B,DBUF+2           B = OFFSET, DBUF[2]
056C CD 35 0F   CALL GETNIB             GETNIB(NCHAR,ZERO ,DBUF[2])
                   ;                          ( A    ,PSW:Z, @B     )
                   ;                          ( 0    , 0   , I      )
056F 4F         MOV  C,A                C = NCHAR
0570 04         INR  B                  B = OFFSET, DBUF[3]
0571 CD 35 0F   CALL GETNIB             GETNIB(DECPOS,ZERO ,DBUF[3])
                   ;                          ( A    ,PSW:Z, @B     )
                   ;                          ( 0    , 0   , I      )
0574 5F         MOV  E,A                E = DECPOS
                   ;                    POINT AT L/O OF DISPLAY IMAGE BUFFER
0575 21 87 74   LXI  H,DIMAGE/2+Y+(NDISP*4-1)
                   ;                    HL = ADDRESS, DIMAGE[NDISP*4-1]
                   ;                    CHECK FOR KEYENTRY IN DISPLAY BUFFER
0578 3A 40 74   LDA  DBUF/2+X           A = DBUF[0..1]
057B B7         ORA  A                  IF DBUF[0..1] .EQ. HEX00
057C C2 8D 05   JNZ  VALDS2
                   ;                      CHECK FOR NULL MESSAGE IN DBUF
057F 3A 41 74   LDA  (DBUF+2)/2+X         A = DBUF[2..3]
0582 FE 0F      CPI  0FH                  IF DBUF[2..3] .EQ. HEX0F
0584 C2 89 05   JNZ  VALDS1
                   ;                        PUT SMALL 0 IN DISPLAY
0587 36 3A      MVI  M,3AH                  OUTPUT DIMAGE[NDISP*4-1] = 'o'
               VALDS1;                    ENDIF
0589 7A         MOV  A,D                  A = KDCTRL
                   ;                      MAKE UNTIMED DISPLAY
058A C3 97 05   JMP  VALDS3
                   ; >>JUMP AHEAD<<
               VALDS2;                  ENDIF
                   ;                    CHECK WHETHER SETTING IS ON DISPLAY
058D FE 81      CPI  HPSET              COMPARE DBUF[0..1] WITH HPSET
058F 7A         MOV  A,D                A = KDCTRL
0590 C2 99 05   JNZ  VALDS4             IF DBUF[0..1] .EQ. HPSET
                   ;                      SHIFT DESTINATION TO LEFT
0593 1C         INR  E                    E = DECPOS = DECPOS + 1
0594 2B         DCX  H                    HL = ADDRESS, DIMAGE[DST=NDISP*4-2]
                   ;                      SET SETTING-ON-DISPLAY FLAG
0595 F6 80      ORI  80H                  KDCTRL.STGDSP = TRUE
               VALDS3;                    >>TARGET OF JUMP AHEAD<<
                   ;                      CLEAR DISPLAY-IS-TIMED FLAG
0597 E6 DF      ANI  0DFH                 KDCTRL.TIMED = FALSE
               VALDS4;                  ENDIF
0599 32 27 74   STA  KDCTRL/2+X         OUTPUT KDCTRL
                   ;                    POINT AT L/O DATA IN DBUF
059C 79         MOV  A,C                A = N = NCHAR
059D B7         ORA  A                  A = N/2;  CY = N .MOD. 2
059E 1F         RAR
059F CE 00      ACI  0                  B = OFFSET, DBUF[SRC=(N/2+N.MOD.2)*2+3]
05A1 17         RAL
05A2 C6 83      ADI  DBUF+3
05A4 47         MOV  B,A
               VALDS5;                  DO WHILE NCHAR .GT. 0
05A5 0D         DCR  C
05A6 FA B5 05   JM   VALDS6
                   ;                      FETCH BCD CHARACTER FROM DBUF
05A9 CD 35 0F   CALL GETNIB               GETNIB(CODE,ZERO ,DBUF[SRC])
                   ;                            ( A   ,PSW:Z, @B       )
                   ;                            ( 0   , 0   , I        )
                   ;                      TRANSLATE TO 7 BIT DISPLAY CODE
05AC CD 3E 05   CALL SEGCOD               SEGCOD(CODE)
                   ;                            ( A  )
                   ;                            ( I/O)
```

```
                   ;                          PUT CODE INTO DISPLAY IMAGE BUFFER
05AF 77              MOV  M,A                 DIMAGE[DST] = CODE
                   ;                          MOVE INDICES LEFT
05B0 05              DCR  B                   B = OFFSET, DBUF[SRC=SRC-1]
05B1 2B              DCX  H                   HL = ADDRESS, DIMAGE[DST=DST-1]
05B2 C3 A5 05        JMP  VALDS5
                   VALDS6;                  ENDDO
                   ;                        CHECK WHETHER DECIMAL IS DISPLAYABLE
05B5 7B              MOV  A,E               A = DECPOS
05B6 FE 08           CPI  DSPCHR            IF DECPOS .LT. DSPCHR
05B8 D2 C3 05        JNC  VALDS7
                   ;                          CALC DECIMAL'S ADDRESS IN DIAMGE
05BB 2F              CMA                      A = -DECPOS-1
05BC C6 88           ADI  (DIMAGE/2+Y-X)+(NDISP*4)
05BE 6F              MOV  L,A
                   ;                          HL = ADDRESS,
                   ;                          DIMAGE[N=(NDISP*4-1)-DECPOS]
                   ;                          INSERT DECIMAL INTO DISPLAY
05BF 7E              MOV  A,M                 DIMAGE[N] = DIMAGE[N] .OR. HEX01
05C0 F6 01           ORI  01H
05C2 77              MOV  M,A
                   VALDS7;                  ENDIF
                   ;                        START DISPLAY TIMER
05C3 3E 07           MVI  A,DSPVAL          DSPTMR = DSPVAL
05C5 32 29 74        STA  DSPTMR/2+X
05C8 F1              POP  PSW               RESTORE A, PSW
05C9 C1              POP  B                 RESTORE BC
05CA D1              POP  D                 RESTORE DE
05CB E1              POP  H                 RESTORE HL
05CC C9              RET                    RETURN
                   ;CMDDSB/DISABL()(MRSTS1,NORFLG)
                   ;               (BITSTR,BITSTR)
                   ;               ( I/O  , 0    )
                   ;               ( RAM  , RAM  )
                   ;               ( C    , C    )
                   ;
                   ;PSW = NO CHANGE
                   ;
                   ;DISABLE METER
                   ;
                   CMDDSB;                  ****ENTRY POINT FOR EXTERNAL DISABLES
05CD F5              PUSH PSW               SAVE A, PSW
                   ;                        SET TO SET NORFLG.LATDSB = TRUE
05CE 3E 01           MVI  A,1               A = LATMSK = HEX01
05D0 C3 D5 05        JMP  DISAB1
                   ; >>JUMP AHEAD<<
                   DISABL;                  ****ENTRY POINT FOR INTERNAL DISABLES
05D3 F5              PUSH PSW               SAVE A,PSW
                   ;                        SET TO PRESERVE NORFLG.LATSDB
05D4 AF              XRA  A                 A = LATMSK = HEX00
                   DISAB1;                  >>TARGET OF JUMP AHEAD<<
05D5 D5              PUSH D                 SAVE DE
05D6 E5              PUSH H                 SAVE HL
05D7 21 26 74        LXI  H,NORFLG/2+X      HL = ADDRESS, NORFLG
                   ;                        UPDATE NORFLG.LATDSB
05DA B6              ORA  M                 NORFLG = NORFLG .OR. LATMSK
05DB 77              MOV  M,A
05DC 11 24 74        LXI  D,MRSTS1/2+X      DE = ADDRESS, MRSTS1
05DF 1A              LDAX D                 IF MRSTS1.ENABLD .EQ. TRUE
05E0 E6 04           ANI  4
05E2 CA EF 05        JZ   DISAB2
05E5 1A              LDAX D                   MRSTS1.ENABLD = FALSE
05E6 E6 FB           ANI  0FBH
05E8 12              STAX D
05E9 7E              MOV  A,M                 NORFLG.TRPREQ = FALSE
05EA E6 F7           ANI  0F7H
05EC F6 80           ORI  80H                 NORFLG QUESTS = TRUE
05EE 77              MOV  M,A
                   DISAB2;                  ENDIF
```

```
05EF E1          POP  H              RESTORE HL
05F0 D1          POP  D              RESTORE DE
05F1 F1          POP  PSW            RESTORE A, PSW
05F2 C9          RET                 RETURN
                ;CMDENB/ENABLE()(MRSTS1,NORFLG,NVMCTL)
                ;                  (BITSTR,BITSTR,BITSTR)
                ;                  ( I/O  , I/O  , I    )
                ;                  ( RAM  , RAM  , RAM  )
                ;                  ( C    , C    , NC   )
                ;
                ;PSW = NO CHANGE
                ;
                ;ENABLE METER
                ;
                CMDENB;              ****ENTRY POINT FOR EXTERNAL ENABLES
05F3 F5           PUSH PSW           SAVE A, PSW
                ;                    SET TO SET NORFLG.LATDSB = FALSE
05F4 3E FE        MVI  A,0FEH        A = LATMSK = HEXFE
05F6 C3 FC 05     JMP  ENABL1
                ; >>JUMP AHEAD<<
                ENABLE;              ****ENTRY POINT FOR INTERNAL ENABLES
05F9 F5           PUSH PSW           SAVE A, PSW
                ;                    SET TO PRESERVE NORFLG.LATDSB
05FA 3E FF        MVI  A,0FFH        A = LATMSK = HEXFF
                ENABL1;              >>TARGET OF JUMP AHEAD<<
05FC C5           PUSH B             SAVE BC
05FD D5           PUSH D             SAVE DE
05FE E5           PUSH H             SAVE HL
05FF 21 26 74     LXI  H,NORFLG/2+X  HL = ADDRESS, NORFLG
                ;                    UPDATE NORFLG.LATDSB
0602 A6           ANA  M             NORFLG = NORFLG .AND. LATMSK
0603 77           MOV  M,A
0604 3A 33 74     LDA  NVMCTL/2+X     IF NVMCTL[0] .NE. HEXF
0607 B7           ORA  A
0608 FA 27 06     JM   ENABL4
                ;                       A BLOCK IS OPEN
060B CD 4E 0F     CALL LSTATE           LSTATE(FATMOD,NORMOD,SERMOD,PRVMOD)
                ;                             (PSW:S ,PSW:Z ,PSW:P ,PSW:CY)
                ;                             ( 0    , 0    , 0    , 0     )
060E C2 27 06     JNZ  ENABL3           IF NORMOD .EQ. TRUE
0611 11 24 74     LXI  D,MRSTS1/2+X       DE = ADDRESS, MRSTS1
0614 1A           LDAX D
0615 E6 EC        ANI  0ECH
0617 47           MOV  B,A                B = FLAGS = MRSTS1.UNKSEL,
                ;                                     MRSTS1.DATDOR,
                ;                                     MRSTS1.INSFND,
                ;                                     MRSTS1.ENABLD
0618 7E           MOV  A,M
0619 E6 03        ANI  3
061B B0           ORA  B                  A = FLAGS = FLAGS .OR.
                ;                                     NORFLG.UNVSEL,
                ;                                     NORFLG.LATDSB
061C C2 27 06     JNZ  ENABL2              IF FLAGS .EQ. FALSE
061F 7E           MOV  A,M                   NORFLG.QUESTS = TRUE
0620 F6 80        ORI  80H
0622 77           MOV  M,A
0623 1A           LDAX D                     MRSTS1.ENABLD = TRUE
0624 F6 04        ORI  4
0626 12           STAX D
                ENABL2;                    ENDIF
                ENABL3;                  ENDIF
                ENABL4;                ENDIF
0627 E1           POP  H               RESTORE HL
0628 D1           POP  D               RESTORE DE
0629 C1           POP  B               RESTORE BC
062A F1           POP  PSW             RESTORE A, PSW
062B C9           RET                  RETURN
                ;CONFIG(ERRFLG)(MTRCHR,XMTBUF)
                ;      (BIT   )(BYTE  ,BYTSTR)
```

```
                   ;       ( O     )( I     , O     )
                   ;       (PSW:S )( RAM   , RAM   )
                   ;       ( C     )( NC    , C     )
                   ;
                   ;REGISTERS DESTROYED
                   ;PSW DESTROYED
                   ;
                   ;PUT METER CONFIGURATION MESSAGE IN TRANSMIT BUFFER
                   ;
                   CONFIG;               ****ENTRY POINT
062C 21 50 74        LXI  H,XMTBUF/2+X   HL = ADDRESS, XMTBUF[0]
                   ;                     DEFINE MESSAGE LENGTH
062F 36 02           MVI  M,2            XMTBUF[0] = 2
                   ;                     DEFINE MESSAGE HEADER
0631 23              INX  H              HL = ADDRESS, XMTBUF[1]
0632 36 AB           MVI  M,HCONFG       XMTBUF[1] = HCONFG
                   ;                     DEFINE ERROR FLAG
0634 2C              INR  L              HL = ADDRESS, XMTBUF[2]
                   ;                     PSW:Z = ERRFLG = FALSE
                   ;                     DEFINE METER CHARACTERISTICS
0635 3A 23 74        LDA  MTRCHR/2+X     XMTBUF[2] = MTRCHR
0638 77              MOV  M,A
0639 C9              RET                 RETURN
                   ;CONSUM(ERRFLG)(CTLCRC)
                   ;       (BIT   )(BYTE  )
                   ;       ( O     )( I     )
                   ;       (PSW:Z )( RAM   )
                   ;       ( C     )( NC    )
                   ;
                   ;REGISTERS DESTROYED
                   ;PSW DESTROYED
                   ;
                   ;CHECK CONTROL SUM CRC AGAINST EXPECTED CRC
                   ;
                   CONSUM;               ****ENTRY POINT
                   ;                     CALCULATE CONTROL SUM CRC
063A CD 4E 06        CALL CTLSUM         CTLSUM(CSMCRC,ERRFLG)
                   ;                            ( D     ,PSW:Z )
                   ;                            ( O     , O     )
063D CA 47 06        JZ   CONSU1         IF ERRFLG .EQ. TRUE
                   ; >>JUMP AHEAD<<        DECLARE DEAD METER. BAD CRC
                   ;                       A = BADCRC
                   ;                       NVMDED(BADCRC,ERRFLG)
                   ;                              ( A     ,PSW:Z )
                   ;                              ( I     , O     )
                   ;                     ELSE
0640 3A 08 74        LDA  CTLCRC/2+X     A = DIF = CTLCRC-CSMCRC
0643 92              SUB  D
0644 CA 4C 06        JZ   CONSU2         IF DIF .NE. 0
                   CONSU1;                 >>TARGET OF JUMP AHEAD<<
                   ;                       DECLARE DEAD METER. BAD CRC
0647 3E 00           MVI  A,BADCRC         A = BADCRC
0649 C3 85 10        JMP  NVMDED           NVMDED(BADCRC,ERRFLG)
                   ;                              ( A     ,PSW:Z )
                   ;                              ( I     , O     )
                   CONSU2;               ELSE
064C 3C              INR  A                PSW:Z = ERRFLG = FALSE
                   ;                     ENDIF
064D C9              RET                 RETURN
                   ;CTLSUM(CSMCRC,ERRFLG)(ASCREG,DSCREG,WORK1 )
                   ;       (BYTE  ,BIT   )(NIBSTR,NIBSTR,NIBSTR)
                   ;       ( O     , O     )( I     , I     , O     )
                   ;       ( D     ,PSW:Z )( RAM   , RAM   , RAM   )
                   ;       ( C     , C     )( NC    , NC    , C     )
                   ;
                   ;REGISTERS DESTROYED
                   ;PSW DESTROYED
                   ;
```

```
                ;CALCULATE CONTROL SUM AND ITS CRC FOR THE CURRENT VALUES
                ;OF THE ASCENDING AND DESCENDING REGISTERS
                ;
                CTLSUM;                 ****ENTRY POINT
                ;                       COPY ASCENDING REGISTER INTO WORK AREA
064E 01 C9 3F    LXI  B,(ASCREG+ASCSIZ-1)*100H+(WORK1+9)
                ;                       B = OFFSET, ASCREG[I=ASCSIZ-1]
                ;                       C = OFFSET, WORK1[J=10-1]
0651 3E 08       MVI  A,ASCSIZ          A = ASCSIZ
0653 CD C2 0F    CALL MVRNIB            MVRNIB(WORK1[J],ASCREG[I],ASCSIZ,
                ;                              ( @C     , @B      , A    ,
                ;                              ( O      , I       , I    ,
                ;
                ;                              NONBCD,ZROFLG)
                ;                              PSW:S ,PSW:Z )
                ;                               O    , O    )
0656 F2 5B 06    JP   CTLSU1            IF NONBCD .EQ. TRUE
0659 AF          XRA  A                   PSW:Z = ERRFLG = TRUE
065A C9          RET
                CTLSU1;                 ELSE
065B 3A 17 74    LDA  DSCREG/2+X        IF DSCREG[0..1] .EQ. HEXFF
065E FE FF       CPI  0FFH                PSW:Z = ERRFLG = TRUE
0660 C8          RZ
                ;                       ELSE
                ;                         CALCULATE CONTROL SUM IN WORK AREA
0661 06 35       MVI  B,DSCREG+DSCSIZ-1
                ;                         B = OFFSET, DSCREG[K=DSCSIZ-1]
0663 11 08 07    LXI  D,DSCSIZ*100H+ASCSIZ
                ;                         D = DSCSIZ
                ;                         E = ASCSIZ
0666 CD F8 06    CALL DECADD              DECADD(WORK1[J],DSCREG[K],
                ;                                ( O      , I       ,
                ;                                ( @C     , @B      ,
                ;
                ;                                ASCSIZ,DSCSIZ,OVRFLO)
                ;                                 I    , I    , O    )
                ;                                 E    , D    ,PSW:CY)
                ;                         CALCULATE CRC FOR CONTROL SUM
0669 01 C2 08    LXI  B,(ASCSIZ)*100H+(WORK1+10-ASCSIZ)
                ;                         B = ASCSIZ
                ;                         C = OFFSET, WORK1[L=10-ASCSIZ]
066C CD B1 0E    CALL CRC                 CRC(WORK1[L],ASCSIZ,CSMCRC)
                ;                             ( I      , I    , O    )
                ;                             ( @C     , B    , D    )
066F 04          INR  B                   PSW:Z = ERRFLG = FALSE
                ;                       ENDIF
0670 C9          RET                    RETURN
                ;DBLHDR(HEADER,ERRFLG)(LOWWRN,SERNUM,ERRST ,SETLIM,ASCREG,
                ;      (BYTE  ,BIT   )(NIBSTR,NIBSTR,NIBSTR,NIBSTR,NIBSTR,
                ;      ( I    , O    )( I    , I    , I    , I    , I    ,
                ;      ( A    ,PSW:Z )( RAM  , RAM  , RAM  , RAM  , RAM  ,
                ;      ( NC   , C    )( NC   , NC   , NC   , NC   , NC   ,
                ;
                ;      DSCREG,WORK1 ,PCEREG,MRSTS1)
                ;      NIBSTR,NIBSTR,NIBSTR,BITSTR)
                ;       I    , I    , I    , O    )
                ;       RAM  , RAM  , RAM  , RAM  )
                ;       NC   , NC   , NC   , C    )
                ;
                ;REGISTERS DESTROYED
                ;PSW DESTROYED
                ;
                ;PROCESS DOUBLY DEFINED HEADERS
                ;
                DBLHDR;                 ****ENTRY POINT
0671 CD 4E 0F    CALL LSTATE            LSTATE(FATMOD,NORMOD,SERMOD,PRVMOD)
                ;                             (PSW:S ,PSW:Z ,PSW:P ,PSW:CY)
                ;                             ( O    , O    , O    , O    )
0674 21 E2 06    LXI  H,DBLH04          SET TO RETURN TO ENDCASE
```

```
0677 E5         PUSH H
0678 E2 A6 06   JPO  DBLH02         IF SERMOD .EQ. TRUE
               ;                    --CASE (HEADER)
067B FE 52      CPI  HREQDL           **52: DOLLAR LOCK VALUE REQUEST
067D 11 E3 06   LXI  D,DBLH05+0
0680 CA 5B 0D   JZ   VALREQ           VALREQ(UNLOCK,LOKFMT,HDLOCK,ERRFLG)
               ;                             (@@DE+0,@DE+1 ,@DE+2 ,PSW:Z )
               ;                             ( I    , I    , I    , 0    )
0683 FE 53      CPI  HREQLP           **53: LOW POSTAGE WARNING VALUE REQ
0685 01 8B 1C   LXI  B,LOWWRN*100H+HLOPOS
0688 CA 34 0D   JZ   SRVREQ           SRVREQ(LOWWRN,HLOPOS,ERRFLG)
               ;                             ( @B   , C    ,PSW:Z )
               ;                             ( I    , I    , 0    )
068B FE 54      CPI  HREQMN           **54: METER SERIAL NUMBER REQUEST
               DBLH01;                ****ALTERNATE ENTRY POINT
068D 11 E6 06   LXI  D,DBLH05+3
0690 CA 5B 0D   JZ   VALREQ           VALREQ(SERNUM,MSNFMT,HMTRNO,ERRFLG)
               ;                             (@@DE+0,@DE+1 ,@DE+2 ,PSW:Z )
               ;                             ( I    , I    , I    , 0    )
0693 FE 55      CPI  HREQDS           **55: DIAGNOSTIC REQUEST
0695 11 E9 06   LXI  D,DBLH05+6
0698 CA 5B 0D   JZ   VALREQ           VALREQ(ERRST ,DIAFMT,HDIAGS,ERRFLG)
               ;                             (@@DE+0,@DE+1 ,@DE+2 ,PSW:Z )
               ;                             ( I    , I    , I    , 0    )
069B FE 56      CPI  HREQSL           **56: SETTING LIMIT VALUE REQUEST
069D 01 8E 1E   LXI  B,SETLIM*100H+HHSLIM
06A0 CA 34 0D   JZ   SRVREQ           SRVREQ(SETLIM,HHSLIM,ERRFLG)
               ;                             ( @B   , C    ,PSW:Z )
               ;                             ( I    , I    , 0    )
               ;                      **ELSE: PROCESS ERROR
06A3 C3 A1 0B   JMP  PROERR           PROERR(ERRFLG)
               ;                             (PSW:Z )
               ;                             ( 0    )
               ;                    --ENDCASE
               DBLH02;              ELSE
               ;                    --CASE (HEADER)
06A6 FE 52      CPI  HREQAR           **52: ASCENDING REGISTER REQUEST
06A8 11 EC 06   LXI D,DBLH05+9
06AB CA 5B 0D   JZ   VALREQ           VALREQ(ASCREG,ASCFMT,HAREG ,ERRFLG)
               ;                             (@@DE+0,@DE+1 ,@DE+2 ,PSW:Z )
               ;                             ( I    , I    , I    , 0    )
06AE FE 53      CPI  HREQDR           **53: DESCENDING REGISTER REQUEST
06B0 11 EF 06   LXI  D,DBLH05+12
06B3 CA 5B 0D   JZ   VALREQ           VALREQ(DSCREG,DSCFMT,HDREG ,ERRFLG)
               ;                             (@@DE+0,@DE+1 ,@DE+2 ,PSW:Z )
               ;                             ( I    , I    , I    , 0    )
06B6 FE 54      CPI  HREQCS           **54: CONTROL SUM REQUEST
06B8 C2 C5 06   JNZ  DBLH03
06BB CD 3A 06   CALL CONSUM           CONSUM(ERRFLG)
               ;                             (PSW:Z )
               ;                             ( 0    )
06BE 11 F2 06   LXI  D,DBLH05+15
               ;                      IF ERRFLG .EQ. FALSE
               ;                        I = 10-ASCSIZ
06C1 C4 5B 0D   CNZ  VALREQ             VALREQ(WORK1[I],CSMFMT,HCSUM,ERRFLG)
               ;                               (@@DE+0  ,@DE+1 ,@DE+2,PSW:Z )
               ;                               ( I      , I    , I   , 0    )
               ;                      ENDIF
06C4 C9         RET
               DBLH03;
06C5 FE 55      CPI  HREQPC           **55: PIECE COUNT REQUEST
06C7 11 F5 06   LXI  D,DBLH05+18
06CA CA 5B 0D   JZ   VALREQ           VALREQ(PCEREG,PCEFMT,HPCNT ,ERRFLG)
               ;                             (@@DE+0,@DE+1 ,@DE+2 ,PSW:Z )
               ;                             ( I    , I    , I    , 0    )
06CD FE 5B      CPI  HREQCF           **5B: CONFIGURATION DATA REQUEST
06CF CA 2C 06   JZ   CONFIG           CONFIG(ERRFLG)
               ;                             (PSW:Z )
               ;                             ( 0    )
```

```
06D2 FE C4      CPI  HSETDA          **C4: RESET DATER DOOR
06D4 C2 A1 0B   JNZ  PROERR
06D7 21 24 74   LXI  H,MRSTS1/2+X    HL = ADDRESS, MRSTS1
06DA 7E         MOV  A,M             MRSTS1.DATDOR = FALSE
06DB E6 BF      ANI  0BFH
06DD 77         MOV  M,A
06DE 24         INR  H               PSW:Z = ERRFLG = FALSE
06DF C3 48 0C   JMP  SELVAL          DISPLAY SELECTION VALUE
               ;                     **ELSE: PROCESS ERROR
               ;                     PROERR(ERRFLG)
               ;                          (PSW:Z )
               ;                          ( 0    )
               DBLH04;             --ENDCASE
               ;                   ENDIF
06E2 C9         RET                RETURN
               DBLH05;             ARGUMENTS FOR VALREQ
06E3 18 40 8A   DB   UNLOCK,LOKFMT,HDLOCK          ;+0
06E6 21 7F 8C   DB   SERNUM,MSNFMT,HMTRNO          ;+3
06E9 13 5F 8D   DB   ERRST,DIAFMT,HDIAGS           ;+6
06EC 38 80 82   DB   ASCREG,ASCFMT,HAREG           ;+9
06EF 2F 70 83   DB   DSCREG,DSCFMT,HDREG           ;+12
06F2 C2 80 84   DB   WORK1+10-ASCSIZ,CSMFMT,HCSUM  ;+15
06F5 28 7F 85   DB   PCEREG,PCEFMT,HPCNT           ;+18
               ;DECADD(V1[V1DGTS-1],V2[V2DGTS-1],V1DGTS,V2DGTS,OVRFLO)
               ;      (NIBSTR      ,NIBSTR      ,BYTE  ,BYTE  , BIT  )
               ;      ( I/O        , I          , I    , I    , 0    )
               ;      ( @C         , @B         , E    , D    ,PSW:CY)
               ;      ( C          , NC         , C    , C    , C    )
               ;
               ;PSW DESTROYED
               ;REGISTERS DESTROYED
               ;
               ;BCD ADDITION OF UNSIGNED BCD VALUE STRINGS
               ;V1[0..V1DGTS-1] = V1[0..V1DGTS-1] + V2[0..V2DGTS-1]
               ;WHERE V1DGTS .GE. V2DGTS
               ;
               DECADD;             ****ENTRY POINT
               ;                   C  OFFSET, V1[I=V1DGTS-1]
               ;                   B  OFFSET, V2[J=V2DGTS-1]
06F8 7B         MOV  A,E           IF V1DGTS .LT. V2DGTS
06F9 BA         CMP  D
06FA DA 20 07   JC   DECERR          DECLARE BAD ARGUMENT
               ;                     ENTER FATAL ERROR MODE
               ;                   ENDIF
06FD AF         XRA  A             PSW:CY = CARRY = FALSE
               DECAD1;             DO WHILE V1DGTS .GE. 0
06FE 1D         DCR  E               E = V1DGTS = V1DGTS-1
06FF F8         RM
0700 CD 0C 07   CALL DECCOM          DECCOM(V1[I],V2[J],V1DGTS,V2DGTS,
               ;                            ( @C  , @B  , E    , D    ,
               ;                            ( I   , I/O , -    , I/O  ,
               ;
               ;                            VAL1,VAL2)
               ;                             L   , A  )
               ;                             0   , 0  )
               ;                     L[0..1] = VAL1 = HEX90 .OR. V1[I]
               ;                     A[0..1] = VAL2 = V2[J]
               ;                     B = OFFSET, V2[J=J-1]
               ;                     D = V2DGTS = V2DGTS-1
0703 8D         ADC  L               A[1] = VAL1 = VAL1+VAL2+CARRY
0704 27         DAA
               ;                     PSW:CY = CARRY
0705 CD EE 0F   CALL PUTNIB          PUTNIB(V1[I],VAL1)
               ;                           ( @C  ,A[1])
               ;                           ( 0   , I  )
0708 0D         DCR  C               C = OFFSET, V1[I=I-1]
0709 C3 FE 06   JMP  DECAD1
               ;                   ENDDO
               ;                   RETURN
```

```
               ;DECCOM(V1[I] ,V2[J] ,V1DGTS,V2DGTS,VAL1,VAL2)
               ;      (NIBBLE,NIBBLE,BYTE  ,BYTE  ,BYTE,BYTE)
               ;      ( I    , I/O  , -    , I/O  , O  , O  )
               ;      ( @C   , @B   , E    , D    , L  , A  )
               ;      ( NC   , C    , NC   , C    , C  , C  )
               ;
               ;PSW:CY = NO CHANGE
               ;PSW:S, Z, P CHANGED
               ;REGISTERS DESTROYED
               ;
               ;COMMON ROUTINE CALLED BY DECADD AND DECSUB
               ;FETCHES NEXT PAIR OF OPERANDS
               ;VAL1 = HEX90 .OR. V1[I]
               ;VAL2 = V2[J]
               ;J AND V2DGTS WILL BE DECREMENTED
               ;
               DECCOM;                 ****ENTRY POINT
070C F5          PUSH PSW              SAVE PSW:CY
070D 60          MOV  H,B              H = OFFSET, V2[J]
070E 41          MOV  B,C              B = OFFSET, V1[I]
070F CD 35 0F    CALL GETNIB           GETNIB(VAL1,ZROFLG,V1[I])
               ;                              ( A  ,PSW:Z , @B  )
               ;                              ( O  , O    , I   )
0712 F6 90       ORI  90H              L[0..1] = VAL1 = HEX90 .OR. VAL1
0714 6F          MOV  L,A
0715 44          MOV  B,H              B = OFFSET, V2[J]
0716 F1          POP  PSW              RESTORE PSW:CY
0717 3E 00       MVI  A,0              A[0..1] = VAL2 = 0
0719 15          DCR  D                D = V2DGTS = V2DGTS-1
071A F8          RM                    IF V2DGTS .GE. 0
071B CD 35 0F    CALL GETNIB             GETNIB(VAL2    ,ZROFLG,V2[J])
               ;                                (A[0..1],PSW:Z , @B  )
               ;                                ( O     , O    , I   )
071E 05          DCR  B                  B = OFFSET, V2[J=J-1]
               ;                       ENDIF
071F C9          RET                   RETURN
               ;DECERR()
               ;
               ;PSW DESTROYED
               ;ALL REGISTERS DESTROYED
               ;
               ;ERROR ROUTINE CALLED BY DECADD AND DECSUB
               ;
               DECERR;                 ****ENTRY POINT
0720 3E 02       MVI  A,SFTWRE         A = SFTWRE
0722 CD 80 08    CALL FATERR           ENTER FATAL MODE. SOFTWARE ERROR
0725 CD 68 10    CALL NVMCHG           SAVE NONVOLATILE MEMORY
0728 C3 B6 01    JMP  PWRDN            FREEZE UNTIL NEXT POWER UP
               ;DECSUB(V1[V1DIGS-1],V2[V2DGTS-1],V1DGTS,V2DGTS)
               ;      (NIBSTR      ,NIBSTR      ,BYTE  ,BYTE  )
               ;      ( I/O        , I          , I    , I    )
               ;      ( @C         , @B         , E    , D    )
               ;      ( C          , NC         , C    , C    )
               ;
               ;PSW DESTROYED
               ;REGISTERS DESTROYED
               ;
               ;BCD SUBTRACTION OF UNSIGNED BCD VALUE STRINGS
               ;V1[0..V1DGTS-1] = V1[0..V1DGTS-1] - V2[0..V2DGTS-1]
               ;WHERE V1DGTS .GE. V2DGTS
               ;
               DECSUB;                 ****ENTRY POINT
               ;                       C = OFFSET, V1[I=V1DGTS-1]
               ;                       B = OFFSET, V2[J=V2DGTS-1]
072B 7B          MOV  A,E              IF V1DGTS .LT. V2DGTS
072C BA          CMP  D
072D DA 20 07    JC   DECERR             DECLARE BAD ARGUEMENT
               ;                         ENTER FATAL ERROR MODE
               ;                       ENDIF
```

```
0730 AF          XRA  A              PSW:CY = BORROW = FALSE
                DECSU1;              DO WHILE V1DGTS .GE. 0
0731 1D          DCR  E                E = V1DGTS = V1DGTS-1
0732 F8          RM
0733 CD 0C 07    CALL DECCOM           DECCOM(V1[I],V2[J],V1DGTS,V2DGTS,
                ;                              ( @C  , @B  , E    , D    ,
                ;                              ( I   , I/O , -    , I/O  ,
                ;
                ;                              VAL1,VAL2)
                ;                               L   , A  )
                ;                               0   , 0  )
                ;                      L[0..1] = VAL1 = HEX90 .OR. V1[I]
                ;                      A[0..1] = VAL2 = V2[J]
                ;                      B = OFFSET, V2[J=J-1]
                ;                      D = V2DGTS = V2DGTS-1
0736 CE F6       ACI  -10              A[1] = VAL1-VAL2-BORROW
0738 2F          CMA
0739 3C          INR  A
073A 85          ADD  L
073B 27          DAA
073C 3F          CMC                   PSW:CY = BORROW
073D CD EE 0F    CALL PUTNIB           PUTNIB(V1[I],VAL1)
                ;                              ( @C   , A   )
                ;                              ( 0    , I   )
0740 0D          DCR  C                C = OFFSET, V1[I=I-1]
0741 C3 31 07    JMP  DECSU1
                ;                    ENDDO
                ;                    RETURN
                ;DOACCT()(POSREG,ASCCRC,ASCREG,DSCCRC,DSCREG,PCEREG,WORK1 )
                ;         (NIBSTR,BYTE  ,NIBSTR,BYTE  ,NIBSTR,NIBSTR,NIBSTR)
                ;         ( I    , 0    , I/O  , 0    , I/O  , I/O  , 0     )
                ;         ( RAM  , RAM  , RAM  , RAM  , RAM  , RAM  , RAM   )
                ;         ( NC   , C    , C    , C    , C    , C    , C     )
                ;
                ;PSW DESTROYED
                ;REGISTERS DESTROYED
                ;
                ;DO ACCOUNTING FOR METER TRIP
                ;
                DOACCT;              ****ENTRY POINT
                ;                    ADD POSTAGE TO ASCENDING REGISTER
0744 11 08 04    LXI  D,NBANKS*100H+ASCSIZ
                ;                    D = NBANKS
                ;                    E = ASCSIZ
0747 01 3F 45    LXI  B,(POSREG+NBANKS-1)*100H+(ASCREG+ASCSIZ-1)
                ;                    B = OFFSET, POSREG[I=NBANKS-1]
                ;                    C = OFFSET, ASCREG[J=ASCSIZ-1]
074A CD F8 06    CALL DECADD         DECADD(ASCREG[J],POSREG[I],
                ;                           ( @C       , @B       ,
                ;                           ( I/O      , I        ,
                ;
                ;                           ASCSIZ,NBANKS)
                ;                             E    , D    )
                ;                             I    , I    )
                ;                    COMPUTE CRC FOR ASCENDING REGISTER
074D 01 38 08    LXI  B,ASCSIZ*100H+ASCREG
                ;                    B = ASCSIZ
                ;                    C = OFFSET, ASCREG
0750 CD B1 0E    CALL CRC            CRC(ASCREG,ASCSIZ,CRCVAL)
                ;                       ( @C   , B    , D    )
                ;                       ( I    , I    , 0    )
0753 7A          MOV  A,D            ASCCRC = CRCVAL
0754 32 20 74    STA  ASCCRC/2+X
                ;                    SUBTRACT POSTAGE FROM DESCENDING REG
0757 11 07 04    LXI  D,NBANKS*100H+DSCSIZ
                ;                    D = NBANKS
                ;                    E = DSCSIZ
075A 01 35 45    LXI  B,(POSREG+NBANKS-1)*100H+(DSCREG+DSCSIZ-1)
                ;                    B = OFFSET, POSREG[I=NBANKS-1]
```

```
                 ;                         C = OFFSET, DSCREG[J=DSCSIZ-1]
075D CD 2B 07     CALL DECSUB              DECSUB(DESCREG[J],POSREG[I],
                 ;                                ( @C       , @B      ,
                 ;                                ( I/O      , I       ,
                 ;
                 ;                                DSCSIZ,NBANKS)
                 ;                                 E    , D    )
                 ;                                 I    , I    )
                 ;                         COMPUTE CRC FOR DESCENDING REGISTER
0760 01 2F 07     LXI  B,DSCSIZ*100H+DSCREG
                 ;                         B = DSCSIZ
                 ;                         C = OFFSET,DSCREG
0763 CD B1 0E     CALL CRC                 CRC(DSCREG,DSCSIZ,CRCVAL)
                 ;                            ( @C   , B    , D    )
                 ;                            ( I    , I    , O    )
0766 7A           MOV  A,D                 DSCCRC = CRCVAL
0767 32 1B 74     STA  DSCCRC/2+X
                 ;                         INCREMENT THE PIECE COUNT
076A 3E 10        MVI  A,10H               WORK1[0] = 1
076C 32 60 74     STA  WORK1/2+X
076F 11 07 01     LXI  D,1*100H+PCESIZ
                 ;                         D = ONESIZ = 1
                 ;                         E = PCESIZ
0772 01 2E C0     LXI  B,(WORK1+1-1)*100H+(PCEREG+PCESIZ-1)
                 ;                         B = OFFSET, WORK1[I=ONESIZ-1]
                 ;                         C = OFFSET, PCEREG[J=PCESIZ-1]
0775 C3 F8 06     JMP  DECADD              DECADD(PCEREG[J],WORK1[I],
                 ;                                ( @C      , @B      ,
                 ;                                ( I/O     , I       ,
                 ;
                 ;                                PCESIZ,ONESIZ)
                 ;                                 E    , D    )
                 ;                                 I    , I    )
                 ;                         RETURN
                 ;DOSTAT()(MRSTS1,MRSTS2,NORFLG)
                 ;         (BITSTR,BITSTR,BITSTR)
                 ;         ( I    , I/O  , I/O   )
                 ;         ( RAM  , RAM  , RAM   )
                 ;         ( NC   , C    , C     )
                 ;
                 ;REGISTERS DESTROYED
                 ;PSW DESTROYED
                 ;
                 ;UPDATE METER STATUS TO AGREE WITH SWITCHES AND SENSORS
                 ;
                 DOSTAT;                   ****ENTRY POINT
                 ;                         FETCH PRESENT SWITCH VALUES
0778 CD 31 0C     CALL REDSTS              REDSTS(TRPSW,PRVSW)
                 ;                                ( B    , A    )
                 ;                                ( O    , O    )
077B E6 01        ANI  1                   C = PRVSW = PRVSW .AND. HEX01
077D 4F           MOV  C,A
077E 78           MOV  A,B                 B = TRPSW = TRPSW .AND. HEX08
077F E6 08        ANI  8
0781 47           MOV  B,A
0782 81           ADD  C                   C = NEWSWS = PRVSW + TRPSW
0783 4F           MOV  C,A
0784 21 25 74     LXI  H,MRSTS2/2+X        HL = ADDRESS, MRSTS2
                 ;                         SAVE ENTRY STATUS
0787 7E           MOV  A,M                 A = MRSTS2
0788 57           MOV  D,A                 D = OLDST2 = MRSTS2
                 ;                         UPDATE STATUS
                 ;                         MRSTS2.TRPSW = TRPSW
                 ;                         MRSTS2.PRVMOD = PRVSW
0789 E6 F6        ANI  0F6H                MRSTS2 = MRSTS2.AND.HEXF6.OR.NEWSWS
078B B1           ORA  C
078C 77           MOV  M,A
                 ;                         CHECK METER STATUS
```

```
0780 CD 4E 0F   CALL LSTATE       LSTATE(FATMOD,NORMOD,SERMOD,PRVMOD)
              ;                          (PSW:S ,PSW:Z ,PSW:P ,PSW:CY)
              ;                          ( 0    , 0    , 0    , 0     )
0790 F8         RM                IF FATMOD .EQ. FALSE
              ;                     READ CYCLE SWITCH
0791 CD AF 0B   CALL RDCYC          RDCYC(INCYC,INCYC,ADRESS,MRSTS1)
              ;                           ( A    ,PSW:C, HL    , @HL  )
              ;                           ( 0    , 0   , 0     , -    )
0794 3E 04      MVI  A,BADCYC       A = BADCYC
              ;                     IF INCYC .EQ. TRUE
              ;                       CYCLE SWITCH SAYS METER NOT HOME
              ;                       DECLARE DEAD METER, BAD SWITCH
0796 DA 85 10   JC   NVMDED           NVMDED(BADCYC,ERRFLG)
              ;                              ( A    ,PSW:Z )
              ;                              ( I    , 0    )
              ;                     ELSE
              ;                       CALC SEQ SWITCH CLOSURE VALUE
0799 7A         MOV  A,D
079A A0         ANA  B
079B A8         XRA  B
079C 4F         MOV  C,A                C = CLOSUR = OLDST2.TRPSW .AND.
                                                     TRPSW .XOR. TRPSW
              ;                       DEFINE TRIP REQUEST VALUE
              ;
079D 7E         MOV  A,M                A=TRPREQ=MRSTS1.ENABLD.AND.CLOSUR
079E 17         RAL
079F A1         ANA  C
              ;                       UPDATE TRIP REQUEST STATUS
              ;                       NORFLG.TRPREQ = TRPREQ
07A0 23         INX  H                HL = ADDRESS, NORFLG
07A1 23         INX  H
07A2 B6         ORA  M                NORFLG = TRPREQ .OR. NORFLG
07A3 77         MOV  M,A
              ;                     ENDIF
              ;                   ENDIF
07A4 C9         RET               RETURN
              ;DOTRIP()(MRSTS1,NORFLG,PORTA )
              ;         (BITSTR,BITSTR,BITSTR)
              ;         ( 0    , 0    , 0    )
              ;         ( RAM  , RAM  , 7001 )
              ;         ( C    , C    , C    )
              ;
              ;REGISTERS DESTROYED
              ;PSW DESTROYED
              ;
              ;TRIP METER
              ;
              DOTRIP;             ****ENTRY POINT
07A5 CD DE 0E   CALL DBLANK       TURN OFF DISPLAY
              ;                   CHECK CYCLE SWITCH WHILE METER HOME
07A8 CD AF 0B   CALL RDCYC        RDCYC(INCYC,INCYC,ADRESS,MRSTS1)
              ;                        ( A    ,PSW:C, HL    , @HL  )
              ;                        ( 0    , 0   , 0     , -    )
07AB 3E 04      MVI  A,BADCYC     A = BADCYC
              ;                   IF INCYC .EQ. TRUE
              ;                     CYCLE SWITCH SAYS METER NOT HOME
              ;                     DECLARE DEAD METER, BAD SWITCH
07AD DA 85 10   JC   NVMDED         NVMDED(BADCYC,ERRFLG)
              ;                            ( A    ,PSW:Z )
              ;                            ( I    , 0    )
              ;                   ELSE
              ;                     CYCLE SWITCH SAYS METER IS HOME
              ;                     INDICATE TRIP HAS STARTED
07B0 7E         MOV  A,M            A = MRSTS1
07B1 F6 81      ORI  81H            MRSTS1.UNKSEL = TRUE
              ;                     MRSTS1.QUEREG = TRUE
07B3 77         MOV  M,A
07B4 23         INX  H              HL = ADDRESS, NORFLG
07B5 23         INX  H
07B6 7E         MOV  A,M            NORFLG.TRPREQ = FALSE
```

```
07B7 E6 F7      ANI  0F7H
07B9 F6 40      ORI  40H          NORFLG.QUEPOS = TRUE
07BB 77         MOV  M,A
               ;                  TRIP METER
07BC CD 7C 18   CALL MVTRIP       MVTRIP(ERROR)
               ;                        ( A    )
               ;                        ( 0    )
07BF B7         ORA  A            IF ERROR .NE. 0
               ;                    DECLARE TRIP ERROR
07C0 C2 80 08   JNZ  FATERR         FATERR(ERROR,ERRFLG)
               ;                          ( A    ,PSW:Z )
               ;                          ( I    , 0    )
               ;                  ELSE
               ;                    TRIP STARTED OK
               ;                    START AC MOTOR TO CONTINUE CYCLE
07C3 21 01 70   LXI  H,PORTA        HL = ADDRESS, PORTA
07C6 7E         MOV  A,M            PORTA = PORTA .AND. HEXEF
07C7 E6 EF      ANI  0EFH
07C9 77         MOV  M,A
07CA F3         DI                  DISABLE INTERRUPT
07CB CD 44 07   CALL DOACCT         ACCOUNT FOR TRIP
               ;                    PREVENT DOUBLE ACCOUNTING
07CE 21 24 74   LXI  H,MRSTS1/2+X   HL = ADDRESS, MRSTS1
07D1 7E         MOV  A,M            MRSTS1.INCYC = TRUE
07D2 F6 02      ORI  2
07D4 77         MOV  M,A
07D5 FB         EI                  ENABLE INTERRUPT
               ;                    CHECK CYCLE SWITCH WHILE NOT HOME
07D6 01 B8 0B   LXI  B,3000         BC = N = 3000 ;FOR 300 MSEC LOOP
               DOTR01;              LOOP
07D9 CD AF 0B   CALL RDCYC            RDCYC(INCYC,INCYC,ADRESS,MRSTS1)
               ;                           ( A    ,PSW:C, HL    , @HL  )
               ;                           ( 0    , 0   , 0     , -    )
               ;                      IF INCYC .EQ. TRUE
07DC DA ED 07   JC   DOTR02             BREAK
               ;                      ENDIF
07DF CD 19 0B   CALL NPAUSE           NPAUSE(N   ,ZROFLG)
               ;                            (BC ,PSW:Z )
               ;                            (I/O, 0    )
07E2 C2 D9 07   JNZ  DOTR01           IF N .EQ. 0
               ;                        TIMEOUT
               ;                        CYC SWT SAYS MOTOR STILL HOME
               ;                        FATAL ERROR, NOT IN CYCLE
07E5 3E 18      MVI  A,NINCYC           A = NINCYC
07E7 CD 80 08   CALL FATERR             FATERR(NINCYC,ERRFLG)
               ;                              ( A    ,PSW:Z )
               ;                              ( I    , 0    )
07EA C3 A0 08   JMP  FINTRP             TRY TO DRIVE METER HOME
               ;                        RETURN
               ;                      ENDIF
               DOTR02;              ENDLOOP
               ;                    CYCLE SWITCH SAYS CYCLE STARTED
               ;                    MOVE FROM TRIP TO LOCK
07ED CD 96 18   CALL MVLOCK         MVLOCK(ERROR)
               ;                          ( A    )
               ;                          ( 0    )
07F0 B7         ORA  A              IF ERROR .NE. 0
               ;                      DECLARE LOCK ERROR
07F1 C4 80 08   CNZ  FATERR           FATERR(ERROR,ERRFLG)
               ;                            ( A    ,PSW:Z )
               ;                            ( I    , 0    )
               ;                    ENDIF
               ;                    CHECK CYCLE SWITCH WHEN HOME AGAIN
07F4 01 10 27   LXI  B,10000        BC = N = 10000 ;FOR 1 SEC LOOP
               DOTR03;              LOOP
07F7 CD AF 0B   CALL RDCYC            RDCYC(INCYC,INCYC,ADRESS,MRSTS1)
               ;                           ( A    ,PSW:C, HL    , @HL  )
               ;                           ( 0    , 0   , 0     , -    )
```

```
                      ;                         IF INCYC .EQ. FALSE
                      ;                           BREAK
                      ;                         ENDIF
07FA D2 0D 08          JNC  DOTR04
07FD CD 19 0B          CALL NPAUSE              NPAUSE(N  ,ZROFLG)
                      ;                                (BC ,PSW:Z )
                      ;                                (I/O, 0    )
0800 C2 F7 07          JNZ  DOTR03              IF N .EQ. 0
                      ;                           TIMEOUT
                      ;                           CYC SWT SAYS MOTOR NOT HOME
0803 E5                PUSH H                     SAVE HL
0804 CD D0 08          CALL FINTR4                FATAL ERROR, SLOW TRIP
0807 E1                POP  H                     RESTORE HL
0808 3E FB             MVI  A,0FBH                A = MASK, WILL SET:
                      ;                           MRSTS1.ENABLD = FALSE
080A C3 0F 08          JMP  DOTR05                DISABLE METER
                      ; >>JUMP AHEAD<<            STOP AC MOTOR
                      ;                           RETURN
                      ;                         ENDIF
                      DOTR04;                 ENDLOOP
                      ;                       CYCLE SWITCH SAYS METER CAME HOME
                      ;                       INDICATE TRIP COMPLETION
080D 3E 7B             MVI  A,7BH             A = MASK, WILL SET:
                      ;                       MRSTS1.ENABLD = FALSE
                      ;                       MRSTS1.UNKSEL = FALSE
                      DOTR05;                 >>TARGET OF JUMP AHEAD<<
                      ;                       UPDATE MRSTS1 ACCORDING TO MASK
080F A6                ANA  M                 MRSTS1 = MASK .AND. MRSTS1
0810 77                MOV  M,A
                      DOTR06;                 ****ALTERNATE ENTRY POINT
                      ;                       STOP AC MOTOR
0811 21 01 70          LXI  H,PORTA           HL = ADDRESS, PORTA
0814 7E                MOV  A,M               PORTA = PORTA .OR. HEX10
0815 F6 10             ORI  10H
0817 77                MOV  M,A
                      ;                     ENDIF
                      ;                   ENDIF
0818 C9                RET                RETURN
                      ;ENDENT(ERRFLG)(NORFLG)
                      ;      (BIT   )(BITSTR)
                      ;      ( 0    )( I    )
                      ;      (PSW:Z )( RAM  )
                      ;      ( C    )( NC   )
                      ;
                      ;PSW DESTROYED
                      ;REGISTERS DESTROYED
                      ;
                      ;PROCESS END OF ENTRY HEADER
                      ;
                      ENDENT;               ****ENTRY POINT
0819 3A 26 74          LDA  NORFLG/2+X      IF(NORFLG.CMBIN .AND.
                      ;                        NORFLG.AMTIN) .NE. TRUE
081C 2F                CMA
081D E6 30             ANI  30H
                      ;                       PROCEEDURAL ERROR
081F C2 A1 0B          JNZ  PROERR            PROERR(ERRFLG)
                      ;                              (PSW:Z )
                      ;                              ( 0    ).
                      ;                     ELSE
0822 CD 4E 0F          CALL LSTATE            LSTATE(FATMOD,NORMOD,SERMOD,PRVMOD)
                      ;                              (PSW:S ,PSW:Z ,PSW:P ,PSW:CY)
                      ;                              ( 0    , 0    , 0    , 0    )
                      ;                       IF SERMOD .EQ. TRUE
                      ;                         SERVICE MODE END OF ENTRY
0825 EA 63 0C          JPE  SEREOE              SEREOE(ERRFLG)
                      ;                                (PSW:Z )
                      ;                                ( 0    )
                      ;                       ELSE
                      ;                       IF PRVMOD .EQ. TRUE
                      ;                         MANUAL RESET
```

```
0828 DA E9 09   JC    MANRST              MANRST(ERRFLG)
                ;                                (PSW:Z )
                ;                                ( 0    )
                ;                          ELSE
                ;                            VARIABLE REMOTE RESET
082B C3 BE 13   JMP   VRMRS                  VRMRS(ERRFLG)
                ;                                (PSW:Z )
                ;                                ( 0    )
                ;                          ENDIF
                ;                        ENDIF
                ;ENTAMT/ENTCMB(MSGBUF)(AMTBUF,CMBBUF,NORFLG)
                ;             (NIBSTR)(NIBSTR,NIBSTR,BITSTR)
                ;             ( I    )( 0    , 0    , 0    )
                ;             ( @B   )( RAM  , RAM  , RAM  )
                ;             ( NC   )( C    , C    , C    )
                ;REGISTERS DESTROYED
                ;PSW DESTROYED
                ;
                ;MOVE FIELD, FORMAT AND VALUE
                ;FROM MESSAGE BUFFER TO APPROPRIATE RESET BUFFER
                ;
                ENTAMT;                  ****ENTRY POINT FOR RESET AMOUNT
082E 0E E0        MVI  C,AMTBUF          C = OFFSET, DEST = OFFSET, AMTBUF
                ;                        SET TO SET NORFLG.AMTIN = TRUE
0830 3E 10        MVI  A,10H             A = MASK = HEX10
0832 C3 39 08     JMP  ENTCM1
                ; >>JUMP AHEAD<<
                ENTCMB;                  ****ENTRY POINT FOR RESET COMBINATION
0835 0E F0        MVI  C,CMBBUF          C = OFFSET, DEST = OFFSET, CMBBUF
                ;                        SET TO SET NORFLG.CMBIN = TRUE
0837 3E 20        MVI  A,20H             A = MASK = HEX20
                ENTCM1;                  >>TARGET OF JUMP AHEAD<<
0839 21 26 74     LXI  H,NORFLG/2+X      HL = ADDRESS, NORFLG
                ;                        UPDATE FLAG
083C B6           ORA  M                 NORFLG = NORFLG .OR. MASK
083D 77           MOV  M,A
                ;                        FETCH COUNT FROM MESSAGE FORMAT
083E CD 35 0F     CALL GETNIB            GETNIB(CNT,ZERO,MSGBUF)
                ;                              ( A ,PSW:Z, @B  )
                ;                              ( 0 , 0   , I   )
                ;                        INCLUDE LEAD ZERO AND FORMAT IN COUNT
0841 C6 03        ADI  3                 CNT = (CNT+3) .AND. HEXFE
0843 E6 FE        ANI  0FEH
                ;                        MOVE MESSAGE TO DESTINATION BUFFER
0845 C3 B3 0F     JMP  MVLNIB            MVLNIB(DEST,MSGBUF,CNT,PSW)
                ;                              ( @C , @B   , A ,PSW)
                ;                              ( 0  , I    , I , 0 )
                ;                        RETURN
                ;ENTSER()(MRSTS1)
                ;        (BITSTR)
                ;        ( 0    )
                ;        ( RAM  )
                ;        ( C    )
                ;
                ;PSW DESTROYED
                ;REGISTERS DESTROYED
                ;
                ;ENTER SERVICE MODE
                ;
                ENTSER;                  ****ENTRY POINT
0848 21 24 74     LXI  H,MRSTS1/2+X      HL = ADDRESS, MRSTS1
084B 7E           MOV  A,M               MRSTS1.SERMOD = TRUE
084C F6 08        ORI  08H
084E E6 FB        ANI  0FBH              MRSTS1.ENABLD = FALSE
0850 77           MOV  M,A
0851 C9           RET                    RETURN
                ;EXTSER()(MRSTS1,NORFLG)
                ;        (BITSTR,BITSTR)
                ;        ( 0    , 0    )
```

```
                 ;         ( RAM   , RAM   )
                 ;         ( C     , C     )
                 ;
                 ;PSW DESTROYED
                 ;REGISTERS DESTROYED
                 ;
                 ;EXIT SERVICE MODE
                 ;
                 EXTSER;                    ****ENTRY POINT
0852 21 24 74      LXI  H,MRSTS1/2+X  HL = ADDRESS, MRSTS1
0855 7E            MOV  A,M           MRSTS1.SERMOD = FALSE
0856 E6 F7         ANI  0F7H
0858 77            MOV  M,A
0859 23            INX  H             HL = ADDRESS, NORFLG
085A 23            INX  H
085B 7E            MOV  A,M           NORFLG.COMDSB = FALSE
085C E6 FB         ANI  0FBH
085E 77            MOV  M,A
085F C9            RET                 RETURN
                 ;EXTTRP()(KDCTRL,MRSTS1,MTRCHR,SERFLG)
                 ;         (BITSTR,BITSTR,BITSTR,BITSTR)
                 ;         ( I     , I     , I     , I     )
                 ;         ( RAM   , RAM   , RAM   , RAM   )
                 ;         ( NC    , NC    , NC    , NC    )
                 ;
                 ;REGISTERS DESTROYED
                 ;PSW DESTROYED
                 ;
                 ;INITIATE TRIP IN RESPONSE TO EXTERNAL MESSAGE
                 ;
                 EXTTRP;                    ****ENTRY POINT
                 ;                          SET TO REACH PROERR VIA RETURN
0860 21 A1 0B      LXI  H,PROERR
0863 E5            PUSH H
0864 3A 27 74      LDA KDCTRL/2+X     PSW:CY = KDCTRL.KBDDSB
0867 1F            RAR
                                      IF KDCTRL.KBDDSB .EQ. FALSE
                 ;                      KEYBOARD HAS NOT BEEN DISABLED
                 ;                      PROERR(ERRFLG)
0868 D0            RNC                ELSE
                 ;
0869 21 24 74      LXI  H,MRSTS1/2+X  HL = ADDRESS, MRSTS1
086C 7E            MOV  A,M           PSW:Z =DISABL=MRSTS1.ENABLD .EQ. FALSE
086D E6 04         ANI  4
                                      IF DISABL .EQ. TRUE
                 ;                      METER IS DISABLED
                 ;                      PROERR(ERRFLG)
086F C8            RZ
                 ;                    ELSE
0870 2B            DCX  H               HL = ADDRESS, MTRCHR
0871 3A 10 74      LDA  SERFLG/2+X      A.2 = (.NOT. SERFLG.SNOLCK) .OR.
                 ;                            MTRCHR.TRPCTL
0874 17            RAL
0875 2F            CMA
0876 B6            ORA  M
0877 E6 20         ANI  20H             PSW:Z = TRPLCK = A.2 .EQ. FALSE
                 ;                      IF TRPLCK .EQ. TRUE
                 ;                        RESPONSE TO EXT TRIP IS FORBIDDEN
0879 C8            RZ                     PROERR(ERRFLG)
                 ;                      ELSE
                 ;                        EXTERNAL TRIPPING ALLOWED
087A E1            POP  H                 CLEAN UP STACK
087B C3 A5 07      JMP  DOTRIP            TRIP METER
                 ;                      ENDIF
                 ;                    ENDIF
                 ;                    RETURN
```

```
                ;FATERR(CODE,ERRFLG)(MRSTS2,ERRCOD,NORFLG,ERRCNT)
                ;      (BYTE,BIT   )(BITSTR,BYTE  ,BITSTR,NIBSTR)
                ;      ( I  , 0    )( 0     , 0    , 0     , 0    )
                ;      ( A  ,PSW:Z )( RAM   , RAM  , RAM   , RAM  )
                ;      ( C  , C    )( C     , C    , C     , C    )
                ;
                ;PSW DESTROYED
                ;REGISTERS DESTROYED
                ;
                ;PROCESS FATAL ERROR
                ;
                FATINT;              ****ENTRY POINT FROM INTERRUPT VECTOR
                ;                    INDICATE WATCHDOG INTERRUPT OR
                ;                    INCORRECTLY ENABLED TEST INTERRUPT
087E 3E 17        MVI  A,BARF        A = BARF
                FATERR;              ****ENTRY POINT
0880 21 25 74     LXI  H,MRSTS2/2+X  HL = ADDRESS, MRSTS2
0883 46           MOV  B,M           IF MRSTS2.FATMOD .EQ. FALSE
0884 04           INR  B
0885 FA 9E 08     JM   FATE01
0888 32 0A 74     STA  ERRCOD/2+X      ERRCOD = CODE
088B 7E           MOV  A,M             MRSTS2.FATMOD = TRUE
088C F6 80        ORI  80H
088E 77           MOV  M,A
088F 23           INX  H               HL = ADDRESS, NORFLG
0890 7E           MOV  A,M             NORFLG.QUESTS = TRUE
0891 F6 80        ORI  80H
0893 77           MOV  M,A
0894 21 0B 74     LXI  H,ERRCNT/2+X    HL = ADDRESS, ERRCNT
0897 7E           MOV  A,M             ERRCNT[0..1] = ERRCNT[0..1]+1
0898 3C           INR  A
0899 27           DAA
089A 77           MOV  M,A
089B CD 64 04     CALL PERDSP          MAKE ERROR DISPLAY
                FATE01;              ENDIF
089E AF           XRA  A             PSW:Z = ERRFLG = TRUE
089F C9           RET                RETURN
                ;FINTRP()(MRSTS1,PORTA )
                ;        (BITSTR,BITSTR)
                ;        ( 0    , 0    )
                ;        ( RAM  , 7001 )
                ;        ( C    , C    )
                ;
                ;REGISTERS DESTROYED
                ;PSW DESTROYED
                ;
                ;ATTEMPT TO DRIVE METER HOME
                ;
                FINTRP;              ****ENTRY POINT
                ;                    START AC MOTOR
08A0 21 01 70     LXI  H,PORTA       HL = ADDRESS, PORTA
08A3 7E           MOV  A,M           PORTA = PORTA .AND. HEXEF
08A4 E6 EF        ANI  0EFH
08A6 77           MOV  M,A
                ;                    DRIVE METER FOR 0.2 SEC. TO INSURE
                ;                    THAT METER AT START OF TRIP CYCLE IS
                ;                    DRIVEN FAR ENOUGH TO MAKE THE CYCLE
                ;                    SWITCH AGREE WITH THE METER STATE.
08A7 01 D0 07     LXI  B,2000        BC = N = 2000; FOR 0.2 SEC. LOOP
                FINTR1;              DO UNTIL N .EQ. 0
08AA CD 19 0B     CALL NPAUSE          NPAUSE(N  ,ZROFLG)
                ;                            (BC ,PSW:Z )
                ;                            (I/O, 0    )
08AD C2 AA 08     JNZ  FINTR1
                ;                    ENDDO
                ;                    NOW DRIVE METER HOME
08B0 01 40 1F     LXI  B,8000        BC = N = 8000; FOR 0.8 SEC. LOOP
                FINTR2;              LOOP
                ;                      READ CYCLE SWITCH
```

```
08B3 CD AF 0B   CALL RDCYC          RDCYC(INCYC,INCYC,ADRESS,MRSTS1)
                ;                        ( A    ,PSW:C, HL    , @HL  )
                ;                        ( 0    , 0   , 0     , -    )
                ;                   IF INCYC .EQ. FALSE
08B6 D2 BF 08   JNC  FINTR3           BREAK
                ;                   ENDIF
08B9 CD 19 0B   CALL NPAUSE         NPAUSE(N  ,ZROFLG)
                ;                         (BC ,PSW:Z )
                ;                         (I/O, 0    )
08BC C2 B3 08   JNZ  FINTR2         IF N .EQ. 0
                ;                     BREAK
                ;                   ENDIF
                FINTR3;             ENDLOOP
08BF CD 11 08   CALL DOTR06         STOP AC MOTOR
                ;                   READ CYCLE SWITCH
08C2 CD AF 0B   CALL RDCYC          RDCYC(INCYC,INCYC,ADRESS,MRSTS1)
                ;                        ( A    ,PSW:C, HL    , @HL  )
                ;                        ( 0    , 0   , 0     , -    )
08C5 F5         PUSH PSW            SAVE A, PSW
                ;                   COPY INCYC INTO MRSTS1
08C6 E6 82      ANI  82H
08C8 57         MOV  D,A
08C9 7E         MOV  A,M
08CA E6 7D      ANI  7DH
08CC B2         ORA  D
08CD 77         MOV  M,A            MRSTS1.UNKSEL = INCYC
                ;                   MRSTS1.INCYC  = INCYC
08CE F1         POP  PSW            RESTORE A, PSW
08CF D0         RNC                 IF INCYC .EQ. TRUE
                ;                     CYC SWT SAYS METER DIDN'T COME HOME
                FINTR4;               ****ALTERNATE ENTRY POINT
                ;                     FATAL ERROR, SLOW TRIP
08D0 3E 08      MVI  A,TRPTIM         A = TRPTIM
08D2 C3 80 08   JMP  FATERR           FATERR(TRPTIM,ERRFLG)
                ;                            ( A    ,PSW:Z )
                ;                            ( I    , 0    )
                ;                   ENDIF
                ;                   RETURN
                ;HDRONY(HEADER,ERRFLG)(NORFLG,XMTBUF)
                ;      (BYTE  ,BIT   )(BITSTR,NIBSTR)
                ;      ( I    , 0    )( 0    , I    )
                ;      ( A    ,PSW:Z )( RAM  , RAM  )
                ;      ( NC   , C    )( C    , NC   )
                ;
                ;REGISTERS DESTROYED
                ;PSW DESTROYED
                ;
                ;INITIATE PROCESSING  RELATED TO HEADERS WHICH CONSIST
                ;OF A HEADER NOT FOLLOWED BY DATA
                ;
                HDRONY;             ****ENTRY POINT
08D5 B7         ORA  A              PSW:Z = ERRFLG = HEADER .EQ. HEX00
08D6 F5         PUSH PSW            SAVE A, PSW
08D7 21 1F 09   LXI  H,HDR002       SET TO RETURN TO ENDCASE
08DA E5         PUSH H
                ;                   CASE (HEADER)
08DB FE 41      CPI  HENABL           **41: ENABLE METER
08DD CA F3 05   JZ   CMDENB
08E0 FE 42      CPI  HDISAB           **42: DISABLE METER
08E2 CA CD 05   JZ   CMDDSB
08E5 FE 46      CPI  HSETSV           **46: ENTER SERVICE MODE
08E7 CA 48 08   JZ   ENTSER
08EA FE 47      CPI  HCLRSV           **47: EXIT SERVICE MODE
08EC CA 52 08   JZ   EXTSER
08EF FE 4E      CPI  HEXTRP           **4E: EXTERNAL TRIP
08F1 CA 60 08   JZ   EXTTRP
08F4 FE 50      CPI  HREQST           **50: STATUS REQUEST
08F6 C8         RZ                          CONTINUE
08F7 FE 62      CPI  HENAKB           **62: ENABLE KEYBOARD
```

```
08F9 CA 14 0F   JZ    ENAKBD
08FC FE 63      CPI   HDISKB          **63: DISABLE KEYBOARD
08FE CA 02 0F   JZ    DSBKBD
0901 21 1C 09   LXI   H,HDR001        SET TO RETURN TO ALTERNATE ENDCASE
0904 E3         XTHL
0905 FE 40      CPI   HREQAC          **40: ACCESS CODE REQUEST
0907 CA EE 12   JZ    ACCODE                ACCODE(ERRFLG)
               ;                                   (PSW:Z )
               ;                                   ( 0    )
090A FE 43      CPI   HENDEN          **43: END OF ENTRY
090C CA 19 08   JZ    ENDENT                ENDENT(ERRFLG)
               ;                                   (PSW:Z )
               ;                                   ( 0    )
090F FE 51      CPI   HREQPO          **51: SELECTION VALUE REQUEST
0911 CA 48 0C   JZ    SELVAL                SELVAL(ERRFLG)
               ;                                   (PSW:Z )
               ;                                   ( 0    )
0914 FE 5C      CPI   HREQSN          **5C: SERIAL NUMBER REQUEST
0916 CA 8D 06   JZ    DBLH01                DBLH01(TRUE ,ERRFLG)
               ;                                   (PSW:Z,PSW:Z )
               ;                                   ( I    , 0    )
               ;                      **ELSE: DOUBLY DEFINED HEADER
0919 C3 71 06   JMP   DBLHDR                DBLHDR(HEADER,ERRFLG)
               ;                                   ( A    ,PSW:Z )
               ;                                   ( I    , 0    )
               HDR001;                ALTERNATE ENDCASE, SAVES NEW ERRFLG
               ;                      PSW:Z = ERRFLG
091C C1         POP   B               A = HEADER
091D 78         MOV   A,B
091E F5         PUSH  PSW             SAVE A, PSW
               HDR002;               ENDCASE
091F 21 26 74   LXI   H,NORFLG/2+X   HL = ADDRESS, NORFLG
0922 3A 50 74   LDA   XMTBUF/2+X     IF XMTBUF[0..1] .EQ. 0
0925 B7         ORA   A
0926 C2 2D 09   JNZ   HDR003
               ;                       QUE DEFAULT STATUS MESSAGE
0929 7E         MOV   A,M              NORFLG.QUESTS = TRUE
092A F6 80      ORI   80H
092C 77         MOV   M,A
               HDR003;               ENDIF
092D F1         POP   PSW            A = HEADER
092E F5         PUSH  PSW
092F FE 42      CPI   HDISAB         IF HEADER .NE. HDISAB
0931 CA 3F 09   JZ    HDR005
0934 E6 F0      ANI   0F0H             IF (HEADER .AND. HEXF0) .NE. HEX50
0936 FE 50      CPI   50H
0938 CA 3F 09   JZ    HDR004
               ;                          CANCEL ANY RESET IN PROGRESS
093B 7E         MOV   A,M
093C E6 CF      ANI   0CFH
093E 77         MOV   M,A                 NORFLG.CMBIN = FALSE
               ;                          NORFLG.AMTIN = FALSE
               HDR004;                 ENDIF
               HDR005;               ENDIF
093F F1         POP   PSW            A = HEADER
               ;                     PSW:Z = ERRFLG
0940 C9         RET                  RETURN
               ;HDRPLS(HEADER,MSGBUF,ERRFLG)(NORFLG)
               ;      (BYTE  ,NIBSTR,BIT   )(BITSTR)
               ;      ( I    , I    , 0    )( 0    )
               ;      ( A    , @B   ,PSW:Z )( RAM  )
               ;      ( NC   , NC   , C    )( C    )
               ;
               ;REGISTERS DESTROYED
               ;PSW DESTROYED
               ;
               ;INITIATE PROCESSING RELATED TO HEADERS WHICH CONSIST
               ;OF A HEADER ASSOCIATED WITH DATA
               ;
```

```
                  HDRPLS;               ****ENTRY POINT
0941 B7             ORA  A              PSW:Z = ERRFLG = HEADER .EQ. HEX00
0942 F5             PUSH PSW            SAVE A, PSW
0943 21 26 74       LXI  H,NORFLG/2+X   HL = ADDRESS, NORFLG
                  ;                     CHECK FOR INTERRUPTED RESET SEQUENCE
0946 FE C5          CPI  HENTAM         IF HEADER .NE. HENTAM
0948 CA 54 09       JZ   HDRP02
094B FE C6          CPI  HENTCO           IF HEADER .NE. HENTCO
094D CA 54 09       JZ   HDRP01
0950 7E             MOV  A,M
0951 E6 CF          ANI  0CFH
0953 77             MOV  M,A                NORFLG.CMBIN. = FALSE
                  ;                         NORFLG.AMTIN = FALSE
                  HDRP01;                 ENDIF
                  HDRP02;               ENDIF
                  ;                     QUE STATUS MESSAGE
0954 7E             MOV  A,M            NORFLG.QUESTS = TRUE
0955 F6 80          ORI  80H
0957 77             MOV  M,A
0958 F1             POP  PSW            A = HEADER
0959 F5             PUSH PSW
095A 21 7C 09       LXI  H,HDRP04       SET TO RETURN TO ENDCASE
095D E5             PUSH H
                  ;                     CASE (HEADER)
095E FE C5          CPI  HENTAM           **C5: ENTER AMOUNT
0960 CA 2E 08       JZ   ENTAMT                 ENTAMT(MSGBUF)
                  ;                                    ( @B    )
                  ;                                    ( I     )
0963 FE C6          CPI  HENTCO           **C6: ENTER COMBINATION
0965 CA 35 08       JZ   ENTCMB                 ENTCMB(MSGBUF)
                  ;                                    ( @B    )
                  ;                                    ( I     )
0968 21 79 09       LXI  H,HDRP03         SET TO RETURN TO ALTERNATE ENDCASE
096B E3             XTHL
096C FE C0          CPI  HSETMN           **C0: ENTER SERIAL NUMBER
096E CA 38 0A       JZ   MSERNO                 MSERNO(MSGBUF,ERRFLG)
                  ;                                    ( @B    ,PSW:Z )
                  ;                                    ( I     , 0    )
0971 FE C1          CPI  HSETPO           **C1: SET POSTAGE
0973 CA 9F 0C       JZ   SETPOS                 SETPOS(MSGBUF,ERRFLG)
                  ;                                    ( @B    ,PSW:Z )
                  ;                                    ( I     , 0    )
                  ;                       **ELSE: PROCESS ERROR
0976 C3 A1 0B       JMP   PROERR                PROERR(ERRFLG)
                  ;                                    (PSW:Z )
                  ;                                    ( 0    )
                  HDRP03;                 ALTERNATE ENDCASE, SAVES NEW ERRFLG
0979 C1             POP  B                A = HEADER
097A 78             MOV  A,B              PSW:Z = ERRFLG
097B F5             PUSH PSW              SAVE A, PSW
                  HDRP04;               ENDCASE
097C F1             POP  PSW            A = HEADER
                  ;                     PSW:Z = ERRFLG
097D C9             RET                 RETURN
                  ;IDLE()(CTLBKT,KDCTRL,MRSTS1,NORFLG,RECBUF,XMTBUF)
                  ;      (BYTE  ,BITSTR,BITSTR,BITSTR,BYTSTR,BYTSTR)
                  ;      ( I    , I    , I/O  , I    , I    , I     )
                  ;      ( RAM  , RAM  , RAM  , RAM  , RAM  , RAM   )
                  ;      ( NC   , NC   , C    , NC   , NC   , NC    )
                  ;
                  ;MAINLINE IDLE LOOP
                  ;
                  IDLE;                 LOOP
097E FB             EI                    ENABLE INTERRUPTS
                  ;                       SET TO RESTART LOOP
097F 21 7E 09       LXI  H,IDLE           HL = ADDRESS, IDLE
0982 E5             PUSH H                PUSH HL, USED BY RETURN STATEMENTS
                  ;                       UPDATE METER STATUS:
```

```
0983 CD 78 07   CALL DOSTAT          WITH RESPECT TO SWITCHES/SENSORS
0986 CD 23 0B   CALL POSUPD          WITH RESPECT TO POSTAGE SETTING
0989 CD 68 10   CALL NVMCHG          WITH RESPECT TO NONVOLATILE MEMORY
098C 3A 50 74   LDA  XMTBUF/2+X      A = XMTBUF[0]
098F B7         ORA  A               IF XMTBUF[0] .NE. 0
0990 C2 15 0E   JNZ  XMIT              TRANSMIT MESSAGE
               ;                     ELSE
0993 3A 26 74   LDA  NORFLG/2+X      A = NORFLG
0996 4F         MOV  C,A             C = NORFLG
0997 17         RAL                  PSW:CY = NORFLG.QUESTS
               ;                     IF NORFLG.QUESTS .EQ. TRUE
0998 DA F4 0A   JC   MTRSTS            TRANSMIT METER STATUS
               ;                     ELSE
099B 17         RAL                  PSW:CY = NORFLG.QUEPOS
099C D2 A4 09   JNC  IDLE01          IF NORFLG.QUEPOS .EQ. TRUE
               ;                       REQUEST POSTAGE SETTING
099F 3E 51      MVI  A,HREQPO          A = HREQPO
09A1 C3 C7 0D   JMP  XEQHDR            XEQHDR(HREQPO,ERRFLG)
               ;                             ( A    ,PSW:Z )
               ;                             ( I    , 0    )
               IDLE01;
               ;                     ELSE
09A4 CD 4E 0F   CALL LSTATE          LSTATE(FATMOD,NORMOD,SERMOD,PRVMOD)
               ;                          (PSW:S ,PSW:Z ,PSW:P ,PSW:CY)
               ;                          ( 0    , 0    , 0    , 0     )
09A7 C2 D1 09   JNZ  IDLE03          IF NORMOD .EQ. TRUE
09AA 21 24 74   LXI  H,MRSTS1/2+X      HL = ADDRESS, MRSTS1
09AD 7E         MOV  A,M               PSW:CY = MRSTS1.QUEREG
09AE 1F         RAR
09AF D2 D1 09   JNC  IDLE02            IF MRSTS1.QUEREG .EQ. TRUE
               ;                         TRIP HAS COMPLETED NORMALLY
09B2 B7         ORA  A                   MRSTS1.QUEREG = FALSE
09B3 17         RAL
09B4 77         MOV  M,A
09B5 21 2B 74   LXI  H,CTLBKT/2+X        HL = ADDRESS, CTLBKT
09B8 3E 41      MVI  A,41H               PSW:Z = CTLBKT .EQ. HEX41
09BA AE         XRA  M
09BB 3E 52      MVI  A,HREQAR            A = HREQAR
               ;                         IF CTLBKT .EQ. HEX41
               ;                           REQUEST ASCENDING REGISTER
09BD CA C7 0D   JZ   XEQHDR                XEQHDR(HREQAR,ERRFLG)
               ;                                 ( A    ,PSW:Z )
               ;                                 ( I    , 0    )
               ;                         ELSE
09C0 3E 31      MVI  A,31H               PSW:Z = CTLBKT .EQ. HEX31
09C2 AE         XRA  M
09C3 3E 53      MVI  A,HREQDR            A = HREQDR
               ;                         IF CTLBKT .EQ. HEX31
               ;                           REQUEST DESCENDING REGISTER
09C5 CA C7 0D   JZ   XEQHDR                XEQHDR(HREQDR,ERRFLG)
               ;                                 ( A    ,PSW:Z )
               ;                                 ( I    , 0    )
               ;                         ELSE
09C8 3E 21      MVI  A,21H               PSW:Z = CTLBKT .EQ. HEX21
09CA AE         XRA  M
09CB 3E 55      MVI  A,HREQPC            A = HREQPC
               ;                         IF CTLBKT .EQ. HEX21
               ;                           REQUEST PIECE COUNT
09CD CA C7 0D   JZ   XEQHDR                XEQHDR(HREQPC,ERRFLG)
               ;                                 ( A    ,PSW:Z )
               ;                                 ( I    , 0    )
               ;                         ENDIF
09D0 C9         RET
               IDLE02;                 ENDIF
               IDLE03;               ELSE
09D1 3A 48 74   LDA  RECBUF/2+X      A = RECBUF[0]
09D4 B7         ORA  A               IF RECBUF[0] .NE. 0
09D5 C2 EE 09   JNZ  MESAGE            PROCESS MESSAGE
               ;                     ELSE
```

```
09D8 3E 08      MVI  A,08H         PSW:Z = NORFLG.TRPREQ .EQ. FALSE
09DA A1         ANA  C
09DB CA E6 09   JZ   IDLE04         IF NORFLG.TRPREQ .EQ. TRUE
09DE 3A 27 74   LDA  KDCTRL/2+X       PSW:CY = KDCTRL.KBDDSB
09E1 1F         RAR
               ;                      IF KDCTRL.KBDDSB .EQ. FALSE
09E2 D2 A5 07   JNC  DOTRIP             PROCESS TRIP REQUEST
               ;                      ENDIF
09E5 C9         RET
               IDLE04;               ELSE
09E6 C3 2E 03   JMP  KEYBRD           PROCESS KEYBOARD
               ;                     ENDIF
               ;                    ENDLOOP
               ;MANRST
               ;
               ;REGISTERS DESTROYED
               ;PSW DESTROYED
               ;
               ;MANUAL METER RESET
               ;
               MANRST;              ****ENTRY POINT
               ;                    DECLARE SOFTWARE ERROR
09E9 3E 02      MVI  A,SFTWRE       A = SFTWRE
09EB C3 80 08   JMP  FATERR         FATERR(SFTWRE,ERRFLG)
               ;                          ( A    ,PSW:Z )
               ;                          ( I    , 0    )
               ;                    RETURN
               ;MESAGE()(RECBUF,XMTBUF,DBUF  )
               ;        (NIBSTR,NIBSTR,NIBSTR)
               ;        ( I/O  , I    , 0    )
               ;        ( RAM  , RAM  , RAM  )
               ;        ( C    , NC   , C    )
               ;
               ;PSW DESTROYED
               ;REGISTERS DESTROYED
               ;
               ;PROCESS MESSAGE RECEIVED FROM EXTERNAL DEVICE
               ;
               MESAGE;              ****ENTRY POINT
               ;                    REMEMBER IF XMTBUF CLEAR ON ENTRY
09EE 3A 50 74   LDA  XMTBUF/2+X     PSW:Z = XMTCLR = XMTBUF[0..1] .EQ. 0
09F1 B7         ORA  A
09F2 F5         PUSH PSW            SAVE A, PSW
09F3 21 48 74   LXI  H,RECBUF/2+X   HL = ADDRESS, RECBUF[0..1]
               ;                    FETCH MESSAGE SIZE, IN BYTES
09F6 4E         MOV  C,M            C = SIZE = RECBUF[0..1]
               ;                    FLAG MESSAGE AS PROCESSED
09F7 36 00      MVI  M,0            RECBUF[0..1] = 0
09F9 23         INX  H              HL = ADDRESS, RECBUF[2..3]
09FA 0D         DCR  C              C = SIZE-1
09FB C2 1A 0A   JNZ  MESAG3         IF (SIZE-1) .EQ. 0
09FE 7E         MOV  A,M              A = HEADER = RECBUF[2..3]
               ;                      PROCESS MESSAGE WITHOUT DATA
09FF CD D5 08   CALL HDRONY           HDRONY(HEADER,ERRFLG)
               ;                            ( A    ,PSW:Z )
               ;                            ( I    , 0    )
0A02 CA 17 0A   JZ   MESAG2           IF ERRFLG .EQ. FALSE
0A05 FE 51      CPI  HREQPO             IF HEADER .EQ. HREQPO
0A07 C2 17 0A   JNZ  MESAG1
               ;                          REVERT TO SETTING DISPLAY
0A0A 01 80 A2   LXI  B,(XMTBUF+2)*100H+DBUF+0
               ;                          B = OFFSET, XMTBUF[2]
               ;                          C = OFFSET, DBUF[0]
0A0D 3A 50 74   LDA  XMTBUF/2+X           A = NIBCNT = XMTBUF[0..1]*2
0A10 87         ADD  A
0A11 CD B3 0F   CALL MVLNIB               MVLNIB(DBUF[0],XMTBUF[2],NIBCNT,
               ;                                ( @C     , @B      , A    ,
               ;                                ( 0      , I       , I    ,
               ;
```

```
                  ;                              NONBCD,ZERO )
                  ;                              PSW:S ,PSW:Z)
                  ;                               0    , 0   )
0A14 CD 5A 05      CALL VALDSP              DISPLAY CONTENTS OF DBUF
                  MESAG1;                   ENDIF
                  MESAG2;                 ENDIF
0A17 C3 31 0A      JMP  MESAG6
                  MESAG3;               ELSE
                  ;                       CHECK FORMAT AGAINST MESSAGE SIZE
0A1A 06 94         MVI  B,RECBUF+4        B = OFFSET, RECBUF[4]
0A1C CD 35 0F      CALL GETNIB            GETNIB(NIBCNT,ZERO ,RECBUF[4])
                  ;                              ( A    ,PSW:Z, @B      )
                  ;                              ( 0    , 0   , I       )
0A1F 3C            INR  A                 A = BYTCNT = (NIBCNT+1)/2
0A20 B7            ORA  A
0A21 1F            RAR
0A22 0D            DCR  C                 C = SIZE-2
0A23 B9            CMP  C                 IF BYTCNT .EQ. (SIZE-2)
0A24 C2 2E 0A      JNZ  MESAG4
                  ;                         PROCESS MESSAGE WITH DATA
0A27 7E            MOV  A,M                 A = HEADER = RECBUF[2..3]
0A28 CD 41 09      CALL HDRPLS              HDRPLS(HEADER,RECBUF[4],ERRFLG)
                  ;                                ( A    , @B     ,PSW:Z )
                  ;                                ( I    , I      , 0    )
0A2B C3 31 0A      JMP  MESAG5
                  MESAG4;                 ELSE
                  ;                         BAD MESSAGE, PROCEEDURAL ERROR
0A2E CD A1 0B      CALL PROERR              PROERR(ERRFLG)
                  ;                                (PSW:Z )
                  ;                                ( 0    )
                  MESAG5;                 ENDIF
                  MESAG6;               ENDIF
                  ;                     CHECK FOR OVERLAY OF TRANSMIT BUFFER
0A31 F1            POP  PSW             PSW:Z = XMTCLR
0A32 3E 12         MVI  A,BUFOVR        A = BUFOVR
                  ;                     IF XMTCLR .EQ. FALSE
                  ;                       BUFFER OVERLAY, FATAL ERROR
0A34 C4 80 08      CNZ  FATERR            FATERR(BUFOVR,ERRFLG)
                  ;                              ( A    ,PSW:Z )
                  ;                              ( I    , 0    )
                  ;                     ENDIF
0A37 C9            RET                  RETURN
                  ;MSERNO(MSGBUF,ERRFLG)(ASCCRC,ASCREG,CTLCRC,DSCCRC,DSCREG,
                  ;      (NIBSTR,BIT   )(BYTE  ,NIBSTR,BYTE  ,BYTE  ,NIBSTR,
                  ;      ( I    , 0    )( 0    , 0    , 0    , 0    , 0    ,
                  ;      ( @B   ,PSW:Z )( RAM  , RAM  , RAM  , RAM  , RAM  ,
                  ;      ( NC   , C    )( C    , C    , C    , C    , C    ,
                  ;
                  ;      ERRCNT,ERRCOD,PCEREG,SERFLG,SERNUM)
                  ;      NIBSTR,BYTE  ,NIBSTR,BITSTR,NIBSTR)
                  ;       0    , 0    , 0    , I/O  , I/O  )
                  ;       RAM  , RAM  , RAM  , RAM  , RAM  )
                  ;       C    , C    , C    , C    , C    )
                  ;
                  ;PSW DESTROYED
                  ;REGISTERS DESTROYED
                  ;
                  ;REDEFINE UNLOCKED SERIAL NUMBER OR
                  ;LOCK SERIAL NUMBER TO PREVENT FURTHER REDEFINITION
                  ;
                  MSERNO;               ****ENTRY POINT
                  ;                     SET TO REACH PROERR VIA RETURN
0A38 21 A1 0B      LXI  H,PROERR
0A3B E5            PUSH H
                  ;                     CONVERT OFFSET INTO ADDRESS
0A3C 16 74         MVI  D,X/100H        DE = ADDRESS, MSGBUF[0..1]
0A3E AF            XRA  A
0A3F 78            MOV  A,B
0A40 1F            RAR
```

```
0A41 5F          MOV  E,A
                ;                    ADJUST OFFSET
0A42 04          INR  B              B = OFFSET, MSGBUF[3]
0A43 04          INR  B
0A44 04          INR  B
                ;                    CHECK FOR VARIOUS ERROR CONDITIONS
0A45 CD 4E 0F    CALL LSTATE         LSTATE(FATMOD,NORMOD,SERMOD,PRVMOD)
                ;                          (PSW:S ,PSW:Z ,PSW:P ,PSW:CY)
                ;                          ( 0    , 0    , 0    , 0     )
                ;                    IF FATMOD .EQ. TRUE
                ;                      METER HAS FATALED
0A48 F8          RM                    PROERR(ERRFLG)
                ;                      RETURN
                ;                    ELSE
                ;                    IF SERMOD .EQ. FALSE
                ;                      METER NOT IN SERVICE MODE
0A49 E0          RPO                   PROERR(ERRFLG)
                ;                      RETURN
                ;                    ELSE
0A4A 3A 10 74    LDA  SERFLG/2+X     PSW:Z = OPEN = SERFLG.SNOLCK .EQ. TRUE
0A4D E6 10       ANI  10H
                ;                    IF OPEN .EQ. FALSE
                ;                      METER NUMBER ALREADY LOCKED
0A4F C0          RNZ                   PROERR(ERRFLG)
                ;                      RETURN
                ;                    ELSE
0A50 1A          LDAX D              PSW:Z = FMTOK = MSGBUF[0..1].EQ.HEX8F
0A51 FE 8F       CPI  8FH
                ;                    IF FMTOK .EQ. FALSE
                ;                      NOT 8 CHARACTERS WITHOUT DECIMAL
0A53 C0          RNZ                   PROERR(ERRFLG)
                ;                      RETURN
                ;                    ELSE
0A54 13          INX  D              DE = ADDRESS, MSGBUF[2..3]
0A55 1A          LDAX D              A = MSGBUF[2..3]
0A56 FE 20       CPI  20H            PSW:CY = CODEOK = MSGBUF[2..3].LT.HEX20
                ;                    IF CODEOK .EQ. FALSE
                ;                      CODE IS NOT 0 OR 1
0A58 D0          RNC                   PROERR(ERRFLG)
                ;                      RETURN
                ;                    ENDIF
                ;                    PROCESS ACCORDING TO CODE IN MSGBUF[2]
0A59 FE 10       CPI  10H            PSW:CY = CODE0 = MSGBUF[2..3].LT.HEX10
0A5B 3E 07       MVI  A,7            A = NIBCNT = 7
0A5D D2 6D 0A    JNC MSERN1          IF CODE0 .EQ. TRUE
                ;                      SERIAL NUMBER IS BEING ENTERED
                ;                      CHECK INPUT DATA
0A60 48          MOV  C,B              C = OFFSET, MSGBUF[3]
0A61 CD B3 0F    CALL MVLNIB           MVLNIB(MSGBUF[3],MSGBUF[3],NIBCNT,
                ;                            ( @C        , @B        , A     ,
                ;                            ( 0         , I         , I     ,
                ;
                ;                            NONBCD,ZROFLG)
                ;                            PSW:S ,PSW:Z )
                ;                             0    , 0    )
                ;                      IF NONBCD .EQ. TRUE
                ;                        BAD INPUT
0A64 F8          RM                      PROERR(ERRFLG)
                ;                      ELSE
                ;                        STORE NEW SERIAL NUMBER
0A65 0E 21       MVI  C,SERNUM           C = OFFSET, SERNUM
0A67 CD B3 0F    CALL MVLNIB             MVLNIB(SERNUM[0],MSGBUF[3],NIBCNT,
                ;                              ( @C        , @B        , A     ,
                ;                              ( 0         , I         , I     ,
                ;
                ;                              NONBCD,ZROFLG)
                ;                              PSW:S ,PSW:Z )
                ;                               0    , 0    )
                ;
0A6A E1          POP  H
```

```
0A6B 0C          INR  C              PSW:Z = ERRFLG = (C+1).EQ.0 = FALSE
0A6C C9          RET
                MSERN1;            ELSE
                 ;                   SERIAL NUMBER IS BEING LOCKED
                 ;                   CHECK INPUT DATA
0A6D 50          MOV  D,B            D = OFFSET, MSGBUF[3]
0A6E 1E 21       MVI  E,SERNUM       E = OFFSET, SERNUM[0]
0A70 CD 8E 0E    CALL CMPARE         CMPARE(MSGBUF[3],SERNUM[0],NIBCNT,
                 ;                          ( @D      , @E      , A    ,
                 ;                          ( I       , I       , I    ,
                 ;
                 ;                          NEGFLG,ZROFLG)
                 ;                          PSW:S ,PSW:Z )
                 ;                           0    , 0    )
                 ;                   IF ZROFLG .EQ. FALSE
                 ;                     INPUT DOESN'T MATCH SERIAL NUMBER
0A73 C0          RNZ                   PROERR(ERRFLG)
                 ;                   ELSE
0A74 CD 9E 12    CALL NVMWR            WRITE NEW ACTIVE SERVICE BLOCK
                 ;                     NO BLOCK IS NOW OPEN
                 ;                     LOCK SERIAL NUMBER
0A77 21 10 74    LXI  H,SERFLG/2+X     HL = ADDRESS, SERFLG
0A7A 7E          MOV  A,M              SERFLG.SNOLCK = TRUE
0A7B F6 10       ORI  10H
0A7D 77          MOV  M,A
                 ;                     UPDATE DATA FOR NORMAL BLOCK
                 ;                     CLEAR PIECE COUNT REGISTER
                 ;                     CLEAR ASCENDING REGISTER
                 ;                     CLEAR DESCENDING REGISTER
0A7E AF          XRA A                 A = NULL = 0
0A7F 01 28 1A    LXI  B,(4+PCESIZ+DSCSIZ+ASCSIZ)*100H+PCEREG
                 ;                     B = NIBCNT = 4+PCESIZ+DSCSIZ+ASCSIZ
                 ;                     C = OFFSET, PCEREG
0A82 CD 24 0F    CALL FILNIB           FILNIB(PCEREG,NULL,NIBCNT)
                 ;                            ( @C   , A  , B    )
                 ;                            ( 0    , I  , I    )
                 ;                     CLEAR ERROR CODE
0A85 32 0A 74    STA  ERRCOD/2+X       ERRCOD = 0
                 ;                     CLEAR ERROR COUNT
0A88 32 0B 74    STA  ERRCNT/2+X       ERRCNT = 0
                 ;                     STORE NEW CONTROL SUM CRC
0A8B CD 4E 06    CALL CTLSUM           CTLSUM(CSMCRC,ERRFLG)
                 ;                            ( D    ,PSW:Z )
                 ;                            ( 0    , 0    )
0A8E 7A          MOV  A,D              CTLCRC = CSMCRC
0A8F 32 08 74    STA  CTLCRC/2+X
                 ;                     STORE NEW ASCENDING REGISTER CRC
0A92 01 38 08    LXI  B,ASCSIZ*100H+ASCREG
                 ;                     B = NIBCNT = ASCSIZ
                 ;                     C = OFFSET, ASCREG
0A95 CD B1 0E    CALL CRC              CRC(ASCREG,NIBCNT,CRCVAL)
                 ;                        ( @C    , B     , D    )
0A98 7A          MOV  A,D              ASCCRC = CRCVAL
0A99 32 20 74    STA  ASCCRC/2+X
                 ;                     STORE NEW DESCENDING REGISTER CRC
0A9C 01 2F 07    LXI  B,DSCSIZ*100H+DSCREG
                 ;                     B = NIBCNT = DSCSIZ
                 ;                     C = OFFSET, DSCREG
0A9F CD B1 0E    CALL CRC              CRC(DSCREG,NIBCNT,CRCVAL)
                 ;                        ( @C    , B     , D    )
                 ;                        ( I     , I     , 0    )
0AA2 7A          MOV  A,D              DSCCRC = CRCVAL
0AA3 32 1B 74    STA  DSCCRC/2+X
0AA6 E1          POP  H                CLEAN UP STACK
                 ;                     WRITE NORMAL BLOCK AND
                 ;                     OPEN ERASED SERVICE BLOCK
0AA7 C3 19 12    JMP  NVMSTO           NVMSTO(ERRFLG)
                 ;                            (PSW:Z )
                 ;                            ( 0    )
```

```
                    ;
                    ;
                    ;
                    ;MSG2MU(FMTNIB,DSTSIZ,ERRFLG)(WORK1 ,DEFDCM,DIEDCM)
                    ;      (NIBSTR,UBYTE ,BIT   )(NIBSTR,BYTE  ,BYTE  )
                    ;      ( I    , I    , O    )( O     , I    , I    )
                    ;      ( @B   , D    ,PSW:Z )( RAM   , RAM  , RAM  )
                    ;      ( NC   , NC   , C    )( C     , NC   , NC   )
                    ;
                    ;PSW DESTROYED
                    ;REGISTERS DESTROYED
                    ;
                    ;TRANSFORM FORMAT AND DATA IN MESSAGE FORMAT INTO A  METER
                    ;UNIT FORMAT BCD STRING RIGHT JUSTIFIED IN WORK1.
                    ;
                    MSG2MU;               ****ENTRY POINT
                    ;                     CLEAR OUTPUT BLOCK
0AAA 3E C0           MVI  A,WORK1         A = OFFSET, WORK1[J=0]
0AAC CD 85 0E        CALL CLRBLK          CLRBLK(WORK1)
                    ;                            ( @A  )
                    ;                            ( O   )
0AAF 2E 01           MVI  L,1             L = FLAGV = 1; WHICH DECREMENTS TO 0
                    ;                     PRODUCING:
                    ;                     PSW:Z = ERRFLG = TRUE
                    ;                     CALCULATE TOTAL CHARACTER COUNT
                    ;                     INCLUDING POSSIBLE LEADING ZERO
                    ;                     B = OFFSET, FMTNIB[I=0]
0AB1 CD 35 0F        CALL GETNIB          GETNIB(NTOTAL,ZERO ,FMTNIB[I])
                    ;                            ( A    ,PSW:Z, @B      )
                    ;                            ( O    , O   , I       )
0AB4 3C              INR  A               H = NTOTAL = (NTOTAL+1) .AND. HEXFE
0AB5 E6 FE           ANI  0FEH
0AB7 67              MOV  H,A
                    ;                     CALCULATE COUNT OF CHARACTERS TO RIGHT
                    ;                     OF DECIMAL POINT
0AB8 04              INR  B               B = OFFSET, FMTNIB[I=1]
0AB9 CD 35 0F        CALL GETNIB          GETNIB(NFRAC,ZERO ,FMTNIB[I])
                    ;                            ( A    ,PSW:Z, @B      )
                    ;                            ( O    , O   , I       )
                    ;                     CHECK FOR UNSPECIFIED DECIMAL POSITION
0ABC FE 0F           CPI  0FH             IF NFRAC .EQ. HEX0F
0ABE C2 C4 0A        JNZ  MSG2M1
                    ;                       USE DEFAULT DECIMAL POSITION
0AC1 3A 36 74        LDA  DEFDCM/2+X        A = NFRAC = DEFDCM
                    MSG2M1;               ENDIF
                    ;                     CHECK FOR TOO MANY FRACTIONAL DIGITS
0AC4 4F              MOV  C,A             C = NFRAC
0AC5 3A 35 74        LDA  DIEDCM/2+X      A = DIEDCM
0AC8 B9              CMP  C               IF DIEDCM .GE. NFRAC
0AC9 DA F2 0A        JC   MSG2M5
                    ;                       THERE IS ROOM FOR FRACTIONAL DIGITS
                    ;                       CALCULATE INDEX FOR LOW ORDER DIGIT
0ACC 2F              CMA                    A = J = 15-DIEDCM+NFRAC
0ACD C6 10           ADI  16
0ACF 81              ADD  C
                    ;                       CHECK DATA LENGTH AND ALIGNMENT WITH
                    ;                       RESPECT TO WORK AREA
0AD0 BC              CMP  H                 IF DINDEX .GE. NTOTAL
0AD1 DA F2 0A        JC   MSG2M4
                    ;                         DATA FITS IN WORK AREA
                    ;                         MOVE DATA INTO WORK AREA
0AD4 C6 C0           ADI  WORK1               C = OFFSET, WORK1[J]
0AD6 4F              MOV  C,A
0AD7 78              MOV  A,B                 B = OFFSET, FMTNIB[I=NTOTAL+1]
0AD8 84              ADD  H
0AD9 47              MOV  B,A
0ADA 7C              MOV  A,H                 A = NTOTAL
0ADB CD C2 0F        CALL MVRNIB              MVRNIB(WORK1[J],FMTNIB[I],NTOTAL,
                    ;                                ( @C      , @B       , A     ,
```

```
                ;                           ( 0      , I       , I     ,
                ;
                ;
                ;                        NONBCD,ZROFLG)
                ;                        PSW:S ,PSW:Z )
                ;                         0    , 0    )
                ;                        CHECK CHARACTERS MOVED
0ADE FA F2 0A    JM   MSG2M3             IF NONBCD .EQ. FALSE
                ;                          ONLY NUMERIC CHARS WERE MOVED.
                ;                          CHECK DATA LENGTH WITH RESPECT TO
                ;                          DECLARED SIZE OF DESTINATION.
                ;                          SET INDEX TO LEFT OF DECLARED
                ;                          HIGH ORDER DIGIT POSITION.
0AE1 7A          MOV  A,D                  A = I = 15-DSTSIZ
0AE2 2F          CMA
0AE3 C6 10       ADI  16
                ;                          CALCULATE NUMBER OF DIGIT
                ;                          POSITIONS ABOVE HIGH ORDER
                ;                          DIGIT POSITION
0AE5 67          MOV  H,A                  H = NTOTAL = 16-DSTSIZ
0AE6 24          INR  H
                ;                          SCAN POSITIONS ABOVE HIGH ORDER
                ;                          DIGIT POSITION
0AE7 C6 C0       ADI  WORK1                B = OFFSET, WORK1[I]
0AE9 47          MOV  B,A
0AEA 7C          MOV  A,H                  A = NTOTAL
0AEB CD 0F 10    CALL RSCAN                RSCAN(WORK1[I],NTOTAL,
                ;                                ( @B     , A    ,
                ;                                ( I      , I    ,
                ;
                ;                                NONBCD,ZROFLG)
                ;                                PSW:S ,PSW:Z )
                ;                                 0    , 0    )
                ;                          CHECK CHARACTERS SCANNED
0AEE C2 F2 0A    JNZ  MSG2M2               IF ZROFLG .EQ. FALSE
                ;                            DECLARED DATA LENGTH EXCEEDED
0AF1 2C          INR  L                      L = FLAGV = 2; DECREMENTS TO 1
                ;                            PRODUCING:
                ;                            PSW:Z = ERRFLG = FALSE
                MSG2M2;                    ENDIF
                MSG2M3;                  ENDIF
                MSG2M4;                ENDIF
                MSG2M5;              ENDIF
0AF2 2D          DCR  L              PSW:Z = ERRFLG
0AF3 C9          RET                 RETURN
                ;MTRSTS()(XMTBUF,KDCTRL,MRSTS1,MRSTS2,NORFLG)
                ;        (BYTSTR,BITSTR,BITSTR,BITSTR,BITSTR)
                ;        ( 0    , I    , I    , I    , 0    )
                ;        ( RAM  , RAM  , RAM  , RAM  , RAM  )
                ;        ( C    , NC   , NC   , NC   ; C    )
                ;
                ;ALL REGISTERS DESTROYED
                ;PSW DESTROYED
                ;
                ;PUT CURRENT STATUS MESSAGE INTO TRANSMIT BUFFER
                ;
                MTRSTS;              ****ENTRY POINT
0AF4 21 03 80    LXI  H,HSTAT*100H+3
                ;                    L = BYTCNT = 3
                ;                    H = HSTAT
0AF7 22 50 74    SHLD XMTBUF/2+X+0   XMTBUF[0] = BYTCNT
                ;                    XMTBUF[1] = HSTAT
0AFA 11 52 74    LXI  D,XMTBUF/2+X+2
                ;                    DE = ADDRESS, XMTBUF[2]
0AFD 21 24 74    LXI  H,MRSTS1/2+X   HL = ADDRESS, MRSTS1
                ;                    XMTBUF[2].0 = 0
                ;                    XMTBUF[2].1 = MRSTS1.DATDOR
                ;                    XMTBUF[2].2 = MRSTS1.INSFND
```

```
                  ;                         XMTBUF[2].3 = MRSTS1.LOWPOS
                  ;                         XMTBUF[2].4 = MRSTS1.SERMOD
                  ;                         XMTBUF[2].5 = MRSTS1.ENABLD
                  ;                         XMTBUF[2].6 = 0
                  ;                         XMTBUF[2].7 = MRSTS1.QUEREG
0B00 7E             MOV  A,M
0B01 E6 7D          ANI  7DH
0B03 12             STAX D
0B04 23             INX  H                  HL = ADDRESS, MRSTS2
0B05 13             INX  D                  DE = ADDRESS, XMTBUF[3]
                  ;                         XMTBUF[3].0 = MRSTS2.FATMOD
                  ;                         XMTBUF[3].1 = KDCTRL.KBDDSB
                  ;                         XMTBUF[3].2..7 = 0
0B06 7E             MOV  A,M
0B07 E6 80          ANI  80H
0B09 47             MOV  B,A
0B0A 3A 27 74       LDA  KDCTRL/2+X
0B0D 0F             RRC
0B0E 0F             RRC
0B0F E6 40          ANI  40H
0B11 B0             ORA  B
0B12 12             STAX D
0B13 23             INX  H                  HL = ADDRESS, NORFLG
0B14 7E             MOV  A,M                NORFLG.QUESTS = FALSE
0B15 E6 7F          ANI  7FH
0B17 77             MOV  M,A
0B18 C9             RET                     RETURN
                  ;NPAUSE(N    ,ZROFLG)
                  ;      (WORD,BIT    )
                  ;      (I/O ,O      )
                  ;      (BC  ,PSW:Z  )
                  ;      ( C  , C     )
                  ;
                  ;REGISTERS DESTROYED
                  ;PSW DESTROYED
                  ;
                  ;PAUSE FOR ABOUT 100 USEC, AND DECREMENT N
                  ;
                  NPAUSE;                   ****ENTRY POINT
                  ;                         PAUSE
0B19 3E 0A          MVI  A,10               A = 10
                  NPAUS1;                   DO UNTIL A = 0
0B1B 3D             DCR  A                    A = A-1
0B1C C2 1B 0B       JNZ  NPAUS1
                  ;                         ENDDO
                  ;                         DECREMENT N
0B1F 0B             DCX  B                  BC = N = N-1
                  ;                         DEFINE STATUS OF N
0B20 78             MOV  A,B                PSW:Z = ZROFLG = N .EQ. 0
0B21 B1             ORA  C
0B22 C9             RET                     RETURN
                  ;POSUPD()(WORK1 ,LOWWRN,POSREG,ASCREG,DSCREG,
                  ;        (NIBSTR,NIBSTR,NIBSTR,NIBSTR,NIBSTR,
                  ;        ( I/O  , I     , I     , I     , I     ,
                  ;        ( RAM  , RAM   , RAM   , RAM   , RAM   ,
                  ;        ( C    , NC    , NC    , C     , C     ,
                  ;
                  ;         ASCCRC,DSCCRC,UNLOCK,MRSTS1,MRSTS2)
                  ;         BYTE  ,BYTE  ,NIBSTR,BITSTR,BITSTR)
                  ;          I    , I    , I    , I/O  , I     )
                  ;          RAM  , RAM  , RAM  , RAM  , RAM   )
                  ;          NC   , NC   , NC   , C    , NC    )
                  ;
                  ;PSW DESTROYED
                  ;REGISTERS DESTROYED
                  ;
                  ;UPDATE METER STATUS FOR CURRENT POSTAGE SETTING
                  ;
                  POSUPD;                   ****ENTRY POINT
```

```
               ;---------------------------------------------------------
               ;                        BUILD WARNING VALUE SAME LENGTH AS
               ;                        DESCENDING REGISTER STARTING AT
               ;                        WORK1[0]
               ;                        CLEAR WORK AREA
0B23 3E C0      MVI  A,WORK1            A = OFFSET, WORK1
0B25 CD 85 0E   CALL CLRBLK             CLRBLK(WORK1)
               ;                               ( @A  )
               ;                               ( 0   )
0B28 06 1D      MVI  B,LOWWRN+1         B = OFFSET, LOWWRN[1]
0B2A CD 35 0F   CALL GETNIB             GETNIB(EXPONT,ZROFLG,LOWWRN[1])
               ;                               ( A    ,PSW:Z , @B      )
               ;                               ( 0    , 0    , I       )
0B2D 2F         CMA                     A = -EXPONT-1
0B2E C6 C7      ADI  WORK1+DSCSIZ       C = OFFSET, WORK1[DSCSIZ-1-EXPONT]
0B30 4F         MOV  C,A
0B31 05         DCR  B                  B = OFFSET, LOWWRN[0]
0B32 3E 01      MVI  A,1                A = NIBCNT = 1
0B34 CD B3 0F   CALL MVLNIB             MVLNIB(WORK1[DSCSIZ-1-EXPONT],
               ;                               ( @C                     ,
               ;                               ( 0                      ,
               ;
               ;                               LOWWRN[0],NIBCNT,NONBCD,ZROFLG)
               ;                                @B      , A    ,PSW:S ,PSW:Z )
               ;                                I       , I    , 0    , 0    )
               ;---------------------------------------------------------
               ;                        INITIALIZE FOR CALLS TO POSUP1
0B37 21 24 74   LXI  H,MRSTS1/2+X       HL = ADDRESS, MRSTS1
0B3A 7E         MOV  A,M
0B3B E6 CF      ANI  0CFH
0B3D 77         MOV  M,A                MRSTS1.INSFND = FALSE
               ;                        MRSTS1.LOWPOS = FALSE
               ;---------------------------------------------------------
               ;                        COMPARE DESCENDING REGISTER WITH
               ;                        WARNING VALUE
0B3E 06 10      MVI  B,10H              B.LOWPOS = TRUE
0B40 CD 85 0B   CALL POSUP1             IF DSCREG .LT. WORK1[0]
               ;                          MRSTS1.LOWPOS = B.LOWPOS = TRUE
               ;                        ENDIF
               ;---------------------------------------------------------
               ;                        BUILD POSTAGE SETTING REGISTER SAME
               ;                        LENGTH AS DESCENDING REGISTER
               ;                        STARTING AT WORK1[0]
               ;                        CLEAR WORK AREA
0B43 3E C0      MVI  A,WORK1            A = OFFSET, WORK1
0B45 CD 85 0E   CALL CLRBLK             CLRBLK(WORK1)
               ;                               ( @A  )
               ;                               ( 0   )
0B48 01 C3 42   LXI  B,POSREG*100H+WORK1+0+DSCSIZ-NBANKS
               ;                        B = OFFSET, POSREG
               ;                        C = OFFSET, WORK1[0+DSCSIZ-NBANKS]
0B4B 3E 04      MVI  A,NBANKS           A = NBANKS
0B4D CD B3 0F   CALL MVLNIB             MVLNIB(WORK1[0+DSCSIZ-NBANKS],
               ;                               ( @C                     ,
               ;                               ( 0                      ,
               ;
               ;                               POSREG,NBANKS,NONBCD,ZROFLG)
               ;                                @B   , A    ,PSW:S ,PSW:Z )
               ;                                I    , I    , 0    , 0    )
               ;---------------------------------------------------------
               ;                        COMPARE DESCENDING REGISTER WITH
               ;                        POSTAGE SETTING
0B50 06 20      MVI  B,20H              B.INSFND = TRUE
0B52 CD 85 0B   CALL POSUP1             IF DSCREG .LT. WORK1[0]
               ;                          MRSTS1.INSFND = B.INSFND = TRUE
               ;                        ENDIF
               ;---------------------------------------------------------
               ;                        CHECK ASCENDING REGISTER CRC
0B55 01 38 08   LXI  B,ASCSIZ*100H+ASCREG
```

```
                      ;                     B = ASCSIZ
                      ;                     C = OFFSET, ASCREG[0]
0B58 3A 20 74   LDA  ASCCRC/2+X             A = ASCCRC
0B5B CD 92 0B   CALL POSUP2                 IF ASCCRC INCORRECT
                      ;                       FILL ASCREG WITH HEXOF
                      ;                       DECLARE DEAD METER. BAD CRC
                      ;                     ENDIF
                      ;---------------------------------------------------------
                      ;                     CHECK DESCENDING REGISTER CRC
0B5E 01 2F 07   LXI  B,DSCSIZ*100H+DSCREG
                      ;                     B = DSCSIZ
                      ;                     C = OFFSET, DSCREG[0]
0B61 3A 1B 74   LDA  DSCCRC/2+X             A = DSCCRC
0B64 CD 92 0B   CALL POSUP2                 IF DSCCRC INCORRECT
                      ;                       FILL DSCREG WITH HEXOF
                      ;                       DECLARE DEAD METER. BAD CRC
                      ;                     ENDIF
                      ;---------------------------------------------------------
                      ;                     CHECK CONTROL SUM CRC
                      ;                     MRSTS2.FATMOD WILL BE USED VS ERRFLG
0B67 CD 3A 06   CALL CONSUM                 CONSUM(ERRFLG)
                      ;                            (PSW:Z )
                      ;                            ( 0    )
                      ;---------------------------------------------------------
                      ;                     ENABLE OR DISABLE METER
0B6A 01 24 74   LXI  B,MRSTS1/2+X           BC = ADDRESS, MRSTS1
0B6D 0A         LDAX B
0B6E E6 68      ANI  68H
0B70 67         MOV  H,A                    H = FLAGS = MRSTS1.DATDOR,
                      ;                                 MRSTS1.INSFND,
                      ;                                 MRSTS1.SERMOD
0B71 03         INX  B                      BC = ADDRESS, MRSTS2
0B72 0A         LDAX B
0B73 E6 81      ANI  81H
0B75 B4         ORA  H                      A = FLAGS = FLAGS .OR.
                      ;                                 MRSTS2.FATMOD,
                      ;                                 MRSTS2.PRVMOD
                      ;                     IF FLAGS .NE. 0
0B76 C2 D3 05   JNZ  DISABL                   DISABLE
                      ;                     ELSE
                      ;                       COMPARE $ UNLOCK VALUE WITH SETTING
0B79 11 18 42   LXI  D,POSREG*100H+UNLOCK
                      ;                       D = OFFSET, POSREG
                      ;                       E = OFFSET, UNLOCK
0B7C 3E 04      MVI  A,NBANKS                 A = NBANKS
0B7E CD 8E 0E   CALL CMPARE                   CMPARE(POSREG,UNLOCK,NBANKS,
                      ;                             ( @D    , @E    , A     ,
                      ;                             ( I     , I     , I     ,
                      ;
                      ;                             NEGFLG,ZROFLG)
                      ;                             PSW:S ,PSW:Z )
                      ;                              0    , 0    )
0B81 FC F9 05   CM   ENABLE                   IF NEGFLG .EQ. TRUE
                      ;                         ENABLE
                      ;                       ENDIF
                      ;                     ENDIF
                      ;---------------------------------------------------------
0B84 C9         RET                         RETURN
                      ;---------------------------------------------------------
                      ;---------------------------------------------------------
                      ;---------------------------------------------------------
                POSUP1;                     ****LOCAL ENTRY POINT
0B85 11 C0 2F   LXI  D,DSCREG*100H+WORK1+0
                      ;                     D = OFFSET, DSCREG[0]
                      ;                     E = OFFSET, WORK1[0]
0B88 3E 07      MVI  A,DSCSIZ               A = DSCSIZ
0B8A CD 8E 0E   CALL CMPARE                 CMPARE(DSCREG[0],WORK1[0],DSCSIZ,
                      ;                           ( @D       , @E      , A     ,
                      ;                           ( I        , I       , I     ,
```

```
                    ;
                    ;                           NEGFLG,ZROFLG)
                    ;                           PSW:S ,PSW:Z )
                    ;                            0    , 0    )
0B8D F0              RP                 IF NEGFLG .EQ. TRUE
0B8E 7E              MOV  A,M             MRSTS1.FLAG = B.FLAG = TRUE
0B8F B0              ORA  B
0B90 77              MOV  M,A
                    ;                   ENDIF
0B91 C9              RET                RETURN
                    ;----------------------------------------------------------
                    ;----------------------------------------------------------
                    ;----------------------------------------------------------
                    POSUP2;             ****LOCAL ENTRY POINT
0B92 CD B1 0E        CALL CRC           CRC(REGSTR[0],REGSIZ,CRCVAL)
                    ;                      ( @C      , B    , D    )
                    ;                      ( I       , I    , O    )
0B95 BA              CMP  D             PSW:Z = NOERR = REGCRC .EQ. CRCVAL
0B96 C8              RZ                 IF NOERR .EQ. FALSE
                    ;                     FILL BAD REGISTER WITH HEXOF
0B97 3E 0F           MVI  A,0FH           A = HEXOF
0B99 C3 24 0F        JMP  FILNIB          FILNIB(REGSTR[0],HEXOF,REGSIZ)
                    ;                           ( @C      , A   , B    )
                    ;                           ( O       , I   , I    )
                    ;                     DECLARE DEAD METER. BAD CRC
0B9C 3E 00           MVI  A,BADCRC        A = CODE = BADCRC
0B9E C3 85 10        JMP NVMDED           NVMDED(CODE,ERRFLG)
                    ;                           ( A  ,PSW:Z )
                    ;                           ( I  , O    )
                    ;                   ENDIF
                    ;                   RETURN
                    ;----------------------------------------------------------
                    ;----------------------------------------------------------
                    ;----------------------------------------------------------
                    ;PROERR(ERRFLG)(XMTBUF)
                    ;     (BIT   )(BYTSTR)
                    ;     ( O    )( O    )
                    ;     (PSW:Z )( RAM  )
                    ;     ( C    )( C    )
                    ;
                    ;REGISTERS DESTROYED
                    ;PSW DESTROYED
                    ;
                    ;PROCESS PROCEDURAL ERROR
                    ;
                    PROERR;             ****ENTRY POINT
0BA1 CD F4 0A        CALL MTRSTS        PUT STATUS MESSAGE IN TRANSMIT BUFFER
0BA4 11 53 74        LXI  D,XMTBUF/2+X+3
                    ;                   DE =  ADDRESS, XMTBUF[3]
                    ;                   DECLARE PROCEDURAL ERROR
0BA7 1A              LDAX D             XMTBUF[3].PROERR = TRUE
0BA8 F6 02           ORI  2
0BAA 12              STAX D
0BAB AF              XRA  A             PSW:Z = ERRFLG = TRUE
0BAC C3 64 04        JMP  PERDSP        MAKE PROCEDURAL ERROR DISPLAY
                    ;                   RETURN
                    ;RDCYC(INCYC ,INCYC,ADRESS,MRSTS1)(DATA1 )
                    ;    (BITSTR,BIT  ,ADRESS,BITSTR)(BITSTR)
                    ;    ( O    , O   , O    , -    )( I    )
                    ;    ( A    ,PSW:C, HL   , @HL  )( 6800 )
                    ;    ( C    , C   , C    , NC   )( NC   )
                    ;
                    ;REGISTERS NOT CHANGED
                    ;PSW DESTROYED
                    ;
                    ;RETURN STATUS OF METER CYCLE SWITCH
                    ;
                    RDCYC;              ****ENTRY POINT
                    ;                   DEFINE ADDRESS FOR CALLING ROUTINES
```

```
0BAF 21 24 74   LXI  H,MRSTS1/2+X  HL = ADDRESS, MRSTS1
               ;                   READ CYCLE SWITCH
0BB2 3A 00 68   LDA  DATA1         A = INCYC,INCYCN = DATA1.2,DATA1.3
0BB5 E6 30      ANI  30H
0BB7 C2 C2 0B   JNZ  RDCYC1        IF BOTH SIDES OF SWITCH CLOSED
               ;                     DECLARE DEAD METER; BAD CYCLE SWITCH
0BBA 3E 04      MVI  A,BADCYC        A = BADCYC
0BBC CD 85 10   CALL NVMDED          NVMDED(BADCYC,ERRFLG)
               ;                            ( A    ,PSW:Z )
               ;                            ( I    , O    )
0BBF C3 B6 01   JMP PWRDN            ABORT
               RDCYC1;             ELSE
0BC2 17         RAL                  PSW:C = INCYC = DATA1.2
0BC3 17         RAL
0BC4 17         RAL
0BC5 9F         SBB  A               A.0..7 = INCYC
0BC6 C9         RET                  RETURN
               ;                   ENDIF
               ;RECEVE()(SID,SOD,SOE,RECBUF,NORFLG)
               ;        (BIT,BIT,BIT,BYTSTR,BITSTR)
               ;        ( I , O , O , O     , I    )
               ;        (RIM,SIM,SIM, RAM   , RAM  )
               ;        ( NC, C , C , C     , NC   )
               ;
               ;REGISTERS DESTROYED
               ;PSW DESTROYED
               ;
               ;RECEIVE INCOMING MESSAGE IF EXTERNAL RTS IS PRESENT.
               ;RECBUF[0], THE MESSAGE BYTE COUNT, IS CLEARED IF A
               ;REQUEST TO SEND IS DETECTED.
               ;
               RECEVE;             ****ENTRY POINT
0BC7 3A 26 74   LDA  NORFLG/2+X    IF NORFLG.COMDSB .EQ. TRUE
0BCA E6 04      ANI  4
               ;                     COMMUNICATIONS ARE DISABLED
0BCC C0         RNZ                  RETURN
               ;                   END IF
0BCD 20         RIM                INPUT BIT
               ;                   A.0 = BIT = RIM.SID ;RTS OR IDLE
0BCE B7         ORA A              IF RIM.SID .NE. RTS
               ;                     NO INCOMING REQUEST TO SEND PRESENT
0BCF F0         RP                   RETURN
               ;                   ENDIF
               ;                   STOP TIMER
0BD0 CD 34 01   CALL STPTMR        STPTMR(WASOFF)
               ;                         (PSW:Z )
               ;                         ( O    )
0BD3 21 27 0C   LXI  H,RECE06      SET TO REACH QUIT ROUTINE VIA RETURN
0BD6 E5         PUSH H
0BD7 21 48 74   LXI  H,RECBUF/2+X  HL = ADDRESS, RECBUF[N=0]
               ;                   (2 MVI VS 1 LXI FOR T3 = 100.012 USEC)
0BDA 06 00      MVI  B,0           B = BYTCNT = 0
0BDC 0E 80      MVI  C,80H         C = SIM*2 .AND. HEXFF, WHERE
               ;                       SIM.SOE = ENABLD = 1
0BDE 70         MOV  M,B           RECBUF[0] = 0

               RECE01;             DO UNTIL BIT .EQ. EOM
0BDF 3E C0      MVI  A,0C0H          SIM.SOD = ONEBIT=1 ;CTS,OR EOB ECHO
               ;                     SIM.SOE = ENABLD = 1
0BE1 30         SIM                  OUTPUT ONEBIT
0BE2 11 FB FE   LXI  D,-261          DE = COUNT ;FOR T13 = 3.494 MSEC
               RECE02;               DO UNTIL (BIT .EQ. START) .OR.
               ;                       (COUNT .GE. 0)
0BE5 20         RIM                    INPUT BIT
               ;                       A.0 = BIT = RIM.SID ;START,RTS,EOB
0BE6 13         INX  D                 DE = COUNT = COUNT+1
0BE7 A2         ANA  D                 A.0 = BIT .AND. COUNT.0
0BE8 FA E5 0B   JM   RECE02
               ;                     ENDDO
```

```
                      ;
0BEB B2                ORA  D               IF COUNT .GE. 0
                      ;                       T13 TIMEOUT OCCURRED
                      ;                       START NOT RECEIVED AFTER RTS
0BEC F0                RP                     QUIT
                      ;                     ENDIF
                      ;                     THE FIRST BYTE'S START BIT HAS BEEN
                      ;                     READ. IT WILL BE READ AGAIN AND
                      ;                     ECHOED LATER.
                      ;                     POINT AT NEXT BYTE IN RECBUF.
0BED 23                INX  H               HL = ADDRESS, RECBUF[N=N+1]
                      ;                     CHECK FOR BUFFER OVERFLOW
0BEE 04                INR  B               B = BYTCNT = BYTCNT+1
0BEF 3E 07             MVI  A,7             IF 7 .LT. BYTCNT
0BF1 B8                CMP  B
                      ;                       TRYING TO RECEIVE 8TH BYTE
0BF2 D8                RC                     QUIT
                      ;                     ENDIF
                      ;                     SET TO INPUT 10 BITS
                      ;                     1 START, 8 DATA, AND 1 EOB OR EOM
0BF3 16 0A             MVI  D,10            D = BITCNT = 10

                      RECE03;               LOOP ;BREAK ON BITCNT .EQ. 0
0BF5 20                RIM                    INPUT BIT
                      ;                       A.0 = BIT = RIM.SID
0BF6 17                RAL                    PSW:CY  = BIT
0BF7 79                MOV  A,C               PSW:CY,A = SIM*2
0BF8 1F                RAR                    A = SIM
                      ;                       SIM.SOD = ECHO = BIT
                      ;                       SIM.SOE = ENABLD = 1
0BF9 30                SIM                    OUTPUT 10 ECHO BITS
0BFA 15                DCR  D                 D = BITCNT = BITCNT-1
                      ;                       IF BITCNT .EQ. 0
0BFB CA 0C 0C          JZ   RECE04              BREAK
                      ;                       ENDIF
0BFE 17                RAL.                   PSW:CY = BIT
                      ;                       SHIFT 9 BITS INTO BUFFER
                      ;                       1 START,(LOST); 8 DATA,(KEPT)
0BFF 7E                MOV  A,M               PSW:CY,A = RECBUF[N]*2
0C00 1F                RAR                    RECBUF[N] = (PSW:CY,A)/2
0C01 77                MOV  M,A
0C02 77                MOV  M,A               DELAY ;BIT PERIOD = 103.923 USEC
0C03 3E 07             MVI  A,7
0C05 3D                DCR  A
0C06 F2 05 0C          JP   $-1
0C09 C3 F5 0B          JMP  RECE03
                      RECE04;                ENDLOOP
0C0C B7                ORA  A                 CHECK FOR EOM
0C0D FA DF 0B          JM   RECE01
                      ;                     ENDDO
0C10 3E 21             MVI  A,33            DELAY ;T8 = 1264.965 USEC
0C12 3D                DCR  A
0C13 F2 12 0C          JP   $-1
                      ;                     CHECK FOR NO-ERROR PULSE
0C16 20                RIM                  INPUT BIT
                      ;                     A.0 = BIT = RIM.SID
0C17 B7                ORA  A               IF BIT .EQ. ACK
0C18 F2 1F 0C          JP   RECE05
                      ;                       MESSAGE RECEIVED WITHOUT ERROR
                      ;                       PUT NONZERO BYTE COUNT IN BUFFER
0C1B 78                MOV  A,B               RECBUF[0] = BYTCNT
0C1C 32 48 74          STA  RECBUF/2+X
                      RECE05;               ENDIF
0C1F F1                POP  PSW             CLEAN UP STACK
0C20 16 22             MVI  D,34            DELAY ;T15 = 1560.533 USEC
0C22 15                DCR  D
0C23 F2 22 0C          JP   $-1
0C26 C9                RET                  RETURN
                      ;
                      RECE06;               QUIT RECEIVE ROUTINE
```

```
0C27 3E 40      MVI  A,40H        SIM.SOD = IDLE = 0
               ;                  SIM.SOE = ENABLD = 1
0C29 30         SIM               OUTPUT IDLE
0C2A 16 C2      MVI  D,194        DELAY ;T15 = 1558.298 USEC
0C2C 15         DCR  D
0C2D F2 2C 0C   JP   $-1
0C30 C9         RET               RETURN
               ;REDSTS(TRPSW,PRVSW)(PORTA ,PORTC )
               ;      (BYTE ,BYTE )(BITSTR,BITSTR)
               ;      ( 0   , 0   )( I/O  , I    )
               ;      ( B   , A   )( 7001 , 7003 )
               ;      ( C   , C   )( C    , NC   )
               ;
               ;REGISTERS DESTROYED
               ;PSW DESTROYED
               ;
               ;RETURNS VALUES FOR TRIP SWITCH AND PRIVELEGED SWITCH
               ;OFF = HEX00
               ;ON  = HEXFF
               ;
               REDSTS;            ****ENTRY POINT
               ;                  FETCH PORTA IMAGE
               ;                  SENSOR LEDS ASSUMED TO BE OFF
0C31 21 01 70   LXI  H,PORTA      HL = ADDRESS, PORTA
0C34 56         MOV  D,M          D = LEDOFF = PORTA
               ;                  TURN SENSOR LEDS ON
0C35 7A         MOV  A,D          PORTA = PORTA .AND. HEXDF
0C36 E6 DF      ANI  0DFH
0C38 77         MOV  M,A
               ;                  READ SENSORS
0C39 3A 03 70   LDA  PORTC
0C3C 07         RLC
0C3D 07         RLC
0C3E 07         RLC               PSW:CY = TRPBIT = PORTC.2
0C3F 4F         MOV  C,A          C.0    = PRVBIT = PORTC.3
0C40 9F         SBB  A            B = TRPSW = TRPBIT*HEXFF
0C41 47         MOV  B,A
0C42 79         MOV  A,C          A = PRVSW = (.NOT. PRVBIT)*HEXFF
0C43 07         RLC
0C44 3F         CMC
0C45 9F         SBB  A
               ;                  TURN SENSOR LEDS OFF
0C46 72         MOV  M,D          PORTA = LEDOFF
0C47 C9         RET               RETURN
               ;SELVAL(ERRFLG)(NORFLG,MRSTS1,POSREG)
               ;      (BIT   )(BITSTR,BITSTR,NIBSTR)
               ;      ( 0    )( 0    , I    , I    )
               ;      (PSW:Z )( RAM  , RAM  , RAM  )
               ;      ( C    )( C    , NC   , NC   )
               ;
               ;REGISTERS DESTROYED
               ;PSW DESTROYED
               ;
               ;PROCESS SELECTION VALUE REQUEST
               ;
               SELVAL;            ****ENTRY POINT
0C48 21 26 74   LXI  H,NORFLG/2+X HL = ADDRESS, NORFLG
0C4B 7E         MOV  A,M          NORFLG.QUEPOS = FALSE
0C4C E6 BF      ANI  0BFH
0C4E 77         MOV  M,A
0C4F 3A 24 74   LDA  MRSTS1/2+X   IF MRSTS1.UNKSEL .EQ. TRUE
0C52 B7         ORA  A
               ;                    SELECTION VALUE IS UNKNOWN
0C53 FA A1 0B   JM   PROERR         PROERR(ERRFLG)
               ;                           (PSW:Z )
               ;                           ( 0    )
               ;                    RETURN
               ;                  ELSE
```

```
                 ;                 FLAG VERIFICATION OF SELECTION VALUE
0C56 7E            MOV  A,M        NORFLG.UNVSEL = FALSE
0C57 E6 FD         ANI  0FDH
0C59 77            MOV  M,A
0C5A 11 60 0C      LXI  D,SELV01   DE = ADDRESS, SELV01
                 ;                 PUT REPLY IN TRANSMIT BUFFER
0C5D C3 5B 0D      JMP  VALREQ     VALREQ(POSREG,POSFMT,HPSET,ERRFLG)
                 ;                       (@@DE+0,@DE+1 ,@DE+2,PSW:Z )
                 ;                       ( I    , I    , I   , 0    )
                 ;                  RETURN
                 ;                ENDIF
                 SELV01;          ARGUMENT LIST FOR VALREQ
0C60 42 40 81      DB   POSREG,POSFMT,HPSET
                 ;SEREOE(ERRFLG)(CMBBUF,LOWWRN,SETLIM,AMTBUF,WORK1 ,UNLOCK)
                 ;      (BIT   )(NIBSTR,NIBSTR,NIBSTR,NIBSTR,NIBSTR,NIBSTR)
                 ;      ( 0    )( I    , 0    , 0    , I    , I/0  , 0    )
                 ;      (PSW:Z )( RAM  , RAM  , RAM  , RAM  , RAM  , RAM  )
                 ;      ( C    )( C    , C    , C    , NC   , C    , C    )
                 ;
                 ;PSW DESTROYED
                 ;REGISTERS DESTROYED
                 ;
                 ;PERFORM SERVICE FUNCTIONS WHICH ARE INITIATED BY THE
                 ;ENTRY OF AN AMOUNT AND COMBINATION
                 ;
                 SEREOE;          ****ENTRY POINT
                 ;                CHECK METER STATUS
0C63 CD 4E 0F      CALL LSTATE    LSTATE(FATMOD,NORMOD,SERMOD,PRVMOD)
                 ;                      (PSW:S ,PSW:Z ,PSW:P ,PSW:C )
                 ;                      ( 0    , 0    , 0    , 0    )
                 ;                IF FATMOD .EQ. TRUE
                 ;                  PROCESS ERROR
0C66 FA A1 0B      JM   PROERR      PROERR(ERRFLG)
                 ;                        (PSW:Z )
                 ;                        ( 0    )
                 ;                ELSE
                 ;                  CHECK FORMAT BYTE IN CMBBUF
0C69 21 78 74      LXI  H,CMBBUF/2+X  HL = ADDRESS, CMBBUF[0..1]
0C6C 7E            MOV  A,M         IF CMBBUF[0..1] .NE. HEX1F
0C6D FE 1F         CPI  1FH
                 ;                    BAD FORMAT, PROCEEDURAL ERROR
0C6F C2 A1 0B      JNZ  PROERR        PROERR(ERRFLG)
                 ;                          (PSW:Z )
                 ;                          ( 0    )
                 ;                  ELSE
                 ;                  CHECK FOR OUT OF RANGE COMBINATION
0C72 23            INX  H           HL = ADDRESS, CMBBUF[2..3]
0C73 7E            MOV  A,M         A = CMBBUF[2..3]
0C74 FE 04         CPI  4           IF CMBBUF[2..3] .GE. 4
                 ;                    BAD COMBINATION, PROCEEDURAL ERROR
0C76 D2 A1 0B      JNC  PROERR        PROERR(ERRFLG)
                 ;                          (PSW:Z )
                 ;                          ( 0    )
                 ;                  ELSE
                 ;                  --CASE (CMBBUF[2..3])
0C79 11 1C 07      LXI  D,DSCSIZ*100H+LOWWRN
0C7C FE 01         CPI  1             **01:
                 ;                      CHANGE LOW POSTAGE WARN LIMIT
0C7E CA FB 0C      JZ   SRVCNV          SRVCNV(LOWWRN,DSCSIZ,ERRFLG)
                 ;                             ( @E    , D    ,PSW:Z )
                 ;                             ( 0     , I    , 0    )
0C81 11 1E 05      LXI  D,(NBANKS+1)*100H+SETLIM
0C84 FE 02         CPI  2             **02:
                 ;                      CHANGE SETTING LIMIT
0C86 CA FB 0C      JZ   SRVCNV          SRVCNV(SETLIM,NBANKS+1,ERRFLG)
                 ;                             ( @E    , D       ,PSW:Z )
                 ;                             ( 0     , I       , 0    )
0C89 06 E0         MVI  B,AMTBUF
                 ;                    **03:
                 ;                      CHANGE SERIAL NUMBER
```

```
0C8B F2 38 0A   JP   MSERNO              MSERNO(AMTBUF,ERRFLG)
                ;                              ( @B   ,PSW:Z )
                ;                              ( I    , O    )
                ;                         **00:
0C8E 15          DCR  D                    D = NBANKS
                ;                          CHANGE DOLLAR UNLOCK VALUE
0C8F CD AA 0A    CALL MSG2MU               MSG2MU(AMTBUF,NBANKS,ERRFLG)
                ;                                 ( @B    , D    ,PSW:Z )
                ;                                 ( I     , I    , O    )
                ;                          IF ERRFLG .EQ. TRUE
                ;                            BAD AMOUNT, PROCEEDURAL ERROR
0C92 CA A1 0B    JZ   PROERR                 PROERR(ERRFLG)
                ;                                  (PSW:Z )
                ;                                  ( O    )
                ;                          ELSE
                ;                            REDEFINE $ UNLOCK VALUE
0C95 3E 04       MVI  A,NBANKS               A = NBANKS
0C97 01 18 CC    LXI  B,(WORK1+16-NBANKS)*100H+UNLOCK
                ;                            B = OFFSET, WORK1[16-NBANKS]
                ;                            C = OFFSET, UNLOCK
0C9A CD B3 0F    CALL MVLNIB                 MVLNIB(UNLOCK,WORK1[16-NBANKS],
                ;                                   ( @C   , @B                ,
                ;                                   ( O    , I                 ,
                ;
                ;                            NBANKS,NONBCD,ZERO )
                ;                             A     ,PSW:S ,PSW:Z)
                ;                             I     , O    , O   )
0C9D 0C          INR  C                      PSW:Z = ERRFLG = FALSE
                ;                          ENDIF
                ;                       --ENDCASE
                ;                       ENDIF
                ;                     ENDIF
0C9E C9          RET                  RETURN
                ;SETPOS(MSGBUF,ERRFLG)(SETLIM,WORK1 ,WORK2 ,MRSTS1,
                ;      (NIBSTR,BIT   )(NIBSTR,NIBSTR,NIBSTR,BITSTR,
                ;      ( I     , O    )( I     , O     , O     , O     ,
                ;      ( @B    ,PSW:Z )( RAM   , RAM   , RAM   , RAM   ,
                ;      ( NC    , C    )( NC    , C     , C     , C     ,
                ;
                ;      NORFLG,POSREG)
                ;      BITSTR,NIBSTR)
                ;       O     , O    )
                ;       RAM   , RAM  )
                ;       C     , C    )
                ;
                ;REGISTERS DESTROYED
                ;PSW DESTROYED
                ;
                ;PROCESS SET POSTAGE COMMAND
                ;
                SETPOS;               ****ENTRY POINT
                ;                     SET TO REACH PROERR VIA RETURN
0C9F 21 A1 0B    LXI  H,PROERR
0CA2 E5          PUSH H
0CA3 CD 4E 0F    CALL LSTATE          LSTATE(FATMOD,NORMOD,SERMOD,PRVMOD)
                ;                           (PSW:S ,PSW:Z ,PSW:P ,PSW:CY)
                ;                           ( O    , O    , O    , O    )
                ;                     IF NORMOD .EQ. FALSE
                ;                       METER NOT IN NORMAL MODE
0CA6 C0          RNZ                    PROERR(ERRFLG)
                ;                     ELSE
                ;                       PUT NEW SETTING VALUE INTO WORK1
0CA7 16 04       MVI  D,NBANKS          D = NIBCNT = NBANKS
0CA9 CD AA 0A    CALL MSG2MU            MSG2MU(MSGBUF,NIBCNT,ERRFLG)
                ;                              ( @B    , D    ,PSW:Z )
                ;                              ( I     , I    , O    )
0CAC F5          PUSH PSW               SAVE A,PSW
0CAD 21 24 74    LXI  H,MRSTS1/2+X      HL = ADDRESS, MRSTS1
0CB0 7E          MOV  A,M               MRSTS1.ENABLD = FALSE
```

```
0CB1 E6 FB     ANI  0FBH
0CB3 77        MOV  M,A
0CB4 F1        POP  PSW                 RESTORE A,PSW
               ;                        IF ERRFLG .EQ. TRUE
               ;                          NEW SETTING VALUE IS IMPROPER
0CB5 C8        RZ                         PROERR(ERRFLG)
               ;                        ELSE
               ;                          FETCH SETTING LIMIT EXPONENT
0CB6 06 1F     MVI  B,SETLIM+1            B = OFFSET, SETLIM[1]
0CB8 CD 35 0F  CALL GETNIB                GETNIB(EXPONT,ZROFLG,SETLIM[1])
               ;                                ( A    ,PSW:Z , @B      )
               ;                                ( O    , O    , I       )
               ;                          CALCULATE WORK2 INDEX FOR MANTISSA
0CBB 2F        CMA                        A = -EXPONT-1
0CBC C6 10     ADI  16                    C = I = 15-EXPONT
0CBE 4F        MOV  C,A
               ;                          CLEAR WORK2
0CBF 3E D0     MVI  A,WORK2               A = OFFSET, WORK2
0CC1 CD 85 0E  CALL CLRBLK                CLRBLK(WORK2)
               ;                                ( @A  )
               ;                                ( O   )
               ;                          PUT SET LIMIT MANTISSA INTO WORK2
0CC4 81        ADD  C                     C = OFFSET, WORK2[I]
0CC5 4F        MOV  C,A
0CC6 05        DCR  B                     B = OFFSET, SETLIM[0]
0CC7 CD 35 0F  CALL GETNIB                GETNIB(MANTIS,ZROFLG,SETLIM[0])
               ;                                ( A    ,PSW:Z , @B      )
               ;                                ( O    , O    , I       )
0CCA CD EE 0F  CALL PUTNIB                PUTNIB(WORK2[I],MANTIS)
               ;                                ( @C      , A    )
               ;                                ( O       , I    )
               ;                          COMPARE NEW SETTING VS SETTING LIM
0CCD 11 DB CB  LXI  D,(WORK1+15-NBANKS)*100H+(WORK2+15-NBANKS)
               ;                          D = OFFSET, WORK1[N=15-NBANKS]
               ;                          E = OFFSET, WORK2[N]
0CD0 3E 05     MVI  A,NBANKS+1            A = NIBCNT = NBANKS+1
0CD2 CD 8E 0E  CALL CMPARE                CMPARE(WORK1[N],WORK2[N],NIBCNT,
               ;                                ( @D      , @E      , A    ,
               ;                                ( I       , I       , I    ,
               ;
               ;                                NEGFLG,ZROFLG)
               ;                                PSW:S ,PSW:Z )
               ;                                 O    , O    )
               ;                          IF NEGFLG .EQ. FALSE
               ;                            NEW SETTING EXCEEDS LIMIT
0CD5 F0        RP                           PROERR(ERRFLG)
               ;                          ELSE
0CD6 F1        POP  PSW                     CLEAN UP STACK
               ;                            SET POSTAGE
0CD7 11 26 74  LXI  D,NORFLG/2+X            DE = ADDRESS, NORFLG
0CDA 1A        LDAX D                       NORFLG.LATDSB = FALSE
0CDB E6 FE     ANI  0FEH
0CDD F6 02     ORI  2                       NORFLG.UNVSEL = TRUE
0CDF 12        STAX D
0CE0 7E        MOV  A,M                     MRSTS1.UNKSEL = TRUE
0CE1 F6 80     ORI  80H
0CE3 77        MOV  M,A
0CE4 E5        PUSH H                       SAVE HL
0CE5 CD 25 1A  CALL MVPOST                  MVPOST(ERROR)
               ;                                  ( A   )
               ;                                  ( O   )
0CE8 E1        POP  H                       RESTORE HL
0CE9 B7        ORA  A                       PSW:Z = NOERR = ERROR .EQ. 0
               ;                            IF NOERR .EQ. FALSE
               ;                              METER DID NOT SET
0CEA C2 80 08  JNZ  FATERR                    FATERR(ERROR,ERRFLG)
               ;                                    ( A   ,PSW:Z )
               ;                                    ( I   , O    )
               ;                            ELSE
               ;                              REPORT SUCCESSFUL SETTING
```

```
0CED 01 42 CC   LXI  B,(WORK1+16-NBANKS)*100H+POSREG
                ;                          B = OFFSET, WORK1[N]
                ;                          C = OFFSET, POSREG
0CF0 3E 04       MVI  A,NBANKS              A = NIBCNT = NBANKS
0CF2 CD B3 0F    CALL MVLNIB                MVLNIB(POSREG,WORK1[N],NBANKS,
                ;                                 ( @C   , @B     , A    ,
                ;                                 ( O    , I      , I    ,
                ;
                ;                                 NONBCD,ZROFLG)
                ;                                 PSW:S ,PSW:Z )
                ;                                  O     , O    )
0CF5 7E          MOV  A,M                   MRSTS1.UNKSEL = FALSE
0CF6 E6 7F       ANI  7FH
0CF8 77          MOV  M,A
                ;                          CLEAR ERROR FLAG
0CF9 0C          INR  C                     C = OFFSET, POSREG[1]
                ;                          PSW:Z = ERRFLG = C.EQ.0=FALSE
                ;                        ENDIF
                ;                      ENDIF
                ;                    ENDIF
                ;                  ENDIF
0CFA C9          RET               RETURN
                ;SRVCNV(SRVREG,MAXCNT,ERRFLG)(AMTBUF,DIEDCM)
                ;      (NIBSTR,BYTE  ,BIT   )(NIBSTR,BYTE  )
                ;      ( O     , I    , O    )( I     , I    )
                ;      ( @E    , D    ,PSW:Z )( RAM   , RAM  )
                ;      ( C     , C    , C    )( NC    , NC   )
                ;
                ;PSW DESTROYED
                ;REGISTERS DESTROYED
                ;
                ;CONVERT MESSAGE FORMATTED VALUE IN AMTBUF INTO A
                ;SPECIAL SERVICE REGISTER FORMAT IN THE FORM:
                ;MANTISSA*10**EXPONENT, IN WHICH
                ;SRVREG[0] = MANTISSA
                ;SRVREG[1] = EXPONENT
                ;
                SRVCNV;                ****ENTRY POINT
                ;                      SET TO REACH PROERR VIA RETURN
0CFB 21 A1 0B    LXI  H,PROERR
0CFE E5          PUSH H
                ;                      FETCH VALUES FROM MESSAGE FORMAT
0CFF 06 E1       MVI  B,AMTBUF+1        B = OFFSET, AMTBUF[1]
0D01 CD 35 0F    CALL GETNIB            GETNIB(DECPOS,ZROFLG,AMTBUF[1])
                ;                             ( A     ,PSW:Z , @B       )
                ;                             ( O     , O    , I        )
0D04 6F          MOV  L,A               L = DECPOS
0D05 05          DCR  B                 B = OFFSET, AMTBUF[0]
0D06 CD 35 0F    CALL GETNIB            GETNIB(MSGCNT,ZROFLG,AMTBUF[0])
                ;                             ( A     ,PSW:Z , @B       )
                ;                             ( O     , O    , I        )
0D09 67          MOV  H,A               H = MSGCNT
                ;                      IF ZROFLG .EQ. TRUE
                ;                        NO VALUE WAS ENTERED
0D0A C8          RZ                      PROERR(ERRFLG)
                ;                      ELSE
                ;                      POINT TO RIGHT OF H/O MESSAGE DIGIT
0D0B E6 01       ANI  1                 B = OFFSET, AMTBUF[I=
                ;                                 (MSGCNT .AND. HEX01)+3]
0D0D C6 E3       ADI AMTBUF+3
0D0F 47          MOV  B,A
0D10 4F          MOV  C,A               C = OFFSET, AMTBUF[I]
                ;                      SCAN DIGITS TO RIGHT OF H/O MSG DIGIT
0D11 7C          MOV  A,H               A = NIBCNT = MSGCNT-1
0D12 3D          DCR  A
0D13 CD B3 0F    CALL MVLNIB            MVLNIB(AMTBUF[I],AMTBUF[I],NIBCNT,
                ;                             ( @C       , @B       , A    ,
                ;                             ( O        , I        , I    ,
                ;
                ;                                NONBCD,ZROFLG)
```

```
                 ;                    PSW:S ,PSW:Z )
                 ;                      0   , 0    )
                 ;                 IF ZROFLG .EQ. FALSE
                 ;                   NOT ALL DIGITS SCANNED WERE ZEROES
0D16 C0           RNZ                PROERR(ERRFLG)
                 ;                 ELSE
0D17 3A 35 74     LDA  DIEDCM/2+X  A = DIEDCM-DECPOS
0D1A 95           SUB  L
                 ;                 IF (DIEDCM-DECPOS) .LT. 0
                 ;                   BAD DECIMAL IN MESSAGE FORMAT
0D1B D8           RC                 PROERR(ERRFLG)
                 ;                 ELSE
                 ;                 CALCULATE EXPONENT
0D1C 84           ADD  H           L = EXPONT = MSGCNT-1+DIEDCM-DECPOS
0D1D 3D           DCR  A
0D1E 6F           MOV  L,A
0D1F BA           CMP  D           IF EXPONT .GE. MAXCNT
                 ;                   MESSAGE IS TOO LONG
0D20 D0           RNC                PROERR(ERRFLG)
                 ;                 ELSE
                 ;                 FETCH H/O MESSAGE DIGIT AS MANTISSA
0D21 05           DCR  B           B = OFFSET, AMTBUF[I=I-1]
0D22 CD 35 0F     CALL GETNIB      GETNIB(MANTIS,ZROFLG,AMTBUF[I])
                 ;                       ( A    ,PSW:Z , @B      )
0D25 FE 0A        CPI  10          IF MANTIS .GE. 10
                 ;                   NON BCD CHAR IN MESSAGE
0D27 D0           RNC                PROERR(ERRFLG)
                 ;                 ELSE
0D28 C1           POP  B             CLEAN UP STACK
                 ;                   PUT MANTISSA IN SERVICE REGISTER
0D29 4B           MOV  C,E           C = OFFSET, SRVREG[0]
0D2A CD EE 0F     CALL PUTNIB        PUTNIB(SRVREG[0],MANTIS)
                 ;                         ( @C       , A    )
                 ;                         ( 0        , I    )
                 ;                   PUT EXPONENT IN SERVICE REGISTER
0D2D 0C           INR  C             C = OFFSET, SRVREG[1]
0D2E 7D           MOV  A,L           A = EXPONT
0D2F CD EE 0F     CALL PUTNIB        PUTNIB(SRVREG[1],EXPONT)
                 ;                         ( @C       , A    )
                 ;                         ( 0        , I    )
0D32 0C           INR  C             PSW:Z = ERRFLG = FALSE
                 ;                 ENDIF
0D33 C9           RET              RETURN
                 ;SRVREQ(SRVVAL,SRVHDR,ERRFLG)(WORK1 ,WORK2 ,DIEDCM)
                 ;      (NIBSTR,BYTE  ,BIT   )(NIBSTR,NIBSTR,BYTE  )
                 ;      ( I    , I    , 0    )( 0    , 0    , I    )
                 ;      ( @B   , C    ,PSW:Z )( RAM  , RAM  , RAM  )
                 ;      ( NC   , C    , C    )( C    , C    , NC   )
                 ;
                 ;PSW DESTROYED
                 ;REGISTERS DESTROYED
                 ;
                 ;EXPAND COMPRESSED SERVICE REGISTER TO WORK BUFFER.
                 ;CALL VALREQ TO BUILD MESSAGE IN XMTBUF.
                 ;
                 SRVREQ;           ****ENTRY POINT
                 ;                 CLEAR WORK AREA
0D34 3E C0        MVI A,WORK1      A = OFFSET, WORK1
0D36 CD 85 0E     CALL CLRBLK      CLRBLK(WORK1)
                 ;                       ( @A  )
                 ;                       ( 0   )
0D39 21 6A 74     LXI  H,(WORK2+4)/2+X
                 ;                 HL = ADDRESS, WORK2[4..5]
0D3C 71           MOV  M,C         WORK2[4..5] = SRVHDR
0D3D 0E C4        MVI  C,WORK1+4   C = OFFSET, WORK1[4]
                 ;                 MOVE MANTISSA INTO WORK AREA
0D3F 3E 01        MVI  A,1         A = NIBCNT = 1
0D41 CD B3 0F     CALL MVLNIB      MVLNIB(WORK1[4],SRVVAL[0],NIBCNT,PSW)
                 ;                       ( @C      , @B       , A    ,PSW)
                 ;                       ( 0       , I        , I    , 0 )
```

```
0D44 04          INR  B             B = OFFSET, SRVVAL[1]
                ;                   FETCH EXPONENT
0D45 CD 35 0F   CALL GETNIB         GETNIB(EXPONT,PSW,SRVVAL[1])
                ;                         ( A    ,PSW, @B      )
                ;                         ( O    , O , I       )
0D48 3C          INR  A             A = NIBCNT = EXPONT+1
0D49 07          RLC                B = FORMAT = HEX10*NIBCNT
0D4A 07          RLC
0D4B 07          RLC
0D4C 07          RLC
0D4D 47          MOV  B,A
0D4E 3A 35 74    LDA  DIEDCM/2+X    A = FORMAT = FORMAT+DIEDCM
0D51 80          ADD  B
0D52 2B          DCX  H             HL = ADDRESS, WORK2[2..3]
0D53 77          MOV  M,A           WORK2[2..3] = FORMAT
0D54 2B          DCX  H             HL = ADDRESS, WORK2[0..1]
0D55 36 C4       MVI  M,WORK1+4     WORK2[0..1] = OFFSET, WORK1[4]
0D57 EB          XCHG               DE = ADDRESS, WORK2[0..1]
                 ;                  PUT REPLY INTO TRANSMIT BUFFER
0D58 C3 5B 0D    JMP  VALREQ        VALREQ(WORK1[4],WORK2[2],WORK2[4],
                ;                         (@@DE+0  ,@DE+1   ,@DE+2   ,
                ;                         ( I      ,  I     ,  I     ,
                ;
                ;                         ERRFLG)
                ;                         PSW:Z )
                ;                          O     )
                ;                   RETURN
                ;VALREQ(SOURCE,VALFMT,ANSHDR,ERRFLG)(DIEDCM,DEPDCM,XMTBUF)
                ;      (NIBSTR,BYTE  ,BYTE  ,BYTE  )(BYTE  ,BYTE  ,NIBSTR)
                ;      ( I     , I    , I    , O    )( I    , I    , O     )
                ;      (@@DE+0, @DE+1, @DE+2,PSW:Z )( RAM  , RAM  , RAM   )
                ;      ( NC    , NC   , NC   , C    )( NC   , NC   , C     )
                ;
                ;PSW DESTROYED
                ;ALL REGISTERS DESTROYED
                ;
                ;BUILD VALUE REPLY MESSAGE IN TRANSMIT BUFFER
                ;
                VALREQ;             ****ENTRY POINT
                ;                   FETCH OFFSET OF SOURCE
0D5B EB          XCHG               HL = ADDRESS, (OFFSET, SOURCE[L=0])
0D5C 46          MOV  B,M           B = OFFSET, SOURCE[L=0]
                ;                   FETCH FORMAT TEMPLATE FOR MESSAGE
0D5D 23          INX  H             HL = ADDRESS, VALFMT
0D5E 7E          MOV  A,M           E = DECPOS = VALFMT[1]
0D5F E6 0F       ANI  0FH
0D61 5F          MOV  E,A
0D62 7E          MOV  A,M           D = NDIGIT = VALFMT[0]
0D63 AB          XRA  E
0D64 0F          RRC
0D65 0F          RRC
0D66 0F          RRC
0D67 0F          RRC
0D68 57          MOV  D,A
                ;                   FETCH HEADER FOR REPLY
0D69 23          INX  H             HL = ADDRESS, ANSHDR
0D6A 4E          MOV  C,M           C = ANSHDR
                ;                   SCAN FOR MOST SIGNIFICANT DIGIT
                VALR01;             DO WHILE SOURCE[L] .EQ. 0
0D6B CD 35 0F    CALL GETNIB          GETNIB(LDIGIT,ZROFLG,SOURCE[L])
                ;                           ( A    , PSW:Z, @B       )
                ;                           ( O    , O    , I        )
0D6E C2 78 0D    JNZ  VALR02
0D71 04          INR  B               B = OFFSET, SOURCE[L=L+1]
0D72 15          DCR  D               D = NDIGIT = NDIGIT-1
0D73 C2 6B 0D    JNZ  VALR01          IF NDIGIT .EQ. 0
0D76 14          INR  D                 D = NDIGIT = 1
0D77 05          DCR  B                 B = OFFSET, SOURCE[L=L-1]
                ;                       BREAK
                ;                     ENDIF
```

```
                  VALR02;              ENDDO
0D78 1C             INR  E             IF DECPOS .EQ. 0
0D79 1D             DCR  E
0D7A C2 9E 0D       JNZ  VALR05
                  ;                      METER CHARACTERISTCS WILL
                  ;                      DETERMINE FORMAT.
                  ;                      ADJUST VALUES SO THAT AT LEAST ONE
                  ;                      DIGIT WILL BE TO LEFT OF DECIMAL.
0D7D 2A 35 74       LHLD DIEDCM/2+X      L = DIEDCM
                  ;                      H = DEFDCM
0D80 5D             MOV  E,L             E = DECPOS = DIEDCM
0D81 7D             MOV  A,L             A = ADJUST = DIEDCM+1-NDIGIT
0D82 3C             INR  A
0D83 92             SUB  D
0D84 FA 8D 0D       JM   VALR03          IF ADJUST .GE. 0
0D87 6F             MOV  L,A               L = ADJUST
0D88 82             ADD  D                 D = NDIGIT = NDIGIT+ADJUST
0D89 57             MOV  D,A
0D8A 78             MOV  A,B               B = OFFSET, SOURCE[L=L-ADJUST]
0D8B 95             SUB  L
0D8C 47             MOV  B,A
                  VALR03;                ENDIF
                  ;                      SUPPRESS TRAILING ZERO IN THE
                  ;                      EVENT DIEDCM .GT. DEFDCM
0D8D C5             PUSH B               SAVE BC
0D8E 78             MOV  A,B             B = OFFSET, SOURCE[R=L+NDIGIT-1]
0D8F 82             ADD  D
0D90 3D             DCR  A
0D91 47             MOV  B,A
0D92 CD 35 0F       CALL GETNIB          GETNIB(RDIGIT,ZROFLG,SOURCE[R])
                  ;                            ( A     , PSW:Z, @B       )
                  ;                            ( 0     , 0    , I        )
0D95 C1             POP  B               B = SOURCE[L]
                  ;                      C = ANSHDR
0D96 C2 9E 0D       JNZ  VALR04          IF RDIGIT .EQ. 0
                  ;                        TRAILING ZERO IS PRESENT
0D99 7A             MOV  A,D               D = NDIGIT = NDIGIT+DEFDCM-DECPOS
0D9A 93             SUB  E
0D9B 84             ADD  H
0D9C 57             MOV  D,A
0D9D 5C             MOV  E,H               E = DECPOS = DEFDCM
                  VALR04;                ENDIF
                  VALR05;              ENDIF
                  ;                    CLEAR TRANSMIT BUFFER
0D9E 3E A0          MVI  A,XMTBUF      A = OFFSET, XMTBUF
0DA0 CD 85 0E       CALL CLRBLK        CLRBLK(XMTBUF)
                  ;                          ( @A     )
                  ;                          ( 0      )
                  ;                    BUILD MESSAGE IN TRANSMIT BUFFER
0DA3 7A             MOV  A,D           L = MSGSIZ = 2+(NDIGIT+1)/2
0DA4 B7             ORA  A
0DA5 1F             RAR
0DA6 CE 02          ACI  2
0DA8 6F             MOV  L,A
0DA9 61             MOV  H,C           H = ANSHDR
0DAA 22 50 74       SHLD XMTBUF/2+X    XMTBUF[0..1] = MSGSIZ
                  ;                    XMTBUF[2..3] = ANSHDR
0DAD 0E A4          MVI  C,XMTBUF+4    C = OFFSET, XMTBUF[4]
0DAF 7A             MOV  A,D           A = NDIGIT
0DB0 CD EE 0F       CALL PUTNIB        PUTNIB(XMTBUF[4],NDIGIT)
                  ;                          ( @C       , A     )
                  ;                          ( 0        , I     )
0DB3 0C             INR  C             C = OFFSET, XMTBUF[5]
0DB4 7B             MOV  A,E           A = DECPOS
0DB5 CD EE 0F       CALL PUTNIB        PUTNIB(XMTBUF[5],DECPOS)
                  ;                          ( @C       , A     )
                  ;                          ( 0        , I     )
0DB8 0C             INR  C             C = OFFSET, XMTBUF[I=6+(NDIGIT.MOD.2)]
0DB9 7A             MOV  A,D
0DBA E6 01          ANI  1
0DBC 81             ADD  C
```

```
ODBD 4F         MOV  C,A
ODBE 7A         MOV  A,D               A = NDIGIT
ODBF CD B3 OF   CALL MVLNIB            MVLNIB(XMTBUF[I],SOURCE[L],NDIGIT,
               ;                              ( @C      , @B      , A     ,
               ;                              ( O       ,  I      , I     ,
               ;
               ;                               NONBCD,ZROFLG)
               ;                               PSW:S ,PSW:Z )
               ;                                O    , O     )
ODC2 FA A1 OB   JM   PROERR            IF NONBCD .EQ. TRUE
               ;                          PROCESS ERROR
               ;                          PROERR(ERRFLG)
               ;                                 ( A    )
               ;                                 ( O    )
               ;                          RETURN
               ;                       ELSE
ODC5 OC         INR  C                    PSW:Z = ERRFLG = FALSE
ODC6 C9         RET                       RETURN
               ;                       ENDIF
               ;XEQHDR(HEADER,ERRFLG)(DBUF  ,XMTBUF,NORFLG)
               ;      (BYTE  ,BIT   )(NIBSTR,NIBSTR,BITSTR)
               ;      ( I    , O    )( I/O  , I     , O     )
               ;      ( A    ,PSW:Z )( RAM  , RAM   , RAM   )
               ;      ( NC   , C    )( C    , NC    , C     )
               ;
               ;PSW = DESTROYED
               ;
               ;SUPERVISES THE EXECUTION OF INTERNALLY GENERATED HEADERS
               ;
               XEQHDR;                 ****ENTRY POINT
ODC7 E5         PUSH H                 SAVE HL
ODC8 D5         PUSH D                 SAVE DE
ODC9 C5         PUSH B                 SAVE BC
ODCA 47         MOV  B,A               B = HEADER
               ;                       STOP TIMER
ODCB CD 34 01   CALL STPTMR            STPTMR(WASOFF)
               ;                             (PSW:Z )
               ;                             ( O    )
ODCE 3A 40 74   LDA  DBUF/2+X          A = DBUF[O..1]
ODD1 B7         ORA  A                 PSW:Z = DBUF[O..1] .EQ. O
ODD2 78         MOV  A,B               A = HEADER
ODD3 C2 E7 OD   JNZ  XEQH02            IF DBUF[O..1] .EQ. O
               ;                         DISPLAY HAS KEYENTERED DATA
ODD6 FE C4      CPI  HSETDA              IF(HEADER .LT .O) .AND.
               ;                           (HEADER .NE. HSETDA)
ODD8 CA E7 OD   JZ   XEQH01
ODDB B7         ORA  A
ODDC F2 E7 OD   JP   XEQH01
               ;                           PROCESS HEADER WITH DATA IN DBUF
ODDF 06 82      MVI  B,DBUF+2              B = OFFSET, DBUF[2]
ODE1 CD 41 09   CALL HDRPLS                HDRPLS(HEADER,DBUF[2],ERRFLG)
               ;                                 ( A     , @B     ,PSW:Z)
               ;                                 ( I     , I      , O    )
ODE4 C3 EA OD   JMP  XEQH03
               XEQH01;                   ELSE
               ;                           PROCESS HEADER WITHOUT DATA
               ;                           HDRONY(HEADER,ERRFLG)
               ;                                 ( A     ,PSW:Z)
               ;                                 ( I     , O    )
               ;                         ENDIF
               XEQH02;                 ELSE
               ;                         PROCESS HEADER WITHOUT DATA
ODE7 CD D5 08   CALL HDRONY              HDRONY(HEADER,ERRFLG)
               ;                               ( A     ,PSW:Z)
               ;                               ( I     , O    )
               XEQH03;                 ENDIF
ODEA CA 11 OE   JZ   XEQH07            IF ERRFLG .EQ. FALSE
ODED F5         PUSH PSW                 SAVE A, PSW
ODEE 3A 50 74   LDA  XMTBUF/2+X          A = BYTCNT = XMTBUF[O..1]
ODF1 B7         ORA  A                   PSW:Z = BYTCNT .EQ. O
```

```
                     ;                       PSW:CY = 0
0DF2 CA 02 0E     JZ   XEQH04          IF BYTCNT .NE. 0
                     ;                         CONVERT BYTE COUNT TO NIBBLE COUNT
0DF5 17           RAL                          A = NIBCNT = 2*BYTCNT
0DF6 01 80 A2     LXI  B,(XMTBUF+2)*100H+DBUF
                     ;                         B = OFFSET, XMTBUF[2]
                     ;                         C = OFFSET, DBUF[0]
                     ;                         MOVE DATA INTO DBUF
0DF9 CD B3 0F     CALL MVLNIB                  MVLNIB(DBUF[0],XMTBUF[2],NIBCNT)
                     ;                                ( @C    , @B       , A    )
                     ;                                ( 0     , I        , I    )
0DFC CD 5A 05     CALL VALDSP                  MOVE DBUF INTO DISPLAY
0DFF C3 10 0E     JMP  XEQH06
                  XEQH04;                      ELSE
                     ;                         BYTCNT .EQ. 0
                     ;                         COMMAND AFFECTED STATUS ONLY
0E02 3A 40 74     LDA  DBUF/2+X                IF DBUF[0..1] = HEX00
0E05 B7           ORA  A
0E06 C2 10 0E     JNZ  XEQH05
                     ;                            KEYENTERED DISPLAY UNCHANGED
                     ;                            QUE POSTAGE REQUEST
0E09 21 26 74     LXI  H,NORFLG/2+X               HL = ADDRESS, NORFLG
0E0C 7E           MOV  A,M                        NORFLG.QUEPOS = TRUE
0E0D F6 40        ORI  40H
0E0F 77           MOV  M,A
                  XEQH05;                       ENDIF
                  XEQH06;                      ENDIF
0E10 F1           POP  PSW                     A = HEADER
                     ;                         PSW:Z = ERRFLG
                  XEQH07;                    ENDIF
0E11 C1           POP  B                     RESTORE BC
0E12 D1           POP  D                     RESTORE DE
0E13 E1           POP  H                     RESTORE HL
0E14 C9           RET                        RETURN
                  ;XMIT()(SID,SOD,SOE,XMTBUF,NORFLG)
                  ;      (BIT,BIT,BIT,BYTSTR,BYTSTR)
                  ;      ( I , 0 , 0 , I/O  , I     )
                  ;      (RIM,SIM,SIM, RAM  , RAM   )
                  ;      ( NC, C , C , C    , NC    )
                  ;
                  ;REGISTERS DESTROYED
                  ;PSW DESTROYED
                  ;
                  ;ATTEMPT TO TRANSMIT MESSAGE IN XMTBUF.
                  ;ONE ATTEMPT ONLY.  XMTBUF[0], THE MESSAGE BYTE COUNT,
                  ;IS CLEARED WHETHER OR NOT THE MESSAGE IS ACTUALLY SENT.
                  ;XMTBUF[0] IS ASSUMED .GT. 0, AND .LE. 7 ON ENTRY.
                  ;
                  XMIT;                      ****ENTRY POINT
                     ;                       FETCH BYTE COUNT OF OUTBOUND MESSAGE
0E15 21 50 74     LXI  H,XMTBUF/2+X          HL =  ADDRESS, XMTBUF[N=0]
0E18 4E           MOV  C,M                   C = BYTCNT = XMTBUF[N]
                     ;                       CANCEL MSG BY CLEARING XMTBUF[0]
0E19 36 00        MVI  M,0                   XMTBUF[N] = 0
0E1B 3A 26 74     LDA  NORFLG/2+X            IF NORFLG.COMDSB .EQ. TRUE
0E1E E6 04        ANI  4
                     ;                          COMMUNICATIONS ARE DISABLED
0E20 C0           RNZ                           RETURN
                     ;                       ENDIF
                     ;                       STOP TIMER
0E21 CD 34 01     CALL STPTMR                STPTMR(WASOFF)
                     ;                             (PSW:Z )
                     ;                             ( 0    )
0E24 E5           PUSH H                     SAVE HL
0E25 C5           PUSH B                     SAVE BC
0E26 CD C7 0B     CALL RECEVE                IF INCOMING RTS IS PRESENT
                     ;                          RECEIVE MESSAGE
                     ;                       ENDIF
0E29 3E C0        MVI  A,0C0H                SIM.SOD = RTS = 1
```

```
                    ;                   SIM.SOE = ENABLD = 1
0E2B 30              SIM                OUTPUT RTS
0E2C C1              POP  B             RESTORE BC
0E2D E1              POP  H             RESTORE HL
0E2E 16 D9           MVI  D,217         D = COUNT ;FOR T13 = 3.509 MSEC
                    XMIT01;             DO UNTIL BIT .EQ. CTS
0E30 15              DCR  D               COUNT = COUNT-1
0E31 CA 7B 0E        JZ   XMIT06          IF COUNT+1 .EQ. 0
                    ; >>JUMP AHEAD<<        TIMEOUT HAS OCCURRED
                    ;                       QUIT
                    ;                     ENDIF
0E34 20              RIM                  INPUT BIT
                    ;                     A.0 = BIT = RIM.SID ;CTS OR IDLE
0E35 B7              ORA  A               CHECK BIT
0E36 F2 30 0E        JP   XMIT01
                    ;                   ENDDO

                    XMIT03;             DO UNTIL BYTCNT .EQ. 0
                    ;                     DEFINE STOP BIT
0E39 3E 01           MVI  A,1             IF 1 .LT. BYTCNT
0E3B B9              CMP  C
                    ;                       THIS IS NOT LAST BYTE
                    ;                       PSW:CY = STOP = EOB = 1
                    ;                     ELSE
                    ;                       THIS IS THE LAST BYTE
                    ;                       PSW:CY = STOP = EOM = 0
                    ;                     ENDIF
0E3C 23              INX  H               HL = ADDRESS, XMTBUF[N=N+1]
0E3D 3E 12           MVI  A,18            DELAY ;FOR T4 = 178.234 USEC
0E3F 3D              DCR  A
0E40 F2 3F 0E        JP   $-1
                    ;                     SET TO OUTPUT 9 BITS FROM LOOP
                    ;                     8 DATA, AND 1 EOB OR EOM
0E43 06 0A           MVI  B,9+1           BITCNT = 10 = 9+1
0E45 3E 40           MVI  A,40H           SIM.SOD = START = 0
                    ;                     SIM.SOE = ENABLD = 1
0E47 57              MOV  D,A             D.0 = OUTBIT = START
0E48 30              SIM                  OUTPUT = START
                    ;                     LOAD 8 DATA BITS
0E49 7E              MOV A,M              A = XMTBUF[N]
                    ;                     SAVE 8 DATA BITS AND 1 STOP BIT
0E4A F5              PUSH PSW

                    XMIT04;               LOOP ;BREAK IF BITCNT .EQ. 0
0E4B 3E 06           MVI  A,6               DELAY ;BIT PERIOD = 103.923 USEC
0E4D 3D              DCR  A
0E4E F2 4D 0E        JP   $-1
0E51 F0              RP
0E52 F1              POP  PSW               GET NEXT BIT
0E53 1F              RAR                    PSW.CY = OUTBIT
0E54 F5              PUSH PSW
0E55 3E 80           MVI  A,80H             PSW:CY,A = SIM*2
0E57 1F              RAR                    A = SIM
                    ;                       SIM.SOD = OUTBIT
                    ;                       SIM.SOE = ENABLD = 1
0E58 5A              MOV  E,D               E.0 = PRVBIT = OUTBIT
0E59 57              MOV  D,A               D.0 = OUTBIT
0E5A 05              DCR  B                 BITCNT = BITCNT-1
                    ;                       IF BITCNT .EQ. 0
0E5B CA 68 0E        JZ   XMIT05              BREAK
                    ;                       ENDIF
0E5E 30              SIM                    OUTPUT OUTBIT
0E5F 20              RIM                    READ ECHO
                    ;                       A.0 = ECHO = RIM.SID
0E60 AB              XRA  E                 IF ECHO .NE. PRVBIT
0E61 F2 4B 0E        JP   XMIT04
0E64 F1              POP  PSW                 CLEAN UP STACK
0E65 C3 7B 0E        JMP  XMIT06              QUIT
                    ; >>JUMP AHEAD<<
                    ;                       ENDIF
```

```
                XMIT05;               ENDLOOP
0E68 F1           POP  PSW            CLEAN UP STACK
0E69 20           RIM                 READ ECHO
                ;                     A.0 = ECHO = RIM.SID
0E6A AB           XRA  E              IF ECHO .NE. STOP
0E6B FA 7B 0E     JM   XMIT06           QUIT
                ; >>JUMP AHEAD<<
                ;                     ENDIF
0E6E 0D           DCR  C              C = BYTCNT = BYTCNT-1
0E6F C2 39 0E     JNZ  XMIT03
                ;                   ENDDO

0E72 3E C0        MVI  A,0C0H       SIM.SOD = ACK = 1
                ;                   SIM.SOE = ENABLD = 1
0E74 30           SIM               OUTPUT ACK
0E75 16 29        MVI  D,41         DELAY ;T7 = 336.914 USEC
0E77 15           DCR  D
0E78 F2 77 0E     JP   $-1
                XMIT06;             >>TARGET OF JUMP AHEAD<<
                ;                   QUIT XMIT ROUTINE
0E7B 3E 40        MVI  A,40H        SIM.SOD = IDLE = 0
                ;                   SIM.SOE = ENABLD = 1
0E7D 30           SIM               OUTPUT IDLE
0E7E 16 C8        MVI  D,200        DELAY ;T14 = 1606.908 USEC
0E80 15           DCR  D
0E81 F2 80 0E     JP   $-1
0E84 C9           RET               RETURN
                ;CLRBLK(BLOCK )
                ;      (NIBSTR)
                ;      ( O    )
                ;      ( @A   )
                ;      ( C    )
                ;
                ;PSW:S, Z, P, CY = NO CHANGE
                ;
                ;CLEAR A 16 NIBBLE BLOCK TO ZEROS
                ;BLOCK[0..15] = 0
                ;
                CLRBLK;            ****ENTRY POINT
0E85 F5           PUSH PSW         SAVE A, PSW
0E86 C5           PUSH B           SAVE BC
0E87 4F           MOV  C,A         C = OFFSET, BLOCK
0E88 AF           XRA  A           A = NIBVAL = 0
0E89 06 10        MVI  B,16        B = NIBCNT = 16
0E8B C3 26 0F     JMP  FILN01      FILNIB(BLOCK,NIBVAL,NIBCNT)
                ;                         ( @C   , A     , B    )
                ;                         ( O    , I     , I    )
                ;                  RESTORE BC
                ;                  RESTORE A, PSW
                ;                  RETURN
                ;CMPARE(MINUEN,SUBTRA,NNIB ,SGNFLG,ZROFLG)
                ;      (NIBSTR,NIBSTR,BYTE ,BIT   ,BIT   )
                ;      ( I    , I    , I   , O    , O    )
                ;      ( @D   , @E   , A   ,PSW:S ,PSW:Z )
                ;      ( NC   , NC   , NC  , C    , C    )
                ;
                ;PSW:CY = NO CHANGE
                ;PSW:S, Z, P CHANGED
                ;
                ;COMPARE EQUAL LENGTH BCD NIBBLE STRINGS
                ;
                CMPARE;            ****ENTRY POINT
0E8E E5           PUSH H           SAVE HL
0E8F F5           PUSH PSW         SAVE A, PSW
0E90 C5           PUSH B           SAVE BC
0E91 D5           PUSH D           SAVE DE
0E92 67           MOV  H,A         H = COUNT = NNIB
                CMPAR1;            DO WHILE COUNT .GT. 0
0E93 25           DCR  H             H = COUNT-1
0E94 FA A9 0E     JM   CMPAR2
```

```
0E97 43         MOV  B,E            B = OFFSET,
                ;                     SUBTRA[SINDEX = NNIB-COUNT]
0E98 CD 35 0F   CALL GETNIB         GETNIB(SDIGIT,ZERO ,SUBTRA[SINDEX])
                ;                           ( A     ,PSW:Z, @B          )
                ;                           ( O     , O   , I           )
0E9B 4F         MOV  C,A            C = SDIGIT
0E9C 42         MOV  B,D            B = OFFSET,
                ;                     MINUEN[MINDEX = NNIB-COUNT]
0E9D CD 35 0F   CALL GETNIB         GETNIB(MDIGIT,ZERO ,MINUEN[MINDEX])
                ;                           ( A     ,PSW:Z, @B          )
                ;                           ( O     , O   , I           )
0EA0 91         SUB  C              A = DIFRNC = MDIGIT-SDIGIT
0EA1 C2 A9 0E   JNZ  CMPAR2         IF DIFRNC .NE. 0
                ;                     BREAK
                ;                   ENDIF
0EA4 1C         INR  E              E = OFFSET,
                ;                     SUBTRA[SINDEX = NNIB-(COUNT-1)]
0EA5 14         INR  D              D = OFFSET,
                ;                     MINUEN[MINDEX = NNIB-(COUNT-1)]
                ;                   H = COUNT = COUNT-1
0EA6 C3 93 0E   JMP  CMPAR1
               CMPAR2;             ENDDO
0EA9 D1         POP  D              RESTORE DE
0EAA C1         POP  B              RESTORE BC
                ;                   IF NNIB .EQ. 0
0EAB 67         MOV  H,A              H = DIFRNC = NNIB = 0
                ;                   ELSE
                ;                     H = DIFRNC
                ;                   ENDIF
0EAC F1         POP  PSW            RESTORE A, PSW:CY
                ;                   OUTPUT PSW:S = SGNFLG
                ;                   OUTPUT PSW:Z = ZROFLG
0EAD 24         INR  H
0EAE 25         DCR  H
0EAF E1         POP  H              RESTORE HL
0EB0 C9         RET                 RETURN
               ;CRC(BLOCK ,NIBCNT,CRCVAL)
               ;   (NIBSTR,UBYTE ,UBYTE )
               ;   ( I    , I    , O    )
               ;   ( @C   , B    , D    )
               ;   ( NC   , NC   , C    )
               ;
               ;PSW = NO CHANGE
               ;
               ;COMPUTE CRC FOR BLOCK OF NIBCNT NIBBLES
               ;
               CRC;                ****ENTRY POINT
0EB1 C5         PUSH B              SAVE BC
0EB2 F5         PUSH PSW            SAVE A, PSW
0EB3 78         MOV  A,B            A = NIBCNT
0EB4 41         MOV  B,C            B = OFFSET, BLOCK[N = 0]
0EB5 4F         MOV  C,A            C = NIBCNT
0EB6 16 FF      MVI  D,0FFH         D = CRCVAL = HEXFF
               CRC1;               DO UNTIL NIBCNT = 0
0EB8 CD 35 0F   CALL GETNIB           GETNIB(NIBVAL,ZERO ,BLOCK[N])
                ;                           ( A     ,PSW:Z, @B     )
                ;                           ( O     , O   , I      )
0EBB CD C6 0E   CALL CRCNIB           CRCNIB(NIBVAL,CRCVAL)
                ;                           ( A     , D     )
                ;                           ( I     , I/O   )
0EBE 04         INR  B                B = OFFSET, BLOCK[N = N+1]
0EBF 0D         DCR  C                NIBCNT = NIBCNT-1
0EC0 C2 B8 0E   JNZ  CRC1
                ;                   ENDDO
0EC3 F1         POP  PSW            RESTORE A, PSW
0EC4 C1         POP  B              RESTORE BC
0EC5 C9         RET
```

```
                ;CRCNIB(NIBVAL,CRCVAL)
                ;      (BYTE  ,BYTE  )
                ;      ( I    , I/O  )
                ;      ( A    , D    )
                ;      ( NC   , C    )
                ;
                ;PSW DESTROYED
                ;
                ;INCLUDE NIBBLE INTO DEVELOPING VALUE OF CRC
                ;
                CRCNIB;                ****ENTRY POINT
0EC6 C5           PUSH B               SAVE BC
0EC7 06 04        MVI  B,4             B = BITCNT = 4
                ;                      SHIFT BITS TO HIGH ORDER OF NIBVAL
0EC9 07           RLC                  A = NIBVAL = NIBVAL*HEX10
0ECA 07           RLC
0ECB 07           RLC
0ECC 07           RLC
                ;                      ROTATE NIBVAL ONE BIT AT A TIME
                ;                      BACK INTO ITS ORIGINAL FORM WHILE
                ;                      MODIFYING CRCVAL TO REFLECT
                ;                      THE BIT'S VALUE
                CRCNI1;                DO UNTIL BITCNT .EQ. 0
0ECD 07           RLC                    CY = NIBBIT
                ;                        A = NIBVAL = ((NIBVAL*2) .AND.
                ;                            HEXFF)+NIBBIT
0ECE 4F           MOV  C,A               C = NIBVAL
0ECF 7A           MOV  A,D               A = CRCVAL
0ED0 17           RAL                    CY = CRCBIT
                ;                        A = CRCVAL = ((CRCVAL*2) .AND.
                ;                                HEXFF)+NIBBIT
0ED1 D2 D6 0E     JNC  CRCNI2            IF CRCBIT = 1
0ED4 EE 9B        XRI  9BH                 A = CRCVAL = CRCVAL .XOR. HEX9B
                CRCNI2;                  ENDIF
0ED6 57           MOV  D,A               D = CRCVAL
0ED7 79           MOV  A,C               A = NIBVAL
0ED8 05           DCR  B                 B = BITCNT = BITCNT-1
0ED9 C2 CD 0E     JNZ  CRCNI1
                ;                      ENDDO
0EDC C1           POP  B               RESTORE BC
0EDD C9           RET                  RETURN
                ;DBLANK()(PORTA )
                ;         (BITSTR)
                ;         ( I/O  )
                ;         ( 7001 )
                ;         ( C    )
                ;
                ;REGISTERS DESTROYED
                ;PSW DESTROYED
                ;
                ;DISPLAY BLANKING ROUTINE
                ;
                DBLANK;                ****ENTRY POINT
                ;                      PREVENT INTERRUPT DISPLAY REFRESH
0EDE CD 34 01     CALL STPTMR          STPTMR(WASOFF)
                ;                            (PSW:Z )
                ;                            ( 0    )
                ;                      FLUSH POSSIBLE NOISE OUT OF DISPLAY
0EE1 CD F6 0E     CALL DFLUSH          DFLUSH(ADDRESS,PORTA)
                ;                            ( HL    , @HL )
                ;                            ( 0     -     )
                ;                      (PORTA .AND HEXOF) .EQ. HEXOF, FOR
                ;                      3 DARK BITS AND IDLE DISPLAY CLOCK
0EE4 7E           MOV  A,M
0EE5 E6 F1        ANI  0F1H
0EE7 77           MOV  M,A             PORTA = PORTA .AND. HEXF1, FOR
                ;                      3 START BITS AND IDLE DISPLAY CLOCK
0EE8 35           DCR  M               PULSE DISPLAY CLOCK
```

```
0EE9 34          INR  M
                ;                          SET TO OUTPUT 35*3 DARK BITS
0EEA F6 0F       ORI  0FH
0EEC 77          MOV  M,A                  PORTA = PORTA .OR. HEX0F, FOR
                ;                          3 DARK BITS AND IDLE DISPLAY CLOCK
0EED 3E 22       MVI  A,34                 A = COUNT = 34
                DBLAN1;                    ****ALTERNATE ENTRY POINT
                DBLAN2;                    DO UNTIL COUNT .LT. 0
0EEF 35          DCR  M                      PULSE DISPLAY CLOCK
0EF0 34          INR  M
0EF1 3D          DCR  A                      A = COUNT = COUNT-1
0EF2 F2 EF 0E    JP   DBLAN2
                ;                          ENDDO
0EF5 C9          RET
                ;DFLUSH(ADDRES)(PORTA )
                ;      (ADDRES)(BITSTR)
                ;      ( O    )( I/O  )
                ;      ( HL   )( 7001 )
                ;      ( C    )( C    )
                ;
                ;REGISTERS DESTROYED
                ;PSW DESTROYED
                ;
                ;FLUSH POSSIBLE NOISE OUT OF DISPLAY SHIFT REGISTER
                ;
                DFLUSH;                    ****ENTRY POINT
0EF6 21 01 70    LXI  H,PORTA              HL = ADDRESS, PORTA
0EF9 7E          MOV  A,M
0EFA F6 0F       ORI  0FH
0EFC 77          MOV  M,A                  PORTA = PORTA .OR. HEX0F, FOR
                ;                          3 DARK BITS AND IDLE DISPLAY CLOCK
                ;                          CLOCK 36*3 DARK BITS INTO DISPLAY
0EFD 3E 23       MVI  A,35                 A = COUNT = 35
0EFF C3 EF 0E    JMP  DBLAN1
                ;                          RETURN
                ;DSBKBD()(KDCTRL,CHRBKT,CTLBKT)
                ;        (BITSTR,BYTE  ,BYTE  )
                ;        ( O    , O    , O    )
                ;        ( RAM  , RAM  , RAM  )
                ;        ( C    , C    , C    )
                ;
                ;PSW:S, Z, P, CY = NO CHANGE
                ;
                ;DISABLE KEYBOARD
                ;
                DSBKBD;                    ****ENTRY POINT
0F02 F5          PUSH PSW                  SAVE A, PSW
                ;                          PREVENT KDIO FROM SCANNING KEYBOARD
0F03 3A 27 74    LDA  KDCTRL/2+X           KDCTRL.KBDDSB = TRUE
0F06 F6 01       ORI  01H
0F08 32 27 74    STA  KDCTRL/2+X
                ;                          CLEAR OUTPUT OF DBOUNCE ROUTINE
0F0B AF          XRA  A                    CHRBKT = HEX00
0F0C 32 2C 74    STA  CHRBKT/2+X
0F0F 32 2B 74    STA  CTLBKT/2+X           CTLBKT = HEX00
0F12 F1          POP  PSW                  RESTORE A, PSW
0F13 C9          RET                       RETURN
                ;ENAKBD()(KEYBKT,KDCTRL)
                ;        (BYTE  ,BITSTR)
                ;        ( O    , O    )
                ;        ( RAM  , RAM  )
                ;        ( C    , C    )
                ;
                ;PSW:S, Z, P, CY = NO CHANGE
                ;
                ;ENABLE KEYBOARD
                ;
                ENAKBD;                    ****ENTRY POINT
0F14 F5          PUSH PSW                  SAVE A, PSW
```

```
                     ;                  FORCE KDIO TO RESYNC KEYBOARD SCAN
0F15 3E 80            MVI  A,MULKEY     KEYBKT = MULKEY
0F17 32 2A 74         STA  KEYBKT/2+X
                     ;                  ALLOW KDIO TO SCAN KEYBOARD
0F1A 3A 27 74         LDA  KDCTRL/2+X   KDCTRL.KDBDSB = FALSE
0F1D E6 FE            ANI  0FEH
0F1F 32 27 74         STA  KDCTRL/2+X
0F22 F1               POP  PSW          RESTORE A, PSW
0F23 C9               RET               RETURN
                     ;FILNIB(DEST   ,NIBVAL,NIBCNT)
                     ;      (NIBSTR,BYTE  ,UBYTE )
                     ;      ( O    , I    , I    )
                     ;      ( @C   , A    , B    )
                     ;      ( C    , NC   , NC   )
                     ;
                     ;PSW:S, Z, P, CY = NO CHANGE
                     ;
                     ;FILL A NIBBLE STRING WITH A VALUE
                     ;DEST[0..NIBCNT-1] = NIBVAL
                     ;
                     FILNIB;            ****ENTRY POINT
0F24 F5                PUSH PSW         SAVE A, PSW
0F25 C5                PUSH B           SAVE BC
                     FILN01;            ****SPECIAL JUMP ENTRY
                     ;                  C = OFFSET, DEST[N = 0]
                     ;                  FILL NIBCNT NIBBLES IN DEST WITH NIBVAL
0F26 04                INR  B           CONDITION NIBCNT FOR DO WHILE
                     FILN02;            DO WHILE NIBCNT .NE. 0
0F27 05                DCR  B              B = NIBCNT-1
0F28 CA 32 0F          JZ   FILN03
                     ;                     PUT NIBVAL INTO DEST
0F2B CD EE 0F          CALL PUTNIB         PUTNIB(DEST[N],NIBVAL)
                     ;                            ( @C    , A     )
                     ;                            ( O     , I     )
                     ;                     POINT AT NEXT NIBBLE TO RIGHT
0F2E 0C                INR  C              C = OFFSET, DEST[N+1]
                     ;                     B = NIBCNT = NIBCNT-1
0F2F C3 27 0F          JMP  FILN02
                     FILN03;            ENDDO
0F32 C1                POP  B           RESTORE BC
0F33 F1                POP  PSW         RESTORE A, PSW
0F34 C9                RET              RETURN
                     ;GETNIB(NIBVAL,ZERO ,SOURCE)
                     ;      (BYTE  ,BIT  ,NIB   )
                     ;      ( O    , O   , I    )
                     ;      ( A    ,PSW:Z, @B   )
                     ;      ( C    , C   , NC   )
                     ;
                     ;PSW:CY = NO CHANGE
                     ;PSW:S, Z, P CHANGED; CORRESPOND TO VALUE OF NIBVAL
                     ;
                     ;FETCH HIGH ORDER 4 BIT VALUE FROM SOURCE[N=EVEN]
                     ;OR LOW ORDER 4 BIT VALUE FROM SOURCE[N=ODD],
                     ;AND PLACE IT IN LOW ORDER OF NIBVAL.
                     ;CLEAR HIGH ORDER OF NIBVAL.
                     ;NIBVAL = SOURCE[N],   ZERO = NIBVAL .EQ. 0
                     ;
                     GETNIB;            ****ENTRY POINT
0F35 E5                PUSH H           SAVE HL
0F36 F5                PUSH PSW         SAVE A, PSW
                     ;                  FLAG WHETHER L/O NIBBLE OF BYTE WANTED
0F37 AF                XRA  A           A = OFFSET, SOURCE[N]/2
0F38 78                MOV  A,B
0F39 1F                RAR
                     ;                  PSW:CY = ODD = TRUE, IF N = ODD
                     ;                  CALCULATE ADDRESS OF SOURCE
0F3A 26 74             MVI  H,X/100H    HL = ADDRESS, SOURCE[N]
0F3C 6F                MOV  L,A
                     GETN01;            ****SPECIAL JUMP ENTRY
```

```
                 ;             FETCH BYTE CONTAINING DESIRED NIBBLE
0F3D 7E           MOV  A,M     A = SOURCE[N]
                 ;             CHECK WHETHER NIBBLE IN HIGH ORDER
0F3E DA 45 0F     JC   GETNO2  IF ODD .EQ. FALSE
                 ;               MOVE H/O NIBBLE TO L/O
0F41 0F           RRC            A = SOURCE[N] = SOURCE[N]/HEX10
0F42 0F           RRC
0F43 0F           RRC
0F44 0F           RRC
                 GETNO2;       ENDIF
                 ;             CLEAR HIGH ORDER NIBBLE
0F45 E6 0F        ANI  0FH     H = NIBVAL = SOURCE[N] .AND. HEX0F
0F47 67           MOV  H,A
0F48 F1           POP  PSW     RESTORE PSW:CY
0F49 7C           MOV  A,H     A = NIBVAL
                 ;             INDICATE NIBVAL STATUS
0F4A 3C           INR  A       PSW:Z = ZERO = NIBVAL .EQ. 0
0F4B 3D           DCR  A
0F4C E1           POP  H       RESTORE HL
0F4D C9           RET          RETURN
                 ;LSTATE(FATMOD,NORMOD,SERMOD,PRVMOD)(MRSTS1,MRSTS2)
                 ;      (BIT   ,BIT   ,BIT   ,BIT   )(BITSTR,BITSTR)
                 ;      ( O    , O    , O    , O    )( I    , I    )
                 ;      (PSW:S ,PSW:Z ,PSW:P ,PSW:CY)(RAM   ,RAM   )
                 ;      ( C    , C    , C    , C    )( NC   , NC   )
                 ;
                 ;PSW:S = MINUS STATUS IF FATAL MODE
                 ;PSW:Z = ZERO STATUS IF NORMAL MODE
                 ;PSW:P = EVEN PARITY STATUS IF SERVICE MODE
                 ;PSW:CY= 1 IF PRIVILEGED MODE
                 ;
                 ;COPIES METER STATE FLAGS INTO PSW FOR EASY TESTING
                 ;
                 LSTATE;       ****ENTRY POINT
0F4E E5           PUSH H       SAVE HL
0F4F F5           PUSH PSW     H = A, SAVED FOR RETURN
0F50 E1           POP  H
0F51 3A 25 74     LDA  MRSTS2/2+X  L = MRSTS2.FATMOD + MRSTS2.PRVMOD
0F54 E6 81        ANI  81H         (PSW:S POS  ) , (PSW:CY POS )
0F56 6F           MOV  L,A
0F57 3A 24 74     LDA  MRSTS1/2+X  A = MRSTS1.SERMOD
0F5A E6 08        ANI  08H         (           )
0F5C 0F           RRC              (PSW:P POS  )
0F5D B5           ORA  L       A = FATMOD, PRVMOD, SERMOD
                 ;                 (PSW:S, PSW:CY, PSW:P)
0F5E C2 63 0F     JNZ  LSTAT1  IF NO STATUS BITS ARE SET
0F61 3E 40        MVI  A,40H     A = NORMOD
                 ;                 (PSW:Z)
                 LSTAT1;       ENDIF
0F63 6F           MOV  L,A     L = A = STATUS
0F64 E5           PUSH H       RESTORE A; PSW = STATUS
0F65 F1           POP  PSW
0F66 E1           POP  H       RESTORE HL
0F67 C9           RET          RETURN
                 ;MOVBIT(SOURCE,SBIT ,DEST  ,DBIT ,VALUE)
                 ;      (BITSTR,UBYTE,BITSTR,UBYTE,BIT  )
                 ;      ( I    , I   , O    , I   , O   )
                 ;      ( @H   , L   , @D   , E   ,PSW:Z)
                 ;      ( NC   , NC  , C    , NC  , C   )
                 ;
                 ;PSW:CY = NO CHANGE
                 ;PSW:S, Z, P CHANGED; CORRESPOND TO VALUE OF BIT
                 ;
                 ;MOVE BIT FROM BIT POSITION SBIT IN SOURCE TO BIT POSITION
                 ;DBIT IN DEST.  VALUE INDICATES WHETHER BIT IS 0 OR 1.
                 ;BIT 0 IS HIGH ORDER BIT OF STRING.
                 ;DEST[DBIT] = SOURCE[SBIT]
                 ;
                 MOVBIT;       ****ENTRY POINT
```

```
0F68 E5          PUSH H            SAVE HL
0F69 C5          PUSH B            SAVE BC
0F6A F5          PUSH PSW          SAVE A, PSW
0F6B D5          PUSH D            SAVE DE
                ;                  H = SRCOFS = OFFSET, SOURCE
                ;                  BUILD SOURCE ADDRESS AND MASK
0F6C CD 8A 0F    CALL MOVB01       MOVB01(SRCOFS,SBIT,SRCADR,SMASK)
                ;                        ( H    , L  , HL   , A   )
                ;                        ( I    , I  , O    , O   )
                ;                  HL = SRCADR = ADDRESS, SOURCE.SBIT
0F6F 47          MOV  B,A          B = SMASK
0F70 7E          MOV  A,M          PSW:CY = SOURCE.SBIT
0F71 A0          ANA  B
0F72 C6 FF       ADI  0FFH
                ;                  IF SOURCE.SBIT .NE. 0
0F74 9F          SBB  A              B = SRCBIT = HEXFF
0F75 47          MOV  B,A
                ;                  ELSE
                ;                    B = SRCBIT = HEX00
                ;                  ENDIF
0F76 E1          POP  H            H = DSTOFS = OFFSET, DEST
                ;                  L = DBIT
0F77 E5          PUSH H            RESAVE HL
                ;                  BUILD DESTINATION ADDRESS AND MASK
0F78 CD 8A 0F    CALL MOVB01       MOVB01(DSTOFS,DBIT,DSTADR,DMASK)
                ;                        ( H    , L  , HL   , A   )
                ;                        ( I    , I  , O    , O   )
                ;                  HL = DSTADR = ADDRESS, DEST.DBIT
0F7B 4F          MOV  C,A          C = DMASK
0F7C A0          ANA  B            B = DSTBIT = DMASK .AND. SRCBIT
0F7D 47          MOV  B,A
0F7E 79          MOV  A,C          A = DEST.DBIT = 0
0F7F 2F          CMA
0F80 A6          ANA  M
0F81 B0          ORA  B            DEST.DBIT = DEST.DBIT .OR. DSTBIT
0F82 77          MOV  M,A
0F83 D1          POP  D            RESTORE DE
0F84 F1          POP  PSW          RESTORE A, PSW:CY
0F85 04          INR  B            PSW:Z = DSTBIT .EQ. 0
0F86 05          DCR  B
0F87 C1          POP  B            RESTORE BC
0F88 E1          POP  H            RESTORE HL
0F89 C9          RET               RETURN
                ;MOVB01(NIBOFS,BITNO,BYTADR,MASK)
                ;      (OFFSET,UBYTE,ADDR  ,BYTE)
                ;      ( I    , I    , O    , O  )
                ;      ( H    , L    , HL   , A  )
                ;      ( C    , C    , C    , C  )
                ;
                ;PSW:S, Z, P, CY DESTROYED
                ;REGISTER DE DESTROYED
                ;
                ;CONVERT NIBBLE OFFSET AND BIT NUMBER INTO ADDRESS OF
                ;BYTE CONTAINING BIT.  A BIT SELECTION MASK IS ALSO
                ;PRODUCED
                ;
                MOVB01;            ****ENTRY POINT FOR MOVBIT ONLY
0F8A 7D          MOV  A,L          E = ((BITNO/4)+NIBOFS)/2
0F8B 1F          RAR
0F8C 1F          RAR
0F8D E6 2F       ANI  2FH
0F8F 84          ADD  H
0F90 1F          RAR
0F91 5F          MOV  E,A
0F92 7C          MOV  A,H          PSW:CY = NIBOFS .MOD. 2
0F93 1F          RAR
0F94 7D          MOV  A,L          A = BITNO
0F95 D2 9A 0F    JNC  MOVB02       IF PSW:CY .EQ. 1
                ;                    NIBOFS NOT ON BYTE BOUNDARY
```

```
0F98 DE 04      SBI  4              MAKE CORRECTION TO BITNO
               MOVB02;              ENDIF
0F9A E6 07      ANI  07H            A = BITNUM, WITHIN BYTE
0F9C 16 00      MVI  D,0            DE = ((BITNO/4)+NIBOFS)/2
0F9E 21 00 74   LXI  H,X            HL = BYTADR
0FA1 19         DAD  D
0FA2 E5         PUSH H              SAVE BYTADR
0FA3 5F         MOV  E,A            DE = BITNUM
0FA4 21 AB OF   LXI  H,MOVB03       HL = ADDRESS, MASK
0FA7 19         DAD  D
0FA8 7E         MOV  A,M            A = MASK
0FA9 E1         POP  H              HL = BYTADR
0FAA C9         RET                 RETURN
               ;
               MOVB03;              MASK TABLE
0FAB 80         DB   80H            0 BIT MASK; HIGH ORDER
0FAC 40         DB   40H            1
0FAD 20         DB   20H            2
0FAE 10         DB   10H            3
0FAF 08         DB   08H            4
0FB0 04         DB   04H            5
0FB1 02         DB   02H            6
0FB2 01         DB   01H            7 BIT MASK; LOW ORDER
               ;MVLNIB(DEST  ,SOURCE,NIBCNT,NONBCD,ZERO  )
               ;      (NIBSTR,NIBSTR,BYTE  ,BIT   ,BIT   )
               ;      ( O    , I    , I    , O    , O    )
               ;      ( @C   , @B   , A    ,PSW:S ,PSW:Z )
               ;      ( C    , NC   , NC   , C    , C    )
               ;
               ;PSW:CY = NO CHANGE
               ;PSW:S, Z, P CHANGED
               ;
               ;FOR A STRING ADDRESSED AT THE LEFT SIDE,
               ;FROM RIGHT TO LEFT MOVE NIBCNT NIBBLES FROM SOURCE TO
               ;DEST.  THE NONBCD AND ZERO FLAGS REFER TO THE LARGEST
               ;NIBBLE VALUE MOVED.
               ;DEST[0..NIBCNT-1] = SOURCE[0..NIBCNT-1]
               ;
               MVLNIB;                ****ENTRY POINT
0FB3 C5         PUSH B                SAVE  BC
               MVLN01;                ****SPECIAL JUMP ENTRY
0FB4 F5         PUSH PSW              SAVE A, PSW
0FB5 D5         PUSH D                SAVE DE
0FB6 3D         DCR  A                D = NIBCNT-1
0FB7 57         MOV  D,A
0FB8 80         ADD  B                B = OFFSET, SOURCE[N=NIBCNT-1]
0FB9 47         MOV  B,A
0FBA 7A         MOV  A,D              A = NIBCNT-1
0FBB 81         ADD  C                C = OFFSET, DEST[N=NIBCNT-1]
0FBC 4F         MOV  C,A
0FBD D1         POP  D                RESTORE DE
0FBE F1         POP  PSW              RESTORE A, PSW
0FBF C3 C3 OF   JMP  MVRN01           MVRNIB(DEST[N],SOURCE[N],NIBCNT,
               ;                             ( @C    , @B      , A    ,
               ;                             ( O     , I       , I    ,
               ;
               ;                             NONBCD,ZERO )
               ;                             PSW:S ,PSW:Z)
               ;                              O    , O    )
               ;                      RESTORE BC
               ;                      RETURN
               ;MVRNIB(DEST  ,SOURCE,NIBCNT,NONBCD,ZERO )
               ;      (NIBSTR,NIBSTR,BYTE  ,BIT   ,BIT   )
               ;      ( O    , I    , I    , O    , O    )
               ;      ( @C   , @B   , A    ,PSW:S ,PSW:Z)
               ;      ( C    , NC   , NC   , C    , C    )
               ;
               ;PSW:CY = NO CHANGE
               ;PSW:S, Z, P CHANGED
```

```
                  ;
                  ;FOR A STRING ADDRESSED AT THE RIGHT SIDE,
                  ;FROM RIGHT TO LEFT MOVE NIBCNT NIBBLES FROM SOURCE TO
                  ;DEST.  THE NONBCD AND ZERO FLAGS REFER TO THE LARGEST
                  ;NIBBLE VALUE MOVED.
                  ;DEST[1-NIBCNT..0] = SOURCE[1-NIBCNT..0]
                  ;
                  MVRNIB;             ****ENTRY POINT
0FC2 C5             PUSH B            SAVE BC
                  MVRN01;             ****SPECIAL JUMP ENTRY
0FC3 F5             PUSH PSW          SAVE A, PSW
0FC4 E5             PUSH H            SAVE HL
0FC5 67             MOV  H,A          H = NIBCNT
                  ;                   B = OFFSET, SOURCE[N=0]
                  ;                   C = OFFSET, DEST[N=0]
                  ;                   SET FLAGS FOR RETURN IF NIBCNT .LE. 0
0FC6 2E 00          MVI  L,0          L = FLAGV = 0; WHICH WILL PRODUCE:
                  ;                   PSW:Z = ZERO = TRUE
                  ;                   PSW:S = NONBCD = FALSE
                  ;                   MOVE NIBCNT NIBBLES
                  MVRN02;             DO WHILE NIBCNT .GT. 0
0FC8 25             DCR  H              H = NIBCNT-1
0FC9 FA E7 0F       JM   MVRN06
                  ;                     MOVE ONE NIBBLE
0FCC CD 35 0F       CALL GETNIB         GETNIB(NIBVAL,ZERO ,SOURCE[N])
                  ;                           ( A    ,PSW:Z, @B       )
                  ;                           ( 0    , 0   , I        )
0FCF CD EE 0F       CALL PUTNIB         PUTNIB(DEST[N],NIBVAL)
                  ;                           ( @C     , A     )
                  ;                           ( 0      , I     )
                  ;                     CHECK FOR NONZERO NIBBLE
0FD2 CA DB 0F       JZ   MVRN04         IF ZERO .EQ. FALSE
                  ;                       CHECK FOR NO PREVIOUS FLAGS
0FD5 2C             INR  L                IF FLAGV .EQ. 0
0FD6 2D             DCR  L
0FD7 C2 DB 0F       JNZ  MVRN03
0FDA 2C             INR  L                  L = FLAGV = 1
                  ;                         WHICH WILL PRODUCE:
                  ;                         PSW:Z = ZERO = FALSE
                  ;                         PSW:S = NONBCD = FALSE
                  MVRN03;                 ENDIF
                  MVRN04;               ENDIF
                  ;                     CHECK FOR NONBCD NIBBLE
0FDB FE 0A          CPI  10             IF NIBVAL .GE. 10
0FDD DA E2 0F       JC   MVRN05
0FE0 2E 80          MVI  L,80H            L = FLAGV = HEX80
                  ;                       WHICH WILL PRODUCE:
                  ;                       PSW:Z = ZERO = FALSE
                  ;                       PSW:S = NONBCD = TRUE
                  MVRN05;               ENDIF
                  ;                     MOVE INDICES FROM RIGHT TO LEFT
0FE2 05             DCR  B              B = OFFSET, SOURCE[N=N-1]
0FE3 0D             DCR  C              C = OFFSET.DEST[N=N-1]
                  ;                     H = NIBCNT = NIBCNT-1
0FE4 C3 C8 0F       JMP  MVRN02
                  MVRN06;             ENDDO
0FE7 4D             MOV  C,L          C = FLAGV
0FE8 E1             POP  H            RESTORE HL
0FE9 F1             POP  PSW          RESTORE A, PSW:CY
0FEA 0C             INR  C            PSW = STATUS, FLAGV
0FEB 0D             DCR  C
0FEC C1             POP  B            RESTORE BC
0FED C9             RET               RETURN
                  ;PUTNIB(DEST   ,NIBVAL)
                  ;      (NIBBLE,BYTE  )
                  ;      ( 0     , I    )
                  ;      ( @C    , A    )
                  ;      ( C     , NC   )
                  ;
                  ;PSW:S, Z, P, CY = NO CHANGE
                  ;
```

```
                ;INSERT LOW ORDER 4 BITS OF NIBVAL INTO DEST
                ;DEST = NIBVAL .AND. HEXOF
                ;
                PUTNIB;                 ****ENTRY POINT
0FEE E5           PUSH H                SAVE HL
0FEF C5           PUSH B                SAVE BC
0FF0 F5           PUSH PSW              SAVE A, PSW
                ;                       CLEAR H/O NIBBLE OF NIBVAL
0FF1 E6 0F        ANI  0FH              B = NIBVAL = NIBVAL .AND. HEX0F
0FF3 47           MOV  B,A
                ;                       FLAG WHETHER NIBBLE GOES INTO L/O
                ;                       OF BYTE CONTAINING DEST
0FF4 AF           XRA  A                PSW:CY = OFFSET, DEST .MOD. 2
0FF5 79           MOV  A,C
0FF6 1F           RAR
                ;                       A = (OFFSET, DEST)/2
0FF7 26 74        MVI  H,X/100H         HL = ADDRESS, DEST
0FF9 6F           MOV  L,A
                ;                       MAKE MASK TO CLEAR L/O OF BYTE
0FFA 0E F0        MVI  C,0F0H           C = MASK = HEXF0
                ;                       CHECK WHETHER NIBBLE GOES IN H/O
0FFC DA 07 10     JC   PUTN01           IF PSW:CY .EQ. 0
                ;                         MAKE MASK TO CLEAR H/O OF BYTE
0FFF 0E 0F        MVI  C,0FH              C = MASK = HEX0F
                ;                         SHIFT L/O NIBBLE OF NIBVAL TO H/O
1001 78           MOV  A,B                B = NIBVAL = NIBVAL * HEX10
1002 07           RLC
1003 07           RLC
1004 07           RLC
1005 07           RLC
1006 47           MOV  B,A
                PUTN01;                 ENDIF
                ;                       FETCH BYTE CONTAINING DEST
1007 7E           MOV  A,M              A = DEST
                ;                       MAKE HOLE IN BYTE FOR NIBBLE
1008 A1           ANA  C                A = DEST = 0
                ;                       PUT NIBBLE IN HOLE
1009 B0           ORA  B                DEST = NIBVAL
100A 77           MOV  M,A
100B F1           POP  PSW              RESTORE A, PSW
100C C1           POP  B                RESTORE BC
100D E1           POP  H                RESTORE HL
100E C9           RET                   RETURN
                ;RSCAN(SOURCE,NIBCNT,NONBCD,ZERO  )
                ;     (NIBSTR,BYTE  ,BIT   ,BIT   )
                ;     ( I    , I    , 0    , 0    )
                ;     ( @B   , A    ,PSW:S ,PSW:Z )
                ;     ( NC   , NC   , C    , C    )
                ;
                ;PSW:CY= NO CHANGE
                ;PSW:S, Z, P CHANGED
                ;
                ;FOR A STRING ADDRESSED AT THE RIGHT SIDE,
                ;FROM RIGHT TO LEFT SCAN NIBCNT NIBBLES.
                ;THE NONBCD AND ZERO FLAGS REFER TO THE LARGEST
                ;NIBBLE SCANNED.
                ;SCAN SOURCE[1-NIBCNT..0]
                ;
                RSCAN;                  ****ENTRY POINT
100F C5           PUSH B                SAVE BC
                ;                       SCAN BY MOVING SOURCE INTO ITSELF
1010 48           MOV  C,B              C = OFFSET, SOURCE
1011 C3 C3 0F     JMP  MVRN01           MVRNIB(SOURCE,SOURCE,NIBCNT,
                ;                              ( @C   , @B   , A    ,
                ;                              ( 0    , I    , I    ,
                ;
                ;                              NONBCD,ZERO  )
                ;                              PSW:S ,PSW:Z )
                ;                               0    , 0    )
                ;                       RESTORE BC
                ;                       RETURN
```

```
                ;TDBITM(SOURCE,BITCNT,DEST  ,DBIT  ,SBIT  )
                ;      (BITSTR,UBYTE ,BITSTR,UBYTE ,BYTSTR)
                ;      ( I    , I    , O    , I    , I    )
                ;      ( @H   , L    , @D   , E    , @BC  )
                ;      ( NC   , C    , C    , C    , NC   )
                ;
                ;REGISTERS DESTROYED
                ;PSW DESTROYED
                ;
                ;TABLE DRIVEN BIT MOVE ROUTINE.
                ;MOVES BITCNT BITS INTO DEST STARTING AT DEST.DBIT;
                ;THE SOURCE BITS ARE SOURCE.SBIT[0] THROUGH
                ;SOURCE.SBIT[BITCNT-1]
                ;
                TDBITM;                  ****ENTRY POINT
1014 7D           MOV  A,L               A = BITCNT = BITCNT+1
1015 3C           INR  A
                ;                        BC = ADDRESS, SBIT[N=0]
                TDBIT1;                  DO WHILE BITCNT .NE. 0
1016 3D           DCR  A                   A =  BITCNT = BITCNT-1
1017 C8           RZ
1018 F5           PUSH PSW                 SAVE A, PSW
1019 0A           LDAX B                   L = SBIT[N]
101A 6F           MOV  L,A
                ;                          MOVE BIT
101B CD 68 0F     CALL MOVBIT              MOVBIT(SOURCE,SBIT[N],DEST,DBIT,VALUE)
                ;                                 ( @H   , L     , @D , E  ,PSW:Z)
                ;                                 ( I    , I     , O  , I  , O   )
101E F1           POP  PSW                 A = BITCNT
101F 03           INX B                    BC = ADDRESS, SBIT[N=N+1]
1020 1C           INR  E                   E = DBIT = DBIT+1
1021 C3 16 10     JMP  TDBIT1
                ;                        ENDDO
                ;                        RETURN
                ;VCALL(RTNADR)
                ;     (ADDR  )
                ;     ( I    )
                ;     ( HL   )
                ;
                ;REGISTER AND STATUS CHANGES DEPEND ON ROUTINE @HL
                ;
                ;VECTOR CALL TO ROUTINE WHOSE ADDRESS IS IN HL
                ;
                VCALL;                   ****ENTRY POINT
1024 E9           PCHL                   GO TO ROUTINE @HL
                ;                        RETURN VIA RTS IN THAT ROUTINE
                ;VCALLS(RTNADR)
                ;      (ADDR  )
                ;      ( I    )
                ;      ( HL   )
                ;      ( NC   )
                ;
                ;PSW:S, Z, P, CY = NO CHANGE
                ;
                ;VECTOR CALL TO ROUTINE @HL
                ;
                VCALLS;                  ****ENTRY POINT
1025 C5           PUSH B                 SAVE ALL REGISTERS
1026 D5           PUSH D
1027 E5           PUSH H
1028 F5           PUSH PSW
                ;                        VECTOR CALL TO ROUTINE @HL
1029 CD 24 10     CALL VCALL             VCALL(RTNADR)
                ;                             ( HL   )
                ;                             ( I    )
                ;                        RESTORE ALL REGISTERS
102C F1           POP  PSW
102D E1           POP  H
102E D1           POP  D
```

```
102F C1          POP  B
1030 C9          RET
                ;NVM30F()(PORTA )
                ;        (BITSTR)
                ;        ( I/O  )
                ;        ( 7001 )
                ;        ( C    )
                ;
                ;REGISTERS NOT CHANGED
                ;PSW NOT CHANGED
                ;
                ;REMOVE 30 VOLTS FROM NONVOLATILE MEMORY TO DISABLE
                ;WRITING AND ERASING.
                ;
                NVM30F;                 ****ENTRY POINT
1031 F5           PUSH PSW              SAVE A,PSW
1032 C5           PUSH B                SAVE BC
                ;                       REMOVE 30 VOLTS FROM NVM
1033 3A 01 70     LDA  PORTA            PORTA = PORTA .OR. HEX40
1036 F6 40        ORI  40H
1038 32 01 70     STA  PORTA
                ;                       PAUSE FOR 10 MSEC TO ALLOW NVM
                ;                       VOLTAGE TO TRANSITION FROM
                ;                       -30 TO +5
103B 01 64 00     LXI  B,100            BC = LOOPCT = 100
                NVM30G;                 DO UNTIL LOOPCT .EQ. 0
103E CD 19 0B     CALL NPAUSE             NPAUSE(LOOPCT,ZROFLG)
                ;                              ( BC   ,PSW:Z )
                ;                              ( I/O  , O    )
1041 C2 3E 10     JNZ  NVM30G
                ;                       ENDDO
1044 C1           POP  B                RESTORE BC
1045 F1           POP  PSW              RESTORE A,PSW
1046 C9           RET                   RETURN
                ;NVM30T()(PORTA )
                ;        (BITSTR)
                ;        ( I/O  )
                ;        ( 7001 )
                ;        ( C    )
                ;
                ;REGISTERS NOT CHANGED
                ;PSW NOT CHANGED
                ;
                ;APPLY 30 VOLTS TO NONVOLATILE MEMORY TO ENABLE
                ;WRITING AND ERASING.
                ;
                NVM30T;                 ****ENTRY POINT
1047 F5           PUSH PSW              SAVE A,PSW
                ;                       SUPPLY 30 VOLTS TO NVM
1048 3A 01 70     LDA  PORTA            PORTA = PORTA .AND. HEXBF
104B E6 BF        ANI  0BFH
104D 32 01 70     STA  PORTA
                ;                       DELAY ABOUT 100 USEC BEFORE RETURNING
1050 3E 0B        MVI  A,11
1052 3D           DCR  A
1053 C2 52 10     JNZ  $-1
1056 F1           POP  PSW              RESTORE A,PSW
1057 C9           RET                   RETURN
                ;NVMBYT(ADRESS,NVMRED[J],BYTE)
                ;      (ADRESS,NIBSTR   ,BYTE)
                ;      ( I/O  , I       , O  )
                ;      ( HL   , @HL     , A  )
                ;      ( C    , NC      , C  )
                ;
                ;PSW DESTROYED
                ;REGISTERS NOT CHANGED
                ;
                ;ASSEMBLE 2 NIBBLES FROM NVM INTO A SINGLE BYTE
                ;
```

```
                 NVMBYT;                 ****ENTRY POINT
1058 C5            PUSH B                SAVE BC
1059 7E            MOV  A,M              B = HINIB = NVMRED[J]*HEX10
105A 87            ADD  A
105B 87            ADD  A
105C 87            ADD  A
105D 87            ADD  A
105E 47            MOV  B,A
                 ;                       POINT AT NEXT NIBBLE
105F CD BB 11      CALL NVMNXT           NVMNXT(ADRESS,NVMRED[J=J+?])
                 ;                              ( HL    , @HL          )
                 ;                              ( I/O   , -            )
1062 7E            MOV  A,M              A = LOWNIB = NVMRED[J] .AND. HEXOF
1063 E6 OF         ANI  OFH
1065 B0            ORA  B                A = BYTE = LOWNIB .OR. HINIB
1066 C1            POP  B                RESTORE BC
1067 C9            RET                   RETURN
                 ;NVMCHG()(NVMCTL)
                 ;        (NIBSTR)
                 ;        ( I    )
                 ;        ( RAM  )
                 ;        ( NC   )
                 ;
                 ;A,PSW DESTROYED
                 ;REGISTERS DESTROYED
                 ;
                 ;PROVIDES NVM NORMAL BLOCK IF METER IN NORMAL MODE.
                 ;PROVIDES NVM SERVICE BLOCK IF METER NOT IN NORMAL MODE.
                 ;
                 ;NVMCTL[0] = F IF NO BLOCK IS OPEN
                 ;          = 0 IF NORMAL BLOCK IS OPEN
                 ;          = 1 IF SERVICE BLOCK IS OPEN
                 ;NVMCTL[1] = NUMBER OF OPEN BLOCK
                 ;
                 NVMCHG;                 ****ENTRY POINT
                 ;                       FETCH BLOCK TYPE
1068 06 66         MVI  B,NVMCTL         B = OFFSET, NVMCTL[0]
106A CD 35 OF      CALL GETNIB           GETNIB(BLKTYP,ZROFLG,NVMCTL[0])
                 ;                              ( A     ,PSW:Z , @B      )
                 ;                              ( 0     , 0    , I       )
106D FE 02         CPI  2                IF BLKTYP .LT. 2
106F D0            RNC
                 ;                         A BLOCK IS OPEN
                 ;                         DETERMINE METER STATUS
1070 CD 4E OF      CALL LSTATE             LSTATE(FATMOD,NORMOD,SERMOD,PRVMOD)
                 ;                               (PSW:S ,PSW:Z ,PSW:P ,PSW:C )
                 ;                               ( 0    , 0    , 0    , 0    )
1073 CA 77 10      JZ   NVMCH1             IF NORMOD .EQ. FALSE
                 ;                           A SERVICE BLOCK IS REQUIRED
1076 3D            DCR  A                    A = DIFRNC = BLKTYP-(SRVTYP=1)
                 NVMCH1;                   ELSE
                 ;                           A NORMAL BLOCK IS REQUIRED
                 ;                           A = DIFRNC = BLKTYP-(NORHDR=0)
                 ;                         ENDIF
1077 B7            ORA  A                  IF DIFRNC .NE. 0
1078 C8            RZ
                 ;                           CURRENT BLOCK NOT REQUIRED
1079 CD DE 0E      CALL DBLANK               STOP CLOCK. BLANK DISPLAY
                 ;                           CLOSE CURRENT BLOCK
107C F3            DI                        DISABLE INTERRUPTS
107D CD 9E 12      CALL NVMWR                NVMWR(ERRFLG)
                 ;                                (PSW:Z )
                 ;                                ( 0    )
1080 FB            EI                        ENABLE INTERRUPTS
                 ;                           IF ERRFLG .EQ. FALSE
                 ;                             OPEN REQUIRED BLOCK
1081 C2 C4 11      JNZ  NVMOPN                 NVMOPN(ERRFLG)
                 ;                                   (PSW:Z )
                 ;                                   ( 0    )
                 ;                           ENDIF
```

```
                ;                        ENDIF
                ;                      ENDIF
1084 C9           RET                  RETURN
                ;NVMDED(CODE,ERRFLG)(SERFLG,NVMRED)
                ;      (BYTE,BIT   )(BIT    ,NIBSTR)
                ;      ( I  , O    )( O     , I    )
                ;      ( A  ,PSW:Z )( RAM   , NVM  )
                ;      ( C  , C    )( C     , NC   )
                ;
                ;A,PSW DESTROYED
                ;REGISTERS DESTROYED
                ;
                ;FLAG METER DEAD AND INDICATE ERROR
                ;
                NVMDED;                ****ENTRY POINT
1085 47           MOV  B,A             B = CODE
                ;                      TEST SPECIAL NVM LOCATION
1086 3A BE 46     LDA  NVMRED+KILCOD   IF NVMRED[KILCOD] .EQ. HEXOF
1089 3C           INR  A
108A E6 OF        ANI  OFH
108C C2 A0 10     JNZ NVMDE2
                ;                        LOCATION STILL CLEAR
                ;                        WRITE ERROR CODE TO LOCATION
108F 78           MOV  A,B               A[1] = CODE
1090 21 BE 02     LXI  H,KILCOD          H = BASE = KILCOD
1093 CD 47 10     CALL NVM30T            TURN ON -30 V TO NVM
1096 CD 61 12     CALL NVMWN             NVMWN(CODE,BASE,ERRFLG)
                ;                             (A[1], HL ,PSW:Z )
                ;                             ( I  , I  , O    )
                NVMDE1;                  ****ENTRY POINT
                ;                            NVMDE1(CODE,ERRFLG)
                ;                                  ( B  ,PSW:Z )
                ;                                  ( I  , O    )
                ;                        FLAG METER DEAD
1099 21 10 74     LXI  H,SERFLG/2+X      HL = ADDRESS, SERFLG
109C 7E           MOV  A,M               SERFLG.DEAD = TRUE
109D F6 80        ORI  80H
109F 77           MOV  M,A
                NVMDE2;                ENDIF
10A0 CD 31 10     CALL NVM30F          TURN OFF -30 V TO NVM
                ;                      DECLARE FATAL ERROR
10A3 78           MOV  A,B             A = DEDCOD = HEX20+CODE
10A4 F6 20        ORI  20H
10A6 C3 80 08     JMP  FATERR          FATERR(DEDCOD,ERRFLG)
                ;                            ( A     ,PSW:Z )
                ;                            ( I     , O    )
                ;                      RETURN
                ;NVMDXB(ERRFLG,BLKCTL)
                ;      (BIT   ,NIBSTR)
                ;      ( O    , I    )
                ;      (PSW:Z , B    )
                ;      ( C    , NC   )
                ;
                ;A,PSW DESTROYED
                ;REGISTERS DESTROYED
                ;
                ;DEACTIVATES NVM BLOCK
                ;
                NVMDXB;                ****ENTRY POINT
                ;                      MOVE NVM CONTROL BYTE TO ACCUMULATOR
10A9 78           MOV  A,B             A = BLKCTL
                ;                      FORM BASE VALUE FOR BLOCK
10AA CD 91 11     CALL NVMMAP          NVMMAP(BLKCTL,BASE,BLKTYP)
                ;                            ( A     , HL , A[1] )
                ;                            ( I     , O  , O    )
                ;                      WRITE NUL HEADER TO DEACTIVATE BLOCK
10AD AF           XRA  A               A[1] = NULHDR = 0
10AE C3 61 12     JMP  NVMWN           NVMWN(NULHDR,BASE,ERRFLG)
```

```
                ;                  ( A[1] , HL ,PSW:Z )
                ;                  ( I    , I  , 0    )
                ;               RETURN
                ;NVMER(ERRFLG)(NVMCTL,NVMERS,NVMRED,SERFLG)
                ;     (BIT   )(NIBSTR,NIBSTR,NIBSTR,BITSTR)
                ;     ( 0    )( I    , 0    , I    , I    )
                ;     (PSW:Z )( RAM  , NVM  , NVM  , RAM  )
                ;     ( C    )( NC   , C    , NC   , C    )
                ;
                ;A,PSW DESTROYED
                ;REGISTERS DESTROYED
                ;
                ;ERASE A BLOCK OF NONVOLATILE MEMORY
                ;
                NVMER;                  ****ENTRY POINT
                ;                       GET CONTROL BYTE TO ERASE NEXT BLOCK
10B1 CD 9F 11     CALL NVMNBK           NVMNBK(ERRFLG,OLDCTL,NXTCTL,
                ;                              (PSW:Z , B     , C     ,
                ;                              ( 0    , 0     , 0     ,
                ;
                ;                              ADRESS,NVMCTL)
                ;                               HL    , @HL  )
                ;                               0     , -    )
10B4 C8           RZ                    IF ERRFLG .EQ. FALSE
                ;                         SET TO CHECK AND ERASE NEXT BLOCK
10B5 79           MOV  A,C                NVMCTL = NXTCTL .OR. HEXF0
10B6 F6 F0        ORI  0F0H
10B8 77           MOV  M,A
                ;                         FETCH BLOCK LENGTH
10B9 CD DF 11     CALL NVMPRP             NVMPRP(NIBCNT,OFFSET,RAM[I])
                ;                                ( B     , C     , @C    )
                ;                                ( 0     , 0     , -     )
10BC C5           PUSH B                  SAVE BC
                ;                         FETCH BASE ADDRESS OF CURRENT BLOCK
10BD 7E           MOV  A,M                A = NVMCTL
10BE CD 91 11     CALL NVMMAP             NVMMAP(NVMCTL,BASE,BLKTYP)
                ;                                ( A     , HL , A[1] )
                ;                                ( I     , 0  , 0    )
10C1 E5           PUSH H                  SAVE HL
                ;                         FORM NVM READ ADDRESS
10C2 11 00 44     LXI  D,NVMRED           HL = ADDRESS, NVMRED[J=BASE]
10C5 19           DAD  D
10C6 E5           PUSH H                  SAVE HL
                ;                         INITIALIZE CRC VALUE
10C7 16 FF        MVI  D,0FFH             D = CRCVAL = HEXFF
                ;                         CHECK BLOCK HEADER
10C9 7E           MOV  A,M                A = BLKHDR[0] = NVMRED[J]
10CA E6 0F        ANI  0FH                IF BLKHDR[0] .EQ. 0
10CC C2 EB 10     JNZ  NVMER4
                ;                           BLOCK IS INACTIVE AND NOT ERASED
                ;                           POINT AT START OF BLOCK'S DATA
10CF 23           INX  H                    HL = ADDRESS, NVMRED[J=J+2]
10D0 23           INX  H

                ;                           CHECK BLOCK CHECKSUM
                NVMER1;                     LOOP - WITH 1 BREAK
10D1 05           DCR  B                      B = NIBCNT = NIBCNT-1
10D2 FA DF 10     JM   NVMER2                 IF NIBCNT .LT. 0
                ;                               BREAK
                ;                             ENDIF
                ;                             DEVELOP CRC
10D5 7E           MOV  A,M                    A = DATA = NVMRED[J]
10D6 CD C6 0E     CALL CRCNIB                 CRCNIB(DATA,CRCVAL)
                ;                                    ( A  , D     )
                ;                                    ( I  , 0     )
                ;                             POINT AT NEXT DATA
10D9 CD BB 11     CALL NVMNXT                 NVMNXT(ADRESS,NVMRED[J=J+?])
                ;                                    ( HL    , @HL          )
                ;                                    ( I/0   , -            )
10DC C3 D1 10     JMP  NVMER1
                NVMER2;                     ENDLOOP
```

```
                   ;              FETCH CRC FROM NVM
10DF CD 58 10      CALL NVMBYT    NVMBYT(ADRESS,NVMRED[J],NVMCRC)
                   ;                    ( HL    , @HL      , A    )
                   ;                    ( I/O   , I        , O    )
10E2 BA            CMP  D         IF NVMCRC .NE. CRCVAL
10E3 CA EB 10      JZ   NVMER3
                   ;                DECLARE DEAD METER. WEAK NVM
10E6 3E 02         MVI  A,NVMRET    A = NVMRET
10E8 CD 85 10      CALL NVMDED      NVMDED(NVMRET,ERRFLG)
                   ;                      ( A    ,PSW:Z )
                   ;                      ( I    , O    )
                   NVMER3;        ENDIF
                   NVMER4;        ENDIF
10EB D1            POP  D         DE = ADDRESS, NVMRED[J=BASE]
10EC E1            POP  H         HL = BASE
10ED 01 00 40      LXI  B,NVMERS  HL = ADDRESS, NVMERS[I=BASE]
10F0 09            DAD  B
10F1 F1            POP  PSW       B = NIBCNT = NIBCNT+4
10F2 C6 04         ADI  4
10F4 47            MOV  B,A
10F5 3A 10 74      LDA  SERFLG/2+X   IF SERFLG.DEAD .EQ. TRUE
10F8 B7            ORA  A
10F9 F2 FE 10      JP   NVMER5
10FC AF            XRA  A           PSW:Z = ERRFLG = TRUE
10FD C9            RET
                   NVMER5;        ELSE
10FE CD 47 10      CALL NVM30T      SUPPLY 30 VOLTS TO NVM
                   NVMER6;          LOOP - WITH 2 BREAKS
1101 05            DCR  B             B = NIBCNT = NIBCNT-1
                   ;                  IF NIBCNT .LT. 0
                   ;                    PSW:Z = ERRFLG = FALSE
1102 FA 31 10      JM   NVM30F          REMOVE 30 VOLTS FROM NVM
                   ;                    BREAK
                   ;                  ENDIF
1105 F3            DI                 DISABLE INTERRUPTS
                   ;                  START ERASE FUNCTION
1106 77            MOV  M,A           NVMERS[J] = DUMMY
                   ;                  PAUSE FOR 10 MSEC
1107 C5            PUSH B             SAVE BC
1108 01 64 00      LXI  B,100         BC = LOOPCT = 100
                   NVMER7;            DO UNTIL LOOPCT .EQ. 0
110B CD 19 0B      CALL NPAUSE          NPAUSE(LOOPCT,ZROFLG)
                   ;                          ( BC    ,PSW:Z )
                   ;                          ( I/O   , O    )
110E C2 0B 11      JNZ  NVMER7
                   ;                  ENDDO
1111 C1            POP  B             RESTORE BC
                   ;                  STOP ERASE FUNCTION
1112 1A            LDAX D             A = GARBAGE = NVMRED[J]
1113 7B            MOV  A,E           A=(ADDRESS,NVMRED[J]).AND.HEX3F
1114 E6 3F         ANI  3FH
1116 CA 1A 11      JZ   NVMER8        IF A .EQ. 0
                   ;                    HEADER[0] NOT JUST ERASED
1119 FB            EI                   ENABLE INTERRUPTS
                   NVMER8;            ENDIF
                   ;                  ADVANCE ERASE ADDRESS
111A CD BB 11      CALL NVMNXT        NVMNXT(ADRESS,NVMERS[I=I+?])
                   ;                        ( HL    , @HL         )
                   ;                        ( I/O   , -           )
                   ;                  READ ERASED NIBBLE
111D 1A            LDAX D             C = DATA = NVMRED[J] .AND. HEXF0
111E F6 F0         ORI  0F0H
1120 4F            MOV  C,A
                   ;                  ADVANCE READ ADDRESS
1121 EB            XCHG
1122 CD BB 11      CALL NVMNXT        NVMNXT(ADRESS,NVMRED[J=J+?])
                   ;                        ( HL    , @HL         )
                   ;                        ( I/O   , -           )
1125 EB            XCHG
```

```
                  ;                        CHECK FOR PROPER ERASURE
1126 0C            INR  C                  IF DATA+1 .NE. 0
1127 CA 01 11      JZ   NVMER6
                  ;                          BAD ERASURE
                  ;                          DECLARE DEAD METER. BAD NVM
112A 3E 01         MVI  A,NVMBAD             A = NVMBAD
112C C3 85 10      JMP  NVMDED               NVMDED(NVMBAD,ERRFLG)
                  ;                                ( A     ,PSW:Z )
                  ;                                ( I     , 0    )
                  ;                          BREAK
                  ;                        ENDIF
                  ;                      ENDLOOP
                  ;                    ENDIF
                  ;                  ENDIF
                  ;                  RETURN
                  ;NVMFND(ERRFLG)(NVMCTL,NVMRED)
                  ;      (BIT   )(NIBSTR,NIBSTR)
                  ;      ( 0    )( I/O  , I     )
                  ;      (PSW:Z )( RAM  , NVM   )
                  ;      ( C    )( C    , NC    )
                  ;
                  ;A,PSW DESTROYED
                  ;REGISTERS DESTROYED
                  ;
                  ;FIND CURRENT BLOCK CORRESPONDING TO METER MODE
                  ;
                  NVMFND;                  ****ENTRY POINT
112F 11 33 74      LXI  D,NVMCTL/2+X       DE = ADDRESS, NVMCTL[0..1]
1132 1A            LDAX D                  PSW:CY = OPEN = NVMCTL[0] .LT. 2
1133 FE 20         CPI  20H
1135 3E 02         MVI  A,SFTWRE           A = SFTWRE
                  ;                        IF OPEN .EQ. TRUE
                  ;                          LOOKING FOR BLOCK IS INAPPROPRIATE
                  ;                          DECLARE DEAD METER. SOFTWARE ERROR
1137 DA 85 10      JC   NVMDED               NVMDED(SFTWRE,ERRFLG)
                  ;                                ( A     ,PSW:Z )
                  ;                                ( I     , 0    )
                  ;                        ELSE
                  ;                          SET TO LOCATE ACTIVE SERVICE HEADER
113A 06 F1         MVI  B,0F1H               B = TEST = HEXF1
                  ;                          SET TO INCREMENT TO BLOCK 0
113C 1A            LDAX D                    NVMCTL[1] = HEX0F
113D F6 0F         ORI  0FH
113F 12            STAX D
                  ;                          THERE ARE 2 SERVICE BLOCKS
1140 0E 02         MVI  C,2                  C = BLKCTR = 2
                  ;                          DETERMINE METER MODE
1142 CD 4E 0F      CALL LSTATE               LSTATE(FATMOD,NORMOD,SERMOD,PRVMOD)
                  ;                                (PSW:S ,PSW:Z ,PSW:P ,PSW:C )
                  ;                                ( 0    , 0    , 0    , 0    )
1145 C2 4E 11      JNZ  NVMFN1               IF NORMOD .EQ. TRUE
                  ;                            SET TO INCREMENT TO BLOCK 2
1148 1A            LDAX D                      NVMCTL[1] = HEX01
1149 A0            ANA  B
114A 12            STAX D
                  ;                            SET TO LOCATE ACTIVE NORMAL HEADER
114B 05            DCR  B                      B = TEST = HEXF0
                  ;                            THERE ARE 14 NORMAL BLOCKS
114C 0E 0E         MVI  C,14                   C = BLKCTR = 14
                  NVMFN1:                    ENDIF
                  NVMFN2;                    LOOP - WITH 2 BREAKS
                  ;                            INCREMENT BLOCK NUMBER
114E 1A            LDAX D                      NVMCTL[1] = NVMCTL[1]+1
114F 3C            INR  A
1150 F6 F0         ORI  0F0H
1152 12            STAX D
                  ;                            FETCH CORRESPONDING BASE ADDRESS
1153 CD 91 11      CALL NVMMAP                 NVMMAP(NVMCTL,BASE,BLKTYP)
```

```
                      ;                            ( A    , HL , A[1] )
                      ;                            ( I    , 0  , 0    )
                      ;                         CONVERT TO READ ADDRESS
1156 C5                PUSH B                   SAVE BC
1157 01 00 44          LXI  B,NVMRED            HL = ADDRESS, NVMRED[J=BASE]
115A 09                DAD  B
115B C1                POP  B                   RESTORE BC
115C 0D                DCR  C                   C = BLKCTR = BLKCTR-1
                      ;                         PSW:S = DONE = BLKCTR .LT. 0
115D 3E 01             MVI  A,NVMBAD            A = NVMBAD
                      ;                         IF DONE .EQ. TRUE
                      ;                           DECLARE DEAD METER. BAD NVM
115F FA 85 10          JM   NVMDED                NVMDED(NVMBAD,ERRFLG)
                      ;                                  ( A    ,PSW:Z )
                      ;                                  ( I    , 0    )
                      ;                           BREAK
                      ;                         ENDIF
                      ;                         FETCH BLOCK HEADER
1162 CD 58 10          CALL NVMBYT              NVMBYT(ADRESS,NVMRED[J],HEADER)
                      ;                                ( HL   , @HL    , A    )
                      ;                                ( I/O  , I      , 0    )
1165 B8                CMP  B                   IF HEADER .EQ. TEST
1166 C2 4E 11          JNZ  NVMFN2
1169 04                INR  B                     PSW:Z = ERRFLG = FALSE
116A C9                RET                        BREAK
                      ;                         ENDIF
                      ;                       ENDLOOP
                      ;                     ENDIF
                      ;                     RETURN
                      ;NVMLOD()(NORFLG,NVMCTL,MRSTS1)
                      ;         (BITSTR,NIBSTR,BITSTR)
                      ;         ( 0    , 0    , 0    )
                      ;         ( RAM  , RAM  , RAM  )
                      ;         ( C    , C    , C    )
                      ;
                      ;A,PSW DESTROYED
                      ;REGISTERS DESTROYED
                      ;
                      ;INITIALIZATION. LOAD NONVOLATILE MEMORY
                      ;
                      NVMLOD;                   ****ENTRY POINT
116B 21 26 74          LXI  H,NORFLG/2+X        HL = ADDRESS, NORFLG
                      ;                         SENT STATUS AND POSTAGE AFTER POWERUP
116E 7E                MOV  A,M                 NORFLG.QUESTS = NORFLG.QUEPOS = TRUE
116F F6 C0             ORI  0C0H
1171 77                MOV  M,A
                      ;                         DECLARE THAT NO BLOCK IS OPEN
1172 3E F0             MVI  A,0F0H              NVMCTL = HEXF0
1174 32 33 74          STA  NVMCTL/2+X
                      ;                         METER GUARANTEED TO BE IN NORMAL MODE
                      ;                         SEARCH FOR NORMAL BLOCK
1177 CD 2F 11          CALL NVMFND              NVMFND(ERRFLG)
                      ;                                (PSW:Z )
                      ;                                ( 0    )
                      ;                         IF ERRFLG .EQ. FALSE
117A C4 EE 11          CNZ NVMRD                  LOAD NORMAL BLOCK
                      ;                         ENDIF
117D 21 24 74          LXI  H,MRSTS1/2+X        HL = ADDRESS, MRSTS1
                      ;                         SET TO LOAD SERVICE BLOCK
                      ;                         INITIALIZE CHECK DATE STATUS
1180 7E                MOV  A,M                 MRSTS1.DATDOR = MRSTS1.SERMOD = TRUE
1181 F6 48             ORI  48H
1183 77                MOV  M,A
1184 E5                PUSH H                   SAVE HL
                      ;                         SEARCH FOR SERVICE BLOCK
1185 CD 2F 11          CALL NVMFND              NVMFND(ERRFLG)
                      ;                                (PSW:Z )
                      ;                                ( 0    )
                      ;                         IF ERRFLG .EQ. FALSE
1188 C4 EE 11          CNZ  NVMRD                 LOAD SERVICE BLOCK
```

```
                   ;                  ENDIF
118B E1             POP  H            RESTORE HL
                   ;                  RETURN TO NORMAL MODE
                   ;                  DISABLE METER
118C 7E             MOV  A,M          MRSTS1.SERMOD = MRSTS1.ENABLD = FALSE
118D E6 F3          ANI  0F3H
118F 77             MOV  M,A
1190 C9             RET               RETURN
                   ;NVMMAP(NVMCTL,BASE  ,BLKTYP)
                   ;      (NIBSTR,ADRESS,NIBSTR)
                   ;      ( I    , 0    , 0    )
                   ;      ( A    , HL   , A[1] )
                   ;      ( C    , C    , C    )
                   ;
                   ;PSW DESTROYED
                   ;REGISTERS NOT CHANGED
                   ;
                   ;MAPS BLOCK NUMBER IN L/O NIBBLE OF ACCUMULATOR INTO
                   ;CORRESPONDING NONVOLATILE MEMORY ADDRESS
                   ;
                   NVMMAP;            ****ENTRY POINT
1191 0F             RRC               A = NVMCTL[1]*HEX10+NVMCTL[0]
1192 0F             RRC
1193 0F             RRC
1194 0F             RRC
1195 F5             PUSH PSW          SAVE A,PSW
1196 E6 F0          ANI  0F0H         HL = BASE = NVMCTL[1]*HEX40
1198 6F             MOV  L,A
1199 26 00          MVI  H,0
119B 29             DAD  H
119C 29             DAD  H
119D F1             POP  PSW          RESTORE A,PSW
                   ;                  A[1] = BLKTYP = NVMCTL[0]
119E C9             RET               RETURN
                   ;NVMNBK(ERRFLG,OLDCTL,NXTCTL,ADRESS,NVMCTL)(NVMCTL)
                   ;      (BIT   ,NIBSTR,NIBSTR,ADRESS,NIBSTR)(NIBSTR)
                   ;      ( 0    , 0    , 0    , 0    , -    )( I     )
                   ;      (PSW:Z , B    , C    , HL   , @HL  )( RAM   )
                   ;      ( C    , C    , C    , C    , -    )( NC    )
                   ;
                   ;A,PSW DESTROYED
                   ;REGISTERS DESTROYED
                   ;
                   ;DEVELOP CONTROL BYTE VALUES FOR DEACTIVATING BLOCK OF
                   ;CURRENT TYPE, AND FOR OPENING NEXT BLOCK.
                   ;
                   NVMNBK;            ****ENTRY POINT
                   ;                  SET NVMCTL TO INDICATE ACTIVE CLOSED
                   ;                  BLOCK CORRESPONDING TO CURRENT STATUS
119F CD 2F 11       CALL NVMFND       NVMFND(ERRFLG)
                   ;                        (PSW:Z )
                   ;                        ( 0    )
11A2 C8             RZ                IF ERRFLG .EQ. FALSE
                   ;                    NVMCTL[0] = HEXF, NO FILES OPEN
                   ;                    NVMCTL[1] = ACTIVE BLOCK NUMBER
11A3 21 33 74       LXI  H,NVMCTL/2+X   HL = ADDRESS, NVMCTL
11A6 46             MOV  B,M            B = OLDCTL = NVMCTL
11A7 0E 02          MVI  C,2            C = NVMCTL = HEX02
11A9 78             MOV  A,B            A = OLDCTL+1
11AA 3C             INR  A
11AB CA B9 11       JZ   NVMNB1         IF OLDCTL+1 .EQ. 0
                   ; >>JUMP AHEAD<<       OLD BLOCK WAS 15
                   ;                      NEWCTL SET FOR BLOCK 2, NORMAL
                   ;                      PSW:Z = ERRFLG = FALSE
                   ;                    ELSE
                   ;                      OLD BLOCK WAS NOT 15
11AE E6 0F          ANI  0FH              A=OLDBLK+1=(OLDCTL+1).AND.HEX0F
11B0 4F             MOV  C,A              C = OLDBLK+1
11B1 DE 03          SBI  3                A = OLDBLK-2
11B3 F2 B9 11       JP   NVMNB1           IF OLDBLK-2 .GE. 0
```

```
                  ; >>JUMP AHEAD<<          OLD BLOCK WAS 2 TO 14
                  ;                         NEWCTL SET FOR BLK 3 TO 15, NORM
                  ;                         PSW:Z = ERRFLG = FALSE
                  ;                        ELSE
                  ;                         OLD BLOCK WAS 0 OR 1
                  ;                         SET NEWCTL FOR BLK 0 OR 1, SERVC
11B6 EE EF          XRI  0EFH               C=NEWCTL=(OLDBLK-2).XOR.HEXEF
11B8 4F             MOV  C,A
                  ;                        ENDIF
                  ;                       ENDIF
                  NVMNB1;                 >>TARGET OF JUMP AHEAD<<
11B9 B1             ORA  C                PSW:Z = ERRFLG = FALSE
11BA C9             RET
                  ;                      ENDIF
                  ;                      RETURN
                  ;NVMNXT(ADRESS)
                  ;     (ADRESS)
                  ;     ( I/O  )
                  ;     ( HL   )
                  ;     ( C    )
                  ;
                  ;A,PSW DESTROYED
                  ;REGISTERS NOT CHANGED
                  ;
                  ;ADVANCE ADDRESS TO NEXT HIGHER LOCATION SKIPPING XXXF
                  ;
                  NVMNXT;                 ****ENTRY POINT
11BB 23             INX  H                HL = ADRESS = ADRESS+1
11BC 7D             MOV  A,L              IF ADRESS[3] .EQ. HEX0F
11BD E6 0F          ANI  0FH
11BF FE 0F          CPI  0FH
11C1 C0             RNZ
11C2 23             INX  H                  HL = ADRESS = ADRESS+1
                  ;                       ENDIF
11C3 C9             RET                   RETURN
                  ;NVMOPN(ERRFLG)(NVMCTL,SERFLG)
                  ;      (BIT   )(NIBSTR,BITSTR)
                  ;      ( 0    )( 0    , I    )
                  ;      (PSW:Z )( RAM  , RAM  )
                  ;      ( C    )( C    , C    )
                  ;
                  ;A,PSW DESTROYED
                  ;REGISTERS DESTROYED
                  ;
                  ;OPENS NVM BLOCK
                  ;
                  NVMOPN;                 ****ENTRY POINT
11C4 3A 10 74       LDA  SERFLG/2+X       IF SERFLG.DEAD .EQ. TRUE
11C7 F6 7F          ORI  7FH                PSW:Z = ERRFLG = TRUE
11C9 2F             CMA
                  ;                       ELSE
                  ;                         PSW:Z = ERRFLG = FALSE
                  ;                       ENDIF
11CA C8             RZ                    IF ERRFLG .EQ. FALSE
                  ;                         ERASE NEXT BLOCK
11CB CD B1 10       CALL NVMER              NVMER(ERRFLG)
                  ;                              (PSW:Z )
                  ;                              ( 0    )
11CE C8             RZ                      IF ERRFLG .EQ. FALSE
11CF CD 47 10       CALL NVM30T               TURN ON -30V TO NVM
                  ;                           DEVELOP CONTROL BYTES FOR OPENING
                  ;                           NEXT BLOCK AND DEACTIVATING
                  ;                           OLD BLOCK
11D2 CD 9F 11       CALL NVMNBK               NVMNBK(ERRFLG,OLDCTL,NXTCTL,
                  ;                                 (PSW:Z , B     , C     ,
                  ;                                 ( 0    , 0     , 0     ,
                  ;
                  ;                                  ADRESS,NVMCTL)
                  ;                                  HL    , @HL  )
                  ;                                  0     , -    )
```

```
11D5 F3          DI                    DISABLE INTERRUPTS
                ;                      OPEN NEXT BLOCK
11D6 71          MOV  M,C              NVMCTL = NXTCTL
                ;                      DEACTIVATE OLD BLOCK
11D7 CD A9 10    CALL NVMDXB           NVMDXB(ERRFLG,OLDCTL)
                ;                            (PSW:Z , B     )
                ;                            ( 0    , I     )
11DA FB          EI                    ENABLE INTERRUPTS
11DB CD 31 10    CALL NVM30F           TURN OFF -30V TO NVM
                ;                    ENDIF
                ;                  ENDIF
11DE C9          RET               RETURN
                ;NVMPRP(NIBCNT,OFFSET,RAM[I])(NVMCTL)
                ;      (BYTE  ,OFFSET,NIBSTR)(NIBSTR)
                ;      ( 0    , 0    , -    )( I    )
                ;      ( B    , C    , @C   )( RAM  )
                ;      ( C    , C    , NC   )( NC   )
                ;
                ;A,PSW DESTROYED
                ;REGISTERS NOT CHANGED
                ;
                ;RETURN RAM PARAMETERS CORRESPONDING TO NVM BLOCK TYPE
                ;
                NVMPRP;                ****ENTRY POINT
11DF 06 22        MVI  B,NORSIZ        B = NIBCNT = NORSIZ
11E1 0E 28        MVI  C,NORSTR        C = OFFSET = NORSTR
11E3 3A 33 74     LDA  NVMCTL/2+X      IF NVMCTL[1] .LT. 2
11E6 E6 0E        ANI  0EH
11E8 C0           RNZ
11E9 06 28        MVI  B,SRVSIZ          B = NIBCNT = SRVSIZ
11EB 0E 00        MVI  C,SRVSTR          C = OFFSET = SRVSTR
                ;                      ENDIF
11ED C9           RET                  RETURN
                ;NVMRD()(NVMCTL,RAM[I],NVMRED)
                ;       (NIBSTR,NIBSTR,NIBSTR)
                ;       ( I    , 0    , I    )
                ;       ( RAM  , RAM  , NVM  )
                ;       ( NC   , C    , NC   )
                ;
                ;A,PSW DESTROYED
                ;REGISTERS DESTROYED
                ;
                ;READ NONVOLATILE MEMORY INTO RAM
                ;
                NVMRD;                 ****ENTRY POINT
                ;                      GET RAM DESTINATION PARAMETERS
11EE CD DF 11     CALL NVMPRP          NVMPRP(NIBCNT,OFFSET,RAM[I])
                ;                            ( B    , C    , @C   )
                ;                            ( 0    , 0    , -    )
                ;                      DEFINE NVM SOURCE BASE
11F1 3A 33 74     LDA  NVMCTL/2+X      A = NVMCTL
11F4 CD 91 11     CALL NVMMAP          NVMMAP(NMVCTL,BASE,BLKTYP)
                ;                            ( A    , HL , A[1] )
                ;                            ( I    , 0  , 0    )
                ;                      FORM NVM READ ADDRESS OF SOURCE DATA
11F7 11 02 44     LXI  D,NVMRED+2      HL = ADDRESS, NVMRED[J=BASE+2]
11FA 19           DAD  D
                ;                      INITIALIZE CRC VALUE
11FB 16 FF        MVI  D,0FFH          D = CRCVAL = HEXFF
                NVMRD1;                LOOP - WITH 1 BREAK
11FD 05           DCR  B                 B = NIBCNT = NIBCNT-1
11FE FA 0F 12     JM   NVMRD2            IF NIBCNT .LT. 0
                ;                          BREAK
                ;                        ENDIF
                ;                        COPY NVM TO RAM
1201 7E           MOV  A,M               A = NVMRED[J]
1202 CD EE 0F     CALL PUTNIB            PUTNIB(RAM[I],NVMRED[J])
                ;                              ( @C    , A         )
                ;                              ( 0     , I         )
                ;                        UPDATE CRC
```

```
1205 CD C6 0E   CALL CRCNIB         CRCNIB(NVMRED[J],CRCVAL)
               ;                          ( A        , D     )
               ;                          ( I        , I/O   )
1208 0C         INR  C              C = OFFSET, RAM[I=I+1]
               ;                    CALCULATE NEXT NVM SOURCE ADDRESS
1209 CD BB 11   CALL NVMNXT         NVMNXT(ADRESS,NVMRED[J=J+?])
               ;                          ( HL    , @HL          )
               ;                          ( I/O   , -            )
120C C3 FD 11   JMP  NVMRD1
               NVMRD2;            ENDDO
               ;                  CHECK CRC VALUES
120F CD 58 10   CALL NVMBYT       NVMBYT(ADRESS,NVMRED[J],NVMCRC)
               ;                        ( HL   , @HL      , A    )
               ;                        ( I/O  , I        , O    )
1212 BA         CMP  D            IF NVMCRC .NE. CRCVAL
1213 C8         RZ
               ;                    DECLARE DEAD METER. BAD CRC
1214 3E 00      MVI  A,BADCRC       A = BADCRC
1216 C3 85 10   JMP  NVMDED         NVMDED(BADCRC,ERRFLG)
               ;                          ( A    ,PSW:Z )
               ;                          ( I    , O    )
               ;                  ENDIF
               ;                  RETURN
               ;NVMSTO(ERRFLG)(MRSTS1,MRSTS2,NVMCTL)
               ;      ( BIT   )(BITSTR,BITSTR,NIBSTR)
               ;      (  O    )( I/O  , I/O  , O     )
               ;      (PSW:Z )( RAM  , RAM  , RAM   )
               ;      (  C    )( C    , C    , C     )
               ;
               ;A,PSW DESTROYED
               ;REGISTERS DESTROYED
               ;
               ;STARTING WITH NO NVM BLOCKS OPEN:
               ;WRITE NEW ACTIVE NVM BLOCK NOT CORRESPONDING TO CURRENT
               ;METER MODE.
               ;OPEN AN ERASED BLOCK CORRESPONDING TO CURRENT METER MODE.
               ;
               NVMSTO;            ****ENTRY POINT
1219 CD 4E 0F   CALL LSTATE       LSTATE(FATMOD,NORMOD,SERMOD,PRVMOD)
               ;                        (PSW:S ,PSW:Z ,PSW:P ,PSW:C )
               ;                        ( O    , O    , O    , O    )
121C F2 21 12   JP   NVMST1       IF FATMOD .EQ. TRUE
121F AF         XRA  A              ERRFLG = PSW:Z = TRUE
1220 C9         RET
               NVMST1;            ELSE
               ;                    ERASE BLOCK FOR UNTOGGLED NORMOD
1221 CD B1 10   CALL NVMER          NVMER(ERRFLG)
               ;                          (PSW:Z )
               ;                          ( O    )
               ;                    IF ERRFLG .EQ. TRUE
1224 CA B6 01   JZ   PWRDN            REINITIALIZE METER
               ;                    ELSE
               ;                      SET TO TOGGLE NORMOD INDIRECTLY BY
               ;                      TOGGLING THE SERVICE OR PRIVILEGED
               ;                      MODE FLAGS
1227 21 24 74   LXI  H,MRSTS1/2+X     HL=ADDRESS,MRSTS?=ADDRESS,MRSTS1
122A 1E 08      MVI  E,08H            E.M = E.SERMOD = TRUE
122C EA 32 12   JPE  NVMST2           IF LSTATE(SERMOD) .EQ. FALSE
122F 23         INX  H                  HL=ADDRESS,MRSTS?=ADDRESS,MRSTS2
1230 1E 01      MVI  E,01H              E.M = E.PRVMOD = TRUE
               NVMST2;                ENDIF
               ;                      TOGGLE NORMOD
1232 7B         MOV  A,E              MRSTS?.M = MRSTS?.M .XOR. E.M
1233 AE         XRA  M
1234 77         MOV  M,A
1235 E5         PUSH H                SAVE HL
1236 D5         PUSH D                SAVE DE
               ;                      ERASE BLOCK FOR TOGGLED NORMOD
1237 CD B1 10   CALL NVMER            NVMER(ERRFLG)
```

```
                  ;                 (PSW:Z )
                  ;                 ( 0    )
                  ;              IF ERRFLG .EQ. TRUE
123A CA B6 01      JZ   PWRDN      REINITIALIZE METER
                  ;              ELSE
123D F3            DI              DISABLE INTERRUPTS
                  ;                SET TO STORE BLK FOR TOG NORMOD
123E CD 9F 11      CALL NVMNBK     NVMNBK(ERRFLG,OLD,NXT,ADR,NVMCTL)
                  ;                     (PSW:Z , B , C , HL, @HL  )
                  ;                     ( 0    , 0 , 0 , 0 , -    )
                  ;                IF ERRFLG .EQ. TRUE
1241 CA B6 01      JZ   PWRDN        REINITIALIZE METER
                  ;                ELSE
1244 CD 47 10      CALL NVM30T       TURN ON -30 V TO NVM
1247 E5            PUSH H            SAVE HL
                  ;                  DEACTIVATE BLK FOR TOG NORMOD
1248 CD A9 10      CALL NVMDXB       NVMDXB(ERRFLG,OLD)
                  ;                         (PSW:Z , B )
                  ;                         ( 0    , I )
                  ;                  OPEN BLK FOR TOG NORMOD
124B E1            POP  H            RESTORE HL
124C 71            MOV  M,C          NVMCTL = NXT
                  ;                  STORE BLK FOR TOGLED NORMOD
124D CD 9E 12      CALL NVMWR        NVMWR(ERRFLG)
                  ;                        (PSW:Z )
                  ;                        ( 0    )
                  ;                  RETURN TO UNTOGGLED NORMOD
1250 D1            POP  D            RESTORE DE
1251 E1            POP  H            RESTORE HL
1252 7B            MOV  A,E          MRSTS?.M =
1253 AE            XRA  M                   MRSTS?.M .XOR. E.M
1254 77            MOV  M,A
                  ;                  GET CONTROL BYTES
1255 CD 9F 11      CALL NVMNBK       NVMNBK(ERRFLG,OLD,NXT,
                  ;                         (PSW:Z , B , C ,
                  ;                         ( 0    , 0 , 0 ,
                  ;
                  ;                         ADRESS,NVMCTL)
                  ;                          HL   , @HL  )
                  ;                          0    , -    )
                  ;                  OPEN ERASED BLOCK
1258 71            MOV  M,C          NVMCTL = NXT
1259 CD 47 10      CALL NVM30T       TURN ON -30 V TO NVM
                  ;                  DEACTIVATE OLD BLOCK
125C CD A9 10      CALL NVMDXB       NVMDXB(ERRFLG,OLD)
                  ;                         (PSW:Z , B )
                  ;                         ( 0    , I )
125F FB            EI                ENABLE INTERRUPTS
1260 C9            RET
                  ;                ENDIF
                  ;              ENDIF
                  ;            ENDIF
                  ;          ENDIF
                  ;          RETURN
                  ;NVMWN(DATA  ,BASE  ,ERRFLG)(NVMRED,NVMWRT)
                  ;     (NIBBLE,ADRESS,BIT   )(NIBSTR,NIBSTR)
                  ;     ( I    , I    , 0    )( I    , 0    )
                  ;     ( A[1] , HL   ,PSW:Z )( NVM  , NVM  )
                  ;     ( C    , NC   , C    )( NC   , C    )
                  ;
                  ;A,PSW DESTROYED
                  ;REGISTERS NOT CHANGED
                  ;
                  ;WRITE NIBBLE TO NONVOLATILE MEMORY
                  ;
                  NVMWN;           ****ENTRY POINT
1261 C5             PUSH B         SAVE REGISTERS
1262 D5             PUSH D
1263 E5             PUSH H
```

```
1264 E5           PUSH H
1265 01 00 48     LXI  B,NVMWRT       DE = ADDRESS, NVMWRT[BASE]
1268 09           DAD  B
1269 EB           XCHG
126A E1           POP  H              HL = ADDRESS, NVMRED[BASE]
126B 01 00 44     LXI  B,NVMRED
126E 09           DAD  B
126F F5           PUSH PSW            SAVE A,PSW
                 ;                    START WRITING DATA
1270 12           STAX D              NVMWRT[BASE] = DATA
                 ;                    DELAY FOR 1 MSEC
1271 01 0A 00     LXI  B,10           BC = LOOPCT = 10
                 NVMWN1;              DO UNTIL LOOPCT .EQ. 0
1274 CD 19 0B     CALL NPAUSE           NPAUSE(LOOPCT,ZROFLG)
                 ;                            ( BC   ,PSW:Z )
                 ;                            ( I/O  , 0    )
1277 C2 74 12     JNZ NVMWN1
                 ;                    ENDDO
                 ;                    STOP WRITE FUNCTION
127A 7E           MOV  A,M            A = GARBAGE = NVMRED[BASE]
127B C1           POP  B              B = DATA
                 ;                    C = GARBAGE
127C 7E           MOV  A,M            A = SAVDAT = NVMRED[BASE]
127D 90           SUB  B              A = TEST = (SAVDAT-DATA) .AND. HEXOF
127E E6 0F        ANI  0FH
1280 C2 87 12     JNZ  NVMWN2         IF TEST .EQ. 0
                 ;                      SAVDAT .EQ. DATA
1283 3C           INR  A                PSW:Z = ERRFLG = FALSE
1284 C3 9A 12     JMP NVMWN4
                 NVMWN2;              ELSE
                 ;                      SAVDAT .NE. DATA
1287 01 9A 12     LXI  B,NVMWN3         SET TO RETURN TO ENDIF
128A C5           PUSH B
128B 01 42 B9     LXI  B,-(NVMRED+KILCOD)
                 ;                      BC = -(ADDRESS, NVMRED[KILCOD])
128E 09           DAD  B                HL = BASE-KILCOD
128F 7C           MOV  A,H              PSW:Z = (BASE-KILCOD).EQ.0
1290 B5           ORA  L
1291 3E 01        MVI  A,NVMBAD         A = NVMBAD
1293 47           MOV  B,A              B = NVMBAD
                 ;                      IF (BASE-KILCOD).EQ.0
                 ;                        DECLARE DEAD METER. BAD NVM
                 ;                        DO NOT WRITE NVMBAD INTO NVM
1294 CA 99 10     JZ   NVMDE1             NVMDE1(NVMBAD,ERRFLG)
                 ;                               ( B    ,PSW:Z )
                 ;                               ( I    , 0    )
                 ;                      ELSE
                 ;                        DECLARE DEAD METER. BAD NVM
                 ;                        WRITE NVMBAD INTO NVM
1297 C2 85 10     JNZ  NVMDED             NVMDED(NVMBAD,ERRFLG)
                 ;                               ( A    ,PSW:Z )
                 ;                               ( I    , 0    )
                 NVMWN3;                ENDIF
                 NVMWN4;              ENDIF
129A E1           POP  H              RESTORE REGISTERS
129B D1           POP  D
129C C1           POP  B
129D C9           RET
                 ;NVMWR(ERRFLG)(NVMCTL,RAM[I],SERFLG)
                 ;     (BIT   )(NIBSTR,NIBSTR,BITSTR)
                 ;     ( 0    )( I/O  , I     , I     )
                 ;     (PSW:Z )( RAM  , RAM   , RAM   )
                 ;     ( C    )( C    , NC    , NC    )
                 ;
                 ;A,PSW DESTROYED
                 ;REGISTERS DESTROYED
                 ;
                 ;WRITE BLOCK FROM RAM TO NONVOLATILE MEMORY
                 ;
```

```
                         NVMWR;                   ****ENTRY POINT
                         ;                        FETCH RAM SOURCE PARAMETERS
129E CD DF 11             CALL NVMPRP             NVMPRP(NIBCNT,OFFSET,RAM[I])
                         ;                             ( B     , C     , @C    )
                         ;                             ( O     , O     , -     )
12A1 79                   MOV  A,C                C = NIBCNT
12A2 48                   MOV  C,B
12A3 47                   MOV  B,A                B = OFFSET, RAM[I]
                         ;                        INITIALIZE CRC VALUE
12A4 16 FF                MVI  D,OFFH             D = CRCVAL = HEXFF
12A6 3A 33 74             LDA NVMCTL/2+X          A = NVMCTL
12A9 FE 20                CPI  20H                IF NVMCTL[0] .LT. 2
12AB D2 E6 12             JNC  NVMWR3
12AE CD 47 10             CALL NVM30T               TURN ON -30 V TO NVM
                         ;                          FETCH NVM DESTINATION BASE
12B1 CD 91 11             CALL NVMMAP               NVMMAP(NVMCTL,BASE,BLKTYP)
                         ;                                 ( A     , HL , A[1] )
                         ;                                 ( I     , O  , O    )
                         ;                          STORE BLOCK TYPE IN NVM HEADER
12B4 23                   INX  H                    HL = BASE +1
12B5 CD 61 12             CALL NVMWN                NVMWN(BLKTYP,BASE+1,ERRFLG)
                         ;                               ( A[1] , HL   ,PSW:Z )
                         ;                               ( I    , I    , O    )
                         ;                          POINT AT START OF DATA IN NVM
12B8 23                   INX  H                    HL = BASE+2
                         NVMWR1;                    LOOP - WITH 1 BREAK
12B9 OD                   DCR  C                      C = NIBCNT = NIBCNT-1
12BA FA CD 12             JM   NVMWR2                 IF NIBCNT .LT. 0
                         ;                              BREAK
                         ;                            ENDIF
                         ;                            FETCH DATA FROM RAM
12BD CD 35 OF             CALL GETNIB                 GETNIB(DATA ,ZROFLG,RAM[I])
                         ;                                  ( A[1],PSW:Z , @B    )
                         ;                                  ( O    , O    , I     )
                         ;                            UPDATE CRC VALUE
12C0 CD C6 OE             CALL CRCNIB                 CRCNIB(DATA ,CRCVAL)
                         ;                                  ( A[1], D     )
                         ;                                  ( I    , O     )
                         ;                            WRITE DATA TO NVM
12C3 CD 61 12             CALL NVMWN                  NVMWN(DATA ,BASE+?,ERRFLG)
                         ;                                 ( A[1], HL   ,PSW:Z )
                         ;                                 ( I    , I    , O    )
                         ;                            POINT AT NEXT DATA LOCATIONS
12C6 04                   INR  B                      B = OFFSET, RAM[I=I+1]
12C7 CD BB 11             CALL NVMNXT                 NVMNXT(ADRESS,BASE+?)
                         ;                                  ( HL    , @HL  )
                         ;                                  ( I/O   , -    )
12CA C3 B9 12             JMP NVMWR1
                         NVMWR2;                    ENDDO
                         ;                          STORE CRC IN NVM
12CD 7A                   MOV  A,D                  A[1] = CRCVAL[0]
12CE OF                   RRC
12CF OF                   RRC
12D0 OF                   RRC
12D1 OF                   RRC
12D2 CD 61 12             CALL NVMWN                NVMWN(CRCVAL[0],BASE+?,ERRFLG)
                         ;                               ( A[1]      , HL   ,PSW:Z )
                         ;                               ( I         , I    , O    )
12D5 CD BB 11             CALL NVMNXT               NVMNXT(ADRESS,BASE+?)
                         ;                                ( HL    , @HL  )
                         ;                                ( I/O   , -    )
12D8 7A                   MOV  A,D                  A[1] = CRCVAL[1]
12D9 CD 61 12             CALL NVMWN                NVMWN(CRCVAL[1],BASE+?,ERRFLG)
                         ;                               ( A[1]      , HL   ,PSW:Z )
                         ;                               ( I         , I    , O    )
                         ;                          INDICATE BLOCK NOT OPEN
12DC 21 33 74             LXI  H,NVMCTL/2+X         HL = ADDRESS, NVMCTL
12DF 3E F0                MVI  A,OFOH               NVMCTL[0] = HEXOF
```

```
12E1 B6          ORA  M
12E2 77          MOV  M,A
12E3 CD 31 10    CALL NVM30F          TURN OFF -30V TO NVM
                NVMWR3;              ENDIF
12E6 3A 10 74    LDA  SERFLG/2+X      IF SERFLG.DEAD .EQ. TRUE
12E9 E6 80       ANI  80H               PSW:Z = ERRFLG = TRUE
12EB EE 80       XRI  80H
                ;                    ELSE
                ;                      PSW:Z = ERRFLG = FALSE
                ;                    ENDIF
12ED C9          RET                 RETURN
                ;ACCODE(ERRFLG)(WORK1 ,DSCREG,RSTCNT,SERFLG)
                ;      (BIT   )(NIBCTR,NIBSTR,NIBBLE,BITSTR)
                ;      ( 0    )( 0    , I    , I    , I    )
                ;      (PSW:Z )( RAM  , RAM  , RAM  , RAM  )
                ;      ( C    )( C    , NC   , NC   , NC   )
                ;
                ;A,PSW DESTROYED
                ;REGISTERS DESTROYED
                ;
                ;BUILD ACCESS CODE MESSAGE IN TRANSMIT BUFFER
                ;
                ACCODE;              ****ENTRY POINT
                ;                    CLEAR WORK AREA
12EE 3E C0       MVI  A,WORK1        A = OFFSET, WORK1
12F0 CD 85 0E    CALL CLRBLK         CLRBLK(WORK1)
                ;                          ( @A   )
                ;                          ( 0    )
                ;                    PUT 10 DGT CONTROL SUM IN WORK1[0..9]
12F3 CD 3A 06    CALL CONSUM         CONSUM(ERRFLG)
                ;                          (PSW:Z )
                ;                          ( 0    )
                ;                    IF ERRFLG .EQ. TRUE
                ;                      PROCESS ERROR
12F6 CA A1 0B    JZ   PROERR           PROERR(ERRFLG)
                ;                            (PSW:Z )
                ;                            ( 0    )
                ;                    ELSE
                ;                      MOVE CONTROL SUM TO WORK1[6..15]
12F9 01 C6 C0    LXI  B,(WORK1+0)*100H+(WORK1+6)
                ;                      B = OFFSET, WORK1[0]
                ;                      C = OFFSET, WORK1[6]
12FC 3E 0A       MVI  A,10             A = NIBCNT = 10
12FE CD B3 0F    CALL MVLNIB           MVLNIB(WORK1[6],WORK1[0],NIBCNT,
                ;                            ( @C      , @B      , A     ,
                ;                            ( 0       , I       , I     ,
                ;
                ;                            NONBCD,ZROFLG)
                ;                            PSW:S ,PSW:Z )
                ;                             0    , 0    )
                ;                      PUT DESC REGISTER IN WORK1[0..4]
1301 01 C0 2F    LXI  B,DSCREG*100H+WORK1
                ;                      B = OFFSET, DSCREG[0]
                ;                      C = OFFSET, WORK1[0]
1304 3E 05       MVI  A,5              A = NIBCNT = 5
1306 CD B3 0F    CALL MVLNIB           MVLNIB(WORK1[0],DSCREG[0],NIBCNT,
                ;                            ( @C      , @B       , A     ,
                ;                            ( 0       , I        , I     ,
                ;
                ;                            NONBCD,ZROFLG)
                ;                            PSW:S ,PSW:Z )
                ;                             0    , 0    )
                ;                      PARSE RSTCNT INTO RESET NUMBER AND
                ;                      RESET BIT
1309 01 C5 12    LXI  B,RSTCNT*100H+(WORK1+5)
                ;                      B = OFFSET, RSTCNT
                ;                      C = OFFSET, WORK1[5]
130C CD 35 0F    CALL GETNIB           GETNIB(RSTCNT,ZROFLG,RSTCNT)
```

```
                 ;                           ( A    ,PSW:Z , @B    )
                 ;                           ( O    , O    , I     )
1310 0F           RRC
1310 57           MOV  D,A               D[1] = RSTCNT/2
                 ;                       D[0].0 = RSTBIT = RSTCNT .MOD. 2
1311 07           RLC                    A = RSTBIT
1312 E6 01        ANI 01H
                 ;                       PUT RSTBIT INTO WORK1[5]
1314 CD EE 0F     CALL PUTNIB            PUTNIB(WORK1[5],RSTBIT)
                 ;                           ( @C      , A     )
                 ;                           ( O       , I     )
                 ;                       EXTRACT RESET NUMBER FROM RIGHTMOST
                 ;                       DIGIT OF WORK1[0..4] WHICH WILL NOT
                 ;                       BE TRANSFORMED INTO A NON BCD DIGIT.
1317 0D           DCR  C                 C = OFFSET, WORK1[I=4]
1318 41           MOV  B,C               B = OFFSET, WORK1[I=4]
1319 1E 05        MVI  E,5               E = NIBCNT = 5
                 ACCOD1;                 DO UNTIL NIBCNT .EQ. 0; WITH 1 BREAK
131B CD 35 0F     CALL GETNIB              GETNIB(BCDDGT,ZROFLG,WORK1[I])
                 ;                              ( A    ,PSW:Z , @B      )
                 ;                              ( O    , O    , I       )
131E FE 08        CPI  8                   IF BCDDGT .LT. 8
1320 D2 2A 13     JNC  ACCOD2
1323 AA           XRA  D                     BCDDGT = BCDDGT .XOR. RSTNO
1324 CD EE 0F     CALL PUTNIB                PUTNIB(WORK1[I],BCDDGT)
                 ;                                 ( @C      , A     )
                 ;                                 ( O       , I     )
1327 C3 30 13     JMP  ACCOD3                BREAK
                 ACCOD2;                   ENDIF
132A 05           DCR  B                   B = OFFSET, WORK1[I=I-1]
132B 0D           DCR  C                   C = OFFSET, WORK1[I=I-1]
132C 1D           DCR  E                   E = NIBCNT = NIBCNT-1
132D C2 1B 13     JNZ  ACCOD1
                 ACCOD3;                 ENDDO
                 ;                       CALCULATE CRC OF WORK AREA
1330 01 C0 10     LXI  B,16X100H+WORK1
                 ;                       B = NIBCNT = 16
                 ;                       C = OFFSET, WORK1[0]
1333 CD B1 0E     CALL CRC               CRC(WORK1[0],NIBCNT,CRCVAL)
                 ;                          ( @C      , B     , D     )
                 ;                          ( I       , I     , O     )
1336 3A 10 74     LDA  SERFLG/2+X        PSW:Z=NVMOK=SERFLG.WEKNVM .EQ. FALSE
1339 E6 20        ANI  20H
133B 7A           MOV  A,D               A = CRCVAL
133C CA 40 13     JZ   ACCOD4            IF NVMOK .EQ. FALSE
133F 2F           CMA                      A = CRCVAL = .NOT. CRCVAL
                 ACCOD4;                 ENDIF
                 ;                       COMPLETE ACCESS CODE IN WORK[0..7]
                 ;                       AS FOLLOWS:
                 ;                       WORK1[4].0..3 = WORK1[4].0..3
                 ;                       WORK1[5].1..2 = WORK1[5].1..2 .OR.
                 ;                                       CRCVAL.0..1
                 ;                       WORK1[6].0 = 0
                 ;                       WORK1[6].1..3 = CRCVAL.2..4
                 ;                       WORK1[7].0 = 0
                 ;                       WORK1[7].1..3 = CRCVAL.5..7
1340 57           MOV  D,A               D = CRCVAL
1341 E6 F8        ANI  0F8H              D = FCRC2
1343 82           ADD  D
1344 57           MOV  D,A
1345 17           RAL                    A = FCRC1
1346 17           RAL
1347 17           RAL
1348 E6 06        ANI  6
134A 21 62 74     LXI  H,(WORK1+4)/2+X HL = ADDRESS, WORK1[4..5]
134D B6           ORA  M                 WORK1[4..5] = WORK1[4..5] .OR. FCRC1
134E 77           MOV  M,A
134F 7A           MOV  A,D               A = FCRC3 = FCRC2 .AND. HEX77
1350 E6 77        ANI  77H
```

```
1352 23         INX  H                HL = ADDRESS, WORK1[6..7]
1353 77         MOV  M,A              WORK1[6..7] = FCRC3
               ;                      BUILD ACCESS CODE MSG IN XMIT BUFFER
1354 11 5A 13   LXI  D,ACCOD5         DE = ADDRESS, ACCOD5
1357 C3 5B 0D   JMP  VALREQ           VALREQ(WORK1 ,ACCFMT,HACODE,ERRFLG)
               ;                            (@@DE+0,@DE+1 ,@DE+2 ,PSW:Z )
               ;                            ( I     , I    , I     , 0     )
               ;                     ENDIF
               ;                     RETURN
               ACCOD5;               ARGUEMENTS FOR VALREQ
135A C0 8F 90   DB   WORK1,ACCFMT,HACODE
               ;BINOCT(BINARY,OCTAL ,DIGCNT)
               ;      (BITSTR,NIBSTR,BYTE  )
               ;      ( I    , O    , I    )
               ;      ( @H   , @D   , B    )
               ;      ( NC   , C    , C    )
               ;
               ;A,PSW DESTROYED
               ;REGISTERS DESTROYED
               ;
               ;INSERT BITS FROM BIT STRING 3 AT A TIME INTO A PREVIOUSLY
               ;CLEARED NIBBLE STRING.
               ;DIGCNT ASSUMED .NE. 0.
               ;
               BINOCT;               ****ENTRY POINT
135D 78         MOV  A,B              E = DBIT = DIGCNT*4-1
135E 07         RLC
135F 07         RLC
1360 3D         DCR  A
1361 5F         MOV  E,A
1362 90         SUB  B                L = SBIT = DBIT-DIGCNT
1363 6F         MOV  L,A
               BINOC1;               DO UNTIL DBIT .LT. 0
               ;                       SET TO MOVE 3 BITS INTO OCTAL NIBBLE
1364 0E 03      MVI  C,3                C = BITCNT = 3
               BINOC2;                 DO UNTIL BITCNT .EQ. 0
               ;                         MOVE 3 L/O BITS INTO NIBBLE
1366 CD 68 0F   CALL MOVBIT              MOVBIT(BINARY,SBIT,OCTAL,DBIT,ZRO)
               ;                               ( @H    , L  , @D   , E  ,P:Z)
               ;                               ( I     , I  , O    , I  , O )
1369 2D         DCR  L                   L = SBIT = SBIT-1
136A 1D         DCR  E                   E = DBIT = DBIT-1
136B 0D         DCR  C                   C = BITCNT = BITCNT-1
136C C2 66 13   JNZ  BINOC2
               ;                       ENDDO
               ;                       SKIP OVER H/O BIT IN NIBBLE
136F 1D         DCR  E                 E = DBIT = DBIT-1
1370 F2 64 13   JP   BINOC1
               ;                     ENDDO
1373 C9         RET                  RETURN
               ;VRCDR(ERRFLG)(DSCREG,DSCCRC)
               ;     (BIT   )(NIBSTR,BYTE  )
               ;     ( O    )( O    , O    )
               ;     (PSW:Z )( RAM  , RAM  )
               ;     ( C    )( C    , C    )
               ;
               ;A,PSW DESTROYED
               ;REGISTERS DESTROYED
               ;
               ;CLEAR VARIABLE RMRS DESCENDING REGISTER
               ;
               VRCDR;                ****ENTRY POINT
               ;                     PERFORM RULE CHECKING AND REFORMATTING
1374 CD 03 14   CALL VRPREP          VRPREP(ERRFLG)
               ;                           (PSW:Z )
               ;                           ( O    )
1377 C8         RZ                   IF ERRFLG .EQ. FALSE
               ;                       CLEAR DESCENDING REGISTER
1378 AF         XRA  A                  A = NIBVAL = 0
```

```
1379 06 07      MVI  B,DSCSIZ         B = DSCSIZ
137B 0E 2F      MVI  C,DSCREG         C = OFFSET, DSCREG
137D CD 24 0F   CALL FILNIB           FILNIB(DSCREG,NIBVAL,DSCSIZ)
               ;                              ( @C    , A     , B     )
               ;                              ( O     , I     , I     )
               ;                      UPDATE DESCENDING REGISTER CRC
1380 CD B1 0D   CALL CRC              CRC(DSCREG,DSCSIZ,CRCVAL)
               ;                         ( @C    , B    , D     )
               ;                         ( I     , I    , O     )
1383 7A         MOV  A,D              DSCCRC = CRCVAL
1384 32 15 74   STA  DSCCRC/2+X
               ;                      CHECK METER STATUS
1387 CD 4E 0F   CALL LSTATE           LSTATE(FATMOD,NORMOD,SERMOD,PRVMOD)
               ;                              (PSW:S ,PSW:Z ,PSW:P ,PSW:C )
               ;                              ( O    , O    , O    , O    )
               ;                      IF FATMOD .EQ. FALSE
               ;                        EXECUTE RESET
138A F2 03 14   JP   VRXEQ              VRXEQ(ERRFLG)
               ;                                (PSW:Z )
               ;                                ( O    )
               ;                      ELSE
               ;                        DECLARE DEAD METER. FATAL RESET
138D 3E 03      MVI  A,FATRST           A = FATRST
138F C3 85 10   JMP  NVMDED             NVMDED(FATRST,ERRFLG)
               ;                                 ( A    ,PSW:Z )
               ;                                 ( I    , O    )
               ;                      ENDIF
               ;                    ENDIF
               ;                    RETURN
               ;VRCLR(ERRFLG)(AMTBUF)
               ;     (BIT   )(NIBSTR)
               ;     ( C    )( I    )
               ;     (PSW:Z )( RAM  )
               ;     ( C    )( NC   )
               ;
               ;A,PSW DESTROYED
               ;REGISTERS DESTROYED
               ;
               ;SELECT VARIABLE RMRS CLEAR REGISTER FUNCTION
               ;
               VRCLR;               ****ENTRY POINT
               ;                    SELECT FUNCTION VIA AMOUNT FORMAT
1392 21 70 74   LXI  H,AMTBUF/2+X   HL = ADDRESS, AMTBUF[0..1]
1395 7E         MOV  A,M            A = AMTBUF[0..1]
               ;                    CASE (AMTBUF[0..1])
1396 FE 1F      CPI  1FH              **1F: CLEAR RESET ERROR COUNTER
1398 CA A3 13   JZ   VRCREC                 VRCREC(ERRFLG,ADRESS,AMTBUF)
               ;                                  (PSW:Z , HL   , @HL  )
               ;                                  ( O    , I    , -    )
139B FE 22      CPI  22H              **22: CLEAR DESCENDING REGISTER
139D CA 74 13   JZ   VRCDR                  VRCDR(ERRFLG)
               ;                                (PSW:Z )
               ;                                ( O    )
               ;                      **ELSE:
               ;                            PROCESS ERROR
13A0 C3 A1 0B   JMP  PROERR                 PROERR(ERRFLG)
               ;                                  (PSW:Z )
               ;                                  ( O    )
               ;                    ENDCASE
               ;                    RETURN
               ;VRCREC(ERRFLG,ADRESS,AMTBUF)(AMTBUF)
               ;      (BIT   ,ADRESS,NIBSTR)(NIBSTR)
               ;      ( O    , I    , -    )( O    )
               ;      (PSW:Z , HL   , @HL  )( RAM  )
               ;      ( C    , C    , -    )( C    )
               ;
               ;A,PSW DESTROYED
               ;REGISTERS DESTROYED
```

```
                         ;
                         ;CLEAR VARIABLE RMRS RESET ERROR COUNTER
                         ;
                         VRCREC;                 ****ENTRY POINT
                         ;                       CHECK AMOUNT BUFFER
13A3 23                    INX  H                HL = ADDRESS, AMTBUF[2..3]
13A4 7E                    MOV  A,M              IF AMTBUF[2..3] .EQ. HEX00
13A5 B7                    ORA  A
                         ;                         DON'T CLEAR DES REG BY MISTAKE
13A6 CA A1 0B              JZ   PROERR             PROERR(ERRFLG)
                         ;                                (PSW:Z )
                         ;                                ( 0    )
                         ;                       ELSE
                         ;                         CHECK METER STATUS
13A9 CD 4E 0F              CALL LSTATE             LSTATE(FATMOD,NORMOD,SERMOD,PRVMOD)
                         ;                                (PSW:S ,PSW:Z ,PSW:P ,PSW:C )
                         ;                                ( 0    , 0    , 0    , 0    )
                         ;                         IF FATMOD .EQ. TRUE
                         ;                           PROCESS ERROR
13AC FA A1 0B              JM   PROERR               PROERR(ERRFLG)
                         ;                                  (PSW:Z )
                         ;                                  ( 0    )
                         ;                         ELSE
                         ;                           ALTER AMOUNT FORMAT
13AF 3A 35 74              LDA  DIEDCM/2+X           A = DIEDCM
13B2 0E E1                 MVI  C,AMTBUF+1           C = OFFSET, AMTBUF[1]
13B4 CD EE 0F              CALL PUTNIB               PUTNIB(AMTBUF[1],DIEDCM)
                         ;                                  ( @C       , A     )
                         ;                                  ( 0        , I     )
                         ;                           PERFORM RULE CHECK AND REFORMATTING
13B7 CD 03 14              CALL VRPRE1               VRPRE1(ERRFLG)
                         ;                                  (PSW:Z )
                         ;                                  ( 0    )
                         ;                           IF ERRFLG .EQ. FALSE
                         ;                             EXECUTE RESET
13BA C2 03 14              JNZ  VRXEQ                  VRXEQ(ERRFLG)
                         ;                                   (PSW:Z )
                         ;                                   ( 0    )
                         ;                           ENDIF
                         ;                         ENDIF
                         ;                       ENDIF
13BD C9                    RET                   RETURN
                         ;VRMRS(ERRFLG)(CMBBUF)
                         ;     (BIT   )(NIBSTR)
                         ;     ( 0    )( I    )
                         ;     (PSW:Z )( RAM  )
                         ;     ( C    )( NC   )
                         ;
                         ;A,PSW DESTROYED
                         ;REGISTERS DESTROYED
                         ;
                         ;SELECT VARIABLE RMRS FUNCTION
                         ;
                         VRMRS;                  ****ENTRY POINT
                         ;                       SELECT FUNCTION VIA COMBINATION FORMAT
13BE 3A 78 74              LDA  CMBBUF/2+X       A = CMBBUF[0..1]
                         ;                       CASE (CMBBUF[0..1])
13C1 FE 4F                 CPI  4FH                **4F: CLEAR REGISTERS
13C3 CA 92 13              JZ   VRCLR                    VRCLR(ERRFLG)
                         ;                                     (PSW:Z )
                         ;                                     ( 0    )
13C6 FE 6F                 CPI  6FH                **6F: RESET POSTAGE
13C8 CA CE 13              JZ   VRSET                    VRSET(ERRFLG)
                         ;                                     (PSW:Z )
                         ;                                     ( 0    )
                         ;                         **ELSE:
                         ;                               PROCESS ERROR
13CB C3 A1 0B              JMP  PROERR                   PROERR(ERRFLG)
                         ;                                     (PSW:Z )
```

```
                  ;                          ( 0     )
                  ;                 ENDCASE
                  ;                 RETURN
                  ;VRSET(ERRFLG)(AMTBUF,DSCREG,DSCCRC)
                  ;     (BIT   )(NIBSTR,NIBSTR,BYTE  )
                  ;     ( 0    )( I    , 0    , 0    )
                  ;     (PSW:Z )( RAM  , RAM  , RAM  )
                  ;     ( C    )( NC   , C    , C    )
                  ;
                  ;A,PSW DESTROYED
                  ;REGISTERS DESTROYED
                  ;
                  ;RESET VARIABLE RMRS DESCENDING REGISTER
                  ;
                  VRSET;                ****ENTRY POINT
                  ;                     CHECK METER STATUS
13CE CD 4E 0F       CALL LSTATE         LSTATE(FATMOD,NORMOD,SERMOD,PRVMOD)
                  ;                           (PSW:S ,PSW:Z ,PSW:P ,PSW:C )
                  ;                           ( 0    , 0    , 0    , 0    )
                  ;                     IF NORMOD .EQ. FALSE
                  ;                       PROCESS ERROR
13D1 C2 A1 0B       JNZ  PROERR           PROERR(ERRFLG)
                  ;                              (PSW:Z )
                  ;                              ( 0    )
                  ;                     ELSE
                  ;                       CHECK AMOUNT FORMAT
13D4 3A 70 74       LDA  AMTBUF/2+X       IF AMTBUF[1] .EQ. HEXOF
13D7 E6 0F          ANI  0FH
13D9 FE 0F          CPI  0FH
                  ;                         PROCESS ERROR. NO DECIMAL ENTERED
13DB CA A1 0B       JZ   PROERR             PROERR(ERRFLG)
                  ;                                (PSW:Z )
                  ;                                ( 0    )
                  ;                       ELSE
                  ;                         PERFORM RULE CHECK AND REFORMATTING
13DE CD 03 14       CALL VRPREP             VRPREP(ERRFLG)
                  ;                                (PSW:Z )
                  ;                                ( 0    )
13E1 C8             RZ                      IF ERRFLG .EQ. FALSE
                  ;                           CALC NEW DESC REGISTER VALUE
13E2 0E E7          MVI  C,AMTBUF+8-1         C = OFFSET, AMTBUF[7]
13E4 06 35          MVI  B,DSCREG+DSCSIZ-1    B = OFFSET, DSCREG[I=DSCSIZ-1]
13E6 11 07 07       LXI  D,DSCSIZ*100H+DSCSIZ
                  ;                           D = DSCSIZ
                  ;                           E = DSCSIZ
13E9 CD F8 06       CALL DECADD               DECADD(AMTBUF[7],DSCREG[I],
                  ;                                 ( @C       , @B       ,
                  ;                                 ( I/O      , I        ;
                  ;
                  ;                                 DSCSIZ,DSCSIZ,OVRFLO)
                  ;                                  D     , E    ,PSW:C )
                  ;                                  I     , I    , 0    )
                  ;                           IF OVRFLO .EQ. TRUE
                  ;                             PROCESS ERROR. OVERFLOW
13EC DA A1 0B       JC   PROERR                 PROERR(ERRFLG)
                  ;                                    (PSW:Z )
                  ;                                    ( 0    )
                  ;                           ELSE
                  ;                             UPDATE DESCENDING REGISTER
13EF 0E 2F          MVI  C,DSCREG               C = OFFSET, DSCREG
13F1 06 E1          MVI  B,AMTBUF+8-DSCSIZ      B = OFFSET, AMTBUF[I=8-DSCSIZ]
13F3 3E 07          MVI  A,DSCSIZ               A = DSCSIZ
13F5 CD B3 0F       CALL MVLNIB                 MVLNIB(DSCREG,AMTBUF[I],DSCSIZ,
                  ;                                    ( @C    , @B      , A    ,
                  ;                                    ( 0     , I       , I    ,
                  ;
                  ;                                     NONBCD,NONZRO)
                  ;                                     PSW:S ,PSW:Z )
                  ;                                      0    , 0    )
                  ;                             UPDATE DESC REGISTER CRC
```

```
13F8 47         MOV  B,A                 B = DSCSIZ
13F9 CD B1 0E   CALL CRC                 CRC(DSCREG,DSCSIZ,CRCVAL)
               ;                            ( @C   , B    , D    )
               ;                            ( I    , I    , O    )
13FC 7A         MOV  A,D                 DSCCRC = CRCVAL
13FD 32 1B 74   STA  DSCCRC/2+X
               ;                         EXECUTE RESET
1400 C3 03 14   JMP  VRXEQ               VRXEQ(ERRFLG)
               ;                              (PSW:Z )
               ;                              ( O    )
               ;                       ENDIF
               ;                     ENDIF
               ;                   ENDIF
               ;                 ENDIF
               ;                 RETURN
               ;  Recharging programs have been deleted.
               VRPREP;
               VRPRE1; and
               VRXEQ:  are two (2) of the modules which have been removed for security
               ;  purposes.  One suitable system for the deleted set of modules
               ;  is disclosed in U. S. Patent No. 4,097,923 for REMOTE POSTAGE
               ;  METER CHARGING SYSTEM USING AN ADVANCED MICROCOMPUTERIZED
               ;  POSTAGE METER issued on June 27,1978 to Alton B. Eckert, Howell
               ;  A. Jones, Jr. and Frank T. Check, Jr.  This patent is hereby
               ;  incorporated by reference into the subject patent application.
               ; (************************************************************)
               ;
               ;THIS IS THE DEMO PROGRAM FOR 6 STEPS/DIGIT MECHANISM
               ;  USED FOR 45 DEG ENCODER  & 30 DEG SENSOR MOUNTING
               ;Objective
               ;  Position the stepper motor through specified number of steps.
               ;  Flag the errors if
               ;                 1. the move fails
               ;                 2. if the sensors are not in home position
               ;                    after the completion of a move
               ;Level:
               ;  Calls RENC , BKLASH routines
               ;  utilizes look up table setup for determining the step count
               ;  requirements for retries.
               ;  Exits with the power held on to both motors.  It is the duty of the
               ;  invoking routine to judiciously hold the appropriate home phase.
               ;Procedure MOVCLS(MOTOR,RETRIES,MCOUNT,SPEED:ERROR)
               ;ERROR := 0
               ;Input (PORT.SENSOR,SENSPTN)
               ;SENSPTN := SENSPTN and MSNMASK
               ;If SENSPTN = (BODO or BODC or BCDO or BCDC) then PASSFLAG := 0
               ;                                                 go to Loop1
               ;                                           else ERROR := 5
               ;                                                 End MOVCLS
               ;Loop1:     Do while (RETRIES > 0 and MCOUNT <> 0 and ERROR > 0 )
               ;           If PASSFLAG = 0 then  ECOUNT := MCOUNT * 2
               ;                                 MSTEP := MCOUNT * 6
               ;           Input (PORT.SENSOR,SENSPTN)
               ;           If MOTOR = BANK then
               ;                        SENSPTN := (SENSPTN / 4) and MASKDSENSR
               ;           If SENSPTN = 11 then MOTPTN := PHASE1    (....  11H..)
               ;                        else MOTPTN := PHASE2           44H
               ;           If MCOUNT > 0 then MOTPTN := MOTPTN * 4
               ;           Input (PORTB,MOTHPTN)
               ;           IF MOTOR = BANK then MOTPTN := MOTPTN and MASKMSN
               ;                            MOTHPTN := MOTHPTN and MASKLSN
               ;                            MOTHPTN := MOTHPTN or MOTPTN
               ;                        else MOTPTN := MOTPTN and MASKLSN
               ;                            MOTHPTN := MOTHPTN and MASKMSN
               ;                            MOTHPTN := MOTHPTN or MOTPTN
               ;           Output ( PORTB,MOTHPTN)
               ;           If MCOUNT > 0 then  MSTEP := MSTEP-1
               ;                               MOTPTN := MOTPTN * 2
               ;                         else  MSTEP := MSTEP + 1
               ;                               MOTPTN := MOTPTN / 2
```

```
                ;            For X = 1 to SPEED by 1
                ;                  Procedure RENC (MOTOR,SPEED,OLDPTN :ERROR,ADJCOUNT)
                ;            End For
                ;            If MSTEP <> 0 then
                ;                  If ERROR = 0 then Continue Do
                ;            else For Y =1 to 60 by 1
                ;                     Procedure RENC (MOTOR,OLDPTN: ERRORT,ADJCOUNT)
                ;                End For
                ;            MSTEP := MSTEP (look-up)
                ;            PASSFLAG := PASSFLAG + 1
                ;            Continue Do
                ;      End Do
                ;      If RETRIES = 0 or MCOUNT = 0 then
                ;                           Procedure BKLASH
                ;If ERROR > 0 THEN End
                ;If BNKPAT = 01 then ERROR := 5; End
                ;             else if BNKPAT = 10 then ERROR :5; End
                ;                           else if MCOUNT = 0 THEN    End
                ;                                          else ERROR := 6;End
                ;If DGTPAT = 01 then ERROR := 5; End
                ;            else if DGTPAT = 10 then ERROR := 5 ; End
                ;                          else if MCOUNT = 0 then End
                ;                                          else ERROR := 6
                ;
                ;End movcls
                ;
                ;
                ; PARAM    (*C-REG*) COUNT : BYTE; (*- FOR CW, + FOR CCW*)
                ;   (*E-REG*) MOTOR : MOTORS; (*1 FOR BANK, 0 FOR DIGIT*)
                ;   (*H-REG*) SPEED : BYTE  ;Stepping speed of motor
                ;   (*L-REG*) TRIES : BYTE;
                ;
                ; VAR      (*B-REG*) ENC_COUNT : BYTE;
                ;   (*C-REG*) MOT_COUNT : BYTE;
                ;   (*D-REG*) PATTERN : BYTE;
                ;
0000            BODO        EQU     0000B
0003            BODC        EQU     0011B
000C            BCDO        EQU     1100B
000F            BCDC        EQU     1111B
0000            PFLAG0      EQU     00
0003            DGTMSK      EQU     03H
000C            BNKMSK      EQU     0CH
000F            LSNMSK      EQU     0FH
00F0            MSNMSK      EQU     0F0H
0011            PHASE1      EQU     11H
0044            PHASE2      EQU     44H
0003            SENSCL      EQU     03H
0005            ERROR5      EQU     05H
0006            ERROR6      EQU     06H
                MOVCLS:                                              ; BEGIN
1403 AF             XRA     A       ; ERROR := NO_ERRORS;
1404 32 38 74       STA     ERROR
                ;
                ;
1407 3A 00 68   MOVC4:      LDA     PORT2A  ;Combination sensor check
140A E6 0F          ANI     LSNMSK
140C FE 00          CPI     BODO
140E CA 23 14       JZ      MOVC7
1411 FE 03          CPI     BODC
1413 CA 23 14       JZ      MOVC7
1416 FE 0C          CPI     BCDO
1418 CA 23 14       JZ      MOVC7
141B FE 0F          CPI     BCDC
141D CA 23 14       JZ      MOVC7
1420 C3 F9 14       JMP     MOVC60
                ;
                ;
1423 3E 00      MOVC7:      MVI     A,PFLAG0  ;Passflag:=0
1425 F5             PUSH    PSW
1426 7D         MOVC05:     MOV     A,L     ; WHILE (TRIES > 0) AND (COUNT <> 0)
```

```
1427 B7              ORA     A        ;       AND (ERROR = NO_ERRORS) DO
1428 CA DB 14        JZ      MOVC50   ;branch here to movc70 for backlash correction
142B 79              MOV     A,C
142C B7              ORA     A
142D CA DB 14        JZ      MOVC50   ;branch here to movc70 for backlash correction
1430 3A 39 74        LDA     ERROR
1433 B7              ORA     A
1434 C2 DB 14        JNZ     MOVC50
                                      ;     BEGIN
1437 F1              POP     PSW      ;Passflag check.
1438 B7              ORA     A
1439 F5              PUSH    PSW      ;
143A C2 56 14        JNZ     MOVC8
143D 79        MOVC1:        MOV      A,C              ;
143E 87              ADD     A
143F 47              MOV     B,A              ;ENC COUNT=2*COUNT
1440 87              ADD     A
1441 80              ADD     B                ;STEP = 6*COUNT
1442 4F              MOV     C,A
               ;
               ;
1443 7B              MOV     A,E
1444 B7              ORA     A
1445 3A 00 68        LDA     PORT2A
1448 CA 4D 14        JZ      MOVC6
               ;
               ;
144B 0F              RRC                      ;BANK MOTOR
144C 0F              RRC                      ;
                                      ;    CASE SIGN (MOT_COUNT) OF
144D E6 03     MOVC6:        ANI      DGTMSK           ;
144F 16 44           MVI     D,PHASE2                  ;
1451 CA 56 14        JZ      MOVC8                     ;
1454 16 11           MVI     D,PHASE1
               MOVC8:                         ;
1456 79              MOV     A,C                       ;
1457 B7              ORA     A                         ;
1458 7A              MOV     A,D                       ;
                                      ;
1459 FA 5F 14        JM      MOVC15           ;
145C 07              RLC
145D 07              RLC                                          ;
                                      ;                 AND PHASED AND PHASEA;
145E 57        MOVC10:       MOV      D,A      ;    END;
               MOVC15:                         ;    REPEAT
145F 7B              MOV     A,E      ;     CASE MOTOR OF
1460 B7              ORA     A
1461 7A              MOV     A,D
1462 CA 73 14        JZ      MOVC20
1465 E6 F0           ANI     MSNMSK
1467 C5              PUSH    B
1468 47              MOV     B,A
1469 3A 02 70        LDA     PORTB
146C E6 0F           ANI     LSNMSK
146E B0              ORA     B
146F C1              POP     B
1470 C3 7E 14        JMP     MOVC25
1473 E6 0F     MOVC20:       ANI      LSNMSK   ;          DIGIT: PORTB := (PATTERN OR PHASESOFF R
1475 C5              PUSH    B
1476 47              MOV     B,A
1477 3A 02 70        LDA     PORTB                     ;
147A E6 F0           ANI     MSNMSK                    ;
147C B0              ORA     B                         ;
147D C1              POP     B                         ;
                                      ;                IS BEING MOVED
147E 32 02 70  MOVC25:       STA      PORTB    ;        END;
1481 79              MOV     A,C      ;     CASE SIGN (MOT_COUNT) OF
1482 B7              ORA     A
1483 7A              MOV     A,D
1484 FA 8C 14        JM      MOVC30
                                      ;            +1: BEGIN
```

```
1487 0D          DCR     C       ;          MOT_COUNT := MOT_COUNT - 1;
1488 07          RLC             ;          PATTERN := PATTERN ROL 1
1489 C3 8E 14    JMP     MOVC35  ;          END;
            MOVC30:                    ;       -1: BEGIN
148C 0C          INR     C       ;          MOT_COUNT := MOT_COUNT - 1;
148D 0F          RRC             ;          PATTERN := PATTERN ROR 1
                                 ;          END;
148E 57     MOVC35:  MOV     D,A       ;    END;
148F C5          PUSH    B       ;     READ_ENCODERS (10, MOTOR, ENC_COUNT)
1490 48          MOV     C,B
1491 D5          PUSH    D
1492 E5          PUSH    H
1493 6C          MOV     L,H
1494 CD 99 19    CALL    RENC
1497 E1          POP     H
1498 D1          POP     D
1499 79          MOV     A,C
149A C1          POP     B
149B 47          MOV     B,A
149C 79          MOV     A,C     ;     UNTIL (MOT_COUNT = 0) OR (ERROR <> NO_ERRORS);
149D B7          ORA     A
149E CA A8 14    JZ      MOVC40
14A1 3A 38 74    LDA     ERROR
14A4 B7          ORA     A
14A5 CA 5F 14    JZ      MOVC15
14A8 C5     MOVC40:  PUSH    B       ;     READ_ENCODERS (60, MOTOR, ENC_COUNT);
14A9 48          MOV     C,B
14AA D5          PUSH    D
14AB E5          PUSH    H
14AC 2E 3C       MVI     L,60.
14AE CD 99 19    CALL    RENC
14B1 E1          POP     H
14B2 D1          POP     D
14B3 79          MOV     A,C
14B4 C1          POP     B
14B5 47          MOV     B,A
14B6 B7          ORA     A       ;     COUNT := ENC_COUNT / 2;
14B7 F2 BC 14    JP      MOVC45
14BA 2F          CMA
14BB 3C          INR     A
14BC E5     MOVC45:  PUSH    H
14BD D5          PUSH    D
14BE 16 00       MVI     D,00H   ;Step error computation/lookup
14C0 5F          MOV     E,A
14C1 21 08 15    LXI     H,TABBASE
14C4 19          DAD     D
14C5 4E          MOV     C,M
14C6 78          MOV     A,B
14C7 B7          ORA     A
14C8 F2 CF 14    JP      MOVC42
14CB 79          MOV     A,C
14CC 2F          CMA
14CD 3C          INR     A
14CE 4F          MOV     C,A
14CF D1     MOVC42:  POP     D
14D0 E1          POP     H
14D1 2D          DCR     L
14D2 F1          POP     PSW
14D3 3C          INR     A               ;PASSFLAG:=PASSFLAG+1
14D4 F5          PUSH    PSW
14D5 C3 26 14    JMP     MOVC05
                 ;
                 ;
                 ;
14D8 CD 1B 15 MOVC70:  CALL    BKLASH
14DB F1     MOVC50:  POP     PSW             ;retrieve passflag;
14DC 3A 38 74    LDA     ERROR
14DF B7          ORA     A
```

```
14E0 C0            RNZ
                   ;
                  ;
                  ;
14E1 3A 39 74      LDA      BNKPAT  ; IF BANK_PAT NOT IN [00H, 03H]
14E4 B7            ORA      A       ;    OR DIGIT_PAT NOT IN [00H,03H] THEN
14E5 CA ED 14      JZ       MOVC55
14E8 FE 03         CPI      SENSCL
14EA C2 F9 14      JNZ      MOVC60
14ED 3A 3A 74 MOVC55:       LDA     DGTPAT
14F0 B7            ORA      A
14F1 CA FF 14      JZ       MOVC65
14F4 FE 03         CPI      SENSCL
14F6 CA FF 14      JZ       MOVC65
                            ;    BEGIN
14F9 3E 05    MOVC60:       MVI      A,ERROR5        ;     ERROR := NOT_HOME;
14FB 32 38 74      STA      ERROR
14FE C9            RET              ;    RETURN
                                    ;    END;
14FF 79       MOVC65:       MOV      A,C     ; IF COUNT <> 0 THEN ERROR := MOVE_FAILED
1500 B7            ORA      A
1501 C8            RZ
1502 3E 06         MVI      A,ERROR6
1504 32 38 74      STA      ERROR
1507 C9            RET
                                    ; END;
                  ;
                  ;
1508 00       TABBASE:DB    0
1509 04            DB       4H
150A 06            DB       6D
150B 08            DB       8D
150C 0C            DB       12D
150D 10            DB       16D
150E 12            DB       18D
150F 14            DB       20D
1510 18            DB       24D
1511 1C            DB       28D
1512 1E            DB       30D
1513 22            DB       34D
1514 24            DB       36D
1515 28            DB       40D
1516 2A            DB       42D
1517 2C            DB       44D
1518 30            DB       48D
1519 34            DB       52D
151A 36            DB       54D
                  ;
                  ;
                  ;BACKLASH CORRECTION ROUTINE
                  ;This routine advances the digit stepper motor by one step
                  ;beyond the expected settling point and then drives one
                  ;step backwards  to the final settling point
                  ;None of.the registers are affected.
                  ;This routine will be invoked only if all retries are exhausted or if al
                  ;motor phases are applied.
                  ;This routine will not be invoked in case of an error condition arises
                  ;in RENC routine before the specified number of pulses are applied
                  ;
151B F5       BKLASH:       PUSH    PSW
151C C5            PUSH     B
151D 7B            MOV      A,E             ;motor type check
151E B7            ORA      A
151F C2 3C 15      JNZ      BKL50
1522 3A 02 70      LDA      PORTB
1525 F5            PUSH     PSW
1526 E6 F0         ANI      MSNMSK
1528 F5            PUSH     PSW
1529 7A            MOV      A,D             ;D register has the next pattern output
152A E6 0F         ANI      LSNMSK
```

```
152C 47             MOV     B,A
152D F1             POP     PSW
152E B0             ORA     B
152F 32 02 70       STA     PORTB
1532 CD A9 17       CALL    DEL30M          ;forward pulse
1535 F1             POP     PSW
1536 32 02 70       STA     PORTB
1539 CD A9 17       CALL    DEL30M          ;backward pulse to final settling point
153C C1        BKL50:       POP     B
153D F1             POP     PSW
153E C9             RET
               ;
               ;
               ;    LEDON ROUTINE
               ;    TURNS ON THE STROBE FOR LEDS
               ;
               ;
153F F5        LEDON:       PUSH    PSW             ;SAVE CONTENTS
1540 3A 01 70       LDA     PORTA           ;LOADS THE CURRENT STATUS
1543 E6 DF          ANI     0DFH            ;BIT RESET
1545 32 01 70       STA     PORTA           ;PORT RESET
1548 F1             POP     PSW
1549 C9             RET                     ;
               ;
               ;
               ;    LEDOFF ROUTINE
               ;    TURNS THE STROBE OFF
               ;
               ;
154A F5        LEDOFF:      PUSH    PSW                     ;
154B 3A 01 70       LDA     PORTA                   ;
154E F6 20          ORI     20H                     ;
1550 32 01 70       STA     PORTA                   ;
1553 F1             POP     PSW             ;
1554 C9             RET                             ;
               ;
               ;
               ;
               ;
               ;
               ;
               ;    DELAY ROUTINES
               ;
               ;
1555 00        DEL300:      NOP
1556 00             NOP             ;ADJUST TIME
1557 CD 64 15       CALL    DEL75   ;75 MICRO SECS
155A CD 64 15       CALL    DEL75   ;
155D CD 64 15       CALL    DEL75           ;
1560 CD 64 15       CALL    DEL75           ;
1563 C9             RET                     ;
               ;
               ;
               ;
1564 F5        DEL75:       PUSH    PSW                     ;
1565 3E 0A          MVI     A,0AH                   ;
1567 3D        DEL1:        DCR     A                       ;
1568 C2 67 15       JNZ     DEL1                    ;
156B F1             POP     PSW                     ;
156C C9             RET                             ;
               ;
               ;
               ;    SENSOR INITIALISATION ROUTINE
               ;
               ;
156D           INITSM:
156D CD 3F 15  SENSR:       CALL    LEDON                   ;LED STROBE ON
1570 CD 64 15       CALL    DEL75                   ;SETTLING TIME
1573 3A 00 68       LDA     PORT2AD
1576 47             MOV     B,A                     ;
```

```
1577 E6 03          ANI     DGTMSK
1579 CA 9E 15       JZ      SENS35
157C FE 03          CPI     DGTMSK
157E C2 A3 15       JNZ     SENS40
1581 3E 02          MVI     A,02H
1583 32 02 70 SENS25:       STA     PORTB
1586 CD A9 17       CALL    DEL30M
1589 3A 00 68       LDA     PORT2AD
158C 47             MOV     B,A
158D E6 03          ANI     DGTMSK                  ;
158F 32 3A 74       STA     DGTPAT                  ;DIGIT PATTERN
1592 78             MOV     A,B                     ;
1593 0F             RRC                             ;
1594 0F             RRC                             ;
1595 E6 03          ANI     DGTMSK                  ;
1597 32 39 74       STA     BNKPAT                  ;BANK PATTERN
159A CD 4A 15       CALL    LEDOFF
159D C9             RET                             ;
                  ;
                  ;
159E 3E 08        SENS35:       MVI     A,08H
15A0 C3 83 15       JMP     SENS25
                  ;
                  ;
15A3 3E 0F        SENS40:       MVI     A,15D
15A5 32 38 74       STA     ERROR
15A8 C3 9E 15       JMP     SENS35
                  ;
                  ; (***************************************************************)
                  ;Objective: To compare present encoder status to previous encoder value
                  ;           and determine the deviation as no change, clockwise movement
                  ;           of one step, counterclockwise movement of one step or as an
                  ;           error, which corresponds to a two step jump in the status.
                  ;
                  ;           Does not call any subroutines
                  ;
                  ;
                  ; FUNCTION (*A-REG*) ENCODER_MOVE : BYTE;
                  ;
                  ; PARAM     (*C-REG*) PATTERN : ENCODER_PATTERNS;
                  ;   (*E-REG*) NEW_PATTERN : ENCODER_PATTERNS;
                  ;
                  ENCMOV:                     ; BEGIN
15AB 79             MOV     A,C     ; CASE PATTERN ROL 2 OR NEW_PATTERN OF
15AC 07             RLC
15AD 07             RLC
15AE B3             ORA     E
15AF 5F             MOV     E,A
15B0 AF             XRA     A
15B1 57             MOV     D,A
15B2 21 B8 15       LXI     H,ENCT
15B5 19             DAD     D
15B6 7E             MOV     A,M
15B7 C9             RET
15B8 00           ENCT:     DB      0       ;     00H: ENCODER_MOVE := 0;
15B9 01             DB       1      ;     01H: ENCODER_MOVE := +1;
15BA FF             DB      -1      ;     02H: ENCODER_MOVE := -1;
15BB 02             DB      +2      ;     03H: ENCODER_MOVE := +2;
15BC FF             DB      -1      ;     04H: ENCODER-MOVE := -1;
15BD 00             DB      0       ;     05H: ENCODER_MOVE := 0;
15BE 02             DB      +2      ;     06H: ENCODER_MOVE := +2;
15BF 01             DB      +1      ;     07H: ENCODER_MOVE := +1;
15C0 01             DB      +1      ;     08H: ENCODER_MOVE := +1;
15C1 02             DB      +2      ;     09H: ENCODER_MOVE := +2;
15C2 00             DB      0       ;     0AH: ENCODER_MOVE := 0;
15C3 FF             DB      -1      ;     0BH: ENCODER_MOVE := -1;
15C4 02             DB      +2      ;     0CH: ENCODER_MOVE := +2;
15C5 FF             DB      -1      ;     0DH: ENCODER_MOVE := -1;
```

```
1506 01             DB      +1      ;     0EH: ENCODER_MOVE := +1;
1507 00             DB      0       ;     0FH: ENCODER_MOVE := 0;
                                    ; END
                                    ; END;
                    ; (*************************************************************)
                    ;THIS SEGMENT IS USED TO MOVE THE BANK & DIGIT IN TO HOME
                    ;POSITION UPON DETECTION OF AN ERROR IN ATTEMPT TO
                    ;POSITION THE RACKS TO 00.00
                    ;
                    ; PROCEDURE ENDMOV_CLOSED;
                    ;
                    ; PARAM     (*C-REG*) COUNT : BYTE; (*- FOR CW, + FOR CCW*)
                    ;   (*E-REG*) MOTOR : MOTORS; (*1 FOR BANK, 0 FOR DIGIT*)
                    ;
                    ; VAR       (*B-REG*) ENC_COUNT : BYTE;
                    ;   (*C-REG*) MOT_COUNT : BYTE;
                    ;   (*D-REG*) PATTERN : BYTE;
                    ;
                    ;
                    ;
00F0                MSNMASK     EQU     0F0H
000F                LSNMASK     EQU     0FH
0014                NUMRD1      EQU     20D
003C                SETLTIM     EQU     60D
                    ;
                    ;
                    ;
                    ;
                    ;
15C8 AF             ENDMOV:     XRA     A                       ;     REPEAT
15C9 32 38 74           STA     ERROR
15CC 7B             ENDM05:     MOV     A,E     ;         CASE MOTOR OF
15CD B7                 ORA     A
15CE 7A                 MOV     A,D
15CF CA E0 15           JZ      ENDM20          ;MOTOR(BANK,DIGIT)
                    ;
                    ;
15D2 E6 F0              ANI     MSNMASK
15D4 C5                 PUSH    B
15D5 47                 MOV     B,A
15D6 3A 02 70           LDA     PORTB
15D9 E6 0F              ANI     LSNMASK
15DB B0                 ORA     B
15DC C1                 POP     B
15DD C3 E3 15           JMP     ENDM25
                    ;
                    ;
15E0 E6 0F          ENDM20:     ANI     LSNMASK     ;   DIGIT: PORTB := (PATTERN OR PHASESOFF ROL 4)
15E2 C5                 PUSH    B
15E3 47                 MOV     B,A
15E4 3A 02 70           LDA     PORTB                  ;
15E7 E6 F0              ANI     MSNMASK                ;
15E9 B0                 ORA     B                      ;
15EA C1                 POP     B                      ;
                                    ;                  IS BEING MOVED
15EB 32 02 70 ENDM25:   STA     PORTB   ;                END;
15EE 79                 MOV     A,C     ;       CASE SIGN (MOT_COUNT) OF
15EF B7                 ORA     A
15F0 7A                 MOV     A,D
15F1 FA F9 15           JM      ENDM30
                                    ;            +1: BEGIN
15F4 0D                 DCR     C       ;                MOT_COUNT := MOT_COUNT - 1;
15F5 07                 RLC             ;                PATTERN := PATTERN ROL 1
15F6 C3 FB 15           JMP     ENDM35  ;                END;
                    ;
                    ;
                    ENDM30:                        ;         -1: BEGIN
15F9 0C                 INR     C       ;                MOT_COUNT := MOT_COUNT - 1;
15FA 0F                 RRC             ;                PATTERN := PATTERN ROR 1
                                    ;                    END;
```

```
1600 2E 14          MVI    L,NUMRD1
15FB 57         ENDM35:     MOV    D,A      ;          END;
15FC C5             PUSH   B        ;        READ_ENCODERS (10, MOTOR, ENC_COUNT)
15FD 48             MOV    C,B
15FE D5             PUSH   D
15FF E5             PUSH   H
1600 2E 14          MVI    L,NUMRD1
1602 CD 99 19       CALL   RENC
1605 E1             POP    H
1606 D1             POP    D
1607 79             MOV    A,C
1608 C1             POP    B
1609 47             MOV    B,A
160A 79             MOV    A,C      ;     UNTIL (MOT_COUNT = 0) OR (ERROR <> NO_ERRORS);
160B B7             ORA    A
160C C2 CC 15       JNZ    ENDM05
                ;
                ;
160F C5         ENDM40:     PUSH   B        ;      READ_ENCODERS (60, MOTOR, ENC_COUNT);
1610 48             MOV    C,B
1611 D5             PUSH   D
1612 E5             PUSH   H
1613 2E 3C          MVI    L,SETLTIM
1615 CD 99 19       CALL   RENC
1618 E1             POP    H
1619 D1             POP    D
161A 79             MOV    A,C
161B C1             POP    B
161C 47             MOV    B,A
161D B7             ORA    A        ;     COUNT := ENC_COUNT / 2;
161E 3E 07          MVI    A,07H                 ;ERROR 7
1620 C8             RZ                           ;NORMAL EXIT
                ;
                ;
1621 32 38 74       STA    ERROR
1624 C9             RET                          ;ERROR EXIT
                ;
0044            HPHAM1      EQU    044H
0088            HPHASE      EQU    88H
0000            SENS00      EQU    00H
0001            SENS01      EQU    01H
0002            SENS02      EQU    02H
0003            SENS03      EQU    03H
0004            SENS04      EQU    04H
0005            SENS05      EQU    05H
0006            SENS06      EQU    06H
0007            SENS07      EQU    07H
0008            SENS08      EQU    08H
0009            SENS09      EQU    09H
000A            SENS10      EQU    0AH
000B            SENS11      EQU    0BH
000C            SENS12      EQU    0CH
000D            SENS13      EQU    0DH
000E            SENS14      EQU    0EH
000F            SENS15      EQU    0FH
0003            SENMSK      EQU    03H
                ;
                ;
1625 CD 6D 15   SEKPOS:     CALL   SENSR
1628 CD 3F 15       CALL   LEDON
162B CD 3B 16       CALL   HDSEEK
162E CD 4A 15       CALL   LEDOFF
1631 CD BC 18       CALL   MODLN
1634 CD B0 18       CALL   ERRHDR
1637 C4 B5 18       CNZ    EXTERR
163A C9             RET
                ;
                ;
                ;
                ;
```

```
;
;Procedure HDSEEK
;Objective
;    This segment initialises the print wheels to 00.00 position.
;    Prior to the movement of the racks this segment aligns the
;    bank and digit motors to legitimate home positions. The 00.00
;    location is attained by hitting against the mechanical blocks.
;    Three retries will be provided before coming to the conclusion
;    that an error in movement is detected.
;Level
;;
;
;   RCOUNTERB := 4
;   RCOUNTERC := 8                       ;RETRY COUNTERS
;SEKP00:RCOUNTERB:= RCOUNTERB-1
;   If RCOUNTERB = 0 then ERROR := 12 ;      End.
;   MOTPATN := HOMEPHASE-1
;   Output(PORTB,MOTPATN)
;   Procedure TIMEDELAY(30msec)
;   MOTPATN := HOMEPHASE
;   Output (PORTB,MOTPATN)
;   Procedure TIMEDELAY(30msec)
;   RCOUNTERC := RCOUNTERC - 1
;   If RCOUNTERC = 0 then ERROR := 12 ;             End.
;   Input (PORT.SENSOR,SENSRPTN)
;   SENSRPTN := SENSRPTN.LSNMASK
;   Case SENSRPTN   00,03,12,15     SEKP85
;                   01,02,13,14     SEKP01
;                   04,07,08,11     SEKP02
;                   05,06,09,10     SEKP03
;
;   SEKP01: Procedure DALIGN(,TYPE 2 ERROR)
;           If TYPE2ERROR = FALSE then go to STEP0
;           else MOTPTN:= NOPHASEON
;                Output (PORTB,MOTPTN)
;                Procedure TIMEDELAY (30msec)
;                Go to SEEKP00
;   SEKP02: Procedure BALIGN(TYPE2ERROR)
;           If TYPE2ERROR = FALSE then go to STEP0
;           else MOTPTN := NOPHASEON
;                Procedure TIMEDELAY(30msec)
;                Go to SEEKP00
;   SEKP03: Procedure DALIGN(TYPE2 ERROR)
;           If TYPE2ERROR = FALSE then go to STEP0
;           else  Procedure BALIGN(TYPE2ERROR)
;           If TYPE2ERROR = FALSE then go to STEP0
;           else Input (PORTB,MOTPTN)
;                MOTPTN := MOTPTN.LSNMSK
;                Output (PORTB,MOTPTN)
;                Procedure TIMEDELAY(30msec)
;                Procedure DALIGN(TYPE2ERROR)
;                If TYPE2ERROR = TRUE then Input (PORTB,MOTPTN)
;                                          MOTPTN := NOPHASEON
;                                          Output(PORTB,MOTPTN)
;                                          Procedure TIMEDELAY(30msec)
;                                          Go to SEEKP00
;               else       Input (PORTB,MOTPTN)
;                          MOTPTN:=(( MOTPTN.LSNMSK)+HOMEPHASEBANK))
;                          Output (PORTB,MOTPTN)
;                          Procedure TIMEDELAY(30msec)
;                          Go to STEP0
;   SEKP85:
;          Procedure PTNCHK(DIGIT:PTNFLAG)
;          If PTNFLAG <> 0 then go to SEKP00
;          Procedure PTNCHK(BANK,PTNFLAG)
;          If PTNFLAG <> 0 then go to SEKP00
;end case
;
```

```
                    ;   SEKP05: Procedure MOVE(DIGIT,CCW,1,SPD8:ERROR)
                    ;           Do while ERROR = 0
                    ;                   Procedure MOVE(DIGIT,CCW,1,SPD8:ERROR)
                    ;           End do.
                    ;           Procedure SELDRN(:DRN)
                    ;           Procedure POHOME(DRN:ERROR)
                    ;           If ERROR <>0 then End hdseek.
                    ;
                    ;           Procedure MOVE(BANK,CCW,1,SPD8:ERROR)
                    ;           Do while ERROR = 0
                    ;                   Procedure MOVE (BANK,CCW,1,SPD8:ERROR)
                    ;           end do.
                    ;           If BNKPAT = 01 then DRN:=CW else DRN:=CCW
                    ;           Procedure POHOME(DRN,ERROR)
                    ;           If ERROR <> 0 then End Hdseek.
                    ;           Procedure MOVE(BANK,CW,4,SPD8:ERROR)
                    ;           If ERROR <> 0 then End Hdseek.
                    ;           For BANK:=0 TO 4 by 1 Do
                    ;                   Procedure MOVE(DIGIT,CCW,1,SPD8:ERROR)
                    ;                   Do while ERROR =FALSE
                    ;                           Procedure MOVE(DIGIT,CCW,1,SPD8:ERROR)
                    ;                   end do
                    ;                   Procedure SELDRN(:DRN)
                    ;                   Procedure POHOME(DRN:ERROR)
                    ;                   If ERROR = TRUE then End hdseek.
                    ;                   Procedure MOVE(DIGIT,CW,9,SPD8:ERROR)
                    ;                   If ERROR = TRUE then End Hdseek.
                    ;                   BANK:= BANK+1
                    ;                   If BANK = 2 then
                    ;                               Procedure MOVE(BANK,CCW,1,SPD8:ERROR)
                    ;                               If ERROR = TRUE then end Hdseek.
                    ;                   end do
                    ;           end for.
                    ;           Procedure MOVE (BANK,CW,2,SPD8:ERROR)
                    ;           If ERROR = TRUE then end hdseek.
                    ;           Procedure MOVE (DIGIT,CW,2,SPD8:ERROR)
                    ;           If ERROR = TRUE then end hdseek.
                    ;           Input (PORTB.MOTPTN)
                    ;           MOTPTN:=MOTPTN.MSNMSK
                    ;           Output(PORTB,MOTPTN)
                    ;END.
                    ;
                    ;
163B 01 08 04 HDSEEK:   LXI     B,408H                  ;RETRY COUNT
163E C5                 PUSH    B
163F C1       SEKP0C:   POP     B
1640 05                 DCR     B
1641 CA 5A 16           JZ      EREXIT
                    ;
                    ;
1644 C5                 PUSH    B
1645 3E 44              MVI     A,HPHAM1
1647 32 02 70           STA     PORTB
164A CD A9 17           CALL    DEL30M
164D 3E 88              MVI     A,HPHASE
164F 32 02 70           STA     PORTB
1652 CD A9 17           CALL    DEL30M
1655 C1       STEP0:    POP     B
1656 0D                 DCR     C
1657 C2 60 16           JNZ     CSTEP0
165A 3E 0C    EREXIT:   MVI     A,12D
165C 32 38 74           STA     ERROR
165F C9                 RET
                    ;
                    ;
1660 C5       CSTEP0:   PUSH    B
1661 3A 00 68           LDA     PORT2A                  ;
1664 E6 0F              ANI     LSNMSK
                    ;
                    ;
```

```
1666 21 73 16      LXI       H,BASE5
1669 16 00         MVI       D,00H
166B 87            ADD       A
166C 5F            MOV       E,A
166D 19            DAD       D
166E 5E            MOV       E,M
166F 23            INX       H
1670 56            MOV       D,M
1671 EB            XCHG
1672 E9            PCHL
               ;
               ;
1673 D2 16     BASE5:        DW       SEKP85
1675 93 16         DW        SEKP01
1677 93 16         DW        SEKP01
1679 D2 16         DW        SEKP85
167B A5 16         DW        SEKP02
167D AF 16         DW        SEKP03
167F AF 16         DW        SEKP03
1681 A5 16         DW        SEKP02
1683 A5 16         DW        SEKP02
1685 AF 16         DW        SEKP03
1687 AF 16         DW        SEKP03
1689 A5 16         DW        SEKP02
168B D2 16         DW        SEKP85
168D 93 16         DW        SEKP01
168F 93 16         DW        SEKP01
1691 D2 16         DW        SEKP85
               ;
               ;
               ;   JZ        SEKP90
               ;                        ;CHECKING DIGIT POSITION
               ;   CPI       SENS01
               ;   JZ        SEKP01
               ;
               ;   CPI       SENS02
               ;   JZ        SEKP01
               ;;
               ;   CPI       SENS13
               ;   JZ        SEKP01
               ;;
               ;   CPI       SENS14
               ;   JZ        SEKP01
               ;;
               ;   CPI       SENS04
               ;   JZ        SEKP02
               ;;
               ;   CPI       SENS07
               ;   JZ        SEKP02
               ;;
               ;   CPI       SENS08
               ;;  JZ        SEKP02
               ;;
               ;   CPI       SENS11
               ;   JZ        SEKP02
               ;;;
               ;   CPI       SENS05
               ;   JZ        SEKP03
               ;;
               ;   CPI       SENS06
               ;   JZ        SEKP03
               ;;
               ;   CPI       SENS09
               ;   JZ        SEKP03
               ;;
               ;   CPI       SENS10
               ;   JZ        SEKP03
               ;;
               ;   CPI       SENS03
```

```
                   ;   JZ      SEKP90
                   ;;
                   ;   JMP     SEKP05
                   ;
                   ;
                   ;                   DIGIT NOT IN HOME
1693 CD E7 17 SEKP01:      CALL    DALIGN
1696 B7                ORA     A
1697 CA 55 16          JZ      STEP0           ;No Error condition
                                               ;Digit aligned and phased
                                               ;Bank aligned and phased
169A
                                               ;Type 1 error
                                               ;Digit aligned and phased
                                               ;Bank not aligned and/or phased
                                               ;
169A 3E 00    SEKP04:      MVI     A,00H           ;Type 2 error
                                               ;Digit not aligned and/or phased
                                               ;Bank don't care
169C 32 02 70 SEP11:       STA     PORTB
169F CD A9 17          CALL    DEL30M
16A2 C3 3F 16          JMP     SEKP00
16A5 CD 12 18 SEKP02:      CALL    BALIGN
16A8 B7                ORA     A
16A9 CA 55 16          JZ      STEP0           ;No Error condition
                                               ;Digit aligned and phased
                                               ;Bank aligned and phased
                                               ;
                                               ;Type 1 Error
                                               ;Bank aligned and phased
                                               ;Digit not aligned and/or phased
16AC C3 9A 16          JMP     SEKP04
16AF CD E7 17 SEKP03:      CALL    DALIGN
16B2 B7                ORA     A
16B3 CA 55 16          JZ      STEP0           ;NO error condition
                   ;
                   ;
16B6
                                               ;Type 2 error
16B6 CD 12 18          CALL    BALIGN
16B9 B7                ORA     A
16BA CA 55 16          JZ      STEP0           ;No error condition
                   ;
                   ;
                                               ;Type 1 Error condition
                   ;
                   ;
16BD 3A 02 70          LDA     PORTB
16C0 E6 0F             ANI     LSNMSK
16C2 32 02 70          STA     PORTB
16C5 CD A9 17          CALL    DEL30M
                   ;
                   ;
                   ;
                   ;
16C8 CD E7 17          CALL    DALIGN
16CB B7                ORA     A
16CC C2 9A 16          JNZ     SEKP04
                   ;
                   ;
                   ;
                   ;   LDA     PORTB
                   ;   ANI     LSNMSK
                   ;   ORI     80H
                   ;   STA     PORTB
                   ;   CALL    DEL30M
16CF C3 55 16          JMP     STEP0
                   ;;
                   ;
                   ;
```

```
                     ;
16D2 1E 00      SEKP85:     MVI     E,00
16D4 CD 2A 19       CALL    PINCHK
16D7 C2 3F 16       JNZ     SEKP00
16DA 1C             INR     E
16DB CD 2A 19       CALL    PINCHK
16DE C2 3F 16       JNZ     SEKP00
                     ;;
                     ;
16E1 C1         SEKP05:     POP     B
16E2 3A 3A 74   SEKP06:     LDA     DGTPAT
16E5 F5             PUSH    PSW
16E6 0E 01          MVI     C,1                     ;
16E8 1E 00          MVI     E,00                    ;DIGIT MOTOR
16EA 21 03 08       LXI     H,803H                  ;RE TRIES
16ED CD 03 14       CALL    MOVCLS                  ;EXIT FROM LOCK TRY
16F0 3A 38 74       LDA     ERROR                   ;
16F3 B7             ORA     A                       ;
16F4 C2 FB 16       JNZ     SEKP07
16F7 F1             POP     PSW
16F8 C3 E2 16       JMP     SEKP06                  ;
                     ;
                     ;
                     ;
16FB F1         SEKP07:     POP     PSW
16FC CD 40 18       CALL    SELDRN
                     ;
16FF CD C5 18   SEKP19:     CALL    POHOME
                     ;
1702 C0             RNZ
1703            SEKP10:
1703 0E 01          MVI     C,01                    ;CLOCKWISE 1STEP
1705 1E 01          MVI     E,01
1707 21 03 08       LXI     H,803H                  ;BANK MOTOR
170A CD 03 14       CALL    MOVCLS                  ;BANK POSITION IDENTIFICATION
170D 3A 38 74       LDA     ERROR                   ;
1710 B7             ORA     A                       ;
1711 CA 03 17       JZ      SEKP10                  ;
                     ;
                     ;
1714 3A 39 74       LDA     BNKPAT
1717 2E 00          MVI     L,00H
1719 FE 01          CPI     01
171B CA 1F 17       JZ      SEKP12
171E 2C             INR     L
                     ;
                     ;
171F CD C5 18   SEKP12:     CALL    POHOME
1722 C0             RNZ
                     ;
                     ;
                     ;
1723 1E 01          MVI     E,01                    ;
1725 0E FC          MVI     C,-4H                   ;
1727 21 03 08       LXI     H,803H                  ;BANK IS BEING POSITIONED TO EXTREME
172A CD 03 14       CALL    MOVCLS                  ;
172D CD B0 18       CALL    ERRHDR                  ;
1730 C0             RNZ                             ;EXITS ON FATAL ERROR
                     ;
                     ;
1731 0E 05          MVI     C,5H                    ;
1733 C5         SEKP15:     PUSH    B                       ;INDEX STORAGE
1734 3A 3A 74   SEKP20:     LDA     DGTPAT
1737 F5             PUSH    PSW
```

```
1738 0E 01          MVI     C,1                 ;CLOCKWISE 1 STEP
173A 1E 00          MVI     E,00                ;DIGIT MOTOR
173C 21 03 08       LXI     H,803H              ;RETRIES
173F CD 03 14       CALL    MOVCLS              ;MOVE DIGIT TO EXTREME..9
1742 3A 38 74       LDA     ERROR               ;
1745 B7             ORA     A                   ;
1746 C2 4D 17       JNZ     SEKP21              ;
1749 F1             POP     PSW                 ;
174A C3 34 17       JMP     SEKP20
                ;
                ;
                ;
174D F1         SEKP21:     POP     PSW
174E CD 40 18       CALL    SELDRN
1751 CD C5 18   SEKP23:     CALL    POHOME              ;
                ;
1754 C2 B3 17       JNZ     SEEK26
1757 0E F7          MVI     C,-9H               ;CLOCKWISE 9STEPS
1759 1E 00          MVI     E,00                ;
175B 21 03 08       LXI     H,803H              ;RE TRIES
175E CD 03 14       CALL    MOVCLS              ;POSITION TO 0
1761 CD B0 18       CALL    ERRHDR              ;
1764 C1             POP     B                   ;RESTORE STACK
1765 C0             RNZ                         ;FATAL ERROR  EXIT
1766 00             NOP
1767 00             NOP
1768 00             NOP
1769 00             NOP
                ;
                ;
                ;
                ;
176A 0D         SEKP22:     DCR     C                   ;
176B CA 87 17       JZ      SEKP30              ;
176E C5         SEKP25:     PUSH    B                   ;INDEX RESTORE
176F 0E 01          MVI     C,1                 ;CLOCWISE 1 STEP
1771 1E 01          MVI     E,01                ;BANK MOTOR
1773 21 03 08       LXI     H,803H              ;RETRIES
1776 CD 03 14       CALL    MOVCLS              ;GO  TO NEXT BANK
1779 CD B0 18       CALL    ERRHDR              ;
177C C1             POP     B                   ;
177D C0             RNZ                         ;FATAL ERROR EXIT
                ;
177E 79             MOV     A,C                 ;
177F FE 03          CPI     03                  ;HOME?
1781 C2 33 17       JNZ     SEKP15              ;
1784 C3 6A 17       JMP     SEKP22              ;
                ;
                ;
                ;
1787 0E FE      SEKP30:     MVI     C,-2H               ;COUNTER CLOCKWISE 2 STEPS
1789 1E 01          MVI     E,01                ;BANK MOTOR
178B 21 03 08       LXI     H,803H              ;
178E CD 03 14       CALL    MOVCLS              ;MOVE BANK TO HOME
1791 CD B0 18       CALL    ERRHDR              ;
1794 C0             RNZ                         ;FATAL ERROR EXIT
                ;
                ;
1795 0E FE          MVI     C,-2H               ;COUNTER CLOCKWISE 1 STEP
1797 1E 00          MVI     E,00                ;DIGIT MOTOR
1799 21 03 08       LXI     H,803H              ;
179C CD 03 14       CALL    MOVCLS              ;SET DIGIT IN TO LOCK
179F CD B0 18       CALL    ERRHDR              ;
17A2 C9             RET
                ;
                    ;
```

```
17A3 C5        DEL6M:     PUSH   B
17A4 06 14                MVI    B,20D
17A6 C3 AC 17             JMP    DELM1
               ;
               ;
               ;
17A9 C5        DEL30M:    PUSH   B
17AA 06 64                MVI    B,100D
17AC CD 55 15  DELM1:     CALL   DEL300
17AF 05                   DCR    B
17B0 C2 AC 17             JNZ    DELM1
17B3 C1        SEEK26:    POP    B
17B4 C9                   RET
               ;
               ;
               ;
               ;
17B5 01 DC 17  DPTSP:     LXI    B,BASEAD
17B8 21 02 70             LXI    H,PORTB
17BB 7B                   MOV    A,E
17BC B7                   ORA    A
17BD 7E                   MOV    A,M
17BE CA D4 17             JZ     DPTS05
               ;
               ;
17C1 7E                   MOV    A,M
17C2 E6 E0                ANI    0E0H
17C4 07                   RLC
17C5 07                   RLC
17C6 07                   RLC
17C7 E5        DPTS10:    PUSH   H
17C8 26 00                MVI    H,00H
17CA 6F                   MOV    L,A
17CB 09                   DAD    B
17CC 7E                   MOV    A,M
17CD E1                   POP    H
17CE A6                   ANA    M
17CF 77                   MOV    M,A
               ;          STA    PORTB
17D0 CD A9 17             CALL   DEL30M
17D3 C9                   RET
               ;
               ;
               ;
17D4 E6 0E     DPTS05:    ANI    0EH
17D6 0F                   RRC
17D7 C6 04                ADI    04
17D9 C3 C7 17             JMP    DPTS10
               ;
               ;
               ;
               ;
               ;
17DC FF        BASEAD:    DB     0FFH
17DD DF                   DB     0DFH
17DE FF                   DB     0FFH
17DF BF                   DB     0BFH
17E0 EF                   DB     0EFH
17E1 FD                   DB     0FDH
17E2 7F                   DB     7FH
17E3 FB                   DB     0FBH
17E4 FE                   DB     0FEH
17E5 FF                   DB     0FFH
17E6 F7                   DB     0F7H
               ;
               ;
               ;
```

```
                  ;Procedure DALIGN
                  ;Objective:        this segment makes an attempt to align the digit motors to
                  ;           a legitimate home position.
                  ;
                  ;Level.
                  ;
                  ;DALIGN:
                  ;   MOTOR := DIGIT
                  ;   PHASE := DPHASE1
                  ;   DIRECTION := CW
                  ;   Procedure DPHOME(:ERROR)
                  ;   If ERROR = TRUE then
                  ;                           MOTOR := DIGIT
                  ;                           PHASE := DPHASE1
                  ;                           DIRECTION := CCW
                  ;                           Procedure DPHOME(:ERROR)
                  ;                           If ERROR <>0 then ERROR := TYPE2ERROR
                  ;                                   Procedure DPTSP(DIGIT)
                  ;                                   end.
                  ;                           else MOTOR := BANK
                  ;                                Procedure PTNCHK(:ERROR)
                  ;                                Procedure DPTSP(DIGIT)
                  ;                                If ERROR <> 0 then ERROR := TYPE2ERROR
                  ;                                end
                  ;End.
                  ;
                  ;
                  ;
17E7 2E 00       DALIGN:     MVI     L,00
17E9 16 33           MVI     D,33H
17EB 1E 00           MVI     E,00H
17ED CD 86 19        CALL    DPHOME
17F0 CA FF 17        JZ      SEKP11
                  ;
                  ;
                  ;
                  ;
                  ;
17F3 2E 01       SEKP09:     MVI     L,01
17F5 16 33           MVI     D,33H
17F7 1E 00           MVI     E,00H
17F9 CD 86 19        CALL    DPHOME
17FC C2 0C 18        JNZ     ERSET
                  ;
                  ;
17FF 1E 01       SEKP11:     MVI     E,01H
1801 CD 2A 19        CALL    PTNCHK
1804 F5              PUSH    PSW
1805 1E 00           MVI     E,00
1807 CD B5 17        CALL    DPTSP
180A F1              POP     PSW
180B C8              RZ                      ;No Error condition
                  ;  MVI     A,01
                  ;  RET                     ;Type 1 Error set
180C CD B5 17 ERSET:      CALL    DPTSP
180F 3E 02           MVI     A,02            ;Type 2 error set
1811 C9              RET
                  ;
                  ;
                  ;;
                  ;Procedure BALIGN
                  ;Objective:        this segment makes an attempt to align the bank motors to
                  ;           a legitimate home position.
                  ;
                  ;Level.
                  ;
```

```
               ;DALIGN:
               ;   MOTOR := BANK
               ;   PHASE := DPHASE1
               ;   DIRECTION := CW
               ;   Procedure DPHOME(:ERROR)
               ;   If ERROR = TRUE then
               ;                             MOTOR := BANK
               ;                             PHASE := DPHASE1
               ;                             DIRECTION := CCW
               ;                             Procedure DPHOME(:ERROR)
               ;                             If ERROR <>0 then ERROR := TYPE2ERROR
               ;                                                Procedure DPTSP(BANK)
               ;                                                end.
               ;                             else MOTOR := DIGIT
               ;                                  Procedure PTNCHK(:ERROR)
               ;                                  Procedure DPTSP(BANK)
               ;                                  If ERROR <> 0 then ERROR := TYPE2ERROR
               ;                                  end
               ;End.
               ;
               ;
               ;
               ;
1812           BALIGN:
1812 2E 00         MVI     L,00
1814 16 33     SEKP17:     MVI     D,33H
1816 1E 01         MVI     E,01H
1818 CD 86 19      CALL    DPHOME
181B C2 31 18      JNZ     SEKP14
181E 1E 00     SEKP13:     MVI     E,00
1820 CD 2A 19      CALL    PTNCHK
1823 F5            PUSH    PSW
1824 1E 01         MVI     E,01
1826 CD B5 17      CALL    DPTSP
1829 F1            POP     PSW
182A C8            RZ                      ;No error condition
               ;   MVI     A,01
               ;   RET                     ;Type 1 error set
               ;
               ;
182B CD B5 17 BERSET:      CALL    DPTSP
182E 3E 02         MVI     A,02            ;       type 2 error set
1830 C9            RET
               ;
               ;
               ;
               ;
1831 2E 01     SEKP14:     MVI     L,01
1833 16 33         MVI     D,33H
1835 1E 01         MVI     E,01H
1837 CD 86 19      CALL    DPHOME
183A C2 2B 18      JNZ     BERSET
               ;
               ;
183D C3 1E 18      JMP     SEKP13
               ;
               ;
               ;
               ;
               ;
               ;
```

```
                        ;
                        ; Accumulator contains the last sucessfully attained
                        ;digit sensor readings
                        ;this sensor reading is compared with the new sensor readings to
                        ;determine the direction of POHOME
                        ;drive
                        ;
                        ;
1840 47                 SELDRN:     MOV     B,A
1841 3A 00 68               LDA     PORT2A
1844 E6 03                  ANI     DGTMSK
1846 2E 00                  MVI     L,00
1848 A8                     XRA     B               ;CLEARS CARRY
1849 1F                     RAR
184A D2 4E 18               JNC     SEKP08
184D 2C                     INR     L
184E C9                 SEKP08:     RET
                        ;
184F 16 88              MOPEN:      MVI     D,088H
1851 79                 MOP05:      MOV     A,C
1852 B7                     ORA     A
1853 7A                     MOV     A,D
1854 FA 68 18               JM      MOP01
1857 07                     RLC
1858 0D                     DCR     C
1859 CA 6D 18               JZ      MOP10
185C 57                 MOP02:      MOV     D,A
185D E6 0F                  ANI     0FH
185F 32 02 70               STA     PORTB
1862 CD A3 17               CALL    DEL6M
1865 C3 51 18               JMP     MOP05
1868 0F                 MOP01:      RRC
1869 0C                     INR     C
186A C2 5C 18               JNZ     MOP02
186D CD A9 17           MOP10:      CALL    DEL30M
1870 C9                     RET
                        ;
                        ;
                        ;
                        ;
1871 0E F4              SEKTRP:     MVI     C,-12D
1873 CD 4F 18               CALL    MOPEN
1876 0E 0C                  MVI     C,12D
1878 CD 4F 18               CALL    MOPEN
187B C9                     RET
                        ;
187C
                        ;           THIS SEGMENT CONTAINS THE PROCEDURES USED IN STEPPER MOTOR
                        ;           CONTROL OF THE SELECTION AND TRIP MECHANISMS.
                        ;
                        ;
                        ;           PROCEDURE MVTRIP
                        ;
                        ;
                        ;           THIS PROCEDURE MOVES THE DIGIT MOTOR FROM THE LOCKED POSITION
                        ;           TO THE TRIP POSITION OF THE TRIP SHAFT.
                        ;           ON DETECTION OF AN ERROR IN THE PROCEDURE, A FATAL ERROR
                        ;           ROUTINE IS INVOKED . UPON EXIT  FROM THE FATAL ERROR ROUTINE
                        ;           THE ZERO FLAG OF THE PROCESSOR STATUS WORD IS RESET TO ZERO
                        ;           IF A FATAL ERROR HAS OCCURED.THE ACCUMULATOR WILL HAVE THE ERRO;
                        ;
                        ;
187C CD 3F 15           MVTRIP:     CALL    LEDON
187F 21 03 10           MVTR05:     LXI     H,1003H         :# OF RE TRIES
1882 1E 00                  MVI     E,00            ;DIGIT MOTOR SELECTED
```

```
1884 0E FE          MVI     C,-2                    ;COUNTER CLOCKWISE 2 STEPS
1886 CD 03 14       CALL    MOVCLS
1889 CD 4A 15       CALL    LEDOFF                  ;
188C CD BC 18       CALL    MODLN                   ;
188F CD B0 18       CALL    ERRHDR
1892 C4 B5 18       CNZ     EXTERR
1895 C9             RET                             ;
                ;
                ;
                ;
                ;
                ;***********************************************************************
                ;
                ;
                ;   PROCEDURE MVLOCK
                ;
                ;
                ;   THIS PROCEDURE MOVES THE DIGIT MOTOR FROM THE TRIP POSITION TO THE
                ;   LOCK POSITION OF THE TRIP SHAFT. ON DETECTION OF AN ERROR ,THE FATAL E
                ;
1896 CD 3F 15 MVLOCK:       CALL    LEDON
1899 21 03 08 MVL005:       LXI     H,803H                  ;RE TRIES
189C 1E 00          MVI     E,00                    ;DIGIT MOTOR
189E 0E 02          MVI     C,2H                    ;CLOCKWISE 2 STEP
18A0 CD 03 14       CALL    MOVCLS                  ;
18A3 CD 4A 15       CALL    LEDOFF
18A6 CD BC 18       CALL    MODLN                   ;
18A9 CD B0 18       CALL    ERRHDR
18AC C4 B5 18       CNZ     EXTERR                  ;
18AF C9             RET
                                    ;
                ;
                ;
                ;
                ;***********************************************************************
                ;
                                                    ;THIS PROCEDURE ASSUMES THAT THE
                ;
                ;
                ;
                ;***********************************************************************
                ;
                ;
                ;           ERRHDR  ROUTINE
                ;           THIS ROUTINE IS CALLED ON DETECTION OF AN ERROR IN
                ;           THE MOTOR MOVE ROUTINES.THE ZERO FLAG AND THE
                ;           ACCUMULATOR RETURN THE FLAG INDICATION AND ERROR CODE
                ;
                ;
18B0            ERRHDR:
18B0 3A 38 74 ERRH05:       LDA     ERROR                   ;
18B3 B7             ORA     A                       ;SETTING FLAGS
18B4 C9             RET                             ;
                ;
                ;
                ;***********************************************************************
                ;
                ;
                ;EXTERR ROUTINE
                ;   This segment creates  a BCD coded error code from the
                ;   error storage location .  Before converting to the BCD pattern
                ;   30D is added to the error value from motor move routines.
                ;   this routine is called upon only when an Error is detected by
                ;   the errhdr routine.
18B5            EXTERR:
18B5 3A 38 74       LDA     ERROR   ;
18B8 C6 1E          ADI     30D
```

```
18BA 27            DAA          ;
18BB C9            RET          ;
                  ;
                  ;
                  ;
                  ;*********************************************************************
                  ;MODLN routine
                  ;
                  ;
                  ;   This routine masks off the bank home position hold and provides
                  ;the digit motor hold pattern to the interface for modulation purpose.
                  ;
18BC              MODLN:
18BC 3A 02 70      LDA     PORTB
18BF E6 0F         ANI     0FH
18C1 32 02 70      STA     PORTB
18C4 C9            RET
                  ;
                  ;
                  ;
                  ;
                  ;THIS ROUTINE PLACES THE MOTOR IN TO THE APPROPRIATE HOME
                  ;POSITION WHEN AN ERROR OCCURS ON SEEK
                  ;THIS ROUTINE MOVES THE MOTORS TWO STEPS AT A TIME
                  ;DEPENDING ON THE SENSOR READINGS THE MOTOR MOVEMENT DIRECTION IS DETERM
                  ;THIS ROUTINE TRANSFORMS THE THE LAST PATTERN OUTPUT FROM DMOVE ROUTINE
                  ;BREGISTER WILL BE LOADED BY THE EXPECTED ENCODER COUNT
                  ;C REGISTER WILL BE LOADED BY THE MOTOR STEP COUNT
                  ;MOTOR STEP COUNT WILL BE DETERMINED BY THE ENCODER READINGS
                  ;BEFORE REACHING THE ERROR CONDITION THE MOTOR WAS BEING DRIVEN IN
                  ;THE CW DIRECTION
                  ;
                  ;
18C5              POHOME:
18C5 CD 79 19 PLHOME:     CALL    SENSIN
18C8 CA D4 18      JZ      PLH12          ;SENSOR (00)
18CB FE 03         CPI     03H
18CD CA D9 18      JZ      PLH14          ;SENSOR (00,11)
18D0 CD FD 18      CALL    PH0110         ;SENSOR (01,10)
18D3 C9            RET
                  ;
                  ;
18D4 16 11        PLH12:      MVI     D,11H
18D6 C3 DB 18      JMP     PLH10          ;check phases/
                  ;
18D9 16 44        PLH14:      MVI     D,44H
18DB CD DF 18 PLH10:      CALL    PH0011         ;
18DE C9            RET                    ;
                  ;
                  ;
                  ;Procedure PH0011
                  ;Objective: This segments positions the motors to a legitimate home posi
                  ;           when the sensor patterns are , to start with , at 00 or 11, (the
                  ;           sensors are either both pen or closed)
                  ;PH0011:DIRECTION := CW
                  ;  MSTEP:=-4
                  ;  ECOUNT := -1
                  ;  Procedure ENDMOV(NEXTPTN,MOTOR,DIRECTION,MSTEP,ECOUNT:ERROR)
                  ;  If ERROR <> 0  then NEXTPTN := RRC(NEXTPTN)
                  ;                      NEXTPTN := RRC(NEXTPTN)
                  ;                      DIRECTION := CCW
                  ;                      MSTEP      :=2
                  ;                      ECOUNT:=    1
                  ;                      Procedure ENDMOV(NEXTPTN,MOTOR,DIRECTION,MSTEP,ECOUNT:ERROR)
                  ;  Procedure PTNCHK(MOTOR:ERROR)
                  ;  end
```

```
                   ;End.
                   ;
                   ;
                   ;
     18DF          PH0011:
     18DF 0E FC          MVI    C,-4H             ;4STEPS CW
     18E1 06 FF          MVI    B,-1H
     18E3 CD C8 15       CALL   ENDMOV            ;POSITION TO 2STEPS BEFORE HOME
                                                  ;1ENCODER STEP AWAY FROM HOME
     18E6 3A 38 74       LDA    ERROR
     18E9 FE 07          CPI    07H
     18EB CA F9 18       JZ     PH05              ;EXIT 1. ERROR FROM TRYING TO MOVE
                                                  ;TO MOVE CW (TOWARDS LOCK FROM A
                                                  ;SENSOR (00,11) AFTER IDENTIFYING
                                                  ;A BLOCK
     18EE 7A             MOV    A,D
     18EF 0F             RRC
     18F0 0F             RRC                      ;MOTOR PATTERN FOR
     18F1 57             MOV    D,A
     18F2 0E 02          MVI    C,02H
     18F4 06 01          MVI    B,01
     18F6 CD C8 15       CALL   ENDMOV
                                                  ;TWO MSTEPS TOWARDS SENSORS (00,11)
                                                  ;IN CCW DIRECTION
     18F9 CD 2A 19 PH05:        CALL   PTNCHK
     18FC C9             RET
                   ;
                   ;
                   ;
                   ;Procedure PH0110
                   ;Objective :     This segment positions the motors to a legitimate home
                   ;             position wherein there is agreement between the phase applied
                   ;             to the motor and the sensor readings observed.  Four single
                   ;             step attempts will be made to position the motor to the
                   ;             home position.  If a home position is reached before all
                   ;             four attempts are completed, an exit will be done from this
                   ;             segment.  The error will be flagged by the pattern check segment.
                   ;
                   ;PH0110:      If DIRECTION = CW then
                   ;                               NEXTPTN := RLC (NEXTPTN)
                   ;                               NEXTPTN := RLC (NEXTPTN)
                   ;                               MSTEP:= -1
                   ;                               ECOUNT := -1
                   ;             else MSTEP:= 1
                   ;                  ECOUNT := 1
                   ;             For TRIES = 4 to 0 by 1 do
                   ;                  Procedure ENDMOV(NEXTPTN,MOTOR,DIRECTION,MSTEP,ECOUNT:ERROR)
                   ;                  Procedure PTNCHK(MOTOR:ERROR)
                   ;                  If ERROR = TRUE then TRIRES:= TRIES-1
                   ;                  else end
                   ;             End
                   ;End.
                   ;
                   ;
                   ;
                   ;
     18FD          PH0110:
                   ;
                   ;
     18FD 7D             MOV    A,L               ;SENSOR (01)
     18FE FE 01          CPI    01H
     1900 C2 0D 19       JNZ    PLH57             ;DIRECTION(CW,CCW)
                   ;
                   ;
```

```
1903 7A       PLH52:      MOV     A,D              ;DIGIT SEEKING 00----------
1904 07          RLC
1905 07          RLC
1906 0E FF       MVI      C,-1H
1908 06 FF       MVI      B,-1H
190A C3 12 19    JMP      PLH65
              ;
              ;
190D 7A       PLH57:      MOV     A,D
190E 0E 01       MVI      C,01H
1910 06 01       MVI      B,01H
1912 57       PLH65:      MOV     D,A              ;PATTERN IN D REGISTER
1913 2E 04       MVI      L,04H
1915 C5       PLH66:      PUSH    B
1916 CD C8 15 PLH67:      CALL    ENDMOV
1919 C1       PLH68:      POP     B
191A CD 2A 19    CALL     PTNCHK
191D C8          RZ                       ;EXIT 4 .NORMAL EXIT
                                          ;STILL ERRORS COULD EXIST
                                          ;DUE TO PTNCHK RESULTS
191E 7A       PLH70:      MOV     A,D
191F 2D          DCR      L
1920 C2 15 19    JNZ      PLH66           ;2 + 2 MSTEPS OVER?
                                          ;AGAINST A STOP
1923 3E 09    PLH83:      MVI     A,09H
1925 32 38 74    STA      ERROR
1928 B7          ORA      A
1929 C9          RET                      ;EXIT 6. THERE IS NO 00/11
                                          ; IN THIE DIRECTION OF MOVEMENT
              ;
              ;
              ;
              ;
              ;
              ;
              ;
              ;
              ;**********************************************************************
              ;
              ;
              ;
              ;PROCEDURE  PTNCHK( MOTOR:ERROR)
              ;
              ;Input (PORTB,MOTPTN)
              ;   IF MOTOR = BANK then MOTPTN:=MOTPTN.MSNMSK
              ;                        MOTPTN:= 4*RRC(MOTPTN)
              ;
              ;                           IF BNKPAT =( 01,02) THEN ERROR:=8; END.
              ;                        IF BNKPAT = 00 AND MOTPTN = (08,05) THEN ERROR :=0
              ;                                                                   END.
              ;                        IF MOTPTN (02,06) THEN ERROR := 0
              ;                                      ELSE ERROR:=8
              ;                                         END.
              ;
              ;
              ;                        ENDIF
              ;      ELSE          MOTPTN:= MOTPTN.LSNMSK
              ;                 IF DGTPAT =(01,02)THEN ERROR:=8;    END.
              ;             IF DGTPAT = 0 AND MOTPTN = (08,09) THEN ERROR := 0
              ;                                                     END.
              ;             IF MOTPATN =(02,06) THEN ERROR:=0       ;END.
              ;END                                                     ELSE ERROR := 8
              ;                                                     END
```

```
                  ;;
                  ;
                  ;
                  ;   E REGISTER ......        MOTOR(BANK,DIGIT)
                  ;   ERROR   CODE.....        8       FAILURE TO  ARRIVE AT HOME
                  ;
192A 7B           PTNCHK:     MOV     A,E                     ;MOTOR (BANK,DIGIT)
192B B7               ORA     A                               ;MOTOR
192C 3A 02 70         LDA     PORTB
192F CA 68 19         JZ      PTNC10
                  ;
                  ;
1932 E6 F0            ANI     0F0H
1934 0F               RRC
1935 0F               RRC
1936 0F               RRC
1937 0F               RRC
1938 F5               PUSH    PSW
1939 3A 39 74         LDA     BNKPAT
193C FE 01        PTNC15:     CPI     01
193E CA 71 19         JZ      PTNC20
                  ;
                  ;
                  ;
1941 FE 02            CPI     02H
1943 CA 71 19         JZ      PTNC20
1946 B7               ORA     A
1947 CA 5A 19         JZ      PTNC30
                  ;
                  ;
                  ;
194A F1               POP     PSW
194B FE 02            CPI     02H
194D CA 55 19         JZ      PTNC40
1950 FE 06            CPI     06H
1952 C2 72 19         JNZ     PTNC25
                  ;
                  ;
                  ;
1955 AF           PTNC40:     XRA     A
1956 32 38 74         STA     ERROR
1959 C9               RET
                  ;
                  ;
                  ;
195A F1           PTNC30:     POP     PSW
195B FE 08            CPI     08H
195D CA 55 19         JZ      PTNC40
1960 FE 09            CPI     09H
1962 CA 55 19         JZ      PTNC40
1965 C3 72 19         JMP     PTNC25
                  ;
                  ;
                  ;
1968 E6 0F        PTNC10:     ANI     0FH
196A F5               PUSH    PSW
196B 3A 3A 74         LDA     DGTPAT
196E C3 3C 19         JMP     PTNC15
                  ;
                  ;
1971 F1           PTNC20:     POP     PSW
1972 3E 08        PTNC25:     MVI     A,08H                   ;ERROR :=8
1974 32 38 74         STA     ERROR
1977 B7               ORA     A                   ;NOT HOME ERROR
1978 C9               RET                         ;EXIT
```

```
                    ;;
                    ;
                    ;
1979                SENSIN:
1979 7B                 MOV     A,E             ;CHECK MOTOR BANK/DIGIT
197A B7                 ORA     A
197B 3A 00 68           LDA     PORT2A
197E CA 83 19           JZ      PLH05           ;MOTOR (BANK,DIGIT)
1981 0F                 RRC
1982 0F                 RRC
1983 E6 03          PLH05:      ANI     DGTMSK
1985 C9                 RET
                    ;
                    ;
                    ;
1986 CD 79 19 DPHOME:   CALL    SENSIN
1989 CA 91 19           JZ      DPH1
198C FE 03              CPI     03H
198E C2 95 19           JNZ     DPH5
1991 CD DF 18 DPH1:     CALL    PH0011
1994 C9                 RET
                    ;
                    ;
                    ;
1995 CD FD 18 DPH5:     CALL    PH0110
1998 C9                 RET
                    ;
                    ; (************************************************************)
                    ;
                    ; PROCEDURE READ_ENCODERS;
                    ;
                    ;Objective: Read the encoder status and store the information in ram
                    ;           storage and update the terminal count.  Flag errors of
                    ;           1.  digit motor moved on a bank motor move
                    ;           2.  digit motor moved too fast
                    ;           3.  bank motor moved on a digit motor move
                    ;           4.  bank motor moved too fast
                    ;
                    ;Initialisation requirements:
                    ;           Initial patterns of bank and digit sensors be stored in the
                    ;           respective locations before this module is invoked, during
                    ;           power up activities.
                    ;Level:
                    ;           Calls ENCMOV, DEL300 and DEL75 modules.
                    ;           Delay routines are used for adjusting the stepper motor rate.
                    ;
                    ;
                    ;Procedure READENC(DGTPAT,BNKPAT,NUMREAD,MOTOR,ENCCOUNT: ENCCOUNT,ERROR)
                    ;Do While (NUMREAD greater than 0 and ERROR  equal to 0
                    ;   NUMREAD := NUMREAD - 1
                    ;   Input (PORT.SENSOR,SENSPTN)
                    ;   SENSPTN1 := SENSPTN
                    ;   SENSPTN := SENSPTN.DSNSRMASK
                    ;   SENSPTN1 := (SENSPTN.BSNSRMASK)/4
                    ;   Case MOTOR = BANK
                    ;           If SENSPTN = (DGTPAT) then
                    ;                       Procedure ENCMOV(BNKPAT,SENSPTN1:COUNTINC)
                    ;                       If COUNTINC = 2 then
                    ;                                   ERROR:= 3
                    ;                                   End Case
                    ;                       If ENCCOUNT greater than 0 then
                    ;                                   ENCCOUNT:= ENCCOUNT-COUNTINC
                    ;                       else        ENCCOUNT:= ENCCOUNT+COUNTINC
                    ;           else        ERROR:= 1       ;DIGIT ON BANK
                    ;           End If
                    ;
```

```
                  ;        MOTOR = DIGIT
                  ;           If SENSPTN1 = BNKPAT then
                  ;                             Procedure ENCMOV(DGTPAT,SENSPTN:COUNTINC)
                  ;                             If COUNTINC = 2 then
                  ;                                               ERROR = 4
                  ;                                               End Case
                  ;                             If ENCCOUNT greater than 0 then
                  ;                                               ENCCOUNT=ENCCOUNT-COUNTINC
                  ;                             else              ENCCOUNT=ENCCOUNT+COUNTINC
                  ;           else              ERROR:= 2
                  ;           End If
                  ;        End Case
                  ;End Do
                  ;BNKPAT := SENSPTN1
                  ;DGTPAT := SENSPTN
                  ;End RENC.
                  ;
                  ;
                  ;
                  ; PARAM VAR (*C-REG*) COUNT : BYTE;
                  ;   (*E-REG*) MOTOR : MOTORS;
                  ;   (*L-REG*) NUM_READS : BYTE;
                  ;
                  ; VAR       (*A-REG*) COUNT_INC : BYTE;
                  ;   (*B-REG*) NEW_BANK_PAT : ENCODER_PATTERNS;
                  ;   (*D-REG*) NEW_DIGIT_PAT : ENCODER_PATTERNS;
                  ;
0001              ERRR1      EQU     01H
0002              ERROR2     EQU     02H
0003              ERROR3     EQU     03H
0004              ERROR4     EQU     04H
                  RENC:                          ; BEGIN
1999
1999 7D           RENC05:    MOV     A,L         ; WHILE (NUM_READS > 0) AND (ERROR = NO_ERRORS) DO
199A B7              ORA     A
199B C8              RZ
199C 3A 38 74        LDA     ERROR
199F B7              ORA     A
19A0 C0              RNZ
                                       ;     BEGIN
19A1 2D              DCR     L         ;     NUM_READS := NUM_READS - 1;
19A2 3A 00 68        LDA     PORT2AD ;       NEW_BANK_PAT := (PORTA AND 0CH) ROR 2;
19A5 E6 0C           ANI     BNKMSK
19A7 0F              RRC
19A8 0F              RRC
19A9 47              MOV     B,A
19AA 3A 00 68        LDA     PORT2AD ;       NEW_DIGIT_PAT := PORTA AND 03H;
19AD E6 03           ANI     DGTMSK
19AF 57              MOV     D,A
19B0 7B              MOV     A,E       ;     CASE MOTOR OF
19B1 B7              ORA     A
19B2 CA E6 19        JZ      RENC20
19B5 3A 3A 74        LDA     DGTPAT    ;       BANK:  IF NEW_DIGIT_PAT <> DIGIT_PAT THEN
19B8 BA              CMP     D
19B9 CA C4 19        JZ      RENC10
19BC 3E 01           MVI     A,ERRR1 ;                    ERROR := DIG_ON_BANK
19BE 32 38 74        STA     ERROR
19C1 C3 14 1A        JMP     RENC35
                  RENC10:                ;                   ELSE
                                       ;                  BEGIN
19C4 C5              PUSH    B         ;                  COUNT_INC := ENCODER_
19C5 3A 39 74        LDA     BNKPAT    ;                     MOVE (NEW_BANK_PAT, BANK_PAT);
19C8 4F              MOV     C,A
19C9 D5              PUSH    D
19CA 58              MOV     E,B
19CB E5              PUSH    H
```

```
19CC CD AB 15      CALL    ENCMOV
19CF E1            POP     H
19D0 D1            POP     D
19D1 C1            POP     B
19D2 FE 02         CPI     2.      ;        IF COUNT_INC = 2 THEN
19D4 C2 DF 19      JNZ     RENC15
19D7 3E 03         MVI     A,ERROR3        ;        ERROR := BANK_TOO_FAST
19D9 32 38 74      STA     ERROR
19DC C3 14 1A      JMP     RENC35
19DF 2F     RENC15:        CMA             ;        ELSE COUNT := COUNT - COUNT_INC
19E0 3C            INR     A
19E1 81            ADD     C
19E2 4F            MOV     C,A
19E3 C3 14 1A      JMP     RENC35
                                   ;        END;
                                            DIGIT: IF NEW_BANK_PAT <> BANK_PAT THEN
19E6 3A 39 74 RENC20:      LDA     BNKPAT  ;
19E9 B8            CMP     B
19EA CA F5 19      JZ      RENC25
19ED 3E 02         MVI     A,ERROR2        ;        ERROR := BANK_ON_DIG
                                           ;NOTE .ERROR CODE MASKED FOR DEMO.........
19EF 32 38 74      STA     ERROR
19F2 C3 14 1A      JMP     RENC35
              RENC25:                      ;        ELSE
                                   ;                BEGIN
19F5 C5            PUSH    B       ;                COUNT_INC := ENCODER_
19F6 3A 3A 74      LDA     DGTPAT  ;                    MOVE (NEW_DIGIT_PAT, DIGIT_PAT);
19F9 4F            MOV     C,A
19FA D5            PUSH    D
19FB 5A            MOV     E,D
19FC E5            PUSH    H
19FD CD AB 15      CALL    ENCMOV
1A00 E1            POP     H
1A01 D1            POP     D
1A02 C1            POP     B
1A03 FE 02         CPI     2.      ;        IF COUNT_INC = 2 THEN
1A05 C2 10 1A      JNZ     RENC30
1A08 3E 04         MVI     A,ERROR4;                ERROR := DIG_TOO_FAST
1A0A 32 38 74      STA     ERROR
1A0D C3 14 1A      JMP     RENC35
1A10 2F     RENC30:        CMA             ;        ELSE COUNT := COUNT - COUNT_INC
1A11 3C            INR     A
1A12 81            ADD     C
1A13 4F            MOV     C,A
                                   ;                END;
            RENC35:                        ;    END;
1A14 78            MOV     A,B     ;        BANK_PAT := NEW_BANK_PAT;
1A15 32 39 74      STA     BNKPAT
1A18 7A            MOV     A,D     ;        DIGIT_PAT := NEW_DIGIT_PAT;
1A19 32 3A 74      STA     DGTPAT
1A1C CD 55 15      CALL    DEL300  ;        DELAY (375)
1A1F CD 64 15      CALL    DEL75
1A22 C3 99 19      JMP     RENC05  ;        END
                                   ; END;
                   ;
                   ; (****************************************************************)
                   ;
                   ; PROCEDURE SET_CLOSED;
                   ;
                   ;
                   ; VAR       (*C-REG*) CUR_BANK_VAL : BYTE;
                   ;   (*E-REG*) INDEX : PRINT_BANKS;
                   ;
1A25               MVPOST:
1A25 CD 3F 15 SETCLS:      CALL    LEDON
1A28 CD 38 1A      CALL    CHPOST
1A2B CD 4A 15      CALL    LEDOFF
```

```
1A2E CD BC 18     CALL    MODLN
1A31 CD B0 18     CALL    ERRHDR
1A34 C4 B5 18     CNZ     EXTERR
1A37 C9           RET
                 ;
                 ;
                 ;Procedure MOVPOST
                 ;Objective
                 ;    sets the print wheels to a new postage value upon execution.
                 ;    updates the postage value upon a sucessfull completion of a
                 ;    new setting.
                 ;Level
                 ;   Calls GNIB, MOVCLS, ERRHDR
                 ;Note:      What action is to be taken up on detection of an error is
                 ;   determined solely by the invoking routine.
                 ;
                 ;INDEX1 := 0
                 ;Do while INDEX1 <> 4
                 ;   VALUE1 := GNIB(POSVAL,INDEX1:VALUE)
                 ;   VALUE2 := GNIB(POSREQ,INDEX1:VALUE)
                 ;   If VALUE1 = VALUE2 then INDEX1 := INDEX1+1; Continue Do
                 ;   MOTOR := DIGIT
                 ;   DIRECTION := CCW
                 ;   RETRIES := 3
                 ;   MCOUNT := 2
                 ;   SPEED := 8 .................... CORRESPONDING TO 160 STEPS/SEC
                 ;   Procedure MOVCLS( MOTOR,DIRECTION,MCOUNT,RETRIES,SPEED: ERROR)
                 ;   Procedure ERRHDR( ERRORFLAG )
                 ;   If ERRORFLAG = 0 then CURBNKVAL := 0
                 ;                         BNKVAL(HOM) := 0
                 ;                         INDEX := 0
                 ;                         Do while INDEX <> 4
                 ;                                  DELTA :=(GNIB (POSREQ,INDEX:VALUE)-
                 ;                                           GNIB (POSVAL,INDEX:VALUE))
                 ;                                  If DELTA <> 0 then
                 ;                                       If INDEX >= 2 then
                 ;                                           INDEX2:= INDEX - 1
                 ;                                       else INDEX2:= INDEX-2
                 ;                                       INDEX2 := COMPLMNT(INDEX2)
                 ;                                       BNKVALINDEX := INDEX2 + 1
                 ;                                       MOTOR := BANK
                 ;                                       MCOUNT := BNKVALINDEX - CURBNKVAL
                 ;                                       RETRIES := 3
                 ;                                       SPEED := 08
                 ;                                       Procedure MOVCLS(MOTOR,MCOUNT,-
                 ;                                                 -RETRIES,SPEED:ERROR)
                 ;                                       Procedure ERRHDR(ERRFLAG)
                 ;                                       If ERRFLAG = 0 then
                 ;                                                 MOTOR := DIGIT
                 ;                                                 RETRIES := 3
                 ;                                                 MCOUNT := DELTA
                 ;                                                 SPEED := 08
                 ;                                                 Procedure MOVCLS
                 ;                                                         (MOTOR,RETRIES,
                 ;                                                         MCOUNT,SPEED:ERROR)
                 ;                                                 ProcedureERRHDR(ERRFLAG))
                 ;                                                 If ERRFLAG<>0 then End
                 ;                                                 end if
                 ;                                       end if
                 ;                                  else INDEX := INDEX + 1
                 ;
                 ;                              End do
                 ;                              MOTOR := BANK
                 ;                              RETRIES := 3
                 ;                              SPEED := 08
```

```
                        ;                                       MCOUNT := BNKVALHOM - CURMBNKVAL
                        ;                                       Procedure MOVCLS (MOTOR,SPEED,RETRIES,
                        ;                                                         MCOUNT:ERROR)
                        ;                                       Procedure ERRHDR(ERRFLAG)
                        ;                                       If ERRFLAG = 0 then
                        ;                                                 RETRIES := 3
                        ;                                                 MOTOR := DIGIT
                        ;                                                 MCOUNT := 2
                        ;                                                 SPEED := 08
                        ;                                                 Procedure MOVCLS(
                        ;                                                    MOTOR,MCOUNT,
                        ;                                                    SPEED,RETRIES:ERROR)
                        ;                                                 Procedure ERRHDR(EFLAG)
                        ;                                                 If ERRFLAG = 0 then
                        ;                                                        For Z=1 to 4 by 1
                        ;                                                           POSTVAL(Z)
                        ;                                                             := POSREQ(Z)
                        ;                                                           Z:= Z + 1
                        ;                                                        end for
                        ;                                                 end if
                        ;                                   end
                        ;   end
                        ;End movpost
     7421               PREG            EQU     7421H           ;POSTAGE VALUE LOCATION
     7460               IWORK1          EQU     7460H           ;
     7466               POSREQ          EQU     7466H           ;WORK1+((16-NBANKS)/2))
     7421               POSVAL          EQU     PREG
                        ;
                        ;
                        ;
                        ;
                                        ;
     1A38 1E 00         CHPOST:         MVI     E,00.   ; IF POST_REQ = POST_VAL THEN RETURN;
     1A3A 21 21 74      SETC05:         LXI     H,POSVAL
     1A3D CD DB 1A          CALL        GNIB                    ;
     1A40 47                MOV         B,A                     ;
     1A41 21 66 74          LXI         H,POSREQ                ;
     1A44 CD DB 1A          CALL        GNIB                                ;
     1A47 90                SUB         B                       ;
     1A48 C2 54 1A          JNZ         SETC10                  ;
     1A4B 7B                MOV         A,E                     ;
     1A4C 3C                INR         A                       ;
     1A4D FE 04             CPI         04                      ;ALL BANKS CHECKED?
     1A4F C8                RZ                                  ;EXIT
     1A50 5F                MOV         E,A                     ;
     1A51 C3 3A 1A          JMP         SETC05                  ;
                        ;
                        ;
     1A54 0E 02         SETC10:         MVI     C,+2    ; MOVE_CLOSED (DIGIT_TRIES, DIGIT,
     1A56 1E 00             MVI         E,00H   ;            DIGIT_VALUE (SET) - DIGIT_VALUE (LOCK));
     1A58 21 03 08          LXI         H,803H
     1A5B CD 03 14          CALL        MOVCLS
     1A5E CD B0 18          CALL        ERRHDR          ;ERROR PROCESSING
     1A61 C0                RNZ                         ;FATAL ERROR EXIT
     1A62 4F                MOV         C,A     ; CUR_BANK_VAL := BANK_VALUE (HOME);
     1A63 57                MOV         D,A     ; FOR INDEX := PENNIES TO TEN_DOLLARS DO
     1A64 5F            SETC15:         MOV     E,A
     1A65 21 21 74          LXI         H,POSVAL;     IF POST_REQ [INDEX] <> POST_VAL [INDEX] THEN
     1A68 CD DB 1A          CALL        GNIB
     1A6B 47                MOV         B,A
     1A6C 21 66 74          LXI         H,POSREQ                            ;
     1A6F CD DB 1A          CALL        GNIB                                            ;
     1A72 90                SUB         B
     1A73 CA A5 1A          JZ          SETC25
```

```
1A76 F5          PUSH    PSW     ;          BEGIN
1A77 7B          MOV     A,E     ;          MOVE_CLOSED (BANK_TRIES, BANK,
1A78 FE 02       CPI     02H     ;                  BANK_VALUE (INDEX) - CUR_BANK_VAL;
1A7A D2 7E 1A    JNC     SETC20
1A7D 3D          DCR     A
1A7E 3D       SETC20:    DCR     A
              ;  CMA
              ;  INR     A
1A7F F5          PUSH    PSW
1A80 91          SUB     C
1A81 4F          MOV     C,A
1A82 D5          PUSH    D
1A83 1E 01       MVI     E,01H
1A85 21 03 08    LXI     H,803H
1A88 CD 03 14    CALL    MOVCLS
1A8B D1          POP     D
1A8C F1          POP     PSW     ;          CUR_BANK_VAL := BANK_VALUE (INDEX);
1A8D 4F          MOV     C,A
1A8E F1          POP     PSW
1A8F 6F          MOV     L,A
1A90 CD B0 18    CALL    ERRHDR            ;
1A93 C0          RNZ                       ;FATAL ERROR EXIT
1A94 C5          PUSH    B       ;          MOVE_CLOSED (DIGIT_TRIES, DIGIT,
1A95 4D          MOV     C,L     ;                  POST_REQ [INDEX] - POST_VAL [INDEX];
1A96 D5          PUSH    D
1A97 1E 00       MVI     E,00H
1A99 21 03 08    LXI     H,803H
1A9C CD 03 14    CALL    MOVCLS
1A9F D1          POP     D
1AA0 C1          POP     B
1AA1 CD B0 18    CALL    ERRHDR            ;
1AA4 C0          RNZ                       ;FATAL ERROR EXIT
                                 ;          END;
1AA5 7B       SETC25:    MOV     A,E
1AA6 3C          INR     A
1AA7 FE 04       CPI     04H
1AA9 DA 64 1A    JC      SETC15
1AAC 79          MOV     A,C     ; MOVE_CLOSED (BANK_TRIES, BANK, BANK_VALUE (HOME)
1AAD 2F          CMA             ;                  - CUR_BANK_VAL;
1AAE 3C          INR     A
1AAF 4F          MOV     C,A
1AB0 1E 01       MVI     E,01
1AB2 21 03 08    LXI     H,803H
1AB5 CD 03 14    CALL    MOVCLS
1AB8 CD B0 18    CALL    ERRHDR                        ;
1ABB C0          RNZ                                   ;FATAL ERROR EXIT
1ABC 0E FE       MVI     C,-2.   ; MOVE_CLOSED (DIGIT_TRIES, DIGIT, DIGIT_VALUE (LOCK)
1ABE 1E 00       MVI     E,00H   ;                  - DIGIT_VALUE (SET));
1AC0 21 03 08    LXI     H,803H
1AC3 CD 03 14    CALL    MOVCLS
1AC6 CD B0 18    CALL    ERRHDR                ;
1AC9 C0          RNZ                 ;FATAL ERROR
1ACA 0E 02       MVI     C,2.    ; FOR INDEX := PENNIES TO TEN_DOLLARS DO
1ACC 11 66 74    LXI     D,POSREQ;      POST_VAL [INDEX] := POST_REQ [INDEX]
1ACF 21 21 74    LXI     H,POSVAL
1AD2 1A       SETC30:    LDAX    D
1AD3 77          MOV     M,A
1AD4 13          INX     D
1AD5 23          INX     H
1AD6 0D          DCR     C
1AD7 C2 D2 1A    JNZ     SETC30
1ADA C9          RET             ; END;
              ;
              ;
              ;
              ;
              ;
```

```
                        ;GETNIB ROUTINE
                        ;HLREGISTER HAS THE BASE ADDRESS:E REGISTER HAS THE BANK INDEX
                        ;RETURNS THE INDEXED NIBBLE IN ACCUMULATOR
                        ;
                        ;
1ADB D5                 GNIB:      PUSH    D                  ;SAVE REGISTER DE
1ADC AF                      XRA     A               ;SET CY = 0
1ADD 57                      MOV     D,A                      ;SETTING FOR DAD OPERATION
1ADE 7B                      MOV     A,E                      ;
1ADF 1F                      RAR                              ;DIVIDE BY 2
1AE0 5F                      MOV     E,A                      ;
1AE1 19                      DAD     D                        ;ADDRESS GENERATION
1AE2 D1                      POP     D                        ;
1AE3 7B                      MOV     A,E                      ;MSB/LSB SELECTION
1AE4 E6 01                   ANI     01H                      ;00,02,04ETC  &01,03,05....
1AE6 3E 0F                   MVI     A,0FH                    ;MASK FOR LSB
1AE8 C2 F3 1A                JNZ     GNI10                    ;
                        ;
                        ;                                     ;MASK FOR MSB SELECTION
1AEB 3E F0                   MVI     A,0F0H
1AED A6                      ANA     M                        ;
1AEE 0F                      RRC                              ;
1AEF 0F                      RRC                              ;
1AF0 0F                      RRC                              ;
1AF1 0F                      RRC                              ;
1AF2 C9                      RET                              ;
                        ;
                        ;
1AF3 A6                 GNI10:     ANA     M                          ;
1AF4 C9                      RET                              ;
                        ;
                        ;
                        ;
1AF5
                        ;
1AF5                         END
M85 assembly errors =        0
```

CROSS REFERENCE

| LABEL | VALUE | REFERENCE |
|---|---|---|
| ACCFMT | 008F | -375 7167 |
| ACCOD1 | 131B | -7105 7120 |
| ACCOD2 | 132A | 7110 -7116 |
| ACCOD3 | 1330 | 7115 -7121 |
| ACCOD4 | 1340 | 7132 -7134 |
| ACCOD5 | 135A | 7160 -7166 |
| ACCODE | 12EE | 3374 -7042 |
| AMTBUF | 00E0 | -254 3107 4568 4756 4773 7274 7327 7401 7415 7435 |
| ASCCRC | 0040 | -101 2796 3845 4146 |
| ASCFMT | 0080 | -376 2605 |
| ASCREG | 0038 | -96 2451 2605 2778 2789 3839 4143 |
| ASCSIZ | 0008 | -360 2451 2454 2473 2484 2484 2607 2775 2778 2789 3822 3839 4143 |
| BADCRC | 0000 | -410 2427 4238 6754 |
| BADCYC | 0004 | -414 2881 2927 4292 |
| BADRAM | 000A | -421 1111 |
| BADSW | 0011 | -397 |
| BALIGN | 1812 | 8312 8329 -8651 |
| BARF | 0017 | -399 3240 |
| BASE5 | 1673 | 8218 -8231 |
| BASEAD | 17DC | 8510 -8547 |
| BCDC | 000F | -7553 7578 |
| BCDO | 000C | -7552 7576 |
| BERSET | 182B | -8668 8679 |
| BINOC1 | 1364 | -7191 7206 |
| BINOC2 | 1366 | -7194 7202 |
| BINOCT | 135D | -7183 |
| BKL50 | 153C | 7790 -7805 |
| BKLASH | 151B | 7721 -7786 |
| BLKTMR | 0050 | -136 699 |
| BNKMSK | 000C | -7556 9193 |
| BNKPAT | 7439 | -210 7729 7885 8401 9036 9213 9233 9265 |
| BODC | 0003 | -7551 7574 |
| BODO | 0000 | -7550 7572 |
| BUFOVR | 0012 | -398 3685 |
| CDBUF | 0316 | -1435 1781 1839 |
| CDBUF1 | 0320 | 1414 -1443 |
| CDBUFC | 0306 | -1409 1777 1799 1870 |
| CDBUFD | 030F | -1424 |
| CHPOST | 1A38 | 9284 -9303 |
| CHRBKT | 0058 | -156 573 1553 5484 |
| CLKD01 | 0046 | 531 -539 |
| CLKD02 | 0049 | 538 -543 |
| CLKDEC | 0040 | -530 654 |
| CLKDGT | 0043 | -537 634 |
| CLRBLK | 0E85 | 1234 3881 4081 4120 4660 4844 4973 -5252 7045 |
| CMBBUF | 00F0 | -259 3113 4538 7359 |
| CMDDSB | 05CD | -2272 3358 |
| CMDENB | 05F3 | -2317 3356 |
| CMPAR1 | 0E93 | -5283 5306 |
| CMPAR2 | 0EA9 | 5285 5298 -5307 |
| CMPARE | 0E8E | 3799 4189 4210 4678 -5277 |
| CONFIG | 062C | -2383 2583 |
| CONSU1 | 0647 | 2415 -2425 |
| CONSU2 | 064C | 2424 -2431 |
| CONSUM | 063A | -2410 2565 4164 7049 |
| CRC | 0EB1 | 1282 2487 2792 2815 3842 3850 4227 -5334 7126 7236 7446 |
| CRC1 | 0EB8 | -5341 5350 |
| CRCNI1 | 0ECD | -5379 5394 |
| CRCNI2 | 0ED6 | 5388 -5390 |

| | | | | | | | | | |
|---|---|---|---|---|---|---|---|---|---|
| CRCNIB | 0EC6 | 5345 | -5367 | 6295 | 6737 | 6985 | | | |
| CSMFMT | 0080 | -377 | 2607 | | | | | | |
| CSTEP0 | 1660 | 8207 | -8213 | | | | | | |
| CTLBKT | 0056 | -151 | 574 | 1503 | 3543 | 5485 | | | |
| CTLCRC | 0010 | -31 | 2422 | 3837 | | | | | |
| CTLREG | 7000 | -324 | 899 | 961 | 1087 | | | | |
| CTLSU1 | 065B | 2462 | -2465 | | | | | | |
| CTLSUM | 064E | 2412 | -2449 | 3833 | | | | | |
| CURBKT | 005A | -161 | 1550 | 1967 | | | | | |
| DALIGN | 17E7 | 8296 | 8322 | 8345 | -8590 | | | | |
| DATA1 | 6800 | -325 | 330 | 4288 | | | | | |
| DBCTR | 005C | -166 | 565 | 1190 | | | | | |
| DBLAN1 | 0EEF | -5433 | 5462 | | | | | | |
| DBLAN2 | 0EEF | -5434 | 5438 | | | | | | |
| DBLANK | 0EDE | 1063 | 1494 | 1962 | 2922 | -5411 | 6147 | | |
| DBLH01 | 068D | -2531 | 3386 | | | | | | |
| DBLH02 | 06A6 | 2518 | -2551 | | | | | | |
| DBLH03 | 06C5 | 2564 | -2576 | | | | | | |
| DBLH04 | 06E2 | 2516 | -2598 | | | | | | |
| DBLH05 | 06E3 | 2521 | 2532 | 2537 | 2554 | 2559 | 2568 | 2578 | -2601 |
| DBLHDR | 0671 | -2512 | 3390 | | | | | | |
| DBOUN1 | 005D | 568 | -575 | | | | | | |
| DBOUNC | 004C | -562 | 733 | | | | | | |
| DBUF | 0080 | -219 | 1412 | 1439 | 1442 | 1653 | 1719 | 1803 | 1803 |
| | | 1879 | 1904 | 1910 | 1933 | 2050 | 2056 | 2168 | 2182 |
| | | 2186 | 2217 | 3642 | 5039 | 5050 | 5075 | 5087 | |
| DBVAL | 0002 | -342 | 580 | | | | | | |
| DECAD1 | 06FE | -2633 | 2654 | | | | | | |
| DECADD | 06F8 | 2476 | -2624 | 2781 | 2829 | 7420 | | | |
| DECCOM | 070C | 2636 | -2675 | 2736 | | | | | |
| DECERR | 0720 | 2629 | -2704 | 2729 | | | | | |
| DECSU1 | 0731 | -2733 | 2757 | | | | | | |
| DECSUB | 072B | -2724 | 2804 | | | | | | |
| DEFDCM | 006C | -201 | 1164 | 3906 | | | | | |
| DEL1 | 1567 | -7855 | 7856 | | | | | | |
| DEL300 | 1555 | -7843 | 8500 | 9268 | | | | | |
| DEL30M | 17A9 | 7801 | 7804 | 7876 | 8201 | 8204 | 8310 | 8340 | -8498 |
| | | 8532 | 8726 | | | | | | |
| DEL6M | 17A3 | -8492 | 8721 | | | | | | |
| DEL75 | 1564 | 7845 | 7846 | 7847 | 7848 | -7853 | 7867 | 9269 | |
| DELM1 | 17AC | 8494 | -8500 | 8502 | | | | | |
| DFLUSH | 0EF6 | 737 | 5417 | -5454 | | | | | |
| DGTMSK | 0003 | -7555 | 7616 | 7870 | 7872 | 7879 | 7884 | 8700 | 9094 |
| | | 9198 | | | | | | | |
| DGTPAT | 743A | -211 | 7734 | 7880 | 8371 | 8423 | 9074 | 9203 | 9244 |
| | | 9267 | | | | | | | |
| DIAFMT | 005F | -378 | 2604 | | | | | | |
| DIEDCM | 006A | -196 | 1161 | 3910 | 4790 | 4867 | 4936 | 7326 | |
| DIMAGE | 0000 | -265 | 776 | 1462 | 1633 | 1649 | 1688 | 1847 | 1849 |
| | | 1850 | 2179 | 2243 | | | | | |
| DISAB1 | 05D5 | 2276 | -2282 | | | | | | |
| DISAB2 | 05EF | 2292 | -2300 | | | | | | |
| DISABL | 05D3 | -2278 | 4182 | | | | | | |
| DISP01 | 0072 | 607 | -609 | | | | | | |
| DISP02 | 0072 | 605 | -610 | | | | | | |
| DISP03 | 007D | -620 | 658 | | | | | | |
| DISP04 | 007F | -623 | 642 | | | | | | |
| DISPLY | 0062 | -596 | 738 | | | | | | |
| DOACCT | 0744 | 1018 | -2773 | 2964 | | | | | |
| DOSTAT | 0778 | -2850 | 3509 | | | | | | |
| DOTR01 | 07D9 | -2973 | 2983 | | | | | | |
| DOTR02 | 07ED | 2978 | -2994 | | | | | | |
| DOTR03 | 07F7 | -3008 | 3018 | | | | | | |
| DOTR04 | 080D | 3013 | -3030 | | | | | | |
| DOTR05 | 080F | 3026 | -3036 | | | | | | |
| DOTR06 | 0811 | -3040 | 3310 | | | | | | |

| | | | | | | | | | |
|---|---|---|---|---|---|---|---|---|---|
| DOTRIP | 07A5 | -2921 | 3220 | 3584 | | | | | |
| DPH1 | 1991 | 9100 | -9103 | | | | | | |
| DPH5 | 1995 | 9102 | -9108 | | | | | | |
| DPHOME | 1986 | 8593 | 8603 | 8655 | 8678 | -9099 | | | |
| DPTS05 | 17D4 | 8515 | -8537 | | | | | | |
| DPTS10 | 17C7 | -8523 | 8540 | | | | | | |
| DPTSP | 17B5 | -8510 | 8611 | 8616 | 8661 | 8668 | | | |
| DSBKBD | 0FC2 | 3370 | -5476 | | | | | | |
| DSCCRC | 0036 | -91 | 1286 | 2819 | 3854 | 4156 | 7240 | 7450 | |
| DSCFMT | 0070 | -379 | 2606 | | | | | | |
| DSCREG | 002F | -86 | 1274 | 2466 | 2471 | 2606 | 2801 | 2812 | 3847 |
| | | 4153 | 4206 | 7071 | 7231 | 7416 | 7434 | | |
| DSCSIZ | 0007 | -361 | 1274 | 2471 | 2473 | 2798 | 2801 | 2812 | 3822 |
| | | 3847 | 4089 | 4123 | 4153 | 4209 | 4556 | 7230 | 7416 |
| | | 7417 | 7417 | 7435 | 7436 | | | | |
| DSPCHR | 0008 | -349 | 1884 | 1891 | 2239 | | | | |
| DSPTMR | 0052 | -141 | 704 | 1515 | 1544 | 1853 | 2254 | | |
| DSPVAL | 0007 | -343 | 1543 | 1852 | 2253 | | | | |
| EJEC | 0000 | -473 | | | | | | | |
| ENABL1 | 05FC | 2321 | -2327 | | | | | | |
| ENABL2 | 0627 | 2355 | -2362 | | | | | | |
| ENABL3 | 0627 | 2342 | -2363 | | | | | | |
| ENABL4 | 0627 | 2337 | -2364 | | | | | | |
| ENABLE | 05F9 | -2323 | 4196 | | | | | | |
| ENAKBD | 0F14 | 3368 | -5500 | | | | | | |
| ENCMOV | 15AB | -7913 | 9218 | 9249 | | | | | |
| ENCT | 15B8 | 7921 | -7925 | | | | | | |
| ENDENT | 0819 | -3062 | 3378 | | | | | | |
| ENDM05 | 15CC | -7971 | 8024 | | | | | | |
| ENDM20 | 15E0 | 7974 | -7987 | | | | | | |
| ENDM25 | 15EB | 7984 | -7995 | | | | | | |
| ENDM30 | 15F9 | 7999 | -8006 | | | | | | |
| ENDM35 | 15FB | 8003 | -8010 | | | | | | |
| ENDM40 | 160F | -8027 | | | | | | | |
| ENDMOV | 15C8 | -7969 | 8898 | 8912 | 8969 | | | | |
| ENTAMT | 082E | -3106 | 3464 | | | | | | |
| ENTCM1 | 0839 | 3110 | -3116 | | | | | | |
| ENTCMB | 0835 | -3112 | 3468 | | | | | | |
| ENTSER | 0848 | -3146 | 3360 | | | | | | |
| EREXIT | 165A | 8195 | -8208 | | | | | | |
| ERRCNT | 0016 | -51 | 3254 | 3631 | | | | | |
| ERRCOD | 0014 | -46 | 3246 | 3829 | | | | | |
| ERRH05 | 18B0 | -8808 | | | | | | | |
| ERRHDR | 18B0 | 8072 | 8417 | 8446 | 8464 | 8479 | 8487 | 8762 | 8785 |
| | | -8807 | 9287 | 9404 | 9436 | 9446 | 9460 | 9466 | |
| ERROR | 7438 | -209 | 7567 | 7591 | 7679 | 7723 | 7741 | 7748 | 7895 |
| | | 7970 | 8043 | 8209 | 8377 | 8396 | 8429 | 8808 | 8823 |
| | | 8900 | 8980 | 9058 | 9080 | 9187 | 9207 | 9225 | 9238 |
| | | 9256 | | | | | | | |
| ERROR2 | 0002 | -9179 | 9236 | | | | | | |
| ERROR3 | 0003 | -9180 | 9224 | | | | | | |
| ERROR4 | 0004 | -9181 | 9255 | | | | | | |
| ERROR5 | 0005 | -7562 | 7740 | | | | | | |
| ERROR6 | 0006 | -7563 | 7747 | | | | | | |
| ERRR1 | 0001 | -9178 | 9206 | | | | | | |
| ERRST | 0013 | -41 | 2604 | | | | | | |
| ERSET | 180C | 8604 | -8616 | | | | | | |
| EXTERR | 18B5 | 8073 | 8763 | 8786 | -8822 | 9288 | | | |
| EXTSER | 0852 | -3166 | 3362 | | | | | | |
| EXTTRP | 0860 | -3190 | 3364 | | | | | | |
| FATE01 | 089E | 3245 | -3260 | | | | | | |
| FATERR | 0880 | 1041 | 1220 | 1242 | 2706 | 2953 | 2988 | 3002 | -3241 |
| | | 3330 | 3603 | 3698 | 4707 | 6205 | | | |
| FATINT | 087E | 502 | 506 | -3237 | | | | | |
| FATRST | 0003 | -413 | 1270 | 7252 | | | | | |
| FILDI1 | 0327 | -1464 | 1469 | | | | | | |

| | | | | | | | | | |
|---|---|---|---|---|---|---|---|---|---|
| FILDIM | 0322 | 1145 | -1459 | 1672 | 1842 | 2159 | | | |
| FILN01 | 0F26 | 5258 | -5527 | | | | | | |
| FILN02 | 0F27 | -5531 | 5541 | | | | | | |
| FILN03 | 0F32 | 5533 | -5542 | | | | | | |
| FILNIB | 0F24 | 1140 | 1212 | 1229 | 1278 | 1326 | 3825 | 4234 | -5524 |
| | | 7232 | | | | | | | |
| FINTR1 | 08AA | -3287 | 3291 | | | | | | |
| FINTR2 | 08B3 | -3295 | 3306 | | | | | | |
| FINTR3 | 08BF | 3301 | -3309 | | | | | | |
| FINTR4 | 08D0 | 3022 | -3327 | | | | | | |
| FINTRP | 08A0 | 1026 | 2991 | -3276 | | | | | |
| FIXSED | 0000 | -21 | 351 | 1136 | 1136 | | | | |
| GETN01 | 0F3D | -5574 | | | | | | | |
| GETN02 | 0F45 | 5578 | -5584 | | | | | | |
| GETNIB | 0F35 | 1654 | 1806 | 1905 | 2169 | 2174 | 2223 | 2679 | 2689 |
| | | 3122 | 3661 | 3890 | 3899 | 4085 | 4651 | 4667 | 4757 |
| | | 4762 | 4806 | 4858 | 4917 | 4957 | 5288 | 5294 | 5342 |
| | | -5563 | 5816 | 6127 | 6981 | 7087 | 7106 | | |
| GNI10 | 1AF3 | 9499 | -9511 | | | | | | |
| GNIB | 1ADB | 9385 | 9388 | 9410 | 9413 | -9488 | | | |
| HACODE | 0090 | -486 | 7167 | | | | | | |
| HAREG | 0082 | -477 | 2605 | | | | | | |
| HCLRSV | 0047 | -436 | 3361 | | | | | | |
| HCONFG | 00AB | -487 | 2389 | | | | | | |
| HCSUM | 0084 | -479 | 2607 | | | | | | |
| HDIAGS | 008D | -484 | 2604 | | | | | | |
| HDISAB | 0042 | -433 | 1427 | 3357 | 3410 | | | | |
| HDISKB | 0063 | -439 | 3369 | | | | | | |
| HDLOCK | 008A | -481 | 2602 | | | | | | |
| HDREG | 0083 | -478 | 2606 | | | | | | |
| HDR001 | 091C | 3371 | -3393 | | | | | | |
| HDR002 | 091F | 3352 | -3398 | | | | | | |
| HDR003 | 092D | 3402 | -3407 | | | | | | |
| HDR004 | 093F | 3414 | -3420 | | | | | | |
| HDR005 | 093F | 3411 | -3421 | | | | | | |
| HDRONY | 08D5 | -3349 | 3635 | 5063 | | | | | |
| HDRP01 | 0954 | 3447 | -3452 | | | | | | |
| HDRP02 | 0954 | 3445 | -3453 | | | | | | |
| HDRP03 | 0979 | 3471 | -3485 | | | | | | |
| HDRP04 | 097C | 3460 | -3489 | | | | | | |
| HDRPLS | 0941 | -3439 | 3672 | 5051 | | | | | |
| HDSEEK | 163B | 8069 | -8191 | | | | | | |
| HENABL | 0041 | -432 | 2078 | 3355 | | | | | |
| HENAKB | 0062 | -438 | 3367 | | | | | | |
| HENDEN | 0043 | -434 | 1496 | 3377 | | | | | |
| HENTAM | 00C5 | -444 | 2018 | 3444 | 3463 | | | | |
| HENTCO | 00C6 | -445 | 2017 | 3446 | 3467 | | | | |
| HEXTRP | 004E | -437 | 3363 | | | | | | |
| HHSLIM | 008E | -485 | 2542 | | | | | | |
| HLOPOS | 008B | -482 | 2526 | | | | | | |
| HMTRKO | 008C | -483 | 2603 | | | | | | |
| HPCNT | 0085 | -480 | 2608 | | | | | | |
| HPHAM1 | 0044 | -8046 | 8199 | | | | | | |
| HPHASE | 0088 | -8047 | 8202 | | | | | | |
| HPSET | 0081 | -476 | 2077 | 2198 | 4511 | | | | |
| HREQAC | 0040 | -453 | 1723 | 3373 | | | | | |
| HREQAR | 0052 | -456 | 2032 | 2553 | 3546 | | | | |
| HREQCF | 005B | -460 | 2582 | | | | | | |
| HREQCS | 0054 | -458 | 2563 | | | | | | |
| HREQDL | 0052 | -467 | 2520 | | | | | | |
| HREQDR | 0053 | -457 | 2028 | 2558 | 3555 | | | | |
| HREQDS | 0055 | -470 | 2536 | | | | | | |
| HREQLP | 0053 | -468 | 2525 | | | | | | |
| HREQMN | 0054 | -469 | 2530 | | | | | | |
| HREQPC | 0055 | -459 | 2034 | 2577 | 3564 | | | | |
| HREQPO | 0051 | -455 | 1532 | 3381 | 3525 | 3639 | | | |
| HREQSL | 0056 | -471 | 2541 | | | | | | |
| HREQSN | 005C | -461 | 3385 | | | | | | |

| | | | | | | | | | |
|---|---|---|---|---|---|---|---|---|---|
| HREQST | 0050 | -454 | 3365 | | | | | | |
| HSETDA | 00C4 | -443 | 2016 | 2586 | 5044 | | | | |
| HSETMN | 00C0 | -441 | 3473 | | | | | | |
| HSETPO | 00C1 | -442 | 2064 | 3477 | | | | | |
| HSETSV | 0046 | -435 | 1757 | 3359 | | | | | |
| HSTAT | 0080 | -475 | 3991 | | | | | | |
| IDLE | 097E | 1191 | -3503 | 3506 | | | | | |
| IDLE01 | 09A4 | 3523 | -3529 | | | | | | |
| IDLE02 | 09D1 | 3538 | -3572 | | | | | | |
| IDLE03 | 09D1 | 3534 | -3573 | | | | | | |
| IDLE04 | 09E6 | 3580 | -3587 | | | | | | |
| INITSM | 156D | 1134 | -7865 | | | | | | |
| INT75 | 009D | 514 | -673 | | | | | | |
| KDCTRL | 004E | -131 | 598 | 723 | 1487 | 1510 | 1588 | 1621 | 1834 |
| | | 1838 | 2163 | 2210 | 3194 | 3581 | 4018 | 5479 | 5481 |
| | | 5506 | 5508 | | | | | | |
| KDIO | 00A7 | -697 | 1564 | | | | | | |
| KDIO01 | 00B7 | 706 | -708 | | | | | | |
| KDIO02 | 00B7 | 702 | -709 | | | | | | |
| KDIO03 | 00D0 | 721 | -731 | | | | | | |
| KDSKIP | 0002 | -344 | 1565 | | | | | | |
| KEYB01 | 034A | 1489 | 1493 | -1501 | | | | | |
| KEYB02 | 0370 | 1524 | -1530 | | | | | | |
| KEYB03 | 0375 | 1529 | -1536 | | | | | | |
| KEYB04 | 0375 | 1517 | -1537 | | | | | | |
| KEYB05 | 0375 | 1513 | -1538 | | | | | | |
| KEYB06 | 0378 | 1508 | -1540 | | | | | | |
| KEYB07 | 038C | 1547 | -1555 | | | | | | |
| KEYB08 | 038C | 1539 | -1556 | | | | | | |
| KEYB09 | 038C | 1500 | -1557 | | | | | | |
| KEYBKT | 0054 | -146 | 563 | 736 | 851 | 5504 | | | |
| KEYBRD | 032E | -1486 | 3588 | | | | | | |
| KEYINT | 4C96 | -345 | 1566 | | | | | | |
| KILCOD | 02BE | -326 | 1126 | 1168 | 6179 | 6186 | 6912 | | |
| LEDOFF | 154A | -7827 | 7886 | 8070 | 8760 | 8783 | 9285 | | |
| LEDON | 153F | -7815 | 7866 | 8068 | 8755 | 8778 | 9283 | | |
| LOKFMT | 0040 | -380 | 2602 | | | | | | |
| LOWWRN | 001C | -61 | 2526 | 4084 | 4556 | | | | |
| LSNMAS | 000F | -7961 | 7981 | 7987 | | | | | |
| LSNMSK | 000F | -7557 | 7571 | 7639 | 7643 | 7796 | 8215 | 8738 | |
| LSTAT1 | 0F63 | 5622 | -5625 | | | | | | |
| LSTATE | 0F4E | 1030 | 1153 | 1180 | 1315 | 1521 | 1627 | 1679 | 2339 |
| | | 2513 | 2873 | 3072 | 3531 | 3728 | 4528 | 4627 | -5610 |
| | | 6134 | 6422 | 6777 | 7242 | 7316 | 7391 | | |
| MANRST | 09E9 | 3083 | -3600 | | | | | | |
| MAXINT | 7FA1 | -346 | | | | | | | |
| MEMORY | M 0000 | 0 | | | | | | | |
| MESAG1 | 0A17 | 3640 | -3655 | | | | | | |
| MESAG2 | 0A17 | 3638 | -3656 | | | | | | |
| MESAG3 | 0A1A | 3632 | -3658 | | | | | | |
| MESAG4 | 0A2E | 3669 | -3676 | | | | | | |
| MESAG5 | 0A31 | 3675 | -3681 | | | | | | |
| MESAG6 | 0A31 | 3657 | -3682 | | | | | | |
| MESAGE | 09EE | 3576 | -3620 | | | | | | |
| MODD01 | 03AD | 1593 | -1599 | | | | | | |
| MODD02 | 03D8 | 1637 | -1639 | | | | | | |
| MODD03 | 03E3 | 1645 | -1647 | | | | | | |
| MODD04 | 03F5 | 1630 | -1664 | | | | | | |
| MODD05 | 03FC | 1668 | -1671 | | | | | | |
| MODD06 | 03FF | 1663 | -1675 | | | | | | |
| MODD07 | 03FF | 1598 | -1676 | | | | | | |
| MODD08 | 0408 | 1682 | -1684 | | | | | | |
| MODD09 | 040E | -1690 | 1702 | | | | | | |
| MODD10 | 0419 | 1693 | -1699 | | | | | | |
| MODDSP | 03A0 | 1562 | -1586 | | | | | | |

| | | | | | | | | | |
|---|---|---|---|---|---|---|---|---|---|
| MODLN | 18BC | 8071 | 8761 | 8784 | -8837 | 9286 | | | |
| MOP01 | 1868 | 8714 | -8723 | | | | | | |
| MOP02 | 185C | -8718 | 8725 | | | | | | |
| MOP05 | 1851 | -8711 | 8722 | | | | | | |
| MOP10 | 186D | 8717 | -8726 | | | | | | |
| MOPEN | 184F | -8710 | 8734 | 8736 | | | | | |
| MOVB01 | 0F8A | 5654 | 5672 | -5705 | | | | | |
| MOVB02 | 0F9A | 5716 | -5719 | | | | | | |
| MOVB03 | 0FAB | 5726 | -5732 | | | | | | |
| MOVBIT | 0F68 | -5647 | 5965 | 7196 | | | | | |
| MOVC05 | 1426 | -7585 | 7717 | | | | | | |
| MOVC1 | 143D | -7599 | | | | | | | |
| MOVC10 | 145E | -7629 | | | | | | | |
| MOVC15 | 145F | 7625 | -7630 | 7681 | | | | | |
| MOVC20 | 1473 | 7634 | -7643 | | | | | | |
| MOVC25 | 147E | 7642 | -7651 | | | | | | |
| MOVC30 | 148C | 7655 | -7660 | | | | | | |
| MOVC35 | 148E | 7659 | -7664 | | | | | | |
| MOVC4 | 1407 | -7570 | | | | | | | |
| MOVC40 | 14A8 | 7678 | -7682 | | | | | | |
| MOVC42 | 14CF | 7706 | -7711 | | | | | | |
| MOVC45 | 14BC | 7694 | -7697 | | | | | | |
| MOVC50 | 14DB | 7587 | 7590 | 7593 | -7722 | | | | |
| MOVC55 | 14ED | 7731 | -7734 | | | | | | |
| MOVC6 | 144D | 7610 | -7616 | | | | | | |
| MOVC60 | 14F9 | 7580 | 7733 | -7740 | | | | | |
| MOVC65 | 14FF | 7736 | 7738 | -7744 | | | | | |
| MOVC7 | 1423 | 7573 | 7575 | 7577 | 7579 | -7583 | | | |
| MOVC70 | 14D8 | -7721 | | | | | | | |
| MOVC8 | 1456 | 7598 | 7618 | -7620 | | | | | |
| MOVCLS | 1403 | -7565 | 8376 | 8395 | 8416 | 8428 | 8445 | 8463 | 8478 |
| | | 8486 | 8759 | 8782 | 9403 | 9430 | 9443 | 9459 | 9465 |
| MRSTS1 | 0048 | -116 | 1009 | 1020 | 1204 | 1307 | 1330 | 1602 | 2289 |
| | | 2343 | 2588 | 2966 | 3147 | 3167 | 3200 | 3535 | 3998 |
| | | 4102 | 4169 | 4286 | 4491 | 4640 | 5617 | 6502 | 6794 |
| MRSTS2 | 004A | -121 | 354 | 2862 | 3242 | 5614 | | | |
| MSERN1 | 0A6D | 3766 | -3794 | | | | | | |
| MSERNO | 0A38 | 3474 | -3713 | 4571 | | | | | |
| MSG2M1 | 0AC4 | 3904 | -3907 | | | | | | |
| MSG2M2 | 0AF2 | 3966 | -3971 | | | | | | |
| MSG2M3 | 0AF2 | 3939 | -3972 | | | | | | |
| MSG2M4 | 0AF2 | 3921 | -3973 | | | | | | |
| MSG2M5 | 0AF2 | 3912 | -3974 | | | | | | |
| MSG2MU | 0AAA | -3878 | 4577 | 4636 | | | | | |
| MSNFMT | 007F | -381 | 2603 | | | | | | |
| MSNMAS | 00F0 | -7960 | 7977 | 7991 | | | | | |
| MSNMSK | 00F0 | -7558 | 7635 | 7647 | 7793 | | | | |
| MTRCHR | 0046 | -111 | 1136 | 1159 | 2394 | | | | |
| MTRSTS | 0AF4 | 3520 | -3990 | 4261 | | | | | |
| MULKEY | 0080 | -347 | 855 | 5503 | | | | | |
| MVDD01 | 00F0 | -779 | 803 | | | | | | |
| MVDD02 | 00FA | 783 | -791 | | | | | | |
| MVDDAT | 00DE | 626 | 646 | -760 | | | | | |
| MVLN01 | 0FB4 | -5761 | | | | | | | |
| MVLNIB | 0FB3 | 1913 | 3129 | 3647 | 3770 | 3783 | 4093 | 4127 | 4591 |
| | | 4716 | 4779 | 4853 | 5001 | 5079 | -5759 | 7063 | 7075 |
| | | 7437 | | | | | | | |
| MVLO05 | 1899 | -8779 | | | | | | | |
| MVLOCK | 1896 | 2997 | -8778 | | | | | | |
| MVPOST | 1A25 | 1215 | 1237 | 4700 | -9282 | | | | |
| MVRN01 | 0FC3 | 5773 | -5801 | 5929 | | | | | |
| MVRN02 | 0FC8 | -5812 | 5846 | | | | | | |
| MVRN03 | 0FDB | 5827 | -5832 | | | | | | |
| MVRN04 | 0FDB | 5823 | -5833 | | | | | | |
| MVRN05 | 0FE2 | 5836 | -5841 | | | | | | |
| MVRN06 | 0FE7 | 5814 | -5847 | | | | | | |
| MVRNIB | 0FC2 | 1938 | 2455 | 3930 | -5799 | | | | |

| | | |
|---|---|---|
| MVTR05 | 187F | -8756 |
| MVTRIP | 187C | 2948 -8755 |
| NARG | 0000 | 0 |
| NBANKS | 0004 | -362 383 1208 1208 1225 1322 2775 2778 2798 2801 4123 4126 4188 4562 4587 4588 4635 4674 4674 4677 4712 4715 |
| NDISP | 0002 | -348 349 773 1461 1462 1649 1687 1688 2179 2243 |
| NINCYC | 0018 | -400 2987 |
| NORFLG | 004C | -126 1490 1558 1761 2089 2285 2331 3063 3117 3399 3442 3516 4320 4487 4691 5092 5127 6486 |
| NORSIZ | 0022 | -354 6689 |
| NORSTR | 0028 | -352 353 354 6690 |
| NPAUS1 | 0B1E | -4045 4047 |
| NPAUSE | 0B19 | 1367 2980 3015 3288 3303 -4042 6041 6345 6892 |
| NUMRD1 | 0014 | -7962 8015 |
| NVM30F | 1031 | 1391 -6029 6201 6335 6671 7020 |
| NVM30G | 103E | -6040 6044 |
| NVM30T | 1047 | 1361 -6063 6187 6330 6652 6821 6850 6963 |
| NVMBAD | 0001 | -411 1378 6378 6452 6917 |
| NVMBYT | 1058 | -6088 6305 6461 6748 |
| NVMCH1 | 1077 | 6137 -6140 |
| NVMCHG | 1068 | 2707 3511 -6124 |
| NVMCTL | 0066 | -186 2335 6126 6402 6493 6574 6691 6717 6960 7016 |
| NVMDE1 | 1099 | 1266 -6191 6922 |
| NVMDE2 | 10A0 | 6182 -6200 |
| NVMDED | 1085 | 1117 1381 2428 2885 2931 4239 4293 -6176 6312 6379 6409 6455 6755 6928 7253 |
| NVMDXB | 10A9 | -6222 6667 6824 6852 |
| NVMER | 10B1 | -6248 6648 6785 6807 |
| NVMER1 | 10D1 | -6288 6302 |
| NVMER2 | 10DF | 6290 -6303 |
| NVMER3 | 10EB | 6309 -6315 |
| NVMER4 | 10EB | 6282 -6316 |
| NVMER5 | 10FE | 6326 -6329 |
| NVMER6 | 1101 | -6331 6375 |
| NVMER7 | 110B | -6344 6348 |
| NVMER8 | 111A | 6355 -6358 |
| NVMERS | 4000 | -329 1363 6319 |
| NVMFN1 | 114E | 6425 -6434 |
| NVMFN2 | 114E | -6435 6465 |
| NVMFND | 112F | -6401 6496 6510 6568 |
| NVMLOD | 116B | 1151 -6485 |
| NVMMAP | 1191 | 6226 6269 6442 -6537 6718 6965 |
| NVMNB1 | 11B9 | 6579 6588 -6599 |
| NVMNBK | 119F | 6250 -6565 6656 6815 6841 |
| NVMNXT | 11BB | 6097 6299 6360 6369 -6617 6742 6994 7008 |
| NVMOPN | 11C4 | 1300 6156 -6639 |
| NVMPRP | 11DF | 6263 -6688 6713 6952 |
| NVMRD | 11EE | 6500 6514 -6711 |
| NVMRD1 | 11FD | -6726 6745 |
| NVMRD2 | 120F | 6728 -6746 |
| NVMRED | 4400 | -328 1126 1168 1336 1373 1375 6179 6274 6447 6722 6884 6912 |
| NVMRET | 0002 | -412 6311 |
| NVMST1 | 1221 | 6780 -6783 |
| NVMST2 | 1232 | 6796 -6799 |
| NVMSTO | 1219 | 1356 3858 -6776 |
| NVMWN | 1261 | 1388 6188 6231 -6875 6970 6989 7005 7012 |
| NVMWN1 | 1274 | -6891 6895 |
| NVMWN2 | 1287 | 6904 -6908 |
| NVMWN3 | 129A | 6910 -6931 |
| NVMWN4 | 129A | 6907 -6932 |

| | | | | | | | | | |
|---|---|---|---|---|---|---|---|---|---|
| NVMWR | 129E | 1065 | 1351 | 3810 | 6150 | 6831 | -6950 | | |
| NVMWR1 | 12B9 | -6975 | 6997 | | | | | | |
| NVMWR2 | 12CD | 6977 | -6998 | | | | | | |
| NVMWR3 | 12E6 | 6962 | -7021 | | | | | | |
| NVMWRT | 4800 | -327 | 6880 | | | | | | |
| OLDSWT | 0068 | -191 | | | | | | | |
| PAUTHK | 041F | -1717 | 2002 | | | | | | |
| PCEFMT | 007F | -382 | 2608 | | | | | | |
| PCEREG | 0028 | -81 | 352 | 2608 | 2826 | 3822 | | | |
| PCESIZ | 0007 | -363 | 2823 | 2826 | 3822 | | | | |
| PCLRK | 0447 | -1776 | 1993 | | | | | | |
| PDCMK | 0450 | -1796 | 1996 | | | | | | |
| PDCMK1 | 0461 | 1810 | -1816 | | | | | | |
| PERDSP | 0464 | -1831 | 3259 | 4269 | | | | | |
| PFLAG0 | 0000 | -7554 | 7583 | | | | | | |
| PH0011 | 18DF | 8871 | -8895 | 9103 | | | | | |
| PH0110 | 18FD | 8863 | -8947 | 9108 | | | | | |
| PH05 | 18F9 | 8902 | -8915 | | | | | | |
| PHASE1 | 0011 | -7559 | 7619 | | | | | | |
| PHASE2 | 0044 | -7560 | 7617 | | | | | | |
| PLH05 | 1983 | 9091 | -9094 | | | | | | |
| PLH10 | 18DB | 8868 | -8871 | | | | | | |
| PLH12 | 18D4 | 8860 | -8867 | | | | | | |
| PLH14 | 18D9 | 8862 | -8870 | | | | | | |
| PLH52 | 1903 | -8955 | | | | | | | |
| PLH57 | 190D | 8952 | -8963 | | | | | | |
| PLH65 | 1912 | 8960 | -8966 | | | | | | |
| PLH66 | 1915 | -8968 | 8977 | | | | | | |
| PLH67 | 1916 | -8969 | | | | | | | |
| PLH68 | 1919 | -8970 | | | | | | | |
| PLH70 | 191E | -8975 | | | | | | | |
| PLH83 | 1923 | -8979 | | | | | | | |
| PLHOME | 18C5 | -8859 | | | | | | | |
| PNUMK | 048A | -1868 | 1988 | | | | | | |
| PNUMK1 | 04A5 | 1895 | -1899 | | | | | | |
| POHOME | 18C5 | 8388 | 8408 | 8439 | -8858 | | | | |
| PORT2A | 6800 | -330 | 7570 | 7609 | 7868 | 7877 | 8214 | 8699 | 9090 |
| | | 9192 | 9197 | | | | | | |
| PORTA | 7001 | -331 | 612 | 840 | 1062 | 1092 | 1186 | 2959 | 3042 |
| | | 3278 | 4452 | 5455 | 6033 | 6035 | 6066 | 6068 | 7816 |
| | | 7818 | 7828 | 7830 | | | | | |
| PORTB | 7002 | -332 | 712 | 908 | 963 | 1060 | 7638 | 7646 | 7651 |
| | | 7791 | 7800 | 7803 | 7875 | 7980 | 7990 | 7995 | 8200 |
| | | 8203 | 8309 | 8337 | 8339 | 8511 | 8720 | 8838 | 8840 |
| | | 9026 | | | | | | | |
| PORTBI | 006E | -206 | 209 | 210 | 211 | 711 | 907 | 964 | |
| PORTC | 7003 | -333 | 847 | 4459 | | | | | |
| POSFMT | 0040 | -383 | 4511 | | | | | | |
| POSREG | 0042 | -106 | 1225 | 1322 | 2778 | 2801 | 4123 | 4185 | 4511 |
| | | 4712 | | | | | | | |
| POSREQ | 7466 | -9376 | 9387 | 9412 | 9469 | | | | |
| POSUP1 | 0B85 | 4111 | 4138 | -4205 | | | | | |
| POSUP2 | 0B92 | 4147 | 4157 | -4226 | | | | | |
| POSUPD | 0B23 | 3510 | -4074 | | | | | | |
| POSVAL | 7421 | -9377 | 9384 | 9409 | 9470 | | | | |
| PREG | 7421 | -9374 | 9377 | | | | | | |
| PROERR | 0BA1 | 494 | 496 | 498 | 500 | 504 | 508 | 512 | 1736 |
| | | 1745 | 2547 | 2587 | 3068 | 3192 | 3482 | 3678 | 3715 |
| | | -4260 | 4494 | 4533 | 4542 | 4551 | 4582 | 4625 | 4753 |
| | | 5008 | 7054 | 7287 | 7311 | 7321 | 7371 | 7396 | 7405 |
| | | 7429 | | | | | | | |
| PROKE1 | 04DB | -1974 | 1978 | | | | | | |
| PROKE2 | 04E3 | 1976 | -1979 | | | | | | |
| PROKE3 | 0502 | 1982 | -2012 | | | | | | |
| PROKEY | 04CE | 1554 | -1961 | | | | | | |
| PSETK | 0516 | 1999 | -2048 | | | | | | |
| PSETK1 | 052F | 2052 | -2075 | | | | | | |

| | | | | | | | | | |
|---|---|---|---|---|---|---|---|---|---|
| PSETK2 | 0536 | 2054 | -2057 | | | | | | |
| PTNC10 | 1968 | 9027 | -9072 | | | | | | |
| PTNC15 | 193C | -9037 | 9075 | | | | | | |
| PTNC20 | 1971 | 9038 | 9043 | -9078 | | | | | |
| PTNC25 | 1972 | 9053 | 9068 | -9079 | | | | | |
| PTNC30 | 195A | 9045 | -9063 | | | | | | |
| PTNC40 | 1955 | 9051 | -9057 | 9065 | 9067 | | | | |
| PTNCHK | 192A | 8362 | 8365 | 8608 | 8658 | 8915 | 8971 | -9024 | |
| PTR | 0010 | -16 | 21 | -23 | 23 | 26 | -28 | 28 | 31 |
| | | -33 | 33 | 36 | -38 | 38 | 41 | -43 | 43 |
| | | 46 | -48 | 48 | 51 | -53 | 53 | 56 | -58 |
| | | 58 | 61 | -63 | 63 | 66 | -68 | 68 | 71 |
| | | -73 | 73 | 76 | -78 | 78 | 81 | -83 | 83 |
| | | 86 | -88 | 88 | 91 | -93 | 93 | 96 | -98 |
| | | 98 | 101 | -103 | 103 | 106 | -108 | 108 | 111 |
| | | -113 | 113 | 116 | -118 | 118 | 121 | -123 | 123 |
| | | 126 | -128 | 128 | 131 | -133 | 133 | 136 | -138 |
| | | 138 | 141 | -143 | 143 | 146 | -148 | 148 | 151 |
| | | -153 | 153 | 156 | -158 | 158 | 161 | -163 | 163 |
| | | 166 | -168 | 168 | 171 | -173 | 173 | 176 | -178 |
| | | 178 | 181 | -183 | 183 | 186 | -188 | 188 | 191 |
| | | -193 | 193 | 196 | -198 | 198 | 201 | -203 | 203 |
| | | 206 | -208 | 208 | 214 | -216 | 216 | 216 | 219 |
| | | -221 | 221 | 224 | -226 | 226 | 229 | -231 | 231 |
| | | 234 | -236 | 236 | 239 | -241 | 241 | 241 | 244 |
| | | -246 | 246 | 249 | -251 | 251 | 254 | -256 | 256 |
| | | 259 | -261 | 261 | -262 | 265 | -267 | 267 | |
| PUTN01 | 1007 | 5886 | -5896 | | | | | | |
| PUTNIB | 0FEE | 1813 | 1928 | 2650 | 2753 | 4670 | 4815 | 4821 | 4987 |
| | | 4992 | 5535 | 5819 | -5868 | 6733 | 7096 | 7112 | 7328 |
| PWRAB1 | 01A7 | 1014 | -1025 | | | | | | |

What is claimed is:

1. In a postage meter having means for entering data, means for displaying numerical values and other data, means for printing postage, computer means electrically connected to each of the aforesaid means and programmed for processing data for controlling the operation thereof, wherein said data entering means includes a keyboard having a plurality of depressable numeric keys, and wherein said computer means includes means for storing data and calculating amounts pertaining to the operation of said postage meter, an improvement for displaying data pertaining to the operation of said postage meter, the improvement comprising:

(a) said keyboard including a depressable special purpose key;

(b) said computer means programmed for causing said displaying means to display a numerical value in response to the depression of selected numeric keys;

(c) said computer means programmed for automatically processing said numerical value on display in response to the depression of said special purpose key; and (d) said computer means programmed for automatically causing said displaying means to display data pertaining to the operating of said postage meter in response to the depression of said special purpose key when said displayed numerical value is a predetermined value.

2. The improvement according to claim 1, wherein said predetermined value includes at least one numeral.

3. The improvement according to claim 1, wherein said predetermined value is one of a plurality of predetermined values, and each of said predetermined values corresponding to unique data pertaining to the operation of said postage meter.

4. The improvement according to claim 1, wherein said postage meter has a service mode of operation, said predetermined value is one of a plurality of predetermined values, each of said predetermined values corresponding to unique data pertaining to the operation of said postage meter when said postage meter is not in a service mode of operation, and a plurality of said predetermined values corresponding to other unique data when said postage meter is in said service mode of operation.

5. The improvement according to claim 1, wherein said computer means is programmed for causing said displaying means to display data corresponding to an access code if a numerical value is not on display and said special purpose key is depressed.

6. The improvement according to claim 1, wherein said computer means is programmed for causing said displaying means to display data indicating a procedural error has occurred when said displayed numerical value is not said predetermined value.

7. The improvement according to claim 1, wherein said data caused to be displayed corresponds to a particular postage value stored in said computer means.

8. The improvement according to claim 1, wherein said data caused to be displayed corresponds to a variable accounting value stored in said computer means.

9. The improvement according to claim 8, wherein said data caused to be displayed corresponds to the value of all postage then available for printing.

10. The improvement according to claim 8, wherein said data caused to be displayed corresponds to the value of all postage printed by said postage meter.

11. The improvement according to claim 1, wherein said data caused to be displayed corresponds to the total of all printing operation of said postage meter.

12. The improvement according to claim 1, wherein said data caused to be displayed corresponds to a postage value stored in the meter for warning that the postage then available for printing is low.

13. The improvement according to claim 1, wherein said postage meter includes a depressable postage setting key, and wherein said data caused to be displayed corresponds to a postage value which will not be printed when equalled and will not be printed when exceeded unless said postage setting key is depressed more than once.

14. The improvement according to claim 1, wherein said data caused to be displayed corresponds to a maximum settable postage value for printing purposes.

15. The improvement according to claim 1, wherein said data caused to be displayed corresponds to the sum of all postage then available for printing and the total of all postage printed by the postage meter.

16. The improvement according to claim 1, wherein said data caused to be displayed corresponds to the postage value setting of said printing means.

17. The improvement according to claim 1, wherein said data caused to be displayed indicates that said printing means has been commanded to be enabled in response to the depression of said special purpose key.

18. The improvement according to claim 1, wherein said data caused to be displayed indicates that said printing means has been commanded to be disabled in response to the depression of said special purpose key.

19. The improvement according to claim 1, wherein said data caused to be displayed corresponds to the postage value entered via said keyboard prior in time to said printing means being commanded to be disabled in response to the depression of said special purpose key.

20. The improvement according to claim 1, wherein said postage meter has a service mode of operation said data caused to be displayed indicates that said postage meter has been commanded to enter the service mode of operation in response to the depression of said special purpose key.

21. The improvement according to claim 1, wherein said postage meter has a service mode of operation said data caused to be displayed indicates that said postage meter has been commanded to exit the service mode of operation in response to the depression of said special purpose key.

22. The improvement according to claim 1, wherein said data caused to be displayed corresponds to the serial number of said postage meter.

23. The improvement according to claim 1, wherein said data caused to be displayed identifies a particular processing step of the computer means which has been diagnosed as having failed.

24. The improvement according to claim 1, wherein said data caused to be displayed indicates the status of said postage meter.

25. In a postage meter having means for entering data, means for displaying numerical values and other data, means for printing postage, computer means electrically connected to each of the aforesaid means and programmed for processing data for controlling the operation thereof, wherein said data entering means includes a keyboard having a plurality of depressable numeric keys, and wherein said computer means includes means for storing data and calculating amounts pertaining to the operation of said postage meter, a method of displaying data pertaining to the operation of said postage meter, said method comprising:

(a) providing said keyboard with a depressable special purpose key;
(b) depressing selected numeric keys for causing the display of a predetermined numerical value;
(c) depressing said special purpose key when said numerical value is on display; and
(d) programming said computer means for causing said displaying means to display data pertaining to the operation of said postage meter in response to the depression of said special purpose key when said displayed numerical value is the predetermined value.

26. The method according to claim 25, wherein step (b) includes the step of utilizing a predetermined value which includes at least one numeral.

27. The method according to claim 25, wherein step (b) includes the step of utilizing a predetermined value which does not include a decimal.

28. The method according to claim 25, including the step of programming said computer means for causing said displaying means to display data indicating that a procedural error has occurred if said special purpose key is depressed when the value on display is not said predetermined value.

29. The method according to claim 25, including the step of programming said computer means for causing said displaying means to display a numerical value associated with the depression of said key if said predetermined value is not on display when said special purpose key is depressed.

30. The improvement according to claim 25, wherein step (d) includes the step of providing a plurality of predetermined values respectively causing said displaying means to display data associated therewith.

* * * * *